US011304037B2

(12) United States Patent
Fechtel et al.

(10) Patent No.: US 11,304,037 B2
(45) Date of Patent: Apr. 12, 2022

(54) V2X COMMUNICATIONS USING MULTIPLE RADIO ACCESS TECHNOLOGIES (MULTI-RAT)

(71) Applicant: Intel Corporation, Santa Clara, CA (US)

(72) Inventors: Stefan Fechtel, Zorneding (DE); Kilian Peter Anton Roth, Munich (DE); Bertram Gunzelmann, Koenigsbrunn (DE); Markus Dominik Mueck, Unterhaching (DE); Ingolf Karls, Feldkirchen (DE); Zhibin Yu, Unterhaching (DE); Thorsten Clevorn, Munich (DE); Nageen Himayat, Fremont, CA (US); Dave A. Cavalcanti, Portland, OR (US); Ana Lucia Pinheiro, Hillsboro, OR (US); Bahareh Sadeghi, Portland, OR (US);

(Continued)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 16/623,348

(22) PCT Filed: Jun. 28, 2018

(86) PCT No.: PCT/US2018/039941
§ 371 (c)(1),
(2) Date: Dec. 16, 2019

(87) PCT Pub. No.: WO2019/006085
PCT Pub. Date: Jan. 3, 2019

(65) Prior Publication Data
US 2020/0280827 A1  Sep. 3, 2020

Related U.S. Application Data

(60) Provisional application No. 62/527,608, filed on Jun. 30, 2017.

(51) Int. Cl.
*H04W 4/40* (2018.01)
*H04W 4/80* (2018.01)
(Continued)

(52) U.S. Cl.
CPC .......... *H04W 4/40* (2018.02); *H04W 4/80* (2018.02); *H04W 8/08* (2013.01); *H04W 80/02* (2013.01); *H04W 80/08* (2013.01)

(58) Field of Classification Search
CPC .......... H04W 4/10; H04W 4/80; H04W 8/08; H04W 80/02; H04W 80/08; H04W 4/40;
(Continued)

(56) References Cited

U.S. PATENT DOCUMENTS 8,902,855 B2  2/2014  Etemad et al.
8,767,536 B2  7/2014  Himayat et al.
(Continued)

FOREIGN PATENT DOCUMENTS

CN    110832951       2/2020
EP    2068452 A2      6/2009
(Continued)

OTHER PUBLICATIONS

"International Application Serial No. PCT US2018 039941, International Preliminary Report on Patentability dated Jan. 9, 2020", 7 pgs.
(Continued)

*Primary Examiner* — Mewale A Ambaye
(74) *Attorney, Agent, or Firm* — Schwegman Lundberg & Woessner, P.A.

(57) ABSTRACT

Systems, devices, and techniques for V2X communications using multiple radio access technologies (RATs) aredescribed herein. A communication associated with one or more of the multiple RATs may be received at a device. The device may include a transceiver interface with multiple
(Continued)

connections to communicate with multiple transceiver chains. The multiple transceiver chains can be configured to support multiple RATs. Additionally, the multiple transceiver chains may be controlled via the multiple connections of the transceiver interface to coordinate the multiple RATs to complete the communication.

14 Claims, 52 Drawing Sheets

(72) Inventors: Hassnaa Moustafa, Portland, OR (US); Marcio Rogerio Juliato, Portland, OR (US); Rafael Misoczki, Hillsboro, OR (US); Emily H. Qi, Gig Harbor, WA (US); Jeffrey R. Foerster, Portland, OR (US); Duncan Kitchin, Beaverton, OR (US); Debdeep Chatterjee, San Jose, CA (US); Jong-Kae Fwu, Sunnyvale, CA (US); Carlos Aldana, Santa Clara, CA (US); Shilpa Talwar, Cupertino, CA (US); Harry G. Skinner, Beaverton, OR (US); Debabani Choudhury, Thousand Oaks, CA (US)

(51) Int. Cl.
*H04W 8/08* (2009.01)
*H04W 80/02* (2009.01)
*H04W 80/08* (2009.01)

(58) Field of Classification Search
CPC ......... H04W 4/44; H04W 4/46; H04W 88/06; H04W 76/16; H04W 24/02
See application file for complete search history.

(56) References Cited

U.S. PATENT DOCUMENTS

| | | | |
|---|---|---|---|
| 9,036,473 | B2 | 5/2015 | Himayat et al. |
| 9,119,154 | B2 | 8/2015 | Etemad et al. |
| 9,426,689 | B2 | 8/2016 | Himayat et al. |
| 9,479,241 | B2 | 10/2016 | Pabla |
| 2009/0068969 | A1 | 3/2009 | Lindoff et al. |
| 2013/0195026 | A1 | 8/2013 | Johnsson et al. |
| 2013/0196632 | A1* | 8/2013 | Horn ............... H04W 72/0433 455/411 |
| 2013/0237227 | A1* | 9/2013 | Nagaraja ......... H04W 36/00835 455/436 |
| 2015/0181459 | A1 | 6/2015 | Zhu |
| 2015/0257013 | A1* | 9/2015 | Patel ..................... H04W 48/10 370/252 |
| 2015/0365981 | A1 | 12/2015 | Thanayankizil et al. |
| 2016/0007227 | A1* | 1/2016 | Picker ............... H04W 28/0247 370/329 |
| 2017/0150490 | A1 | 5/2017 | Chen et al. |
| 2019/0042617 | A1* | 2/2019 | Guim Bernat ......... H04W 4/00 |
| 2019/0104011 | A1* | 4/2019 | Yang ....................... H04L 27/38 |
| 2019/0312815 | A1* | 10/2019 | Altman ............. H04W 28/0236 |

FOREIGN PATENT DOCUMENTS

| | | | |
|---|---|---|---|
| WO | WO-2014129870 A1 | 8/2014 | |
| WO | WO-2015172658 A1 * | 11/2015 | .......... H04L 1/0009 |
| WO | WO-2017035305 A1 | 3/2017 | |
| WO | WO-2019006085 A1 | 1/2019 | |

OTHER PUBLICATIONS

"Indian Application Serial No. 201947048816, First Examination Report dated Mar. 15, 2021", 7 pgs.

"Korean Application Serial No. 10-2019-7035280, Voluntary Amendment filed Jun. 28, 2021", with English claims, 22.

"5G Automotive Vision", 5G PPP, [Online], Retrieved from the Internet: <URL: https://5g-ppp.eu/wp-content/uploads/2014/02/5G-PPP-White-Paper-on-Automotive-Vertical-Sectors.pdf>, (Oct. 20, 2015), 67 pgs.

"5G White Paper", NGMN Alliance, (Feb. 17, 2015), 125 pgs.

"International Application Serial No. PCT/US2018/039941, International Search Report dated Oct. 30, 2018", 3 pgs.

"International Application Serial No. PCT/US2018/039941, Written Opinion dated Oct. 30, 2018", 5 pgs.

Bakmaz, Bojan, et al., "Network Selection Algorithm for Heterogeneous Wireless Environment", 18th Annual IEEE International Symposium on Personal, Indoor and Mobile Radio Communications (PIMRC'07), (2007), 4 pgs.

Karakus, Can, et al., "Enhancing Multiuser MIMO Through Opportunistic D2D Cooperation", (2017), 47 pgs.

Song, Guocong, et al., "Utility-Based Resource Allocation and Scheduling in OFDM-Based Wireless Broadband Networks", IEEE Communications Magazine, (Dec. 2005), 127-134.

Wang, Lusheng, "Mathematical Modeling for Network Selection in Heterogeneous Wireless Networks—A Tutorial", IEEE Communications Surveys & Tutorials, vol. 15, No. 1, First Quarter 2013, (2013), 271-292.

Yeh, Shu-Ping, et al., "Capacity and Coverage Enhancement in Heterogeneous Networks", IEEE Wireless Communications, (Jun. 2011), 32-38.

"European Application Serial No. 18825490.8, Extended European Search Report dated Feb. 4, 2021", 15 pgs.

"European Application Serial No. 18825490.8, Response filed Aug. 23, 2021 to Extended European Search Report dated Feb. 4, 2021", 14 pgs.

* cited by examiner

V2X COMMUNICATIONS USING MULTIPLE RADIO ACCESS TECHNOLOGIES (MULTI-RAT)

PRIORITY CLAIM

This application is a U.S. National Stage Filing under 35 U.S.C. 371 from International Application No. PCT/US2018/039941, filed Jun. 28, 2018, and published as WO 2019/006085, which claims the benefit of priority to U.S. Provisional Patent Application Ser. No. 62/527,608, filed Jun. 30, 2017, and entitled "V2X COMMUNICATIONS USING MULTIPLE RADIO ACCESS TECHNOLOGIES (MULTI-RAT)." Each of which are incorporated herein by reference in their entirety.

TECHNICAL FIELD

Aspects pertain to radio access networks (RAN s). Some aspects relate to vehicle-to-everything (V2X) communications in various radio access technologies (RATs), including cellular local rea networks and wireless local area networks (WLANs), including Third Generation Partnership Project Long Term Evolution (3GPP LTE) networks and LTE advanced (LTE-A) networks, as well as 4th generation (4G) networks and 5th generation (5G) networks. Some aspects relate to multi-RAT, multi-link V2X communications. Some aspects relate to V2X multi-radio convergence.

BACKGROUND

The use of 3GPP LTE systems (including both LTE and LTE-A systems) has increased due to both an increase in the types of devices such as user equipment (UEs) using network resources as well as the amount of data and bandwidth being used by various applications, such as video streaming operating on these UEs. For example, the growth of network use by Internet of Things (IoT) UEs, which include machine type communication (MTC) devices such as sensors and may use machine-to-machine (M2M) communications, as well as the burgeoning V2X communications, has severely strained network resources and increased communication complexity. V2X communications of a variety of different applications from a user equipment (UE) are to coordinate with various technologies, as well as among potentially rapidly moving vehicles.

Connected cars are becoming an important part of connected life of the users. With autonomous driving and IoT on the horizon, V2X through the connectivity in the car, among vehicles, between vehicles and the infrastructure as well as sensors and the "things" surrounding the cars becomes more desirable. At the same time, meeting the stringent requirements of autonomous driving and seamless connectivity on the go for V2X applications as well as within the car and IoT applications remains challenging. Currently, various wireless technologies, including IEEE 802.11p, Dedicated Short Range Communications (DSRC), Wireless Access Vehicular Environment (WAVE), Cellular, etc., attempt to address the V2X network requirement s.

BRIEF DESCRIPTION OF THE FIGURES

In the figures, which are not necessarily drawn to scale, like numerals may describe similar components in different views. Like numerals having different letter suffixes may represent different instances of similar components. Aspects are illustrated by way of example, and not limitation, in the following figures of the accompanying drawings.

DETAILED DESCRIPTION

Figure 1:
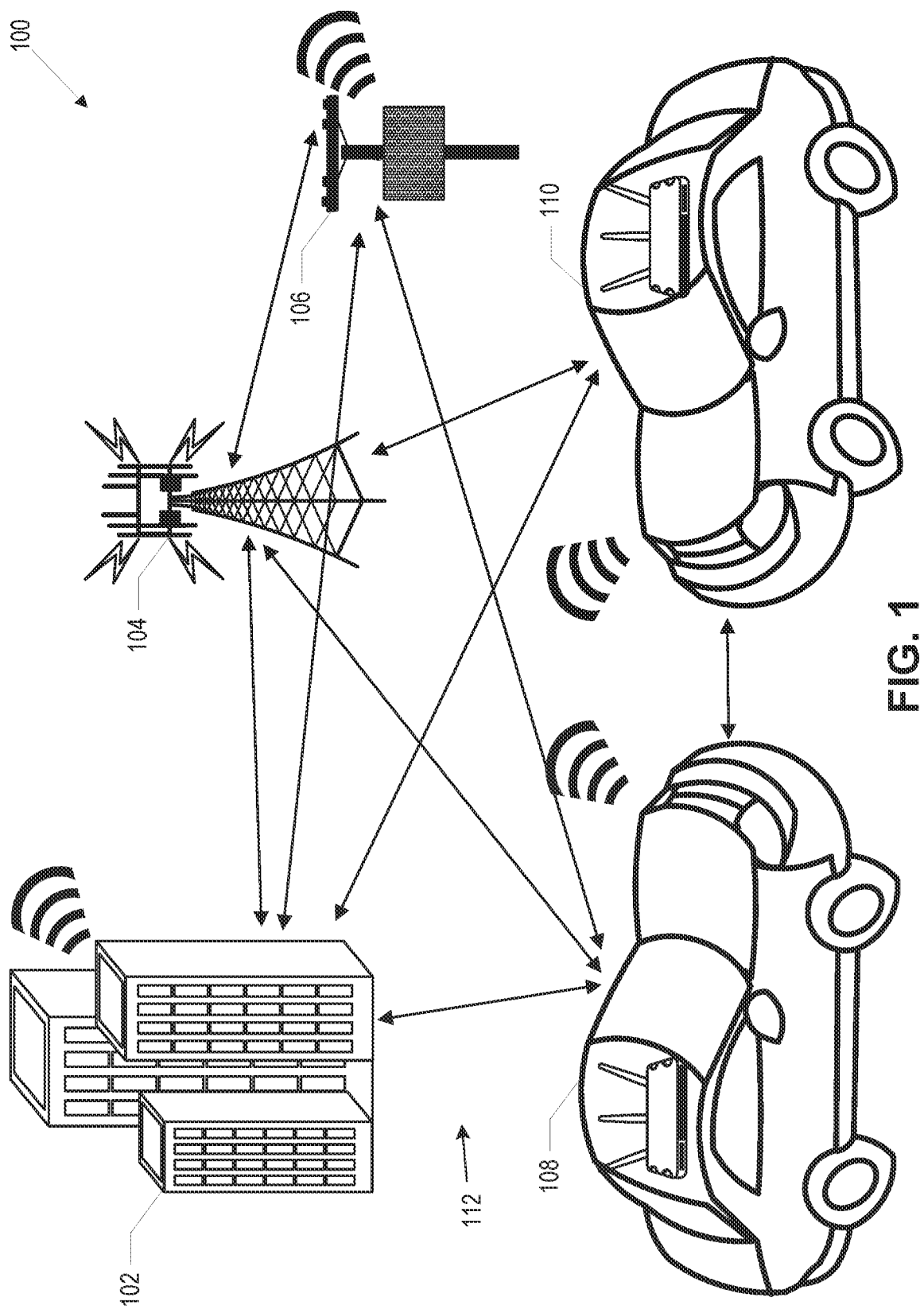
FIG. 1 illustrates an exemplary V2X communication environment using multi-RAT, multi-link connectivity according to some aspects described herein.

Aspects relate to systems, devices, methods, computer-readable media, apparatus, and assemblies for multi-RAT V2X communications. In some aspects, various access technologies may be utilized and co-exist within a single communication device (e.g, a vehicular terminal device or another device used in V2X communications), the same way that multi-radios are a norm and have come to be expected for other communication devices. For example, some radios may collect information from sensors, some radios may provide connectivity to the users, while other radios may communicate with infrastructure/Road Side Units (RSUs) and other vehicular terminal devices (or cars) for automated driving etc.

The following description and the drawings illustrate specific aspects to enable those skilled in the art to practice them. Other aspects may incorporate structural, logical, electrical, process, and other changes. Portions and features of some aspects may be included in, or substituted for, those of other aspects, and are intended to cover all available equivalents of the elements described.

The word "exemplary" is used herein to mean "serving as an example, instance, or illustration." Any aspect or design described herein as "exemplary" is not necessarily to be construed as preferred or advantageous over other aspects or designs.

The words "plurality" and "multiple" in the description or the claims expressly refer to a quantity greater than one. The terms "group (of)," "set (of)," "collection (of)," "series (of)," "sequence (of)," "grouping (of)," etc., and the like in the description or in the claims refer to a quantity equal to or greater than one, i.e. one or more. Any term expressed in plural form that does not expressly state "plurality" or"multiple" likewise refers to a quantity equal to or greater than one. The terms "proper subset," "reduced subset," and "lesser subset" refer to a subset of a set that is not equal to the set, i.e. a subset of a set that contains less elements than the set.

It is appreciated that any vector or matrix notation utilized herein is exemplary in nature and is employed solely for purposes of explanation. Accordingly, it is understood that the approaches detailed in this disclosure are not limited to being implemented solely using vectors or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, the term "software" includes any type of executable instruction or set of instructions, including embedded data in the software. Software may also encompass firmware. Software may create, delete or modify software, e.g., through a machine learning process.

A "module" as used herein is understood to include any kind of functionality-implementing entity, which may include hardware-defined modules such as special-purpose hardware, software-defined modules such as a processor executing software or firmware, and mixed modules that include both hardware-defined and software-defined components. A module may thus be an analog circuit or component, digital circuit, mixed-signal circuit or component, logic circuit, processor, microprocessor, Central Processing Unit (CPU), application processor, Graphics Processing Unit (GPU), Digital Signal Processor (DSP), Field Programmable Gate Array (FPGA), integrated circuit, discrete circuit, Application Specific Integrated Circuit (ASIC), etc., or any combination thereof. Any other kind of implementation of the respective functions which will be described below in further detail may also be understood as a "module". It is understood that any two (or more) of the modules detailed herein may be realized as a single module with substantially equivalent functionality, and conversely that any single module detailed herein may be realized as two (or more) separate modules with substantially equivalent functionality. Additionally, references to a "module" may refer to two or more modules that collectively form a single module.

The term "terminal device" utilized herein includes user-side devices (both mobile and immobile) that may connect to a core network and various external networks via a radio access network. The term "network access node" as utilized herein includes to a network-side device that provides a radio access network with which terminal devices may connect and exchange information with other networks through the network access node.

The term "base station" used in reference to an access node of a mobile communication network may be understood to include a macro base station (such as, for example, for cellular communications), micro/pico/femto base station, Node B, evolved Node-B (base station), Home base station, Remote Radio Head (RRH), relay point, access point (AP, such as, for example, for Wi-Fi, WLAN, WiGig millimeter Wave (mmWave), etc.) etc. As used herein, a "cell" in the setting of telecommunications may be understood to include an area (e.g., a public place) or space (e.g., multi-story building or airspace) served by a base station or access point. The base station may include mobile, e.g., installed in a vehicle, and the covered area or space may move accordingly. Accordingly, a cell may be covered by a set of co-located transmit and receive antennas, each of which also able to cover and serve a specific sector of the cell. A base station or access point may serve one or more cells, where each cell is characterized by a distinct communication channel or standard (e.g., a base station offering 2G, 3G and LTE services). Macro-, micro-, femto-, pico-cells may have different cell sizes and ranges, and may be static or dynamic (e.g., a cell installed in a drone or balloon) or change its characteristic dynamically (for example, from macrocell to picocell, from static deployment to dynamic deployment, from omnidirectional to directional, from broadcast to narrowcast). Communication channels may include narrowband or broadband. Communication channels may also use carrier aggregation across radio communication technologies and standards, or flexibly adapt bandwidth to communication needs. In addition, terminal devices may include or act as base stations or access points or relays or other network access nodes.

For purposes of this disclosure, radio communication technologies may be classified as one of a Short Range radio communication technology or Cellular Wide Area radio communication technology, for example. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit-switched and packet-switched GSM, including GPRS, EDGE, and any other related GSM technologies. Likewise, the term UMTS refers to both circuit- and packet-switched GSM, i.e. including HSPA, HSDPA/HSUPA, HSDPA+/HSUPA+, and any other related UMTS technologies.

The term "network" as utilized herein, for example, in reference to a communication network such as a mobile communication network, encompasses both an access section of a network (e.g., a radio access network (RAN) section) and a core section of a network (e.g., a core network section), but also, for an end-to-end system, encompasses mobile (including peer-to-peer, device to device, or machine to machine communications), access, backhaul, server, backbone and gateway/interchange elements to other networks of the same or different type. The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network. The up link communication channel may be a physical channel or a virtual channel. Idle or connection mode may be connection-switched or packet-switched.

Unless explicitly specified, the term "transmit" encompasses both direct (point-to-point) and indirect transmission (via one or more intermediary points or nodes). Similarly, the term "receive" encompasses both direct and indirect reception. Furthermore, the terms "transmit," "receive," "communicate," and other similar terms encompass both physical transmission (e.g., the transmission of radio signals) and logical transmission (e.g, the transmission of logical data over a software-level connection). For example, a processor may transmit or receive data in the form of radio signals with another processor, where the physical transmission and reception is handled by radio-layer components such as RF transceivers and antennas, and the logical transmission and reception is performed by the processor. The term "communicate" encompasses one or both of transmitting and receiving i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Several different vehicular radio communication technologies, including short range radio communication technology (e.g, Dedicated Short Range Communications (DSRC)), cellular wide area radio communication technology (e.g, Long Term Evolution (LTE) Vehicle-to-Vehicle (V2V) and Vehicle-to-Everything (V2X)), and cellular narrowband radio communication technology may be used for communicating with and between vehicular terminal devices. These vehicular radio communication technologies target both autonomous driving use cases and delivery of standard mobile communications data, such as voice calls, text messages, and Internet and application data, to connected vehicles.

A short range radio communication technology may include e.g. a DSRC technology, a Bluetooth radio communication technology, an Ultra Wide Band (UWB) radio communication technology, a Wireless Local Area Network radio communication technology (e.g according to an IEEE 802.11 (e.g. IEEE 802.1 in) radio communication standard)), IrDA (Infrared Data Association), Z-Wave and ZigBee, HiperLAN/2 ((High Performance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.1 1ad for VHT at 60 GHz, a Worldwide Interoperability for Microwave Access (WiMax) (e.g according to an IEEE 802.16 radio communication standard, e.g. WiMax fixed or WiMax mobile), WiPro, HiperMAN (High Performance Radio Metropolitan Area Network), IEEE 802.16m Advanced Air Interface, WiGig (e.g., according to any IEEE 802.11 standard), millimeter Wave and other similar radio communication technologies and the like.

A short range radio communication technology may, for example, include the following characteristics: the technology may be based on Carrier Sense Multiple Access (CSMA); the technology may be contention-based, e.g usually no fully load channel possible; the technology may be rather inexpensive; no communication network provider is necessary for the spectrum; e.g for DSRC: the add-on 802.11 system may be implemented in most of the communication devices, e.g. in vehicles; the technology may be used to form an ad hoc network where there is no fixed communications infrastructure; the technology may provide a high data rate; the technology may in some cases not provide a redundancy frequency band; the technology may in some cases have latency as an issue, since the latency may be unpredictable; and the technology may in some cases have no central scheduler.

DSRC builds on the Institute of Electrical and Electronics Engineers (IEEE) 802.11p physical and medium access control layers, while LTE V2V/V2X develops on top of the 3rd. Generation Partnership Project (3GPP) LTE standard. While both DSRC and UTE V2V/V2X, may be used for future 5G and autonomous driving uses, these vehicular radio communication technologies exhibit certain differences, in particular with the approach to spectrum access management. Similar to its underlying IEEE 802.11p origins, DSRC generally uses a contention-based channel access scheme where vehicular terminal devices and supporting network access nodes, known as Roadside Units (RSUs), compete for access to a shared channel in a distributed manner. In contrast, and likewise, to current LIE channel access, LTE V2V/V2X generally uses deterministic scheduling in which a centralized control entity selectively assigns radio resources for transmission (although V2X includes two resource allocation modes, a first mode, in which an evolved Node-B (base station) assigns all resources to all UEs and a second in which the base station defines a resource block for which UEs use contention to acquire specific radio resources).

A cellular wide area radio communication technology may include e.g a Global System for Mobile Communications (GSM) radio communication technology, a General Packet Radio Service (GPRS) radio communication technology, an Enhanced Data Rates for GSM Evolution (EDGE) radio communication technology, or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDM A2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband C ode Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdma One (2G), CDM A2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMP S (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, and Unlicensed Mobile Access (UMA, also referred to as also referred to as 3GPP Generic Access Network, or GAN standard), and LTE-A (Long Term Evolution Advanced), LTE V2V, LTE V2X, 5G (e.g., millimeter Wave (mmWave), 3GPP New Radio (NR)), next generation cellular standards like 6G, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. Furthermore, as used herein the term GSM refers to both circuit- and packet-switched GSM, for example, including GPRS, EDGE, and any other related GSM technologies. Likewise, the term UMTS refers to both circuit- and packet-switched GSM, for example, including HSPA, HSDPA/HSUPA, HSDPA+/HSUPA+, and any other related UMTS technologies. Further communication technologies include Line of sight (LiFi) communication technology. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

A cellular wide area radio communication technology may, for example, have the following characteristics: may fit into a 5G communication system and may easily be integrated in it; the technology may provide an evolution path (i.e. the technology may be further developed); the technology may provide a redundancy frequency band (which may be independent from the usage frequency band); the technology may provide a predictable and high Quality of Service (QoS); the technology may provide good latency characteristics; the technology may provide a central congestion control; the technology may provide a controllable QoS; and the technology may provide re-purpose allocation of radio resources.

A narrowband radio communication technology may include narrowband Internet-of-things (NB-IoT) such as CatNB1 or LTE MTC (machine type communication, commonly called CatM1), legacy Cat0, narrowband IOT (NB-IoT) (commonly called CatNB1), and the like. A narrowband radio communication technology may, for example, have the following characteristics: the technology may provide coverage enhancement; the technology may currently provide only limited voice support; the technology may provide rather low data rate (only approximately 500 bit/seconds); the technology may provide a low power radio communication technology and thus a low power radio communication device; the technology may be inserted into spectrum gaps (if available and known), an independent search for spectrum gaps may be provided, a beacon may be sent to other communication devices to indicate the usage; the technology may provide direct communication between the communication device implementing the narrowband radio communication technology and a satellite; and the technology may provide 3.4 GHz frequency bands.

Due to the simultaneous development of multiple vehicular radio communication technologies, coexistence may play an important role once deployment is widespread. Accordingly, vehicular terminal devices operating with DSRC may coexist with vehicular terminal devices operating with LTE V2V/V2X, and vice versa. The potential introduction and deployment of other vehicular radio communication technologies may also be considered in the future for coexistence purposes. However, as DSRC and LTE V2V/V2X may develop separately and use separate supporting architectures, centralized coexistence schemes may be difficult to develop without substantial coordination and integration between the competing technologies.

According to exemplary aspects, close collaboration and coordination among different radios (within the same vehicle, between vehicles and between vehicles and infrastructure elements) and access technologies may be used to provide the desired connectivity and performance. In some aspects, collaboration and convergence of radios in one physical V2X device may be used to achieve multi-device connectivity within a V2X communication environment. For example, two devices supporting the same radios (e.g., same communication technologies) may communicate and achieve an overall better performance compared to when each radio operates independently. The device may for example be the user's handheld device, the vehicle or the infrastructure. In some aspects, the radios may be integrated, or not. In instances when the radios are not integrated, within a vehicle, for example, the radio transceivers may be located at different part of the vehicle, but connected via high speed connections where the converged upper stack is located. In some aspects, an unintegrated scenario may include aggregation of the radios present on user's device and the radios implemented in the vehicle, together creating a multi-radio device.

The presence of multi-radios on one device, provide both opportunities and challenges. On one hand, configuration and management of devices—including for example provisioning and on—boarding becomes more challenging especially in the vehicular networks where the environment is dynamic. On the other hand, by introducing mechanisms to allow different integrative or collocated radios to coexist and cooperate, better collective performance may be achieved, leading to a better user experience. In addition, the connectivity coverage increase is expected for vehicles using multi-radio communications.

Offering next generation autonomous vehicular services poses challenging requirements for wireless networks supporting such applications. More specifically, future V2X networks may support ultra-low latency and extreme reliability, while still operating at high data rates and high mobility. In some aspects, Multi-Radio Het-Nets, integrating multiple tiers of cells (e.g., macro, pica, femto, and end-point devices) equipped with different radios operating on different RATs (Radio Access Technologies) may be used as an essential architecture for next generation V2X networks. While, there are several examples of such deployments in 4G and upcoming 5G access networks [e.g., Technical Specification TS 36.300], the use of Multi-RAT Het-Net deployments for V2X applications is beginning to emerge as a viable technology, as cellular LTE/5G standards are being extended for V2X use cases, in addition to the incumbent DSRC (Dedicated Short Range Communications) systems.

FIG. 1 illustrates an exemplary V2X communication environment 100 using multi-RAT, multi-link connectivity according to some aspects. Referring to FIG. 1, the V2X communication environment 100 may include various V2X enabled devices, such as vehicular terminal devices (e.g., vehicles) 108 and 110, a roadside unit (RSU) 106, a V2X enabled base station or an evolved Node-B (base station) 104, and a V2X enabled infrastructure 102. Each of the V2X enabled devices within the V2X communication environment 100 may include a plurality of radios, where each radio may be configured to operate in one or more of a plurality of wired or wireless communication technologies, RATs. Example RATs include a dedicated short-range communication (DSRC) radio communication technology, a wireless access vehicular environment (WAVE) radio communication technology, a Bluetooth radio communication technology, an IEEE 802.11 radio communication technology, an LTE radio communication technology, and a 5G radio communication technology.

In some aspects, V2X deployments within the V2X communication environment 100 may use multiple RATs operating on different bands (e.g., licensed, un-licensed, light licensed, and high-frequency bands) to improve V2X wireless connectivity. Furthermore, V2X communication infrastructure within the V2X environment 100 may be deployed with different tiers of cells comprising traditional macro-cells, small cells deployed on RSUs (e.g., RSU 106) as well as allow for direct vehicle-to-vehicle communication (e.g., communication between vehicles 108 and 110 using multiple hops). In this regard, communications within the V2X environment 100 may for example include V2N (Vehicle-to-Network) communications, V2I (Vehicle-to-Infrastructure) communications, V2V (Vehicle-to-Vehicle) communications, and V2P (Vehicle-to-Pedestrians) communications. In some aspects, multiple V2X communication links, such as communication links 112, may be exploited to improve the connectivity performance of the V2X environment 100. Communication links 112 in FIG. 1 are illustrated only as examples and other links may also be used in the V2X communication environment. Each of the links 112 between any two or more of the V2X enabled devices in FIG. 1 can include multi-links, using the same or different RATs of multiple available RATs.

In some aspects, the V2X communication environment 100 may utilize multi-radio, multi-link connectivity principles towards a V2X communication system design that may meet V2X application objectives in terms of improved reliability, lower latency, better capacity, higher data rates, lower power consumption, as well as lower interruption time during handovers. Further benefits of multi-radio, multi-link connectivity within the V2X environment 100 may include more reliable control links to manage multi-connectivity, as well as providing the coordination for improving V2X connections, such as radio resource management, interference management, and so forth. In additional aspects as discussed herein below, a convergence function or a convergence layer may be used as a common interface between multiple transceivers within a V2X-enabled device.

Figure 2:
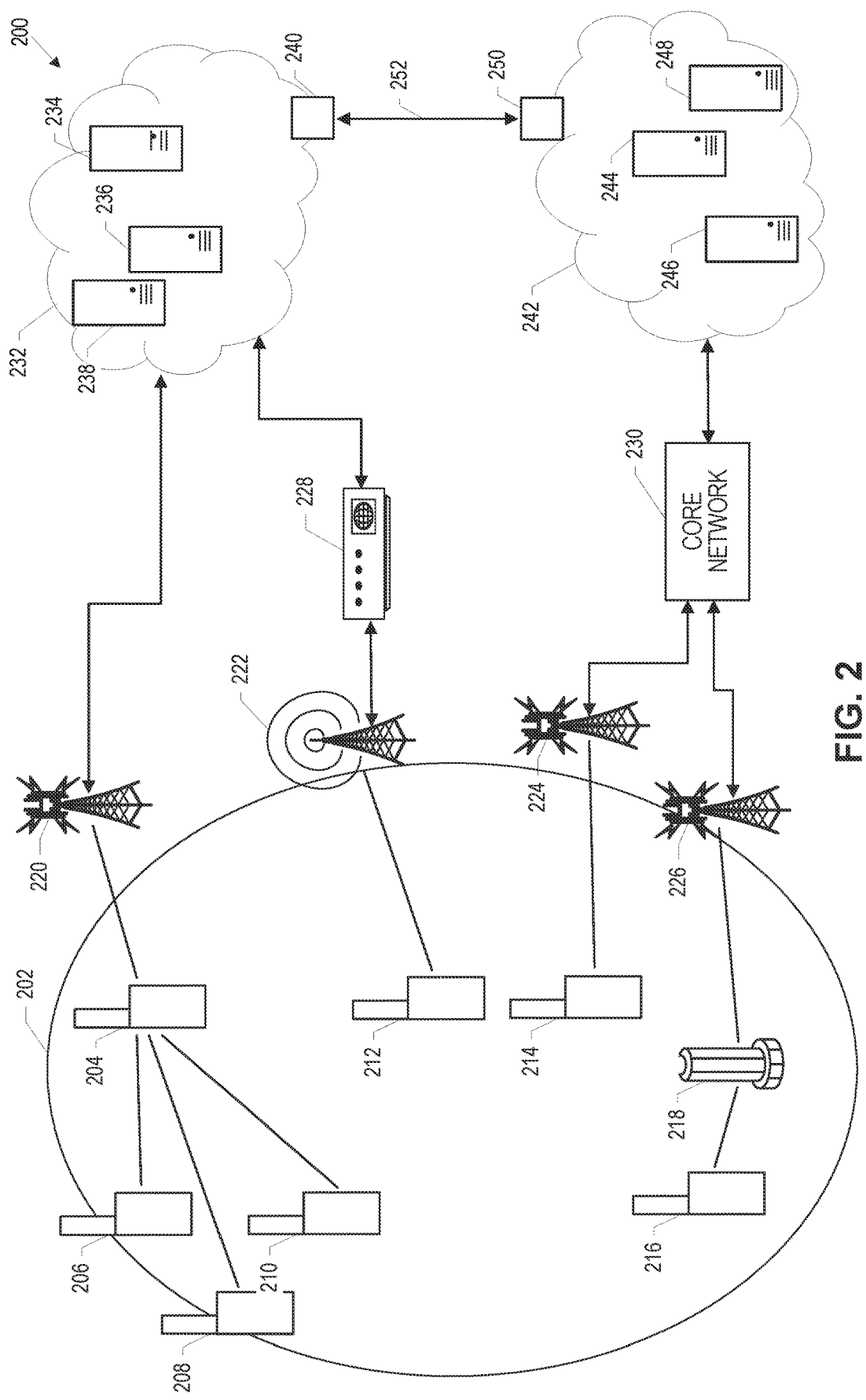
FIG. 2 illustrates an exemplary depiction of a communication network according to some aspects described herein.

FIG. 2 illustrates an exemplary depiction of a communication network 200 according to some aspects. As shown in FIG. 2, communication network 200 may be an end-to-end network spanning from radio access network 202 to backbone networks 232 and 242. Backbone networks 232 and 242 may be realized as predominantly wireline networks. Network access nodes 220 to 226 may include a radio access network and may wirelessly transmit and receive data with terminal devices 204 to 216 to provide radio access connections to terminal devices 204 to 216. Terminal devices 204 to 216 may utilize the radio access connections provided by radio access network 202 to exchange data on end-to-end communication connections with servers in backbone networks 232 and 242. The radio access connections between terminal devices 204 to 216 and network access nodes 220 to 226 may be implemented according to one or more RATs, where each terminal device may transmit and receive data with a corresponding network access node according to the protocols of a p articular RAT that governs the radio access connection. In some aspects, one or more of terminal devices 204 to 216 may utilize licensed spectrum or unlicensed spectrum for the radio access connections. In some aspects, one or more of terminal devices 204 to 216 may directly communicate with one another according to any of a variety of different device-to-device (D2D) communication protocols.

As shown in FIG. 2, in some aspects terminal devices such as terminal devices 206 to 210 may rely on a forwarding link provided by terminal device 204, where terminal device 204 may act as a gateway or relay between terminal devices 206 to 210 and network access node 220. In some aspects, terminal devices 206 to 210 may be configured according to a mesh or multi-hop network and may communicate with terminal device 204 via one or more other terminal devices and using one or more multi-link connections using one or more of multiple RATs (multi-RAT). The configuration of terminal devices, e.g., a mesh or multi-hop configuration, may change dynamically e.g., according to terminal or user requirements, the current radio or network environment, the availability or performance of applications and services, or the cost of communications or access.

In some aspects, terminal devices such as terminal device 216 may utilize relay node 218 to transmit or receive data with network access node 226, where relay node 218 may perform relay transmission between terminal devices 216 and network access node 226, e.g., with a simple repeating scheme or a more complex processing and forwarding scheme. The relay may also be a realized as a series of relay s, or use opportunistic relaying where a best or approximately best relay or series of relays at a given moment in time or time interval is used.

In some aspects, network access nodes such as network access node 224 and 226 may interface with core network 230, which may provide routing control, and management functions that govern both radio access connections and core network and backhaul connections. As shown in FIG. 2, core network 230 may interface with backbone network 242, and may perform network gateway functions to manage the transfer of data between network access nodes 224 and 226 and the various servers of backbone network 242. In some aspects, network access nodes 224 and 226 may be directly connected with each other via a direct interface, which may be wired or wireless. In some aspects, network access nodes such as network access nodes 220 may interface directly with backbone network 232. In some aspects, network access nodes such as network access node 222 may interface with backbone network 232 via router 228.

Backbone networks 232 and 242 may contain various different Internet and external servers in servers 234 to 238 and 244 to 248. Terminal devices 204 to 216 may transmit and receive data with servers 234 to 238 and 244 to 248 on logical software-level connections that rely on the radio access network and other intermediate interfaces for lower layer transport. Terminal devices 204 to 216 may therefore utilize communication network 200 as an end-to-end network to transmit and receive data, which may include internet and application data in addition to other types of user-plane data. In some aspects backbone networks 232 and 242 may interface via gateway s 240 and 250, which may be connected at interchange 252.

Some of terminal devices 204 to 216 may be mobile devices such as smartphones, tablet PCs, and the like. Other terminal devices may be static devices such as devices integrated in a V2X communication environment. By way of example, some terminal devices may be integrated in a traffic light or a traffic sign or in a street post, and the like. Some terminal devices may be integrated in a vehicle. As will be described in more detail below, some of the terminal devices 204 to 216 may be low power consumption devices, some of the terminal devices may provide a minimum QoS, some may provide the capability to communicate using multi-links on different RATs and so forth. An example communication scenario is illustrated in FIG. 2, which shows an exemplary radio communication system 200 in a general V2X communication environment.

Figure 3:
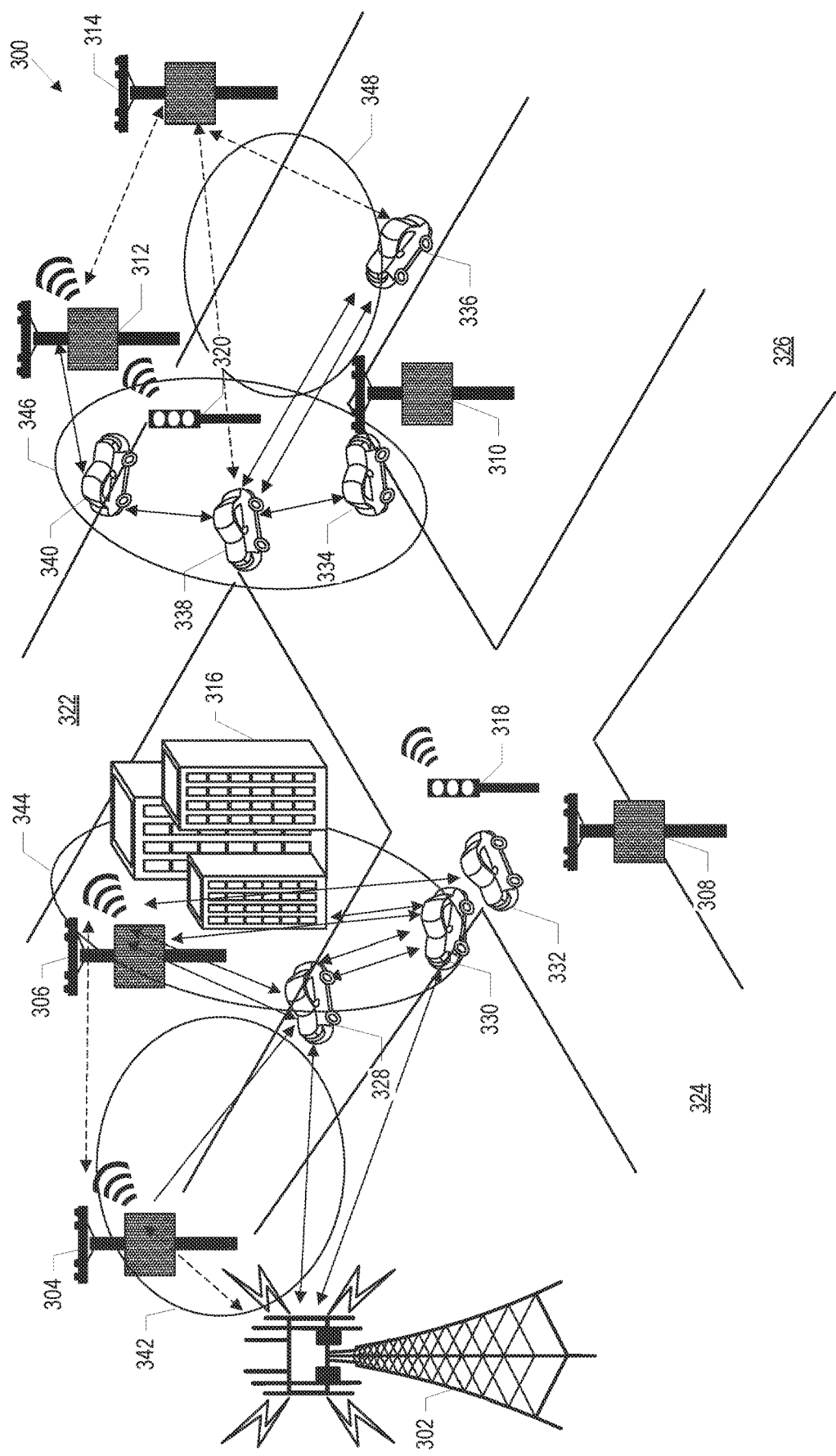
FIG. 3 illustrates an exemplary V2X communication environment using multi-RAT, multi-link connectivity according to some aspects described herein.

FIG. 3 illustrates an exemplary V2X communication environment 300 using multi-RAT, multi-link connectivity according to some aspects. More specifically, FIG. 3 shows an exemplary excerpt of a plurality of roads 322, 324, and 326. A plurality of vehicles such as vehicles 328-340 may drive or stand on or aside of roads 322-326. Terminal devices having various mobile radio capabilities may be integrated in vehicles 328-340. The terminal devices may be configured to support different RATs, such as one or more Short Range radio communication technologies or one or more Cellular Wide Area radio communication technologies or one or more cellular narrowband radio communication technologies as described herein. Moreover, infrastructure objects such as a V2X enabled base station or an evolved Node-B (base station) 302, a V2X enabled infrastructure 316, traffic lights 318, 320, road side units (RSU) 304-314, road posts, traffic signs, and the like may be provided and may be configured to support the different RATs using multi-radio, multi-link connectivity as described herein.

Terminal devices having various mobile radio capabilities may be integrated in traffic infrastructure objects 302-320. These terminal devices may be configured to support different RATs, such as one or more Short Range radio communication technologies or one or more Cellular Wide Area radio communication technologies or one or more cellular narrowband radio communication technologies as described herein. An arbitrary number of base stations 240, 242 or Wireless Access Points may also be provided to be part of one or more different RAT s which may be of the same or of different radio communication network providers.

More and more vehicles (e.g., vehicles 328-340) may be connected to the Internet and to each other. Furthermore, the vehicles 328-340 may advance toward higher automation thereof, which results in various demands with respect to terminal devices, e.g. with respect to power consumption, interoperability, coexistence, device access, synchronization of various terminal devices. In order to deal with increasingly complex road situations, in accordance with some aspects automated vehicles may rely not only on their own sensors, but also on information detected or transmitted by other vehicles or infrastructure components. Therefore, the vehicles may cooperate with each other and it may be desired that the information transmitted between various vehicles and infrastructure components reach its respective destination reliably within an exceedingly short timeframe. In this regard, multi-radio, multi-link communications using one or more RATs may take place between communication nodes (e.g., infrastructure components 302-320 and vehicles 328-340) within the V2X communication environment 300 to improve V2X connectivity performance across several metrics, such as reliability, latency, data rate, and so forth.

As will be described in more detail below, multi-link connectivity in the V2X communication network 300 may be based on using communication links operating on the same or different frequency bands, as well as on different RATs. Example V2X communication technologies, which may be included in the RATs include DSRC, LTE-based communications (e.g., LTE MBMS, LTE Prose and LTE-Uu communications), WLAN (802.11-based protocols and standards), LWA, LAA, Multefire, 5G NR (New Radio), legacy communication standards (e.g., 2G/3G standards), and so forth. The communication scenarios identified herein may according to some aspects allow for mixing of multiple RATs on communication links between vehicles or other V2X enabled nodes (e.g., 302-320), depending on the capability of infrastructure and vehicular devices.

FIG. 3 illustrates several example communication scenarios 342 (multi-link connectivity for V2I/V2N links based on carrier aggregation and dual connectivity), 344 (multi-link connectivity based on V2V assisted V2I/V2N link), 346 (multi-radio, multi-hop relay communications), and 348 (network/V2I assisted V2V communications and multi-link V2V coordination). Additional aspects and examples of the communication scenarios 342-348, and other communication scenarios, are described below.

Broadcasts communications are a possible communication scenario. Broadcast communications generally involve the transmission of messages without a specific intended recipient. Rather, a group of devices, or any device that is able to receive, are the class of recipients. Broken communication links are also prevalent in a mobile network environment (e.g., involving vehicular terminal devices, such as vehicles 328-340). For example, when vehicles or other objects pass between broadcasting devices, or between broadcasting and receiving devices, or when a dynamic change in the environment causes fading within a communication link between the devices. Because broadcast messages generally do not have an intended receiver, and therefore generally do not rely upon acknowledgments to determine reliability, determining when a link is unreliable or broken using standard mechanisms of channel reliability improvement may be difficult in a broadcast link. Determining when a link is unreliable or broken may be important for broadcasting applications, which are important for enabling connected and autonomous vehicles e.g., basic safety message broadcasts). Link quality aspects described herein are not limited to broadcast communications and may also include multicast and unicast communications.

In some aspects, a device may identify communication links to neighboring devices of high importance, based on various factors, such as proximity, message content, or any other context information (e.g, map application data pertaining to a vehicular environment). The device may then detect when a link is not reliable and provide mechanisms to improve reliability for important links. In some aspects, the device may maintain a list—or other appropriate data structure such as a tree, dictionary, array, matrix, etc.—of links, associated with one or more neighboring devices within a certain range, in storage or in a central location of a list of hypothetical receivers within range of that device. The list may be updated periodically or when a new neighboring device is detected within range of the device. In some aspects, the device may utilize the list and various other methods to improve the quality or reliability of a communication link, for example a communication link to a neighboring device. In an aspect, the device may receive the list from another source, such as a central directory or other devices.

Figure 4:
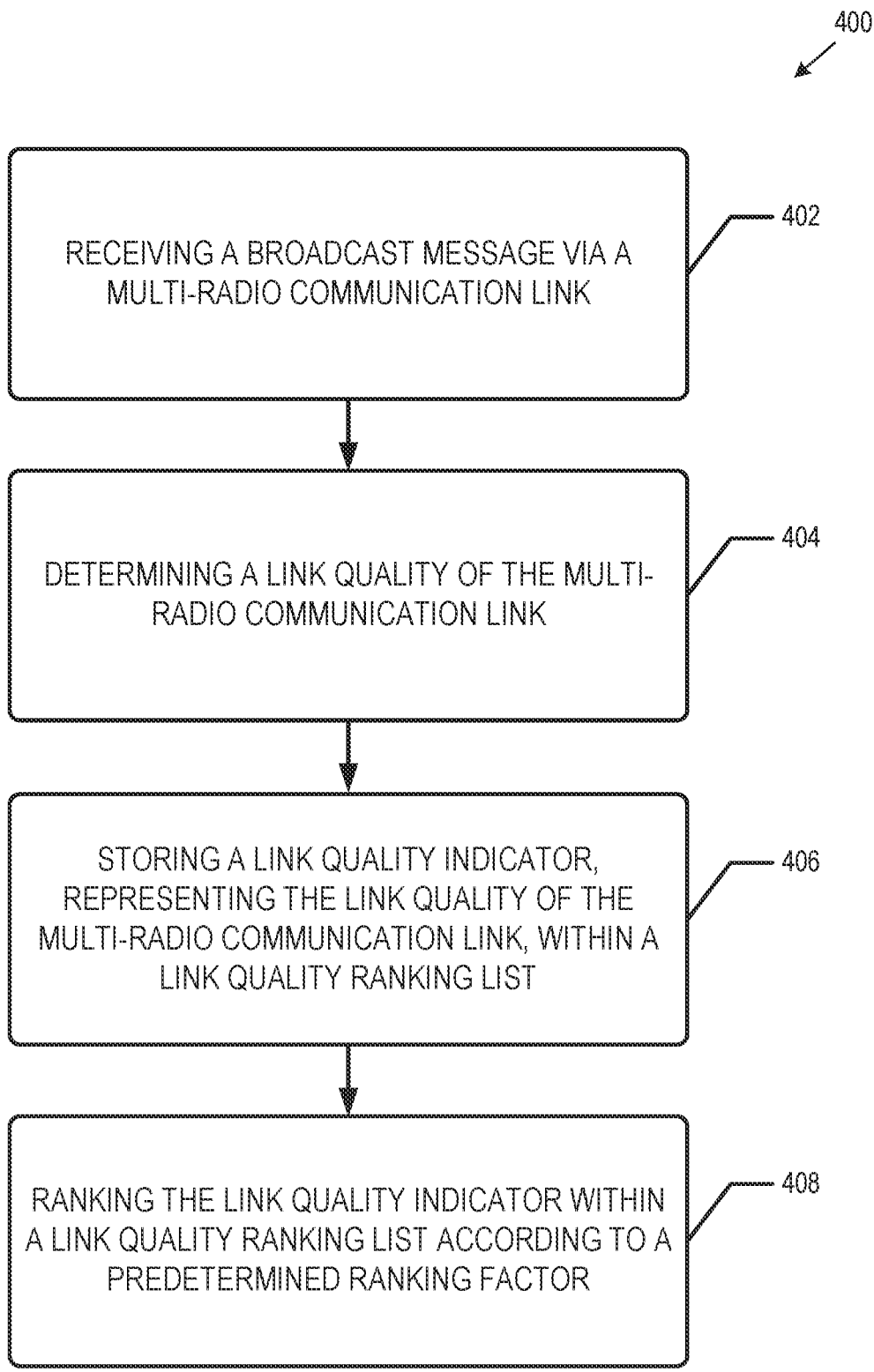
FIG. 4 illustrates an exemplary method of tracking link quality according to some aspects described herein.

FIG. 4 illustrates an exemplary method 400 of tracking link quality. In some aspects, the operations of the method 400 of tracking link quality are implemented in electronic hardware, such as described herein, for example with respect to FIG. 54, which may be included in a vehicular terminal device of a vehicle. Thus, in the context of the present disclosure, method 400 may be performed by a hardware processor. However, method 400 may be performed by other hardware or software components such as processing circuitry, microprocessors, central processing units (CPUs), etc.

At operation 402, in some aspects, a primary vehicular terminal device may include a hardware processor (e.g., processors 1140 (see FIG. 11) or processor 5402 (see FIG. 54)) that is configured to receive a broadcast message via a multi-radio communication link, the multi-radio communication link being associated with one or more available RATs. For example, a neighboring vehicle to the primary vehicle may transmit a broadcast message from a neighboring vehicular terminal device of the neighboring vehicle, via the multi-radio communication link. In some aspects, the hardware processor may receive the broadcast message through a vehicle-to-everything (V2X) convergence function of the primary vehicular terminal device via a V2X convergence function of the neighboring vehicular terminal device over the multi-radio radio communication link. In other aspects, the hardware processor may receive the broadcast message from a communication device other than a neighboring vehicle, for example, a communication device associated with an base station or a RSU.

At operation 404, after receiving the broadcast message from the neighboring vehicle, in some aspects, the hardware processor may determine link quality of the multi-radio communication link. In some aspects, the hardware processor is configured to determine, based on the received broadcast message, the link quality by decoding measurement information from the received broadcast message, the measurement information indicative of link quality of the multi-radio communication link. For example, the measurement information may include information elements encoded within a packet to indicate reliability of the multi-radio communication link. In some aspects, the hardware processor is configured to determine link quality based on information obtained when receiving or processing a packet of a received broadcast message. For example, the hardware processor may be configured to measure received signal strength (e.g., RSSI) or use a measured RSSI value of the received broadcast message in determining link quality of the multi-radio communication link. In other aspects, the hardware processor may be configured to determine, based on the received broadcast message, the link quality of the multi-radio communication link by tracking one or more packet errors associated with the broadcast message, for example, error occurring when decoding a packet of a received broadcast message.

In some aspects, electronic hardware (e.g., electronic hardware as described with respect to FIG. 54) included within a primary vehicular terminal device may also include a link quality estimator. At operation 406, in some aspects, the link quality estimator may store a link quality indicator within a link quality ranking list. The link quality ranking list may be stored within the electronic hardware (e.g., within memory as described with respect to FIG. 54). In some aspects, the link quality indicator may represent a certain link quality associated with a multi-radio communication link, for example the multi-radio communication link utilized by the neighboring vehicle for transmitting the broadcast message. In some aspects, the link quality estimator may map, based on the determined link quality of the received broadcast message, a value representing the link quality to a link quality indicator. In some aspects, the link quality indicator may represent information such as measurement information decoded from a received broadcast message or other information pertaining to the link quality of the multi-radio communication link, for example, received signal quality, average power, or an indication of a broken communication link, such as one or more packet errors associated with a received broadcast message.

At operation 408, in some aspects, the link quality estimator may rank the link quality indicator within the link quality ranking list, wherein the link quality ranking list may include one or more additional link quality indicators that represent a link quality of one or more additional multi-radio communication links. For example, an additional multi-radio communication link may be a communication link between the primary vehicle and an additional neighboring vehicle. In other aspects, an additional multi-radio communication link may be a communication link between the primary vehicle and a device other than a vehicle, for example, a RSU. In some aspects, the link quality indicators within the link quality ranking list may be ordered in accordance to a predetermined ranking factor. A predetermined ranking factor, for example, may include a distance value representing a distance between the primary vehicle and a neighboring vehicle or a broadcast message type (e.g, vehicle or traffic safety message), among other factors.

In some aspects, a link quality indicator having a higher rank within the link quality ranking list may indicate a multi-radio communication link having a higher priority over the remaining multi-radio communication links represented in the list. In other aspects, a link quality indicator having a higher rank within a link quality ranking list may indicate a low quality multi-radio communication link that is critical in comparison to the other multi-radio communication links represented in the list. However, aspects are not so limited, and the link quality ranking list may be ordered according to other rules and criteria.

In some aspects, the link quality estimator may rank the link quality indicator within the link quality ranking list according to the predetermined ranking factor as well as additional context information associated with the primary vehicle or one or more additional vehicles, such as neighboring vehicles. Context information, for example, may include location information or sensor data, with respect to one or more sensors associated with the primary vehicle or another vehicle (e.g., neighboring vehicle), as well as other information with respect to a multi-radio communication environment (e.g., map data). In some aspects, the hardware processor may receive context information from one or more higher layer applications associated with the primary vehicular terminal device or another vehicular terminal device, for example a map application.

The hardware processor, in some aspects, may use the context information (e.g., from an application) to verify measurement information received in a broadcast message or to verify the ranking of one or more link quality indicators within the link quality ranking list. For example, if measurement information included within a broadcast signal indicates to the primary vehicular terminal device that a neighboring vehicle is within close proximity, the hardware processor may utilize the measurement information in combination with context information (e.g., map data) to determine that the neighboring vehicle is on an opposing side of a road barrier and therefore, while the neighboring vehicle is in close proximity, the multi-radio communication link between the primary vehicle and the neighboring vehicle is of low priority. Accordingly, the link quality estimator may then choose to assign a low priority to the link quality indicator, within the link quality ranking list, associated with the multi-radio communication link, or to discard the link quality indicator from the link quality ranking list altogether.

In another aspect, the hardware processor, in some aspects, may use the context information to determine that a barrier between the primary vehicle and a neighboring vehicle is temporary, for example, the barrier may be a truck passing between the primary vehicle and the neighboring vehicle on a one-way road. Accordingly, in such a scenario, the link quality estimator may choose to not assign a low priority to a multi-radio communication link between the primary vehicle and the neighboring vehicle, or to not discard the link quality indicator representing the quality of the multi-radio communication link, because the primary vehicle and the secondary vehicle are traveling in the same direction and the multi-radio communication link between them may be high priority and may need to be tracked (e.g., within the link quality ranking list).

Figure 5:
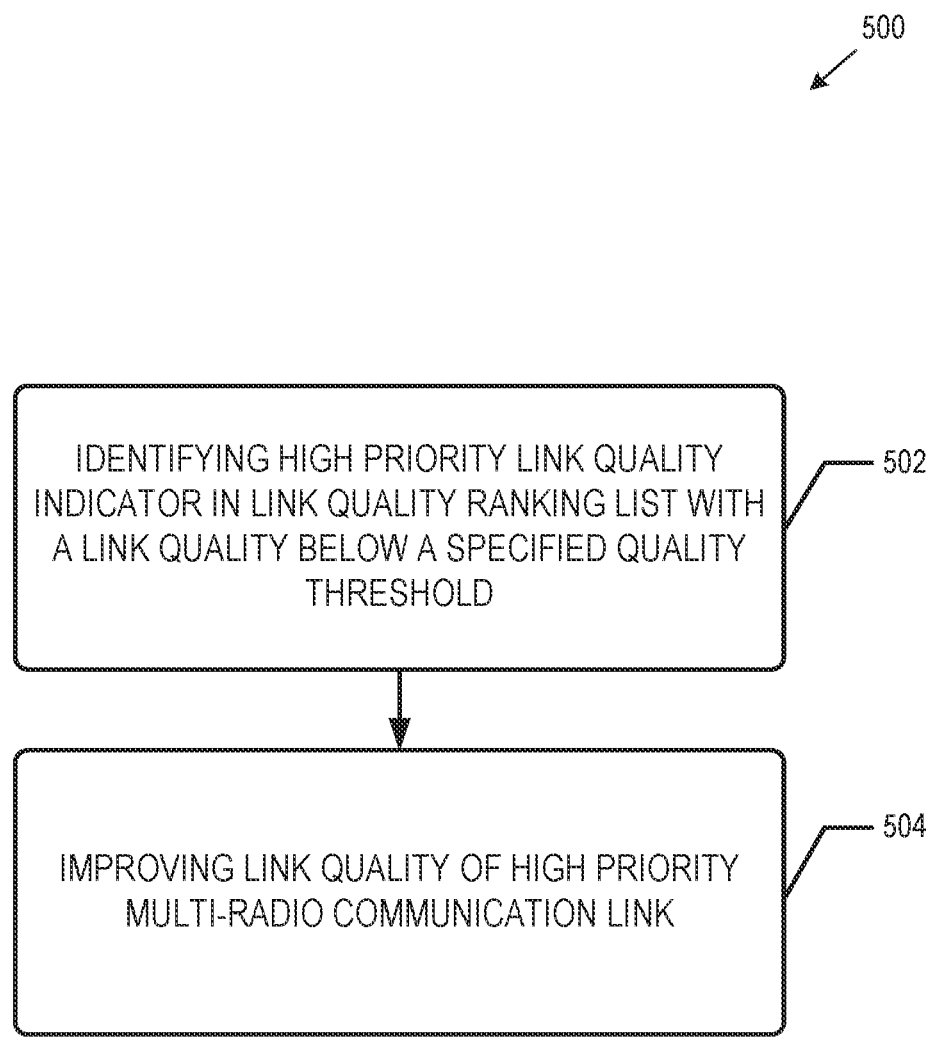
FIG. 5 illustrates an exemplary method for identifying and improving a high priority multi-radio communication link according to some aspects described herein.

FIG. 5 illustrates an exemplary method 500 to identify and improve a high priority multi-radio communication link. In the context of the present disclosure, method 500 may be performed by a hardware processor. However, method 500 may be performed by other hardware or software components such as processing circuitry, microprocessors, central processing units (CPUs), etc. At operation 502, in some aspects, the link quality estimator may identify, within the link quality ranking list, a link quality indicator representing a high priority multi-radio communication link. The link quality estimator may use, according to the aspects described herein, a predetermined ranking factor to identify the link quality indicator. Additionally, the link quality estimator may also use context information to verify the priority of a link quality indicator, corresponding to a high priority multi-radio communication link. In some aspects, the link quality estimator may first identify a link quality indicator as being high-priority and then determine the quality of the corresponding multi-radio communication link. In other aspects, the link quality estimator may first identify a link quality indicator corresponding to a multi-radio communication link of low quality, and then may determine the multi-radio communication link to also be of a high priority, according to criteria described herein. In some aspects, the link quality estimator may identify one of the link quality indicators as being high-priority according to the quality of the corresponding multi-radio communication link being below a predetermined quality threshold.

In some aspects, at operation 504, once the link quality estimator identifies a high priority multi-radio communication link, the link quality estimator may use one or more of several methods of improving the link quality, and corresponding reliability, of the high priority multi-radio communication link. In some aspects, a primary vehicular terminal device may include an antenna system (e.g., antenna system described with respect to FIG. 11 or FIG. 12) that includes an antenna array. In some aspects, the antenna array may comprise a plurality of MIMO antennas which may be coupled to a plurality of transceivers. In such aspects, the hardware processor and to the antenna system may be configured to improve the link quality of the high priority multi-radio communication link by modifying the direction of a radiation pattern of the antenna system. For example, the hardware processor may be configured to operate a subset of the plurality of MIMO antennas, by beamforming the subset of M IMO antennas in one or more sectors or directions. In some aspects, the hardware processor may beamform a radiation pattern in a direction corresponding to the high priority multi-radio communication link.

In some aspects, the hardware processor (e.g., of the primary vehicular terminal device) may be configured to beamform a signal, via the subset of MIMO antennas, in the direction of a transmitter (e.g., of a neighboring vehicular terminal device) from which a broadcast message was received. In such aspects, continued message exchange between the primary vehicular terminal device and the neighboring vehicular terminal device may provide additional feedback data that may be used to further characterize the multi-radio communication link between the primary vehicle and the neighboring vehicle. In some aspects, beamforming in combination with tracking the link quality of one or more multi-radio communication link (e.g., within the link quality ranking list) may improve reliability of high priority multi-radio communication links and may also improve the efficiency of continued beamforming (e.g., improving the quality and reliability of broadcasting messages).

In some aspects, the hardware processor may be configured to improve the quality of a high priority multi-radio communication link by reducing the packet size of a packet for transmission by the primary vehicular terminal device. For example, if the link quality estimator has determined that a high priority multi-radio communication link is unreliable or low quality, the hardware processor may remove one or more information elements from the packet prior to transmission, or may encode less information into the packet. Additionally, in some aspects, the hardware processor may also improve the link quality by encoding for transmission a package including one or more codes indicating a high priority message, which may be transmitted over the high priority multi-radio communication link. By replacing certain information elements with one or more codes, a primary vehicular terminal device may communicate a critical message (e.g., safety message) to a neighboring vehicular terminal device in less time, and thus improve the efficiency and reliability of the high priority multi-radio communication link, addressing the problem of allowing more high priority communications to occur on the high priority link. In some aspects, the hardware processor may also encode a packet to include sensor data associated with the primary vehicle, a neighboring vehicle, or another device. The hardware processor may also encode sensor data in a packet together with one or more codes to improve the reliability of a critical message transmission across a high priority multi-radio communication link.

In some aspects, the hardware processor may also be configured to improve the link quality of the high priority multi-radio communication link by using quiet time. For example, the hardware processor may track a transmission window associated with the wireless medium of the multi-radio network, receive exclusive access of the wireless medium during the transmission window, and transmit a packet including one or more information elements indicating a high priority message, during the transmission window. In such aspects, during the transmission window, all other communication devices may refrain from transmitting and instead listen for any critical messages pertaining to the high priority multi-radio communication link, or pertaining to the vehicle from which the high-priority message is transmitted.

In other aspects, the hardware processor may be configured to improve the link quality of the high priority multi-radio communication link by using frequency diversity, for example, wherein the hardware processor may be configured to simultaneously transmit a signal pertaining to a high priority multi-radio communication link over to our more frequency bands. Additionally, the hardware processor and the antenna system may be configured to improve the link quality of the high priority multi-radio communication link by using antenna diversity, for example, by simultaneously transmitting a signal pertaining to a high priority multi-radio communication link over two or more subsets of MIMO antennas of an antenna array (e.g, antenna array of the antenna system described with respect to FIG. 11 or FIG. 12).

The link quality arrangements and techniques described herein may serve to improve communications in challenging conditions, such as those illustrated in FIG. 3. An additional, or alternative technique to improving the quality of any given link, includes the selective use of multiple RATs to meet a variety of communication needs As described herein, particularly in high-mobility situations, it may be desirable to allow simultaneous use of more than one RAT. Whether or not more than one RAT is being used, it may further be desirable to discontinue usage of one RAT (e.g, "drop" a RAT), to initiate usage of a new RAT (e.g., "add" a RAT), or to add or drop an entire group of two or more RATs. However, selection of RATs may be time-consuming. The techniques described below provide for greater efficiency in RAT selection, including adding or dropping RATs, than previously available.

Figure 6:
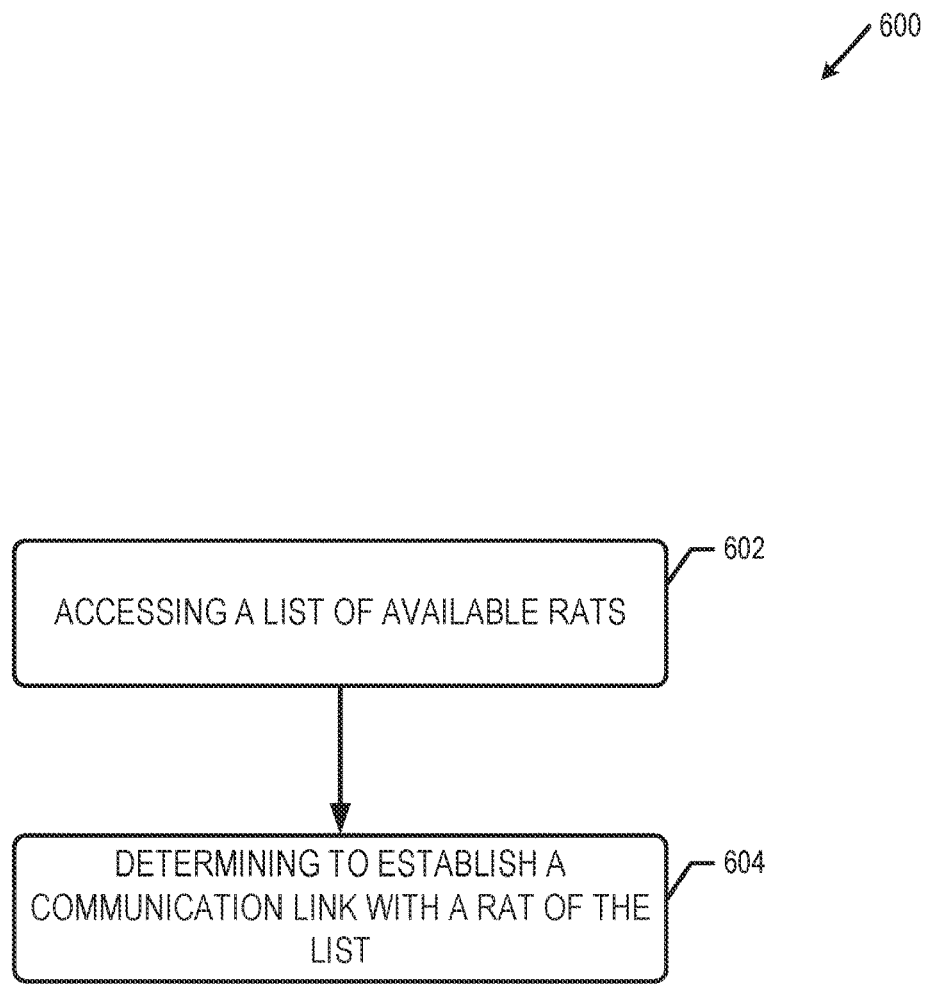
FIG. 6 illustrates an exemplary method for wireless communication according to some aspects described herein.

FIG. 6 illustrates an exemplary method 600 in accordance with some aspects. In the context of the present disclosure, method 600 may be performed by a hardware processor. However, method 600 may be performed by other hardware or software components such as processing circuitry, microprocessors, central processing units (CPUs), etc. The example method 600 may begin at operation 602 with a device (e.g. vehicular terminal device 328-340 or other nodes) accessing a list of available RATs. As described earlier herein, this list may be provided in a central location or be stored locally on the device, among other possibilities. At operation 604, the device may determine to establish a communication link with a RAT of the list. As described earlier herein, this determination may be made based on transmission requirements of the device, KPIs that characterize the RAT, etc.

In some aspects, the device (e.g, via a hardware processor) may access a list of available RATs that have been detected within a range of the device. The list may be provided by a network access node (e.g., infrastructure component 302), by a neighboring device using D2D communication, or by other devices or methods. The hardware processor may then establish a new communication link with a selected RAT of the available RATs based on compatibility of transmission requirements of the device with the selected RAT. These transmission requirements may include latency requirements, reliability requirements, throughput requirements, and requirements of an application executing on the device, among other requirements. Other parameters to be considered in RAT selection may include other performance indicators (KPIs) that characterize RATs including quality of service (QoS)-based parameters such as congestion levels and loads, voice support, data rates (either maximum achievable data rates or rates available based on signal conditions), range available, power levels, bands covered, signal conditions, coexistence with other technologies, and spectrum access method (e.g, dedicated license, unlicensed, shared spectrum, etc.) used. Validity indicators may be included in the matrix to indicate trustworthiness of different measurements based on location where the measurement was taken, the environment at that location (e.g., rural area, urban area), time of day of the measurement, age of the data, etc.

Parameters may also indicate cryptographic capabilities of a RAT. For example, some RATs may support quantum safe cryptography (QSC), and this capability information may be provided in signaling or stored in the matrix. Other non-standard compliant extensions may also be indicated, for example, support for non-standard compliant multiple antenna schemes, coding mechanisms, etc., may be indicated. Parameters may also indicate periodic powering down of RATs or particular frequency bands in a cell. The device and network access node may negotiate any usage of proprietary non-standard compliant extensions of the system. Such negotiations may also be performed on a device-to-device (D2D) basis.

The hardware processor may select one or more RATs by accessing a database table or other computer-readable file that includes indicators of which RATs (whether currently available, or within the vicinity of the device) may or are complying with different transmission requirements. For example, a database table may indicate a relationship between the transmission requirements or preferences of the device and at least one RAT of the list of available RATs. When, for example, a detected condition becomes such that a transmission requirement is no longer being met by a given RAT, the hardware processor may determine which of the other available RATs meets that transmission requirement by accessing the database table to retrieve the identity of a RAT that meets the transmission requirement. As an additional example, when the device first comes online or accesses the network, the initial RAT or group of RATs to be used may be identified by accessing the database table to retrieve the identity of a RAT that meets a minimum condition of the device. As still another example, RAT/s may be changed upon the device changing to use a different application, e.g., the device may change from executing a data-hungry application to executing an application requiring very low latency. The database table may be stored at the device or at a network access node for central access by the device and any other neighboring device.

Measurements in the database table may be provided in a number of different way s. For example, the database table may be populated by measurements of a group of parameters taken by at least one device. The group of parameters to be measured may be indicated by the network access node, by the device/s, or any combination thereof. The network access node may partition measurement responsibilities among different devices in a cell served by the network access node. Additionally, or alternatively, measurement responsibilities may be partitioned by the devices themselves using device-to-device (D2D) communication.

In one aspect, a central node (e.g., a base station) may use a dedicated broadcast channel to broadcast parameter values, resource availability, or other information to aid nearby devices in RAT selection. This or other information may be broadcast on request from devices, or the information may be broadcast periodically, among other possibilities. This information may be stored in the database table described herein. The device/s and network access node/s may generate long-term statistics about different RATS and use statistics to anticipate conditions at different times of the day or in different locations.

In another aspect, RATs may collaborate. In other words, the behavior of one RAT may depend on the observation of another RAT RATs may be grouped to facilitate such collaboration. For example, one RAT that is susceptible to deep shadowing may be grouped with at least one RAT that is not susceptible to deep shadowing. Then, if conditions are suboptimal for one RAT, a device may attempt to communicate on neighboring RATs instead. Due to the benefits of RAT collaboration, the device may allocate additional computational resources to increase search and measurement capabilities to find other RATs than the device otherwise may have without RAT collaboration. However, in an example, if a RAT collaboration for a device meets a predetermined capability threshold (e.g., there are enough RATs with low latency, high bandwidth, range, etc.), then the device may conserve resources by foregoing additional RAT searches until the capability threshold is not met again. Collaboration may be controlled by a network access node or another central node, by a device, or some combination thereof.

As another example of collaboration, frequency hopping patterns may be defined separately in two or more different neighboring RATs in such as a way as to reduce or eliminate adjacent band interference by providing a maximum distance in the frequency direction.

The techniques described herein may in some aspects also be used to determine which RATs to avoid. For example, if an application requires low latency or wideband communication, narrowband IoT RATs may be excluded from consideration because of their inability to provide low-latency communication.

A user device may include the V2X convergence layer 4112, described below with respect to FIG. 41, or the like, to manage selection and usage of a RAT or a group of multiple RATs. This V2X convergence layer 4112 may include circuitry to evaluate statistics and KPIs and to perform RAT selection. In other aspects, a hardware processor of the device may encode, for transmission to a network access node, a request to use a RAT or group of RATs of the list of available RATs.

In addition to frequency hopping RAT hopping (e.g., 2D hopping) may be implemented in some aspects. Such aspects may be implemented in scenarios (e.g., military or intelligence use cases) in which information within transmissions is protected. RAT hopping may also be used in scenarios in which one RAT is used for part of a transmission (e.g., a control portion of a transmission or other delay-tolerant portion of a transmission) and another RAT is used for data transfer when lower-latency RATs are most useful. RAT hopping may also occur to a different RAT during phases in which high throughput is needed (e.g, during a file transfer). Accordingly, the device may select a first RAT for transmission of a first portion of a transmission—based on an affinity between a characteristic of the first RAT and the first portion of the transmission, such as an under-used but high latency RAT for a delay tolerant control portion—and the device may select a second RAT for transmission of a second portion of the transmission—again based on an affinity between a characteristic of the second RAT and the second portion of the transmission. In examples, the first portion may include a control portion and the second portion may include a data portion, although aspects are not limited thereto.

The link quality improvement techniques may provide increased communication reliability in a number of environments. The RAT selection techniques described herein may permit an efficient use of multiple RATs to effectuate improved communications by, for example, selecting a RAT most appropriate for a given communication. Additionally, as described below, multiple RATs may be used as back-up, such that, for example, a higher-performing but failure prone RAT may be used when available while a more reliable RAT is configured to handle interruptions to the higher-performing RAT service.

As noted above, a communication device (e.g., vehicular terminal device 330) may be using more than one radio access technology (RAT) simultaneously to realize quality of service (QoS) gains. For example, a communication device may be transmitting and receiving on a primary RAT (e.g., LTE or a lower-frequency RAT) and on a secondary RAT (e.g, Wi-Fi or a higher-frequency RAT). In mobile use cases, the communication device may move outside high frequency range, for example, and may need to rely on only the primary RAT. In some aspects, a communication device thus affected may request additional resources from a node (e.g., an evolved Node-B (base station) 302) via a primary RAT to maintain a certain QoS. In some aspects, a certain RAT may be designated as a primary RAT and another RAT may be designated as a secondary RAT.

In some aspects, the identity of a primary RAT and a secondary RAT may be changed dynamically, with respect to an event (e.g., change in network environment or mobility environment) and based on one or more preferences or capabilities of a communication device (e.g, vehicular terminal device). For example, when a vehicular terminal device is relatively stationary or within range of a very strong high-frequency signal, it may be desirable for the vehicular terminal device to designate this higher-frequency RAT as the primary RAT, even though the range of that signal may be relatively small. When a change in mobility of the vehicular terminal device occurs, a different RAT may then be preferable to the vehicular terminal device. In other aspects, the vehicular terminal device may prefer a RAT associated with a lower cost factor to be the primary RAT. In some aspects, other criteria may be used to designate a primary RAT and secondary RAT.

In some aspects, a primary communication node (e.g., the communication node 302), for example, a base station, may be configured to communicate with another node (e.g., one of the nodes 328 or 330), for example, a vehicular terminal device, through a first transceiver of multiple transceiver chains using a communication link (e.g., a multi-radio communication link) of a first RAT. In some aspects, the base station may also be configured to communicate with the vehicular terminal device through a second transceiver, using a multi-radio communication link of a second RAT. The first RAT and the second RAT may each be one of several different RATs that both the vehicular terminal device and a network are configured to utilize. In some aspects, the second transceiver may communicate with the vehicular terminal device through one or more intermediate nodes (e.g., RSUs), although aspects are not so limited. The first RAT and the second RAT may each comprise one of a dedicated short-range communication (DSRC) radio access technology, a wireless access vehicular environment (WAVE) radio access technology, a Bluetooth radio access technology, an IEEE 802.11 radio access technology, an LTE radio access technology, or a 5G radio access technology.

In some aspects, the first RAT may be designated as a primary RAT and the second RAT may be designated as a secondary RAT, respectively. A change in the designation of the primary RAT and the secondary RAT may subsequently occur, for example, due to a change in network environment (e.g, network loading), mobility environment (e.g, movement or obstruction of a vehicular terminal device), and parameters specific to a communication device (e.g., preferences or capabilities of a vehicular terminal device). In some aspects, a primary communication node (e.g., base station) may modify a designation of a primary RAT and a secondary RAT for a vehicular terminal device, for example, to maintain a certain QoS and to comply with user preferences of the vehicular terminal device. In some aspects, the vehicular terminal device may also modify the designation of the primary RAT and the secondary RAT. In other aspects, other devices within a multi-RAT network may modify the designation of the primary RAT and the secondary RAT, for example, a RSU.

Figure 7:
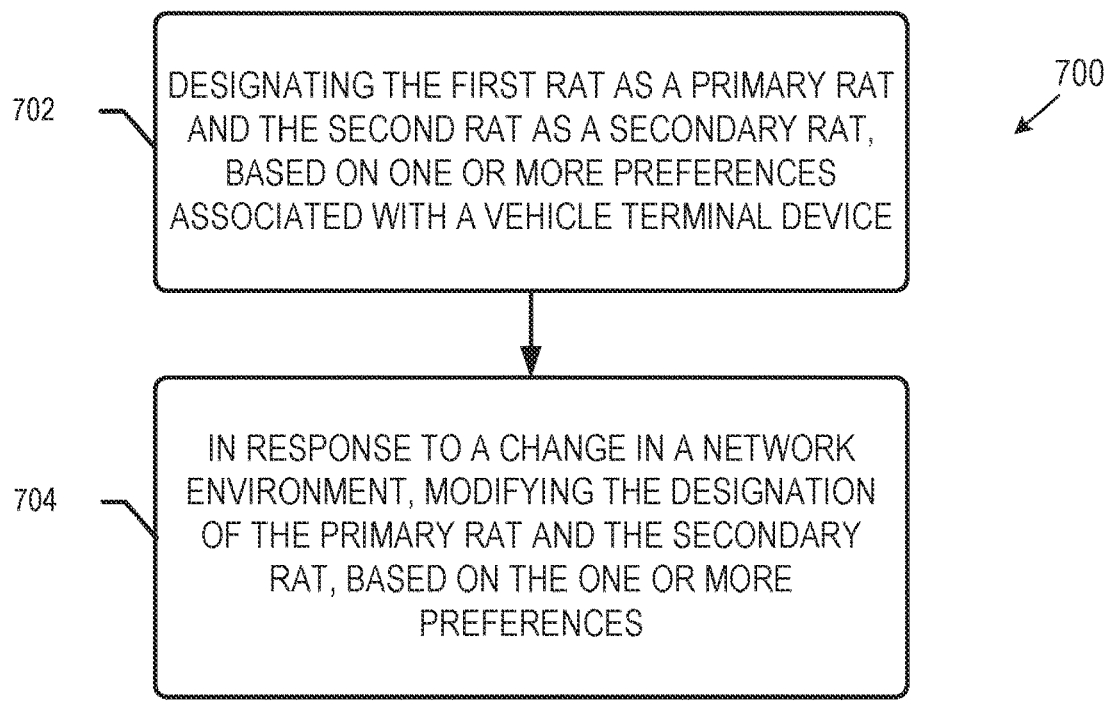
FIG. 7 illustrates an exemplary method of designation of a primary RAT and a secondary RAT with respect to a multi-radio communication link according to some aspects described herein.

FIG. 7 illustrates an exemplary method 700 of designation of a primary RAT and a secondary RAT with respect to a multi-radio communication link. In the context of the present disclosure, method 700 may be performed by a hardware processor. However, method 700 may be performed by other hardware or software components such as processing circuitry, microprocessors, central processing units (CPUs), etc. In the method 700, a communication device (e.g., the communication node 302), for example, an RRC of a base station may include a hardware processor (e.g., processor 1140 or processor 5402) that is configured—for example, by software, virtualization, or other technique that abstracts control instructions from the underlying hardware, upon which everything will eventually be implemented—to communicate with one or more nodes (e.g., one of the nodes 328 or 330), for example, a vehicular terminal device. At operation 702, the hardware processor may be configured to designate a first RAT as a primary RAT for a primary communication link and a second RAT as a secondary RAT for a secondary communication link, with respect to one or more vehicular terminal devices. In some aspects, the hardware processor may designate the primary RAT and the secondary RAT based on one or more preferences associated with a vehicular terminal device. Preferences may include, for example, a specification of one or more of a desired data throughput, cost factor, mobility factor associated with a vehicular terminal device, or a specified quality of service (QoS). In some aspects, a vehicular terminal device itself may also negotiate with the hardware processor to modify the designation of the primary RAT and the secondary RAT. In other aspects, other devices within a multi-RAT network may modify the designation of the primary RAT and the secondary RAT, for example, an RSU.

At operation 704, in response to a change in a network environment (e.g, a change in a network loading factor), the hardware processor may modify the designation of the primary RAT and the secondary RAT with respect to the vehicular terminal device, based on the one or more preferences of the vehicular terminal device. For example, the vehicular terminal device may specify a preference to modify a designation of a primary RAT from an LTE radio access technology to an IEEE 802.11 radio access technology, and a designation of a secondary RAT from an IEEE 802.11 radio access technology to an LTE radio access technology, when a network environment changes (e.g., a change in network loading). In some aspects, the vehicular terminal device may specify a preference for the designation of the primary RAT to be modified to another RAT, other than the secondary RAT.

Figure 8:
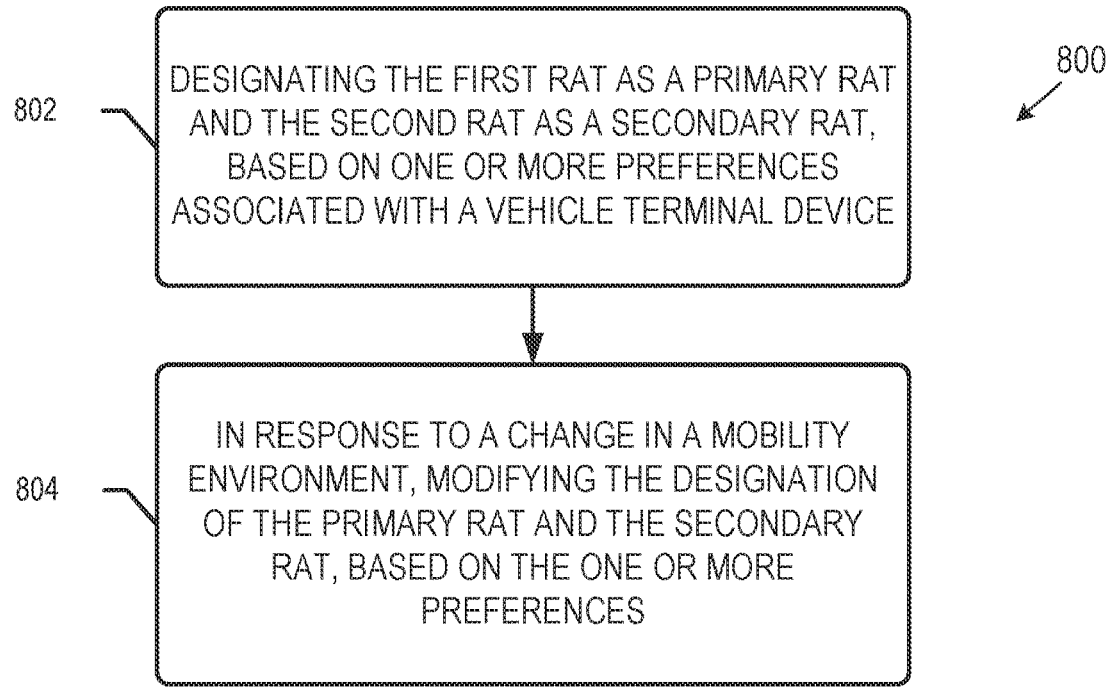
FIG. 8 illustrates an exemplary method of designation of a primary RAT and a secondary RAT with respect to a multi-radio communication link according to some aspects described herein.

FIG. 8 illustrates an exemplary method 800 of designation of a primary RAT and a secondary RAT with respect to a multi-radio communication link. In the context of the present disclosure, method 800 may be performed by a hardware processor. However, method 800 may be performed by other hardware or software components such as processing circuitry, microprocessors, central processing units (CPUs), etc. The method 800 may be similar to the method 700 in that, at operation 802, the hardware processor may designate the primary RAT and the secondary RAT based on one or more preferences associated with a vehicular terminal device. At operation 804, in response to a change in mobility environment (e.g., change in vehicular terminal device speed), the hardware processor may modify the designation of the primary RAT and the secondary RAT with respect to the vehicular terminal device, based on the one or more preferences of the vehicular terminal device. For example, the vehicular terminal device may specify a preference to modify a designation of a primary RAT from an LTE radio access technology to an IEEE 802.11 radio access technology, and a designation of a secondary RAT from an IEEE 802.11 radio access technology to an LTE radio access technology when a vehicular terminal device has become stationary, to take advantage of a higher-frequency RAT as the primary RAT or to take advantage of a lower cost factor, even if the range of the IEEE 802.11 signal may be relatively small. In some aspects, the vehicular terminal device may specify a preference for the designation of the primary RAT to be modified to another RAT, other than the secondary RAT.

Figure 9:
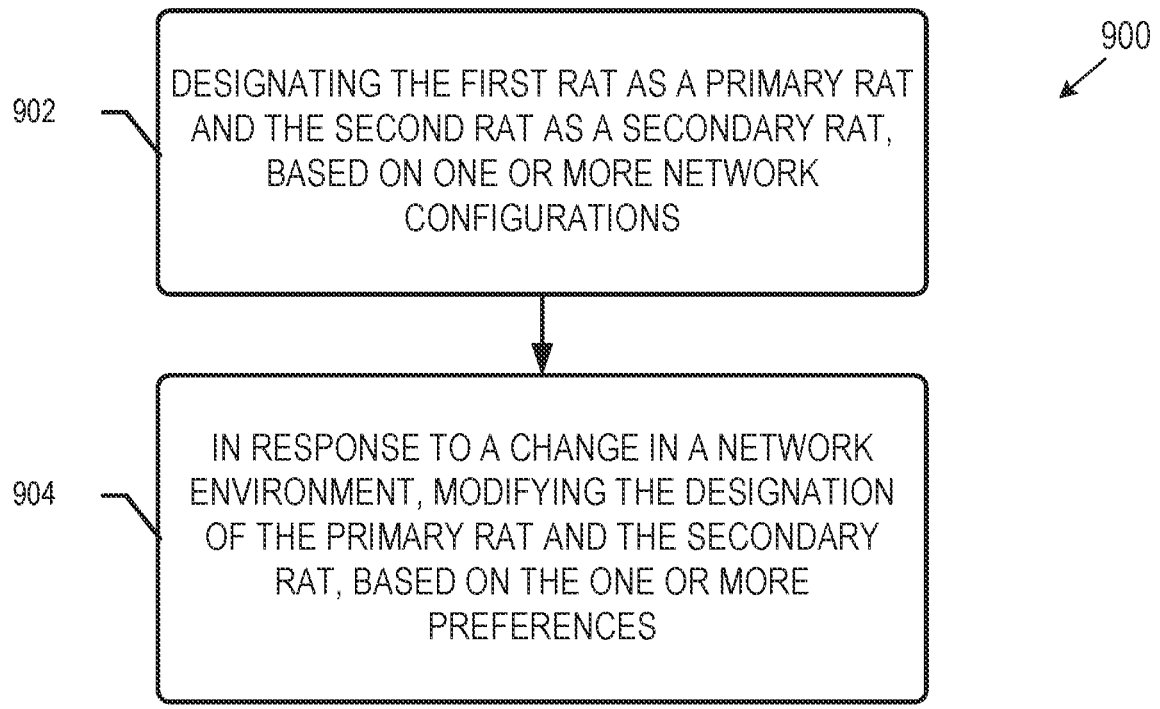
FIG. 9 illustrates an exemplary method of designation of a primary RAT and a secondary RAT with respect to a multi-radio communication link according to some aspects described herein.

FIG. 9 illustrates an exemplary method 900 of designation of a primary RAT and a secondary RAT with respect to a multi-radio communication link. In the context of the present disclosure, method 900 may be performed by a hardware processor. However, method 900 may be performed by other hardware or software components such as processing circuitry, microprocessors, central processing units (CPUs), etc. In the method 900, which may be similar to methods 700 and 800, at operation 902, the hardware processor may designate a first RAT as a primary RAT for a primary communication link and a second RAT as a secondary RAT for a secondary communication link. However, in the method 900, the designation of the primary RAT and secondary RAT may be based on one or more network configurations. At operation 904, the hardware processor may also modify the designation of the primary RAT and the secondary RAT with respect to the vehicular terminal device, in response to a change in a network environment, for example, a change in network loading and the modification may be based on the one or more preferences of the vehicular terminal device.

Figure 10:
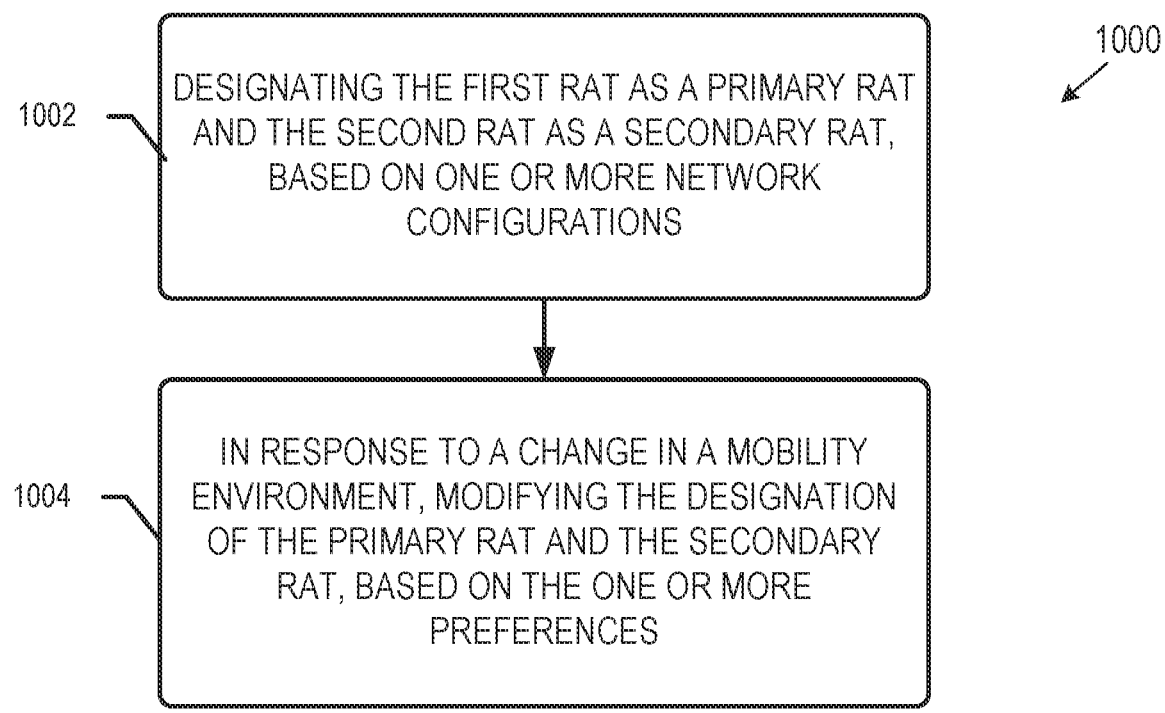
FIG. 10 illustrates an exemplary method of designation of a primary RAT and a secondary RAT with respect to a multi-radio communication link according to some aspects described herein.

FIG. 10 illustrates an exemplary method 1000 of designation of a primary RAT and a secondary RAT with respect to a multi-radio communication link. In the context of the present disclosure, method 1000 may be performed by a hardware processor. However, method 1000 may be performed by other hardware or software components such as processing circuitry, microprocessors, central processing units (CPUs), etc. In the method 1000, which may be similar to method 900, at operation 1002, the hardware processor may designate the primary RAT and the secondary RAT based on one or more network configurations. At operation 1004, however, the hardware processor may then modify the designation of the primary RAT and the secondary RAT in response to a change in a mobility environment (e.g., movement of the vehicular terminal device) and based on the one or more preferences of the vehicular terminal device.

Figure 11:
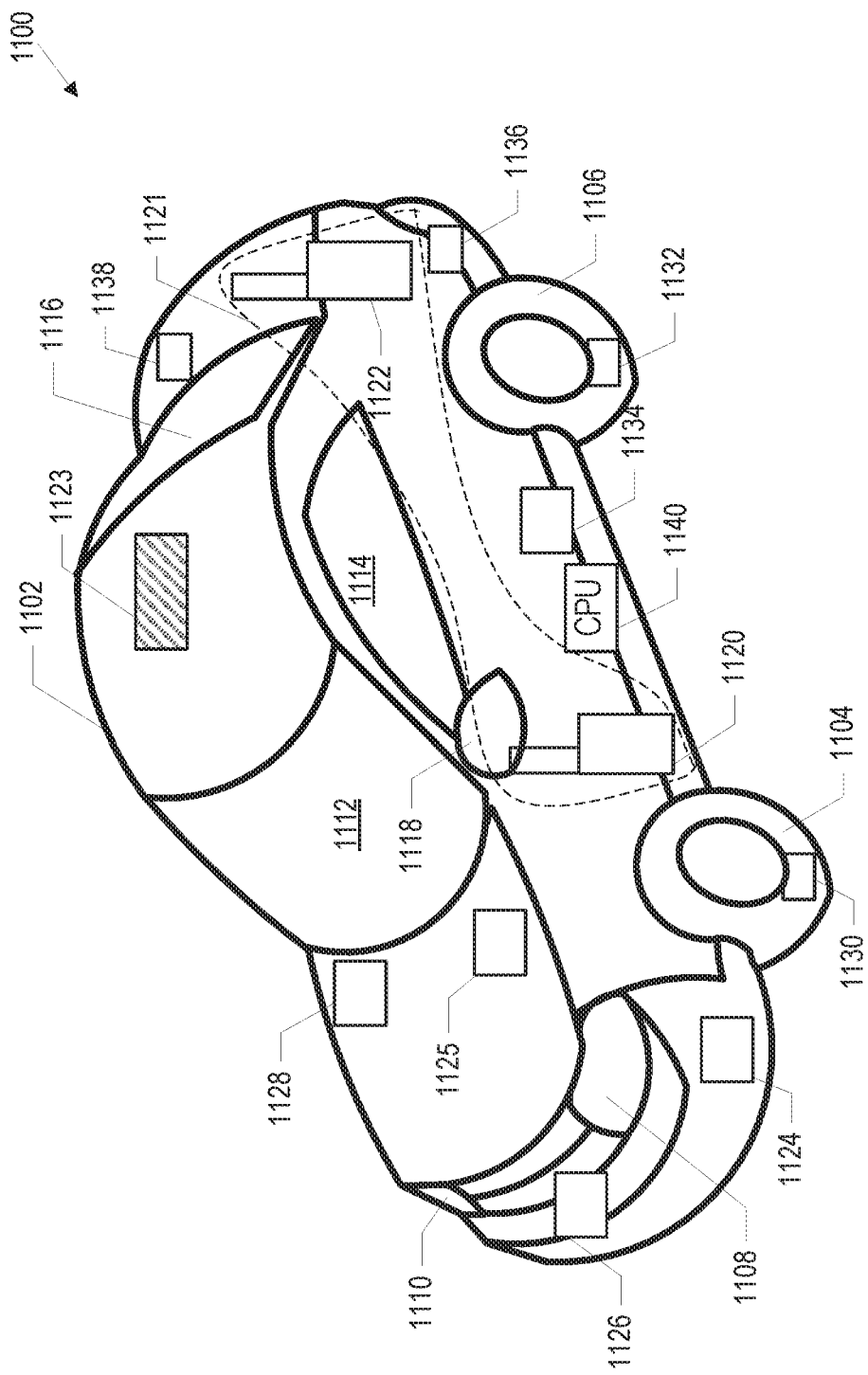
FIG. 11 illustrates an exemplary internal configuration of a vehicular terminal device according to some aspects described herein.

FIG. 11 illustrates an exemplary internal configuration of a vehicular terminal device 1100 according to some aspects described herein. Referring to FIG. 11, vehicular terminal device 1100 may include a steering and movement system 1125, a radio communication system 1121, and an antenna system 1123. The internal components of vehicular terminal device 1100 may be arranged or enclosed within a vehicular housing such as an automobile body, plane or helicopter fuselage, boat hull, or similar type of vehicular body dependent on the type of vehicle that vehicular terminal device 1100 is. As an example, FIG. 11 illustrates the vehicular terminal device 1100 as a vehicle (which may be an example of vehicles such as vehicles 328-340 in FIG. 3) including a vehicle body 1102, tires 1104-1106, different types of lamp s such as headlamp s 1108-1110, front shield 1112, one or more side windows 1114, rear window 1116, exterior rear-view mirror 1118, and the like.

Vehicular terminal device 1100 may further include one or more radio terminal devices 1120-1122, which may form the radio communication system 1121. The radio communication system 1121 may be configured to implement one or more different RATs. Furthermore, a plurality of sensors 1124, 1126, 1128, 1130, 1132, 1134, 1136, and 1138 may be installed in the vehicular terminal device 1100.

Examples of sensors 1124 to 1138 may include one or more of the following sensors (it is to be noted that any other type of sensor may be provided and not all of the following sensors need to be provided): a distance sensor (e.g a radar sensor), such as distance sensor 324; a camera, such as camera 326; a water/rain sensor, such as rain sensor 328; a tire sensor (e.g., an air pressure sensor), such as tire sensors 330-332; an airbag sensor such as airbag sensor 334; an exhaust gas sensor, such as exhaust gas sensor 336; and a temperature sensor, such as temperature sensor 338. Furthermore, one or more controllers or actuators may be provided in the vehicular terminal device 1100, such as a speed controller, an air condition controller, a brake controller, an airbag trigger controller, and so forth.

In some aspects, one or more processors 1140 (e.g., hardware processors, processing circuitry, microprocessors, central processing units (CPUs), etc.) may be provided and may be communicatively coupled to some or all of the sensors 1124-1138 and to the radio communication system 1121 as well as to some or all of the controllers or actuators. The coupling may be wired, wireless or optical. In an example, the one or more processors 1140 may be part of the radio communication system 1121.

Figure 16:
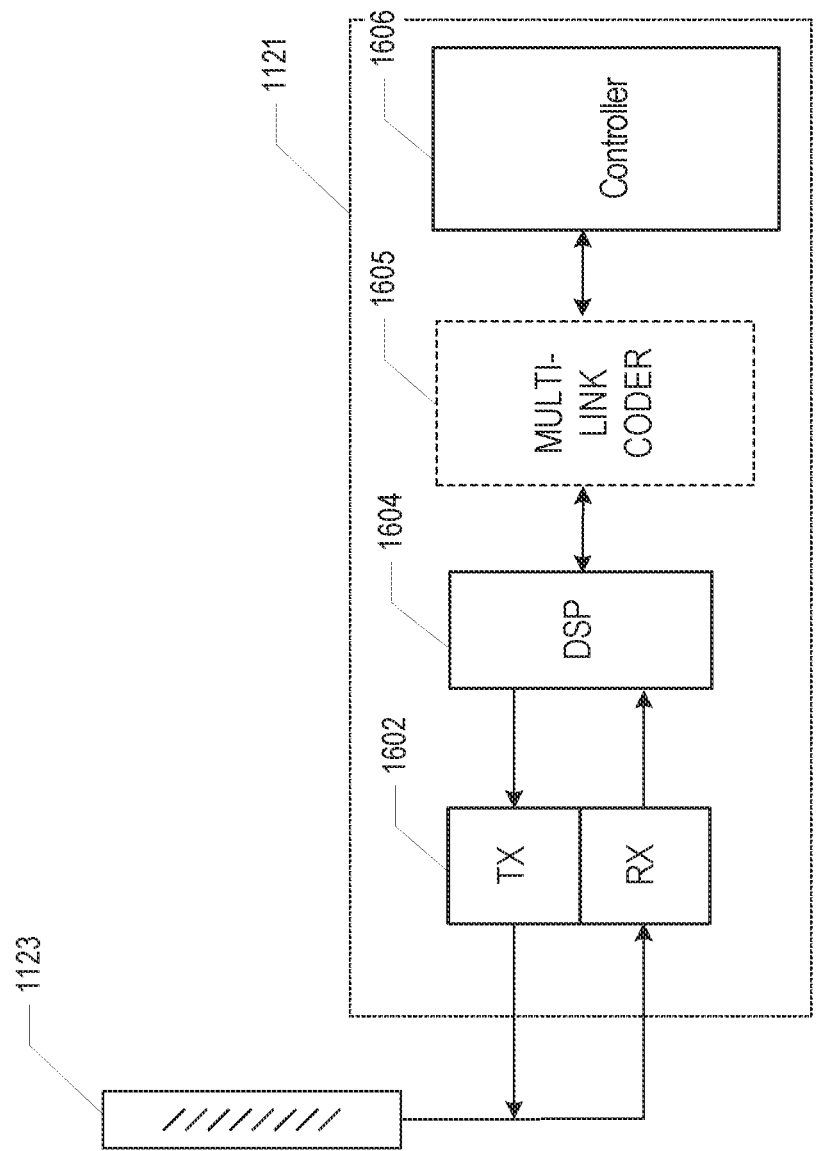
FIG. 16 illustrates an exemplary internal configuration of a radio communication system of the vehicular terminal device of FIG. 11 according to some aspects described herein.
Figure 17:
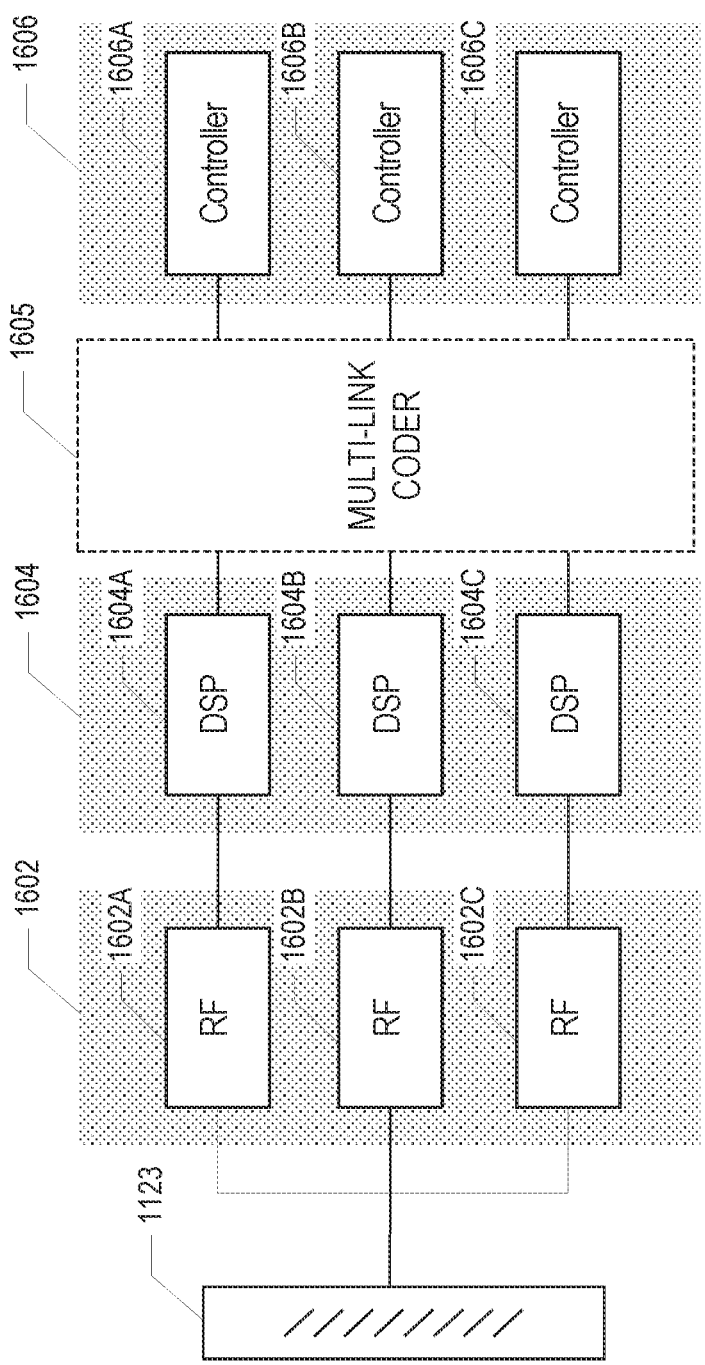
FIG. 17 illustrates exemplary transceivers using multiple radio communication technologies in the vehicular terminal device of FIG. 16 according to some aspects described herein.

Thus, by way of example, sensors 1124 to 1138 may be configured to detect respective physical quantity and to generate a corresponding quantity value rep resenting the detected physical quantity and may forward the same to processor 1140, which may be configured to process the quantity values received from the plurality of sensors 1124-1138 and may supply the processing results to the terminal devices 1120-1122. The terminal devices 1120-1122 may be configured to generate and transmit radio messages to other terminal devices or base stations, for example. Furthermore, terminal devices 1120-1122 may be configured to receive and decode radio messages from other terminal devices or base stations, for example, and to forward respective instructions to the one or more processors 1140. The one or more processors 1140 may be configured to generate respective control signals or messages and to transmit the same to the controllers or actuators. An exemplary structure of the radio communication system 1121 (which includes the terminal devices 1120 and 1122) is illustrated in FIG. 16 and FIG. 17.

In order to help ensure that both incoming and outgoing data is received and transmitted properly with a selected network access node or another terminal device, e.g., according to a wireless standard or a proprietary standard, or a mix thereof, a terminal device may also receive control information that provides control information or parameters. The control parameters may include, for example, time and frequency scheduling information, coding/modulation schemes, power control information, paging information, retransmission information, connection/mobility information, or other such information that defines how and when data is to be transmitted and received. Terminal devices may then use the control parameters to control data transmission and reception with the network access node or another terminal device, thus enabling the terminal device to successfully exchange user and other data traffic with the network access node or another terminal device over the wireless connection. The network access node may interface with an underlying communication network (e.g., a core network) that may provide a terminal device with data including voice, multimedia (e.g., audio/video/image), internet or other web-browsing data, etc., or provide access to other applications and services, e.g., using cloud technologies.

A terminal device may be configured to operate on a plurality of RATs. A terminal device configured to operate on a plurality of RATs (e.g., the first and second RATs) may be configured in accordance with the wireless protocols of both the first and second RATs and optionally in addition in accordance with a wireless protocol of a third RAT (and likewise for operation on additional RATs). For example, LTE network access nodes (e.g., base stations) may transmit discovery and control information in a different format (including the type/contents of information, modulation and coding scheme, data rates, etc.) with different time and frequency scheduling (including periodicity, center frequency, bandwidth, duration, etc.) than Wi-Fi network access nodes (e.g., WLAN APs). Consequently, a terminal device designed for both LTE and Wi-Fi operation may operate according to the specific LTE protocols in order to properly receive LTE discovery and control information and may also operate according to the specific Wi-Fi protocols in order to properly receive Wi-Fi discovery and control information. Terminal devices configured to operate on further radio access networks, such as UMTS, GSM, Bluetooth, may likewise be configured to transmit and receive radio signals according to the corresponding individual access protocols. In some aspects, terminal devices may have dedicated hardware or software component corresponding to each supported RAT.

In some aspects, the steering and movement system 1125 may include components of vehicular terminal device 1100 related to steering and movement of the vehicular terminal device. In aspects where vehicular terminal device 1100 is an automobile, the steering and movement system 1125 may include wheels and axles, an engine, a transmission, brakes, a steering wheel, associated electrical circuitry and wiring and any other components used in the driving of an automobile. In aspects where the vehicular terminal device 1100 is an aerial vehicle, the steering and movement system 1125 may include one or more of rotors, propellers, jet engines, wings, rudders or wing flaps, air brakes, a yoke or cyclic, associated electrical circuitry and wiring and any other components used in the flying of an aerial vehicle. In aspects where the vehicular terminal device 1100 is an aquatic or sub-aquatic vehicle, the steering and movement system 1125 may include any one or more of rudders, engines, propellers, a steering wheel, associated electrical circuitry and wiring and any other components used in the steering or movement of an aquatic vehicle. In some aspects, the steering and movement system 1125 may also include autonomous driving functionality, and accordingly may also include a central processor configured to perform autonomous driving computations and decisions and an array of sensors for movement and obstacle sensing. The autonomous driving components of the steering and movement system 1125 may also interface with the radio communication system 1121 to facilitate communication with other nearby vehicular terminal devices or central networking components that perform decisions and computations for autonomous driving.

The radio communication system 1121 and the antenna system 1123 may be configured to perform one or more radio communication functionalities of the vehicular terminal device 1100, which may include transmitting and receiving communications with a radio communication network or transmitting and receiving communications directly with other vehicular terminal devices and other communication devices. For example, the radio communication system 1121 and the antenna system 1123 may be configured to transmit and receive communications with one or more network access nodes, such as, in the demonstrative context of DSRC and LTE V2V/V2X, RSUs and evolved Node-Bs (eNBs or base stations). In some aspects, the communication system 1121 may include a plurality of radios, which may be interfaced with each other via a common V2X convergence function layer or multiple V2X convergence functions within a protocol stack associated with each radio.

FIG. 12 through FIG. 15 illustrate additional example aspects of the antenna system 1123 introduced above. In support of multi-RAT environments, and further in sup p ort of other applications such as autonomous vehicles, antennas are provided in various numbers and configurations throughout the body of a mobile vehicle (e.g, vehicular terminal devices 108, 110, 328, 330, 332, 334, 336, 338, 340, or 1100), for communication with other vehicles, infrastructure, and other systems on the vehicle. Additionally, communication antennas described herein may be included to enhance radar communications, camera systems, and other sensing and communication systems.

Figure 12:
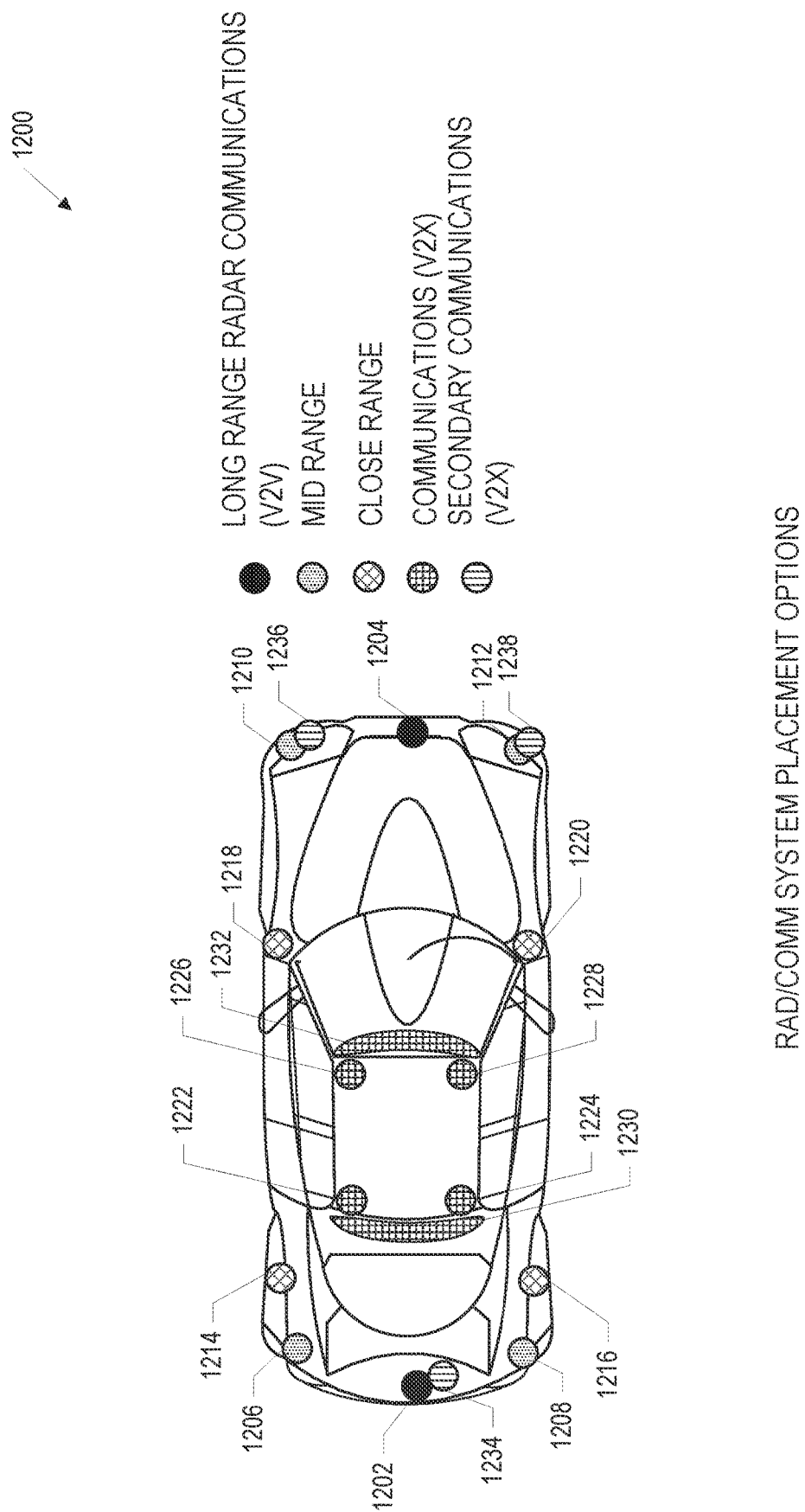
FIG. 12 illustrates an exemplary placing of multiple communication systems and radar systems link according to some aspects described herein.

FIG. 12 illustrates an exemplary placing of multiple communication systems and radar systems. Multiple antennas may, for example, be embedded in vehicle hoods, roofs or glass using integrated patterns. As illustrated, at least one antenna array 1222 may be placed at a first location of a first surface (e.g., roof or hood) of the vehicle and at least another antenna array 1226 may be placed on a second location of the first surface. 360-degree coverage may be provided by embedding antenna systems in four sides of the vehicle hood or roof. For example, as shown in FIG. 12, antennas 1222, 1224, 1226 and 1228 may be embedded at the four corners of the vehicle roof. Additionally, antennas 1230 and 1232 may be etched into windshields of the vehicle. Multiple antennas also allow vehicles to be connected to more than one point of infrastructure at the same time, as well as to more than one vehicle at the same time.

With data able to arrive at a vehicle from multiple sources over multiple RATs, there exists the possibility that some data may not be trustworthy, or that some data is being provided by persons attempting to "hack" into vehicular systems. Aspects therefore provide for vehicles to encode telemetry into messages, or to decode telemetry in received messages (e.g., by a hardware processor, such as processors 1140 or processor 5402). Such telemetry data may be used to improve security of a connection. Telemetry may, for example, include speed, GPS location, heading vehicle identification numbers, etc., such as is specified by the WAVE/DRSC families of standards (e.g., SAE 2735 Basic Safety Messages). By providing the capability to capture more telemetry over multiple RAT s, the amount of information may be increased and trustworthiness or usefulness of information may be determined. For example, by identifying GPS location of a vehicle, it may be determined whether the data provided by that vehicle is useful in that, for example, data from a vehicle that is too far away may not be useful for certain situations (e.g., collision detection). As another example, vehicle identification numbers may be inspected and verified before data is trusted. As another example, the provided GPS location may be double-checked using vehicular radar (or a camera, for example). If there is no vehicle detected in an expected location, based on the provided GPS location, then in accordance with some aspects the information from the vehicle providing that GPS location is not to be trusted.

As noted above, radar communications, camera systems, and other sensing and communication systems may be enhanced by the various configurations illustrated in FIG. 12. For example, communication antennas described herein may enhance long range radar communication systems 1202, 1204; mid-range radar communication systems 1206, 1208, 1210, 1212; and close-range radar communication systems 1214, 1216, 1218, and 1220. Such radar systems may be used to aid in parking to provide front, rear, or side collision warning for blind spot warnings, and for other uses. Such radar systems may be used to aid in parking to provide front, rear, or side collision warning for blind spot warnings, and for other uses. Radar may also be used to assist in communications directly, such as providing link setup for directional antennas.

Figure 13:
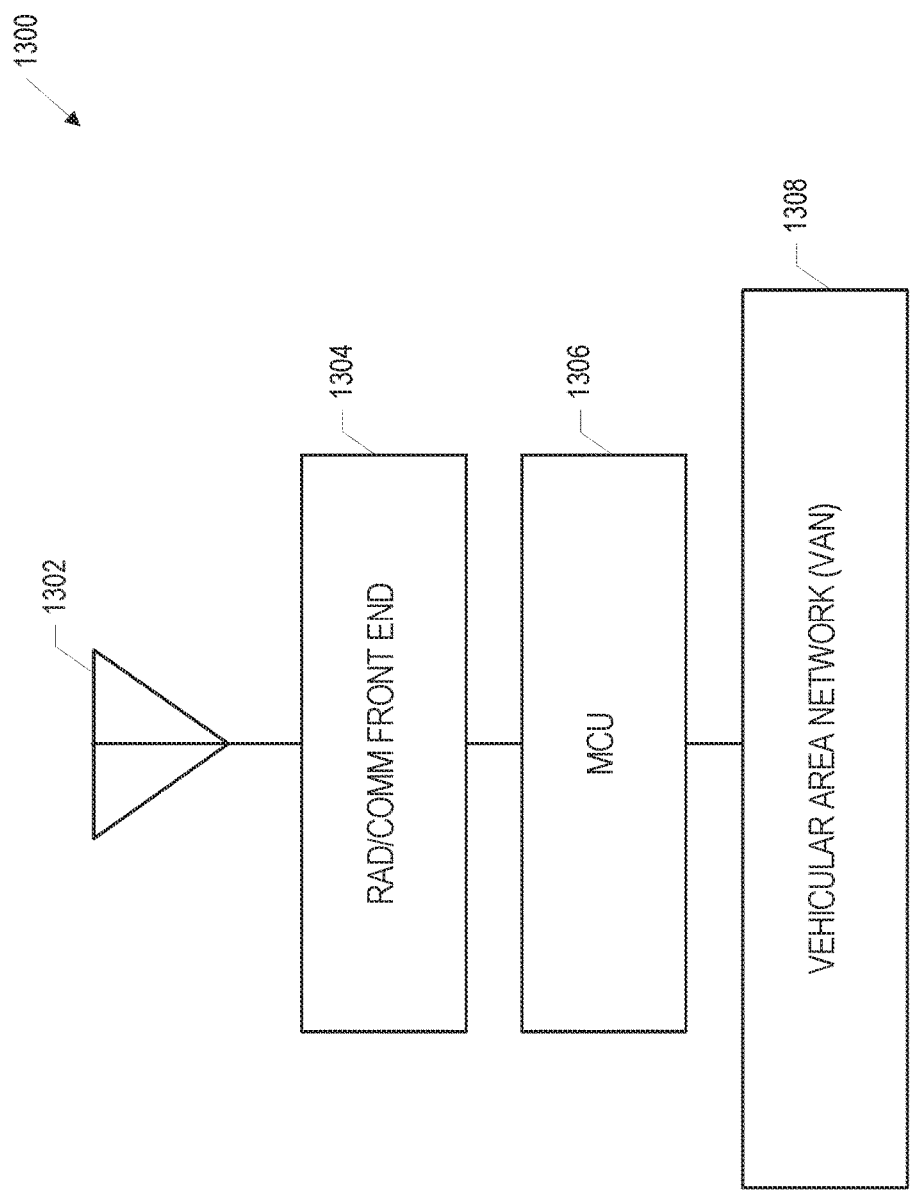
FIG. 13, FIG. 14, and FIG. 15 illustrate different exemplary configurations of front end and antenna systems according to some aspects described herein.
Figure 14:
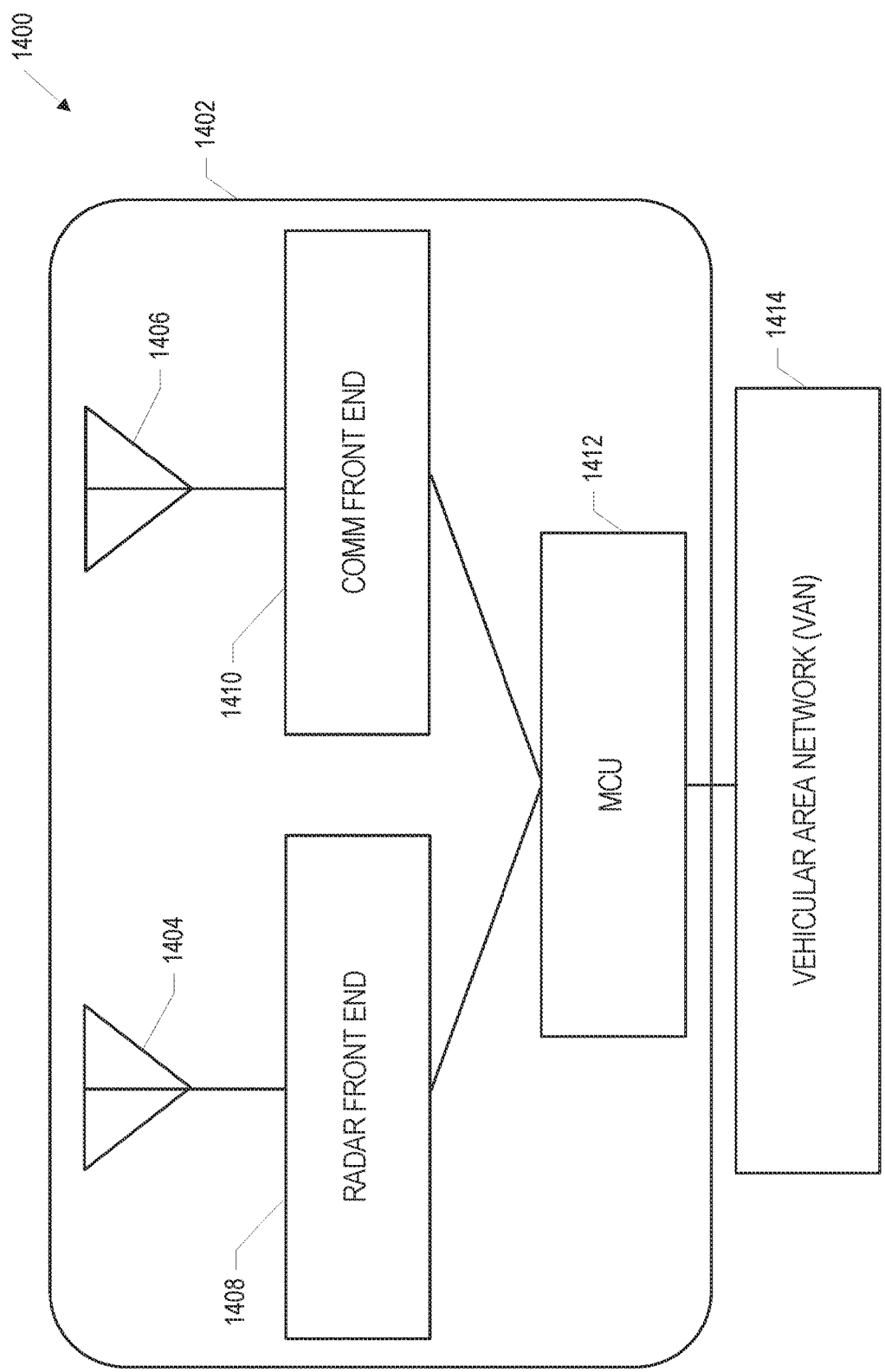
Figure 15:
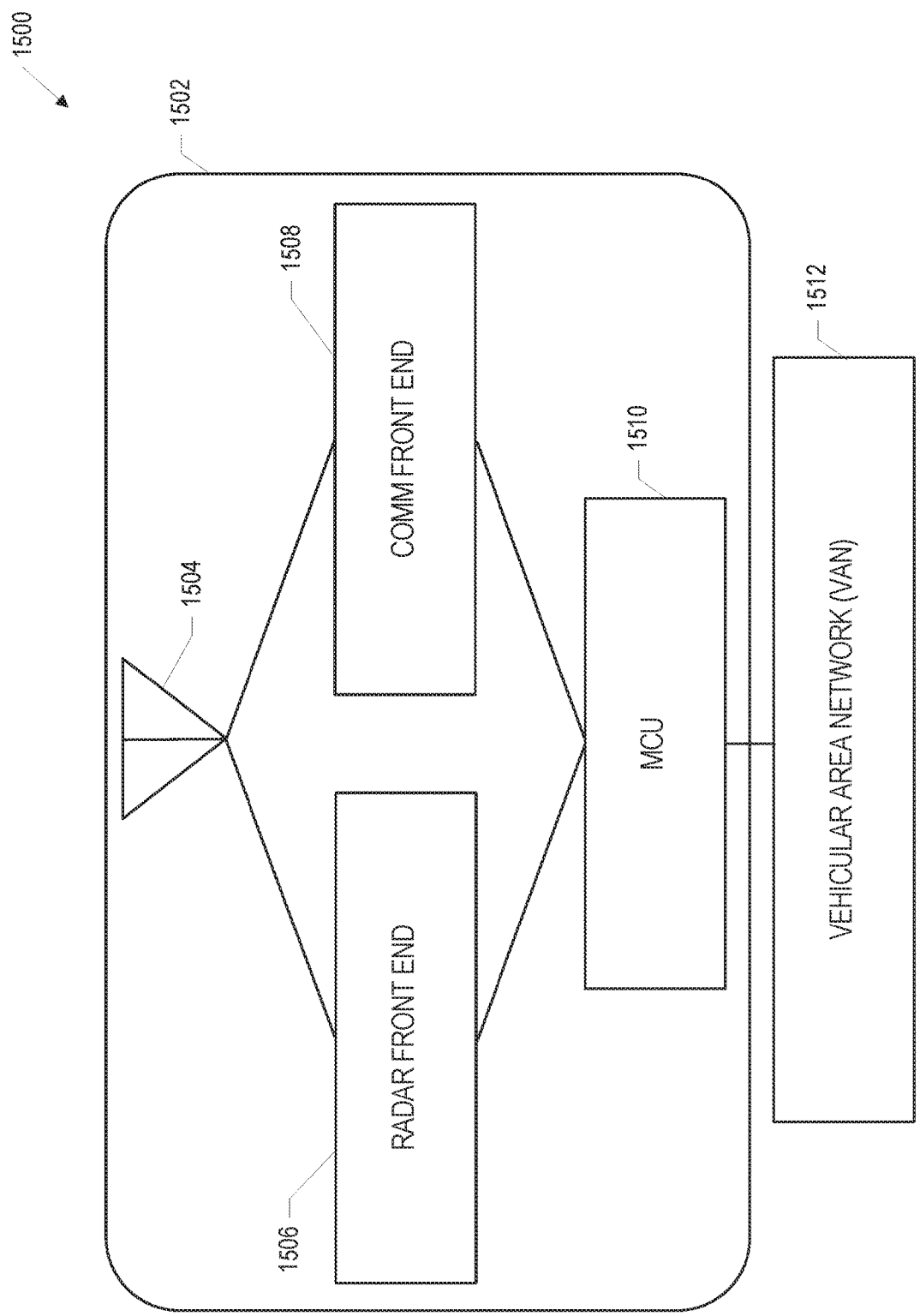

FIG. 13, FIG. 14, and FIG. 15 illustrate different configurations of front end and antenna systems in accordance with some aspects. FIG. 13 illustrates a combined system configuration 1300 in which a vehicular area network (VAN) 1308, or the like (e.g., a wired vehicle bus for intra-vehicle component communications) provides data for one microcontroller unit (MCU) 1306, which provides inputs to one front end 1304, for transmission/reception using one antenna 1302. FIG. 14 illustrates the radar front end 1408 and communications front end 1410 being separated, and two different antennas 1404 and 1406 being used for transmission/reception. FIG. 15 illustrates separated front ends 1506, 1508 with a combined antenna system 1504.

FIG. 16 illustrates an exemplary internal configuration of a radio communication system of the vehicular terminal device of FIG. 11 according to some aspects described herein. Referring to FIG. 16, the radio communication system 1121 may include a radio frequency (RF) transceiver 1602, a digital signal processor (DSP) 1604, and a controller 1606. In some aspects, the radio communication system may include a multi-link coder (MDC) 1605. The MDC 1605 may include a multi-link encoder and a multi-link decoder, and may be configured to perform functionalities associated with providing multi-layer redundancy in connection with multi-link, multi-RAT communications performed by the radio communication system 1121. Example functionalities of the MDC 1605 are discussed herein below in reference to FIG. 17-FIG. 25.

Although not explicitly shown in FIG. 16, in some aspects, the radio communication system 1121 may further include one or more additional hardware or software components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), key pad(s), touchscreen(s), speaker(s), external button(s), camera(s), microphone(s), etc.), or other related component s.

The controller 1606 may comprise suitable circuitry, logic, interfaces or code and may be configured to execute upper-layer protocol stack functions. The DSP 1604 may comprise suitable circuitry, logic, interfaces or code and may be configured to perform physical layer (PHY) processing. The RF transceiver 1602 may be configured to perform RF processing and amplification related to transmission and reception of wireless RF signals via the antenna system 1123.

The antenna system 1123 may include a single antenna or an antenna array with multiple antennas. The antenna system 1123 may additionally include analog antenna combination or beamforming circuitry. In the receive (RX) path, the RF transceiver 1602 may be configured to receive analog RF signals from the antenna system 1123, and perform analog and digital RF front-end processing on the analog RF signals to produce digital baseband samples (e.g., In-Phase/Quadrature (IQ) samples) to provide to the DSP 1604. In some aspects, the RF transceiver 1602 may include analog and digital reception components, such as amplifiers (e.g., a Low Noise Amplifiers (LNAs)), filters, RF demodulators (e.g, RF IQ demodulators)), and analog-to-digital converters (ADCs), which the RF transceiver 1602 may utilize to convert the received RF signals to digital baseband samples.

In the transmit (TX) path, the RF transceiver 1602 may be configured to receive digital baseband samples from the DSP 1604, and to perform analog and digital RF front-end processing on the digital baseband samples to produce analog RF signals to provide to antenna system 1123 for wireless transmission. In some aspects, the RF transceiver 1602 may include analog and digital transmission components, such as amplifiers (e.g., Power Amplifiers (PAs), filters, RF modulators (e.g, RF IQ modulators), and digital-to-analog converters (DACs) to mix the digital baseband samples received from a baseband modem, which the RF transceiver 1602 may use to generate the analog RF signals for wireless transmission by the antenna system 1123.

The DSP 1604 may be configured to perform physical layer (PHY) transmission and reception processing to, in the transmit path, prepare outgoing transmit data provided by controller 1606 for transmission via RF transceiver 1602, and, in the receive path, to prepare incoming received data provided by the RF transceiver 1602 for processing by the controller 1606. The DSP 1604 may be configured to perform one or more of error detection, forward error correction encoding/decoding channel coding and interleaving channel modulation/demodulation, physical channel mapping radio measurement and search, frequency and time synchronization, antenna diversity processing power control and weighting rate matching/de-matching retransmission processing interference cancellation, and any other physical layer processing functions.

The DSP 1604 may include one or more processors configured to retrieve and execute program code that defines control and processing logic for physical layer processing operations. In some aspects, the DSP 1604 may be configured to execute processing functions with software via the execution of executable instructions. In some aspects, the DSP 1604 may include one or more dedicated hardware circuits (e.g., ASICs, FPGAs, and other hardware) that are digitally configured to specifically execute processing functions, where the one or more processors of the DSP 1604 may offload certain processing tasks to these dedicated hardware circuits, which may be referred to as hardware accelerators. Exemplary hardware accelerators may include Fast Fourier Transform (FFT) circuits and encoder/decoder circuits. In some aspects, the processor and hardware accelerator components of the DSP 1604 may be realized as a coupled integrated circuit.

While the DSP 1604 may be configured to perform lower-layer physical processing functions, the controller 1606 may be configured to perform upper-layer protocol stack functions. The controller 1606 may include one or more processors configured to retrieve and execute program code that defines the upper-layer protocol stack logic for one or more radio communication technologies, which may include Data Link Layer/Layer 2 and Network Layer/Layer 3 functions. In an example, the upper layer protocol stack may include a V2X convergence function associated with functionalities performed by one or more radios within the RF transceiver 1602 or a V2X convergence function layer that is common to one or more of the radios within the RE transceiver 1602. In some aspects, the DSP 1604 or the controller 1606 may perform one or more of the functions performed by the processor 1140 (FIG. 11).

The controller 1606 may be configured to perform both user-plane and control-plane functions to facilitate the transfer of application layer data to and from the radio communication system 1121 according to the specific protocols of one or more supported radio communication technologies. User-plane functions may include header compression and encapsulation, security, error checking and correction, channel multiplexing scheduling and priority, while the control-plane functions may include setup and maintenance of radio bearers. The program code retrieved and executed by the controller 1606 may include executable instructions that define the logic of such functions.

In some aspects, the controller 1606 may be communicatively coupled to an application processor, which may be configured to handle the layers above the protocol stack, including the transport and application layers. The application processor may be configured to act as a source for some outgoing data transmitted by the radio communication system 1121, and a sink for some incoming data received by the radio communication system 1121. In the transmit path, the controller 1606 may be configured to receive and process outgoing data provided by the application processor according to the layer-specific functions of the protocol stack, and provide the resulting data to the DSP 1604. The DSP 1604 may be configured to perform physical layer processing on the received data to produce digital baseband samples, which the DSP may provide to the RF transceiver 1602. The RF transceiver 1602 may be configured to process the digital baseband samples to convert the digital baseband samples to analog RF signals, which the RF transceiver 1602 may wirelessly transmit via the antenna system 1123. In the receive path, the RF transceiver 1602 may be configured to receive analog RF signals from the antenna system 1123 and process the analog RF signal to obtain digital baseband samples. The RF transceiver 1602 may be configured to provide the digital baseband samples to the DSP 1604, which may perform physical layer processing on the digital baseband samples. The DSP 1604 may then provide the resulting data to the controller 1606, which may process the data according to the layer-specific functions of the protocol stack and provide the resulting incoming data to the application processor.

In some aspects, the radio communication system 1121 may be configured to transmit and receive data according to multiple radio communication technologies. Accordingly, in some aspects, one or more of the antenna system 1123, the RF transceiver 1602, the DSP 304, and the controller 1606 may include separate components or instances dedicated to different radio communication technologies or unified components that are shared between different radio communication technologies.

For example, in some aspects, V2X convergence functions (or a common V2X convergence function layer) may be used in the protocol stacks associated with each radio within the RF transceiver 1602. In some other aspects, the controller 1606 may be configured to execute multiple protocol stacks, each dedicated to a different radio communication technology and either at the same processor or different processors. In some aspects, the DSP 1604 may include separate processors or hardware accelerators that are dedicated to different respective radio communication technologies, or one or more processors or hardware accelerators that are shared between multiple radio communication technologies.

In some aspects, the RF transceiver 1602 may include separate RF circuitry sections dedicated to different respective radio communication technologies, or RF circuitry sections shared between multiple radio communication technologies. In some aspects, the separate RF circuitry sections dedicated to different radio communication technologies may be interfaced to each other via a common V2X convergence layer or via separate V2X convergence functions associated with each RF circuitry section.

In some aspects, the antenna system 1123 may include separate antennas dedicated to different respective radio communication technologies, or antennas shared between multiple radio communication technologies. Accordingly, while the antenna system 1123, the RF transceiver 1602, the DSP 1604, and the controller 1606 are shown as individual components in FIG. 16, in some aspects the antenna system 1123, the RF transceiver 1602, the DSP 1604, or the controller 1606 may encompass separate components dedicated to different radio communication technologies.

FIG. 17 illustrates exemplary transceivers using multiple radio communication technologies in the vehicular terminal device of FIG. 16 according to some aspects described herein. Referring to FIG. 17, the RF transceiver 1602 may include an RF transceiver 1602A for a first radio communication technology, an RF transceiver 1602B for a second radio communication technology, and an RF transceiver 1602C for a third radio communication technology. Similarly, the DSP 1604 may include a DSP 1604A for the first radio communication technology, a DSP 1604B for the second radio communication technology, and a DSP 1604C for the third radio communication technology. Similarly, the controller 1606 may include a controller 1606A for the first radio communication technology, a controller 1606B for the second radio communication technology, and a controller 1606C for the third radio communication technology.

In some aspects, the radio communication technologies may, for example, include a dedicated short-range communication (DSRC) radio communication technology, a wireless access vehicular environment (WAVE) radio communication technology, a Bluetooth radio communication technology, an IEEE 802.11 radio communication technology (e.g, Wi-Fi), an LTE radio communication technology, and a 5G radio communication technology.

The RF transceiver 1602A, the DSP 1604A, and the controller 1606A may form a communication arrangement (e.g., the hardware and software components dedicated to a p articular radio communication technology) for the first radio communication technology. The RF transceiver 1602B, the DSP 1604B, and the controller 1606B may form a communication arrangement for the second radio communication technology. The RF transceiver 1602C, the DSP 1604C, and the controller 1606C may form a communication arrangement for the third radio communication technology. While depicted as being logically separate in FIG. 11, any components of the communication arrangements may be integrated into a common component.

With continued reference to FIG. 18-FIG. 53, one or more of the referenced handheld devices, vehicular devices or other V2X-enabled devices (e.g., RSUs) may be configured similarly to the vehicular terminal device 1100 as shown and described in reference to FIG. 11. Devices illustrated or described in reference to FIG. 18-FIG. 53 may be configured to transmit and receive radio signals using one or more communication links associated with at least one RAT of multiple RATs, and representing communication data according to one or more vehicular radio communication technologies, such as DSRC, WAVE, Bluetooth, Wi-Fi, LTE, or 5G. In some aspects, a V2X convergence function layer may be configured as a common interface between the different radios, to perform multi-link, multi-radio communications in a V2X communication environment.

Figure 18:
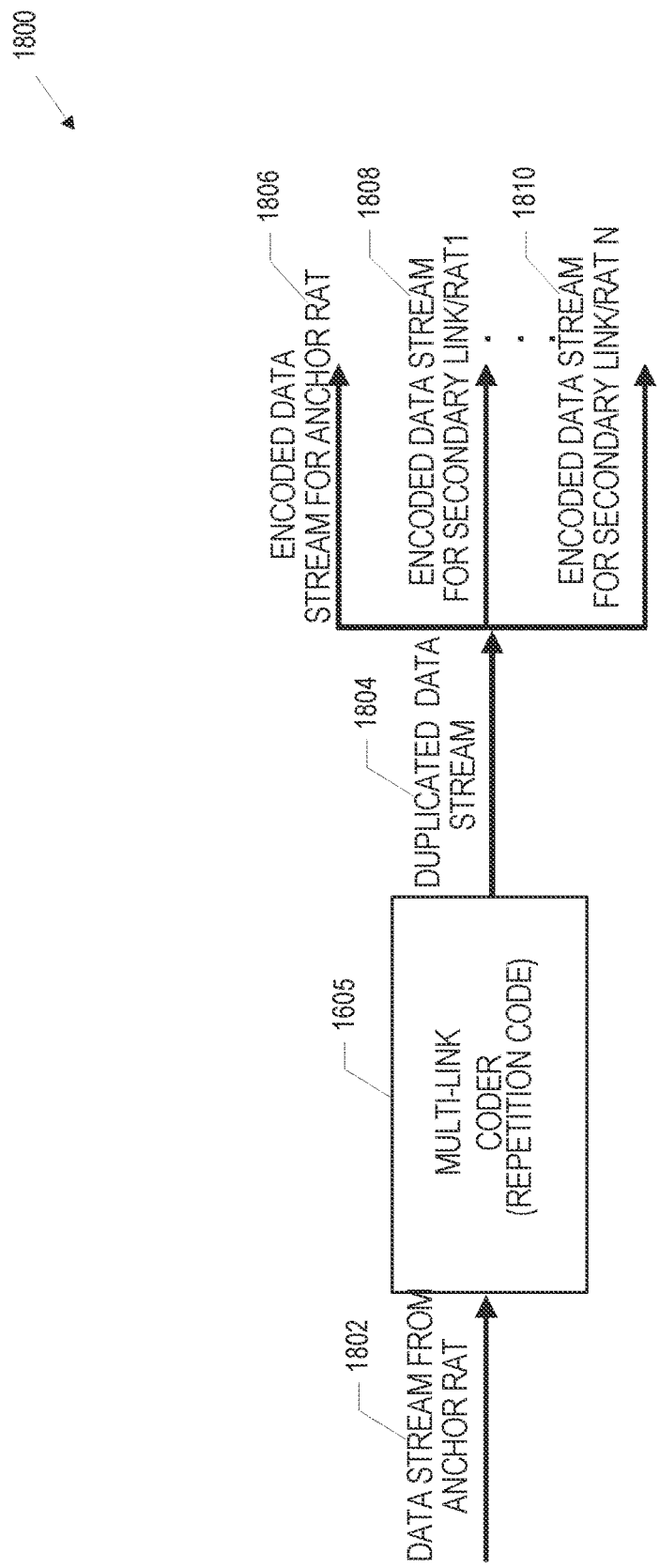
FIG. 18, FIG. 19, and FIG. 20 illustrate exemplary coding techniques, which may be performed by the multi-link coder of FIG. 17 according to some aspects described herein.
Figure 19:
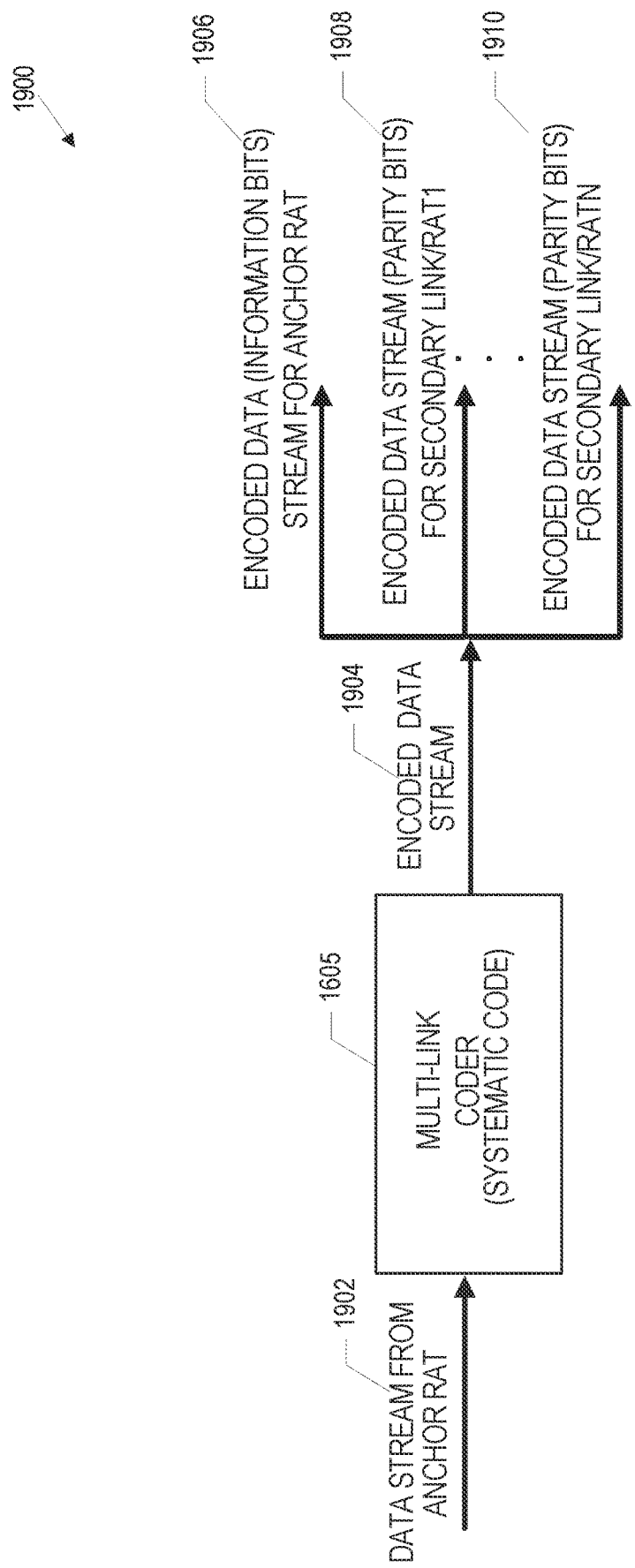
Figure 20:
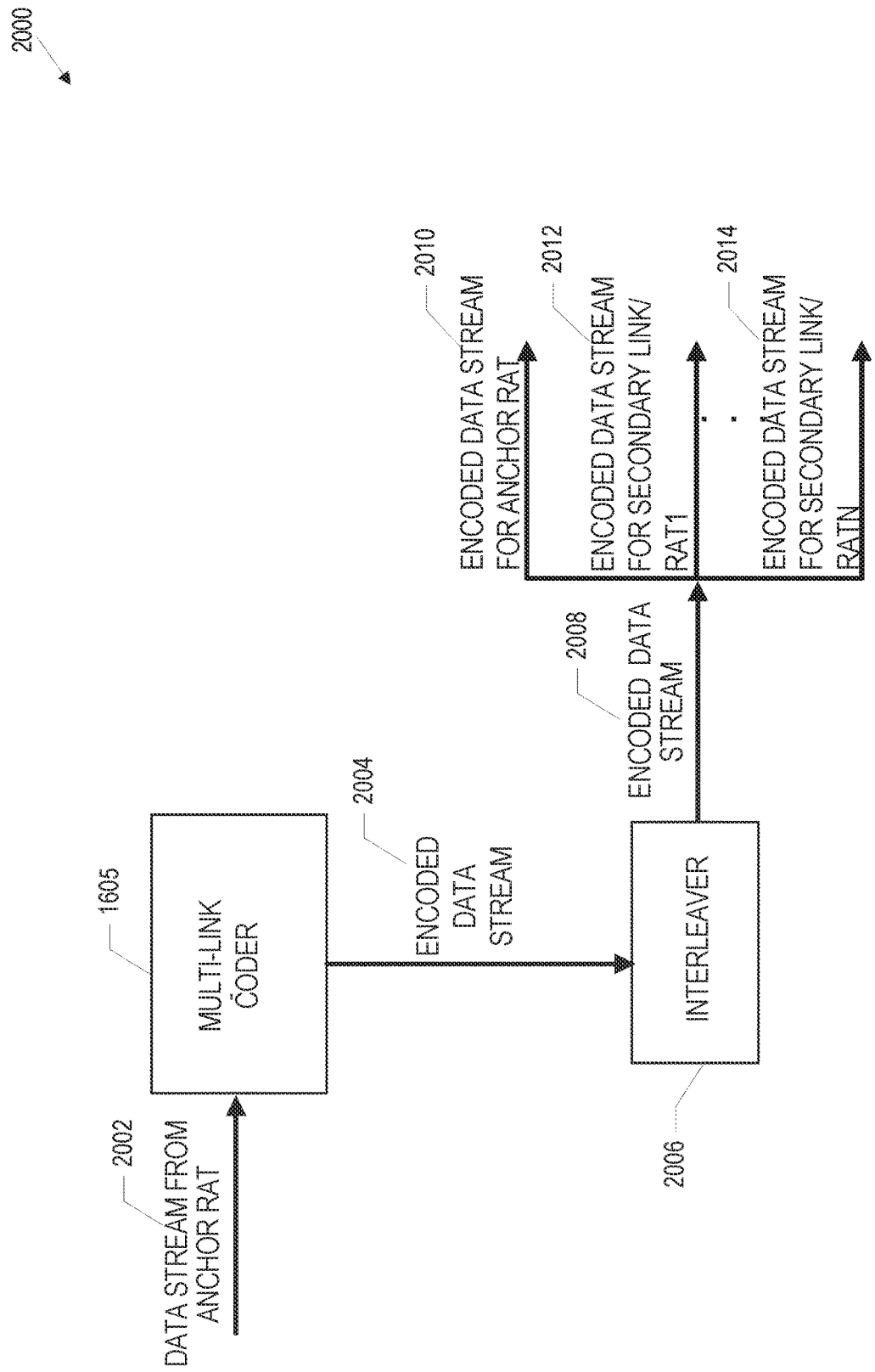

FIG. 18-FIG. 20 illustrate exemplary coding techniques, which may be performed by the multi-link coder of FIG. 17 according to some aspects described herein. Referring to FIG. 18, there is illustrated an exemplary first coding technique 1800 for coding a data stream by the multi-link coder 1605. For example, the multi-link coder 1605 may receive a data stream 1802 (e.g., from an anchor RAT) and may apply a repetition code to generate an encoded data stream 1804. The encoded data stream 1804 may be replicated and may be communicated across multiple communication links of a single transceiver chain or multiple transceiver chains where each transceiver chain is associated with a different RAT of a multi-RAT. As seen in FIG. 18, the encoded data stream 1804 may be replicated to generate encoded data stream 1806 (which may be communicated to the anchor RAT) and additional encoded data stream 1808 and 1810 (which may be communicated to secondary links of a transceiver chain used for communicating the data stream 1806 or to additional transceiver chains using one or more different RATs of the multi-RAT). In this regard, by using a repetition code, the multi-link coder 1605 may duplicate a data stream across multiple links or RATs.

Referring to FIG. 19, there is illustrated an exemplary second coding technique 1900 for coding a data stream by the multi-link coder 1605. For example, the multi-link coder 1605 may receive a data stream 1902 (e.g, from an anchor RAT) and may apply a systematic code to generate an encoded data stream 1904. The encoded data stream 1904 may be used to generate a first encoded data stream 1906, which includes the information bits associated with the data stream 1902 and may be communicated to the anchor RAT. The encoded data stream 1904 may also be used to generate additional encoded data streams 1908 and 1910, which may include parity bits associated with the data stream 1902. The additional data streams 1908 and 1910 may be communicated to secondary links of a transceiver chain used for communicating the data stream 1906 or to additional transceiver chains using one or more different RATs of multi-RAT.

Referring to FIG. 20, there is illustrated an exemplary third coding technique 2000 for coding a data stream by the multi-link coder 1605. For example, the multi-link coder 1605 may receive a data stream 2002 (e.g., from an anchor RAT) and may apply a systematic or non-systematic code to generate an encoded data stream 2004. The multi-link coder 1605 may additionally include an interleaver 2006, which may interleave the data stream 2004 to generate encoded data stream 2008. In some aspects, the interleaver 2006 may interleave a data stream 2004 between multiple data streams 2010, 2012, . . . , 2014. As seen in FIG. 20, the encoded data stream 2010 may be communicated to an anchor RAT, and the encoded data streams 2012 and 2014 may be communicated to secondary links of a transceiver chain used for communicating the data stream 2010 or two additional transceiver chains using one or more different RATs of the multi-RAT.

Even though FIG. 18-FIG. 20 illustrate the use of repetition, systematic, or non-systematic codes by the multi-link coder 1605, the disclosure is not limited in this regard and different type of codes may be applied in other aspects. For example, at higher layers, erasure codes (such as Raptor or other Fountain codes) or channel codes may, for example, also be applied as well.

As seen in FIG. 18-FIG. 20, multiple encoded data streams may be generated based on a single data stream, and the multiple encoded data streams may be communicated via different links of the same transceiver chain or via multiple transceiver chains using different RAT of the multi-RAT. In this regard, multilayer redundancy of the communicated information within a V2X communication environment may be achieved, which increases reliability of communications. More specifically, the same encoded data (or parity data which may be used to decode the encoded data) may be communicated on multiple communication channels to ensure successful reception by one or more V2X enabled devices within the V2X communication environment.

Figure 21:
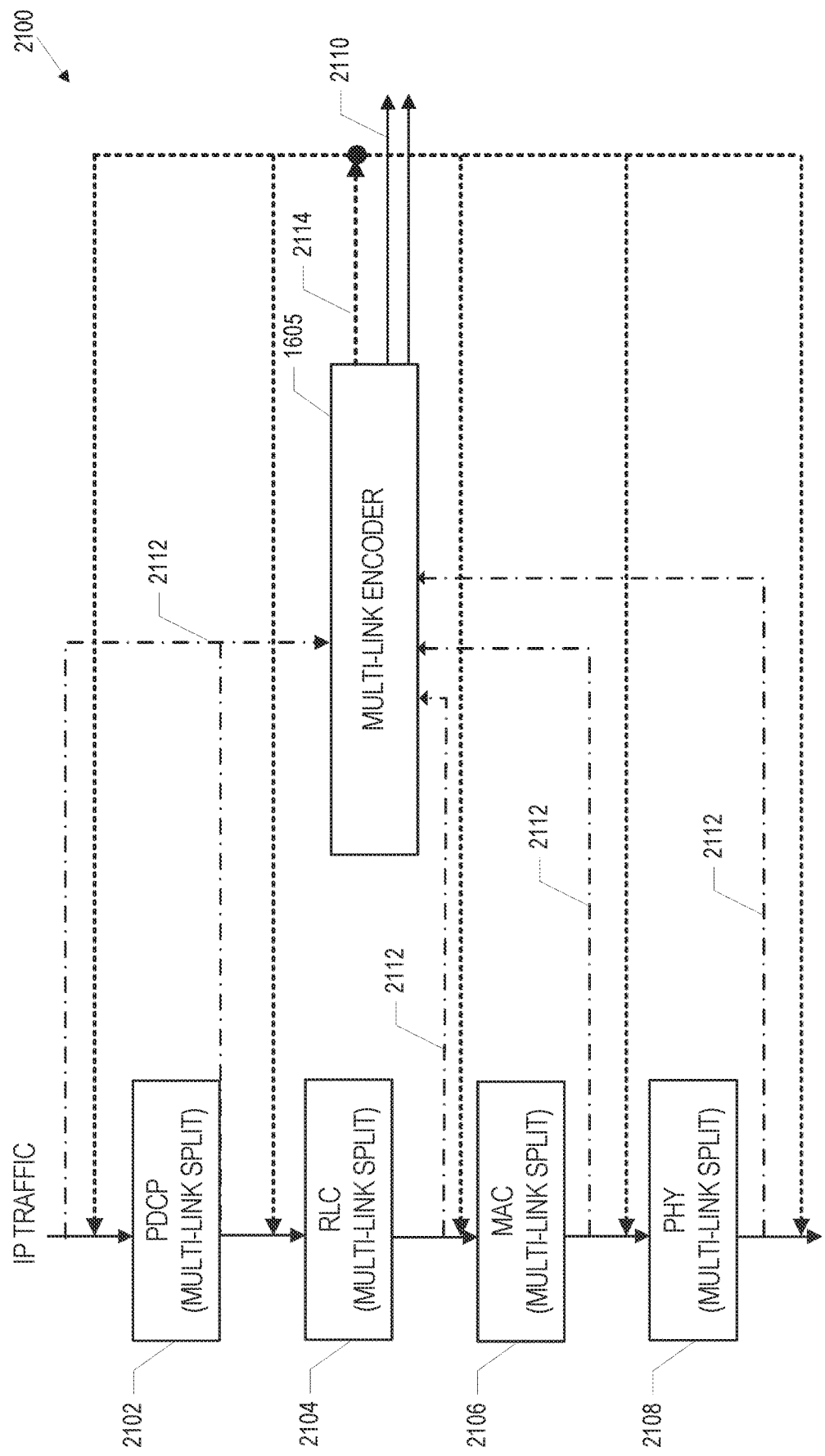
FIG. 21 illustrates exemplary multi-link encoding performed by the multi-link coder of FIG. 17 at various levels within a 3GPP protocol stack according to some aspects described herein.

FIG. 21 illustrates exemplary multi-link encoding performed by the multi-link coder of FIG. 17 at various levels within a 3GPP protocol stack according to some aspects described herein. Referring to FIG. 21, there is illustrated a multi-link encoding technique 2100 using data from various layers of a 3GPP protocol stack. The 3GPP protocol stack may include a physical (PHY) layer 2108, a media access control (MAC) layer 2106, a radio link control (RLC) layer 2104, and a packet data convergence protocol (PDCP) layer 2102.

As seen in FIG. 21, the multi-link coder 1605 may be configured to receive data inputs 2112 from any of the protocol layers 2102-2108 of the 3GPP protocol stack, and encode bits, symbols, or packets at the different layers of the protocol stack. The encoded data stream 2110 may include an encoded stream for an anchor link as well as an encoded stream for one or more secondary links (e.g., as seen in FIG. 18-FIG. 20). In some aspects, a common convergence protocol layer or function may be added to the protocol stack (e.g., as discussed herein below in reference to FIG. 40-FIG. 53). The common convergence protocol layer may be configured to add proper sequence numbers and headers to the encoded packets for multi-link transmissions.

Figure 22:
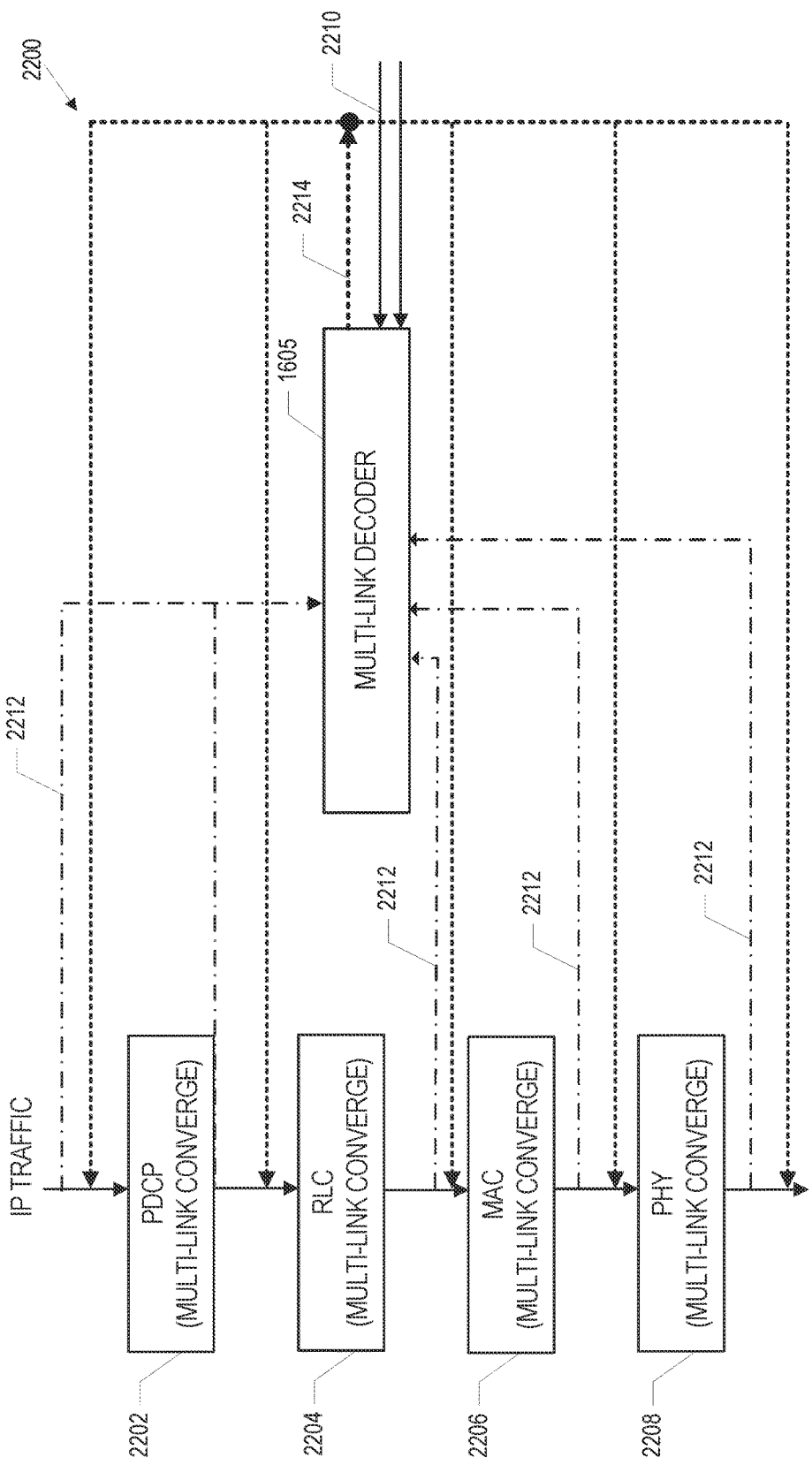
FIG. 22 illustrates exemplary multi-link decoding performed by the multi-link coder of FIG. 17 at various levels within a 3GPP protocol stack according to some aspects described herein.

FIG. 22 illustrates exemplary multi-link decoding performed by the multi-link coder of FIG. 17 at various levels within a 3GPP protocol stack according to some aspects described herein. Referring to FIG. 22, there is illustrated a multi-link decoding technique 2200 communicating decoded data to various layers of a 3GPP protocol stack. The 3GPP protocol stack may include a physical (PHY) layer 2208, a media access control (MAC) layer 2206, a radio link control (RLC) layer 2204, and a packet data convergence protocol (PDCP) layer 2202.

As seen in FIG. 22, the multi-link coder 1605 (which may be referred to as a multi-link decoder in this case) may be configured to receive encoded data input 2210 (which may be received via redundant communication links such as primary and secondary links). The multi-link decoder 1605 may be also configured to receive data inputs 2212 from any of the protocol layers 2202-2208 of the 3GPP protocol stack, which inputs may be used to decode the received data and generate decoded data 2214. The decoded data stream 2214 may be communicated to any of the protocol layers 2202-2208 of the 3GPP protocol stack for further processing and communication to one or more V2X enabled devices. In some aspects, a common convergence protocol layer or function may be added to the protocol stack (e.g., as discussed herein below in reference to FIG. 40-FIG. 53). The common convergence protocol layer may, for example, be configured to add proper sequence numbers and headers to the decoded packets for multi-link transmissions.

Figure 23:
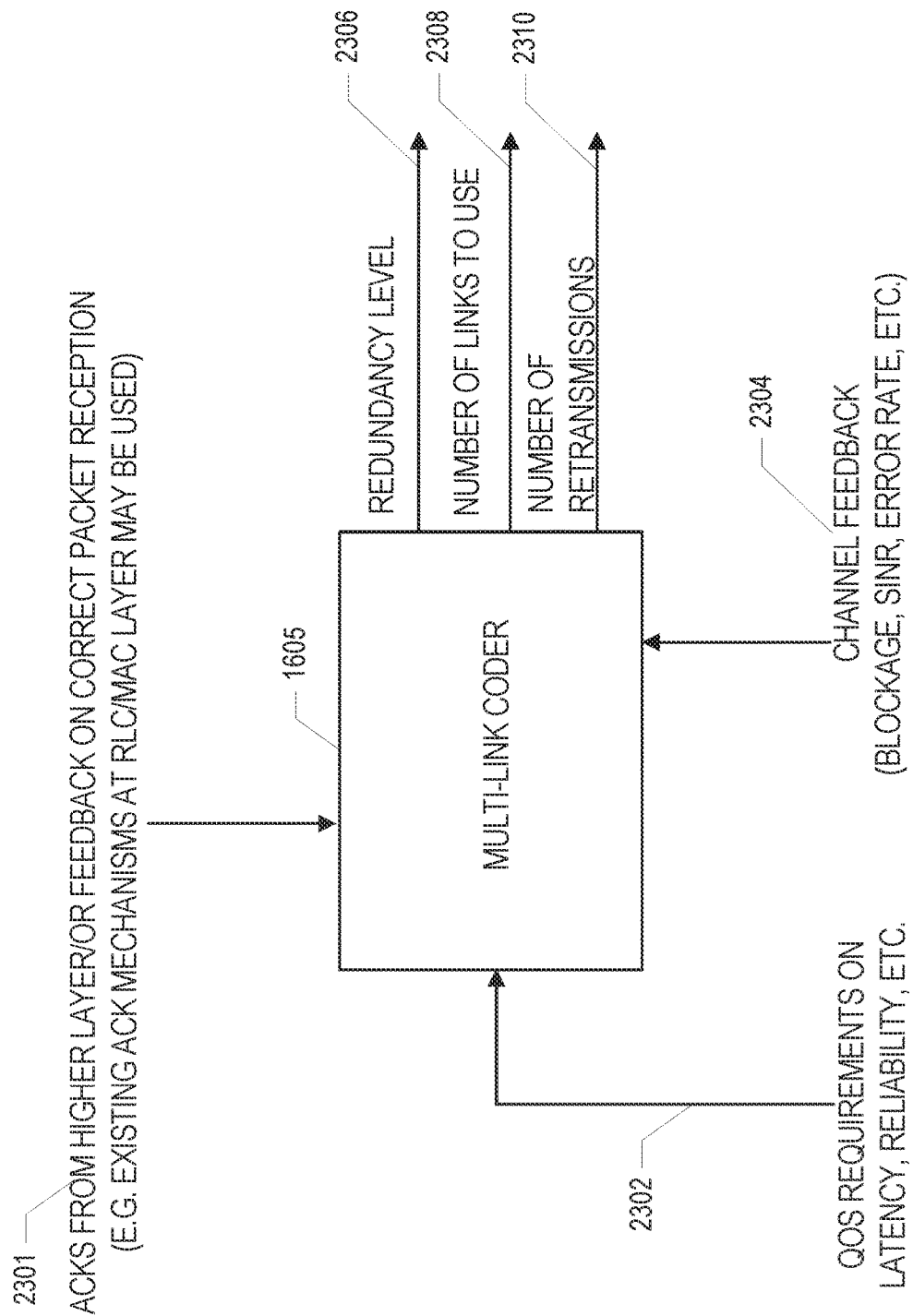
FIG. 23 illustrates various inputs to the multi-link coder of FIG. 17 according to some aspects described herein.

FIG. 23 illustrates various inputs to the multi-link coder of FIG. 17 according to some aspects described herein. Referring to FIG. 23, the multi-link coder 1605 may be configured to receive various inputs 2301-2304, which may be used to determine a redundancy level 2306, a number of links 2308 to use when transmitting encoded data, and a number of retransmissions 2310 (e.g, a number of communication links used to transmit encoded data with the same transceiver chain or the number of different transceiver chains associated with different RATs to use when transmitting the encoded data stream). Inputs 2301 may include one or more acknowledgments from a higher layer or feedback from a receiving communication node on correct packet reception (e.g, existing ACK mechanisms at RLC/MAC layer may be used). Inputs 2302 may include one or more quality of service (QoS) requirements on latency, reliability, and so forth. Inputs 2304 may include channel quality feedback information for one or more communication channels coupled to a device using the multi-link coder 1605. The channel quality feedback 2304 may include channel blockage information, signal to interference plus noise ratio (SINR), error rate, and so forth.

Figure 24:
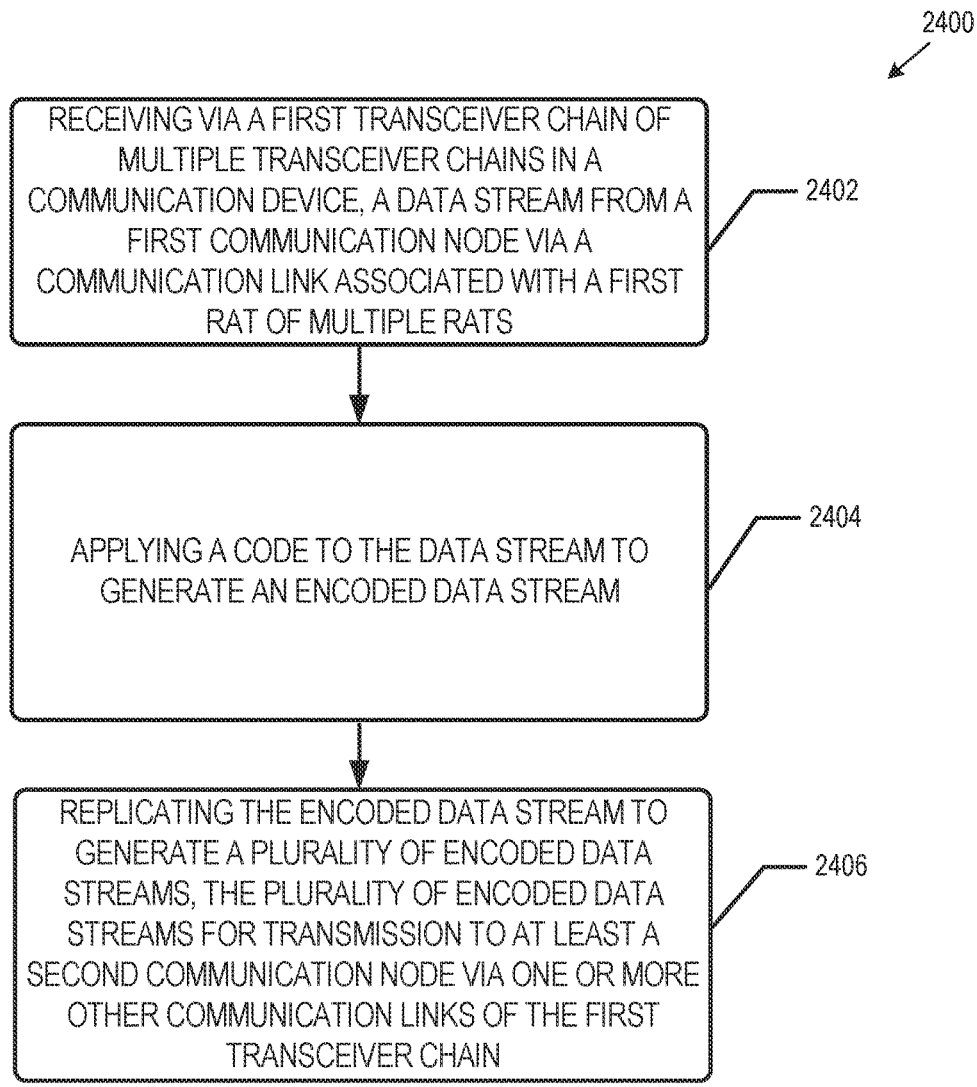
FIG. 24 and FIG. 25 illustrate exemplary methods for multi-link coding within a V2X communication environment according to some aspects described herein.
Figure 25:
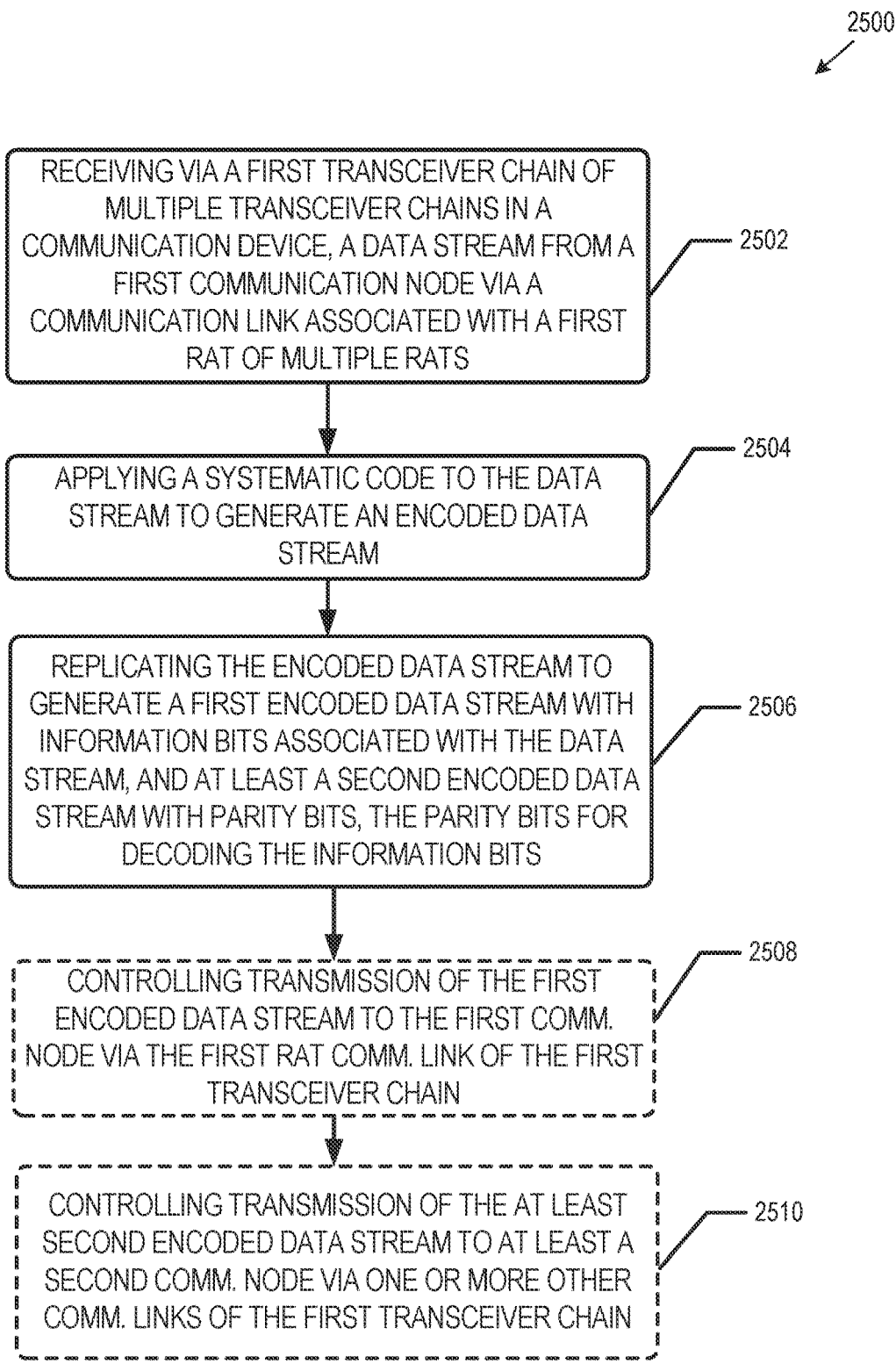

FIG. 24 and FIG. 25 illustrate exemplary methods 2400 and 2500 for multi-link coding within a V2X communication environment according to some aspects described herein. In the context of the present disclosure, methods 2400 and 2500 may be performed by a hardware processor. However, methods 2400 and 2500 may be performed by other hardware or software components such as processing circuitry, microprocessors, central processing units (CPUs), etc.

Referring to FIG. 24, the example method 2400 may start at operation 2402, when a data stream may be received via a first transceiver chain of multiple transceiver chains within a communication device. The data stream may be received from a first communication node via a communication link associated with a first RAT of a multi-RAT communication environment. For example, and in reference to FIG. 3 and FIG. 18, the multi-linking coder 1605 may be implemented within a vehicular terminal device 328, which may be configured to receive a data stream 1802 from the base station 302. At operation 2404, the multi-link coder 1605 may apply a code to the received data stream to generate an encoded data stream, such as 1804. At operation 2406, the encoded data stream may be replicated to generate a plurality of encoded data streams. The plurality of encoded data streams may be used for transmission to at least the second communication node via one or more other communication links of the first transceiver chain. For example, the multi-link coder 1605 may use repetition code and generate replicated encoded streams 1806, 1808, and 1810. Encoded data stream 1806 may be used for communication back to the base station 302, while one or more of the encoded data stream 1808 through 1810 may be communicated to other nodes within the V2X communication environment using different links of the same transceiver chain used for communication of the encoded data stream 1806.

Referring to FIG. 25, the example method 2500 may start at operation 2502, when a data stream may be received via a first transceiver chain of multiple transceiver chains in a communication device. The data stream may be received from a first communication node via a communication link associated with a first RAT of a multi-RAT communication environment. For example and in reference to FIG. 3 and FIG. 19, the multi-link coder 1605 may be implemented within a vehicular terminal device 328, which may be configured to receive a data stream 1902 from the base station 302.

At operation 2504, a systematic code may be applied to the data stream to generate an encoded data stream. For example, the multi-link coder 1605 may apply a systematic code to generate decoded data stream 1904. At operation 2506, the encoded data stream may be replicated to generate a first encoded data stream with information bits associated with the data stream and at least the second encoded data stream with parity bits. The parity bits may be used for decoding the information bits. For example, the encoded data stream 1904 may be used to generate encoded data stream 1906 with information bits and encoded data stream 1908 through 1910 with parity bits.

At operation 2508, a control circuit (e.g., controller 1606) may control transmission of the first encoded data stream 1906 with the information bits to the first communication node via the first RAT communication link of the first transceiver chain. At operation 2510, the control circuit may also control transmission of the at least second encoded data stream (one or more of the data streams 1908 through 1910) to at least the second communication node via one or more other communication links of the first transceiver chain.

Figure 26:
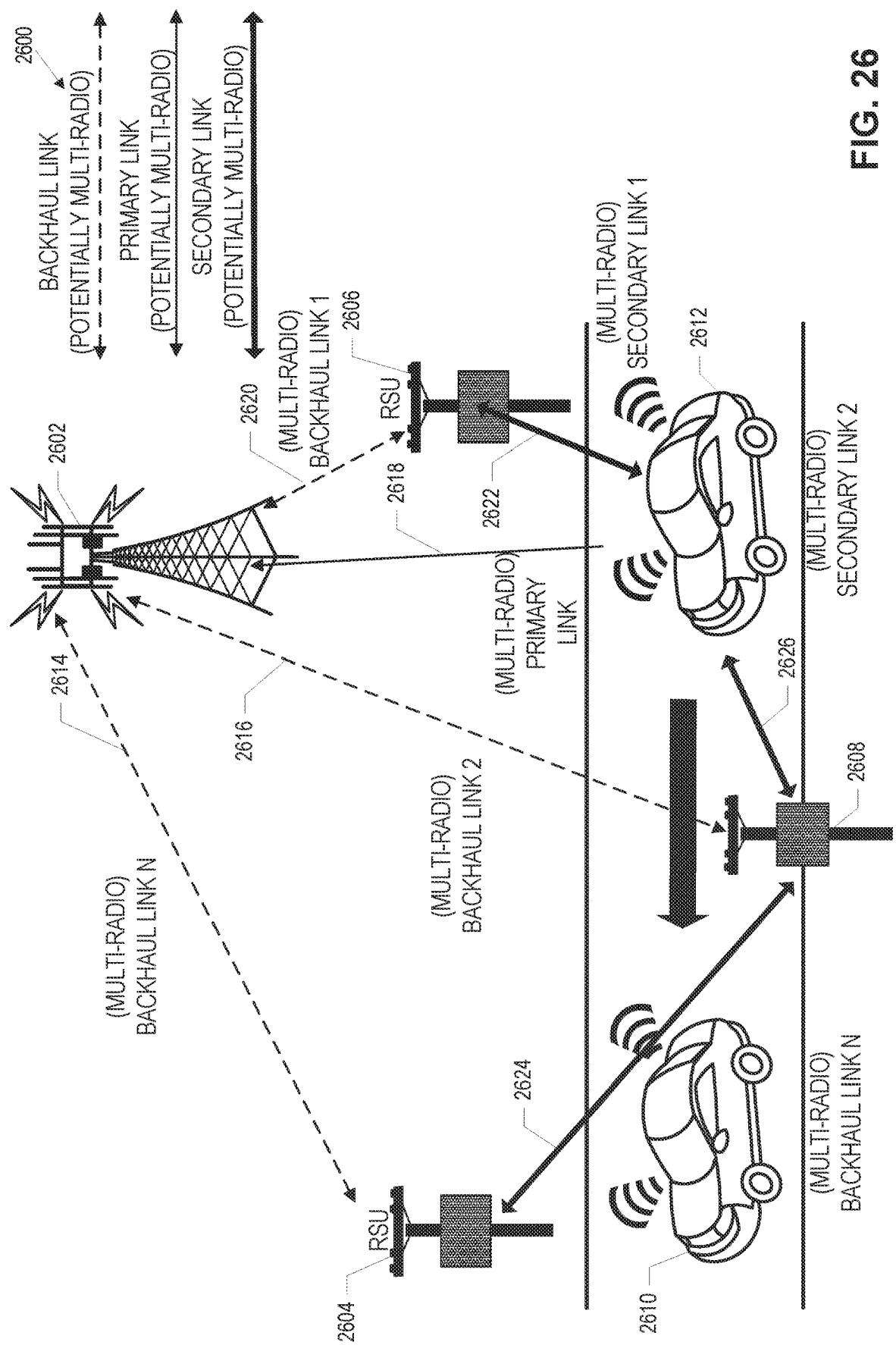
FIG. 26 illustrates an exemplary V2X communication environment with multi-link connectivity for V2I/V2N links based on 3GPP carrier aggregation and dual connectivity based frameworks according to some aspects described herein.

FIG. 26 illustrates an exemplary V2X communication environment with multi-link connectivity for V2I/V2N links based on 3GPP carrier aggregation and dual connectivity based frameworks according to some aspects described herein. Referring to FIG. 26, the V2X communication environment 2600 includes a primary node 2602 (e.g., a base station or another type of communication node), RSU 2604, RSU 2606, RSU 2608, and vehicles 2610 and 2612. The vehicle 2612 may be connected with the primary node 2602 via a primary communication link 2618. The RSUs 2604, 2606, and 2608 may be connected with the primary node 2602 via communication links 2614, 2616, and 2620, respectively. In some aspects, the communication links 2614, 2616, and 2620 may be used as backhaul communication links. In some aspects, one or more of the vehicles 2610, 2612, and one or more of the RSUs 2604, 2606, and 2608 may be communicatively coupled via secondary communication links. For example, vehicle 2612 is communicatively coupled with RSUs 2606 and 2608 via secondary communication links 2622 and 2626 respectively. RSU 2608 may be further coupled with RSUs 2604 via the second communication link 2624.

In some aspects, communication links between a vehicle and an infrastructure unit (such as an anchor node, a base station, an RSU, and so forth) may be referred to as V2I links; communication links between a vehicle and a network enabled device or network infrastructure may be referred to as V2N links; and communication links between vehicles may be referred to as fee to the links. In some aspects, any of the communication links 2614, 2616, 2618, 2620, 2622, 2624, and 2626 may be multi-link connections (e.g., using multiple communication links via a single transceiver chain) or multi-radio links (e.g., using communication links via multiple transceiver chains where each transceiver chain may operate in accordance with one or more RATs of multi-RAT).

In some aspects, one or more of the vehicles 2610 and 2612 may be equipped with multi-RAT cap abilities (e.g., may include a plurality of transceivers configured to operate on LTE, WLAN, DSRC, mmWave, NR, and so forth). Additionally, the vehicle 2610 and 2612 may be configured to simultaneously connect to multiple infrastructure units (e.g., 2602, 2604, 2606, and 2608) using a carrier aggregation (CA) or dual connectivity (DC) based framework (e.g., as available for LTE radio technology and its extensions, as well as new communication techniques being introduced in 3GPP Release 15 and beyond). A vehicle's multiple connections may be to a wide area macro cell and a RSU, or to two different RSUs, or to different carriers/RATs on the same infrastructure units, and so forth. The macro-cell or RSUs may be connected via fiber-backhaul or self-backhaul systems using orthogonal or same frequency bands (e.g., backhaul communication links 2614, 2616, and 2620).

In some aspects, the infrastructure nodes may also be connected via a cloud RAN architecture, where Remote Radio Heads (RRH) are mounted on the RSUs. In some aspects, the infrastructure nodes may be connected using radios operating on one or both of un-licensed and licensed bands (e.g. LTE-WLAN Aggregation (LWA) or Licensed Assisted Access (LAA)). Numerous benefits of DC and CA based frameworks then become available for improving V2I connections, augmenting the existing DSRC and V2X mechanisms, and so forth. For example, a DC framework within the V2X communication environment 2600 may allow a vehicle (e.g., 2612) to connect with the wide-area infrastructure using its primary carrier (for example the LTE carrier on communication link 2618, although it is conceivable that other radio links may also serve as the "primary" or "anchor" nodes), and then allow for additional connections (e.g., 2622) to local infrastructure nodes (e.g., RSU 2606) to simultaneously service the connectivity needs of the vehicle. Such connectivity may be managed by a central controller (e.g, a Radio Resource Controller (RRC) at the anchor node 2602, in the LTE case, or a Multi-RAT coordination or convergence functions described herein below in reference to FIG. 40-FIG. 53).

In some aspects, a specific RSU selection and the number of additional RSUs to use for multilink connectivity may be based on the vehicle location, augmented by the link measurements reported by the vehicle, the current loading on the network, the connectivity needs of the vehicle, the topology and reachability of the additional RSU nodes (in terms of the ease of routing traffic through them), and so forth. Furthermore, the link measurements to different RSUs for a given vehicle may be collected via backhaul communication or predicted based on past vehicle trajectories, as well as crowd sourcing mechanisms (e.g., through reporting from other vehicles, pedestrians, or other devices). The usage of the supporting nodes may also determine the additional nodes (for example, if the additional nodes are to be used to assist in handovers, then connectivity may be established to RSUs along the predicted trajectory, otherwise if reliability is of primary concern, then, for example, the set of RSUs with the best signal strength or the lowest probability of being blocked may be identified).

In some aspects, a vehicle within the V2X communication environment 2600 may express a preference for connectivity to a specific node/RAT, based on cost considerations and so forth (e.g., the vehicle may be configured to always connect to a WLAN node for getting non-critical information, such as advertising information on nearby restaurants, stores of interest based on vehicle/user profile, etc.). Once the dual or multi-link connectivity is established, the dynamic use of links for routing or aggregating different types of traffic could be governed via radio resource management (RRM) principles described herein.

Figure 27:
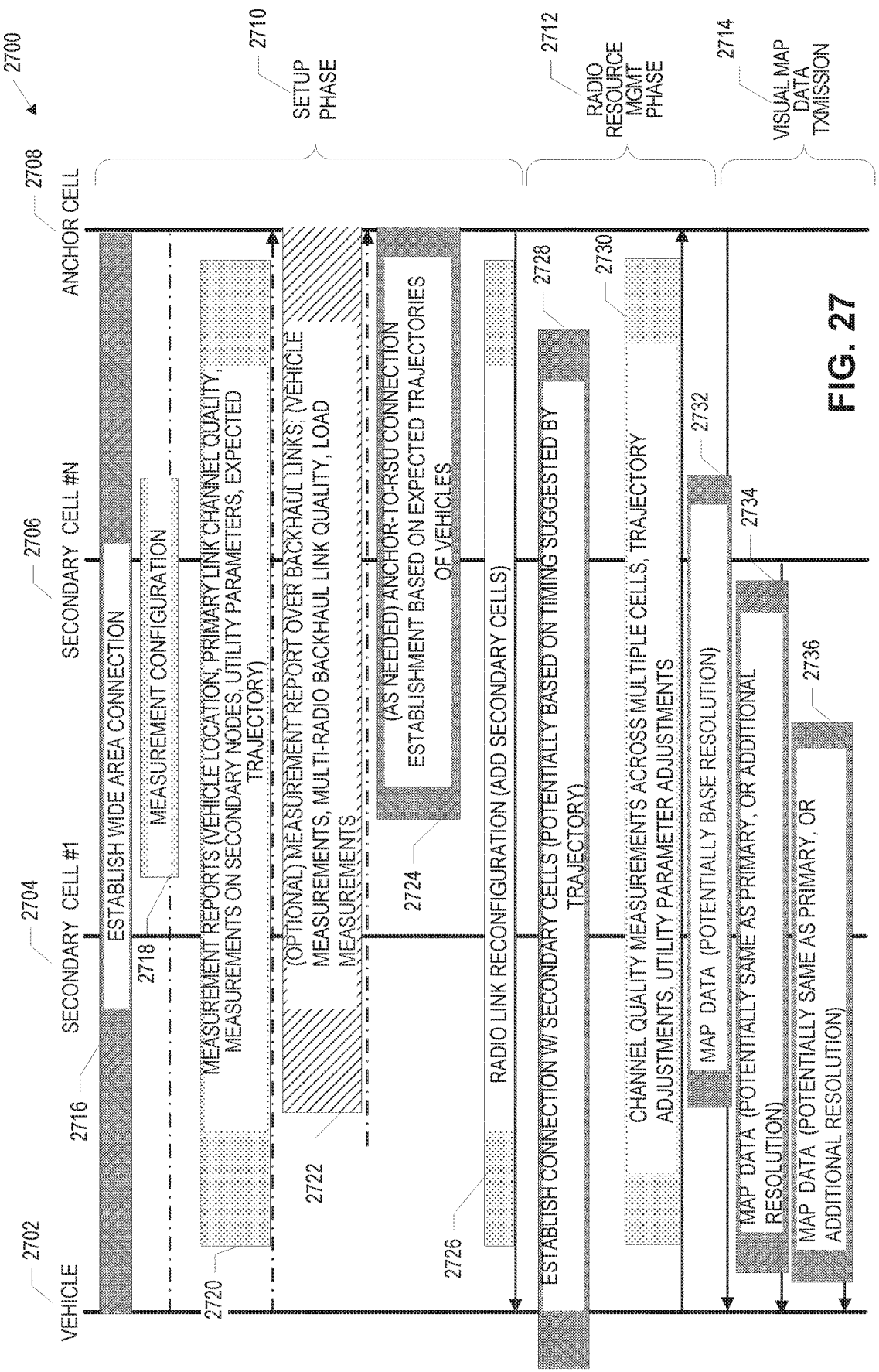
FIG. 27 illustrates an exemplary communication flow within the V2X communication environment of FIG. 26 according to some aspects described herein.

There are numerous V2X applications that may benefit from availability of such multiple V2I link connectivity illustrated in FIG. 26. In one aspect and as illustrated in FIG. 27, the infrastructure nodes may broadcast (or unicast) map information to a vehicle via different nodes based on locality of the map information. The infrastructure may also split the data across several nodes (aggregation) to speed up the delivery of the map information. Alternately, the map data may be broadcast redundantly from multiple nodes in the vicinity of the vehicle to improve reliability of reception.

FIG. 27 illustrates an exemplary communication flow within the V2X communication environment of FIG. 26 according to some aspects described herein. Referring to FIG. 27, the communication flow 2700 may occur between a vehicle 2702 (e.g. 2610, 2612), secondary cells 2704, 2706 (e.g. RSUs 2604, 2606, 2608), and an actor cell 2708 (e.g., 2602). During an example set up phase 2710, at 2716, a wide area connection may be established between the vehicle 2702, the secondary cells 2704 and 2706, and the anchor cell 2708. At 2718, measurement configuration may take place based on, e.g., communications from the anchor cell 2708. At 2720, one or more measurement reports may be communicated from the vehicle 2702, the secondary cell 2704, or the secondary cell 2706 to the anchor cell 2708. Such measurement reports may include, for example, the vehicle locations, primary or secondary link channel quality information, one or more measurements on secondary nodes or cells, utility parameters, expected vehicle trajectory information, and so forth. At 2722, one or more optional measurement reports may be communicated to the anchor cell 2708 via one or more backhaul links (e.g., 2614, 2616, and 2620). The optional measurement reports may include various vehicle generated measurements, multi-radio backhaul link quality, communication node load measurements, and so forth.

In some aspects, anchor-to-RSU connections may be established between the secondary cell 2704 or the secondary cell 2706 with the anchor cell 2708 based on expected trajectory of the vehicle 2702. At 2726, the radio links within the V2X communication environment 2600 may be reconfigured by adding one or more new communication nodes based on the connection establishments at 2724.

In some aspects, a radio resource management phase 2712 may be performed at 2712. More specifically, at 2728, the vehicle 2702 may establish a connection with the secondary cell 2704 or the secondary cell 2706 based on, e.g., timing associated with current or estimated vehicle trajectory. At 2730, channel quality measurements across multiple cells, trajectory adjustments, or utility parameter adjustments may be communicated from the vehicle 2702, secondary cell 2704, and or secondary cell 2706 to the anchor cell 2708 for purposes of radio resource management. In this regard, utility-based measurements, location information, and trajectory based measurements are used for radio resource management and to enable predictive multi-radio, multi-link connectivity for vehicles within the V2X communication environment 2600.

In some aspects, a visual map data transmission 2714 may occur within the V2X communication environment 2600. For example, at 2732, map data may be communicated from the anchor cell 2708 the vehicle 2702 based on, e.g., current vehicle location. The map data communicated by the anchor cell 2708 may include map data with base (low) resolution. As the vehicle 2702 drives near secondary cells 2706 and 2704 additional map data may be communicated by the secondary cells. For example, at 2734, map data may be communicated from the secondary cell 2706 to the vehicle 2702. Such map data may be characterized by the same resolution as the map data received from the anchor cell 2708 or may be a high-resolution map data. At 2736, map data may be communicated from the secondary cell 2704 to the vehicle 2702. Such map data may be characterized by the same resolution as the map data received from the anchor cell 2708 may be a high-resolution map data. In some aspects, the map data received from the secondary cells 2704 and 2706 may be redundant with the map data received from the anchor cell 2708. In some aspects, the map data received from the secondary cells 2704 and 2706 may be cumulative (e.g., different from a combined map may be assembled at the vehicle 2702 using the map data received from the secondary cells 2704 and 2706 as well as the anchor cell 2708.

Figure 28:
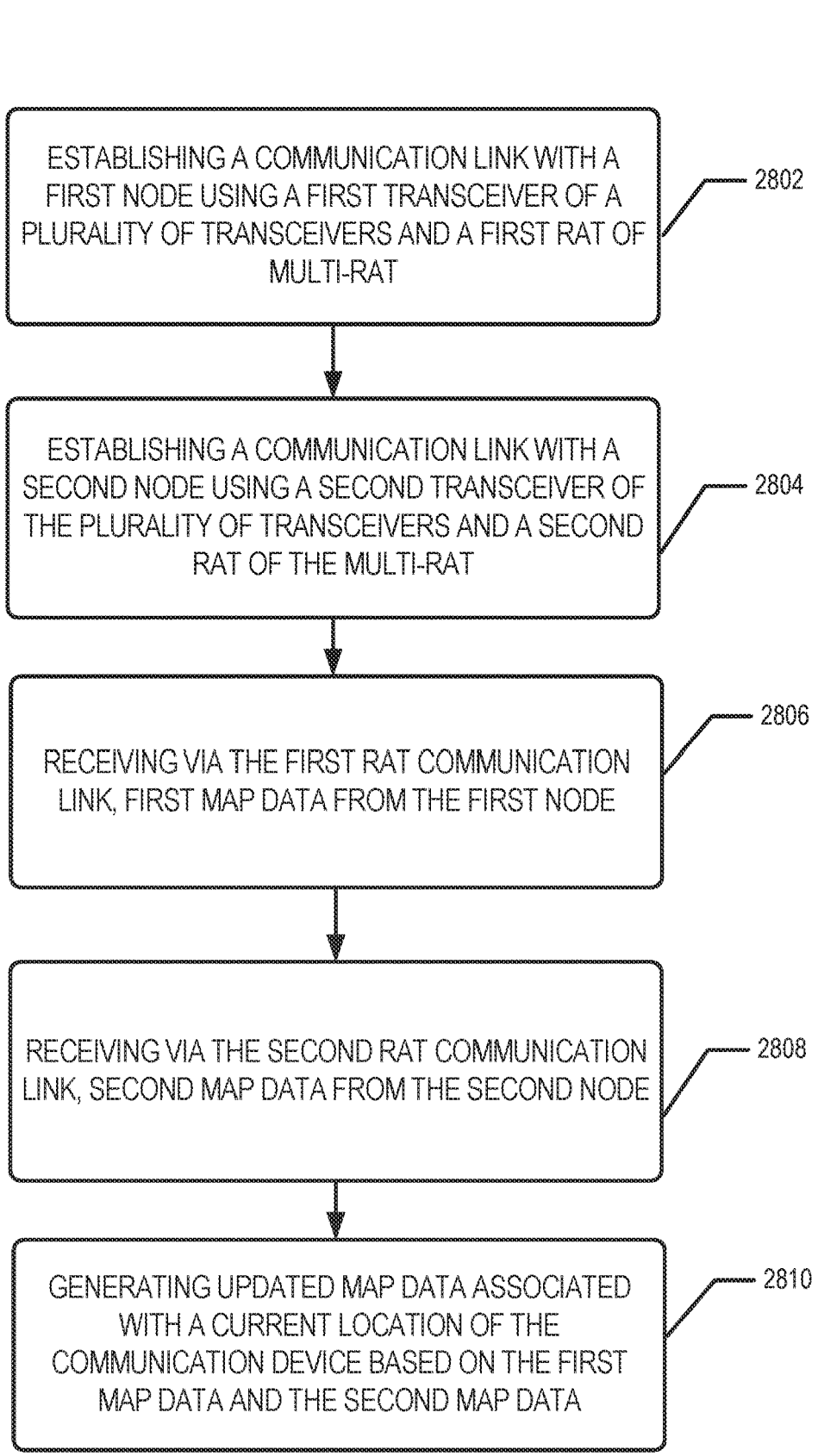
FIG. 28 illustrates an exemplary method for communication within the V2X environment of FIG. 26 according to some aspects described herein.

FIG. 28 illustrates an exemplary method 2800 for communication within the V2X environment of FIG. 26 according to some aspects described herein. In the context of the present disclosure, method 2800 may be performed by a hardware processor. However, method 2800 may be performed by other hardware or software components such as processing circuitry, microprocessors, central processing units (CPUs), etc.

Referring to FIG. 28, the example method 2800 may start at operation 2802, when a communication link is established with a first node using a first transceiver of a plurality of transceivers and a first RAT of multi-RAT. For example, vehicle 2612 may establish a primary communication link 2618 with the anchor node 2602 which may be used for receiving map data. At operation 2804, a communication link may be established with a second node using a second transceiver of the plurality of transceivers and a second RAT of the multi-RAT. For example, the vehicle 2612 may established a second communication link 2626 with the RSU 2608. At operation 2806, first map data may be received via the first RAT communication link from the first node. For example, first map data may be received at the vehicle 2612 from the anchor node 2602 via the primary link 2618. At operation 2808, second map data may be received via the second RAT communication link from the second node. For example, the vehicle 2612 may receive second map data from the RSU 2608 via the communication link 2626. At operation 2810, map data associated with a current location of the communication device may be generated based on the first and second map data. For example, the vehicle 2612 may assemble an updated map based on the map data received from the anchor node 2602 and the RSU 2608.

Figure 29:
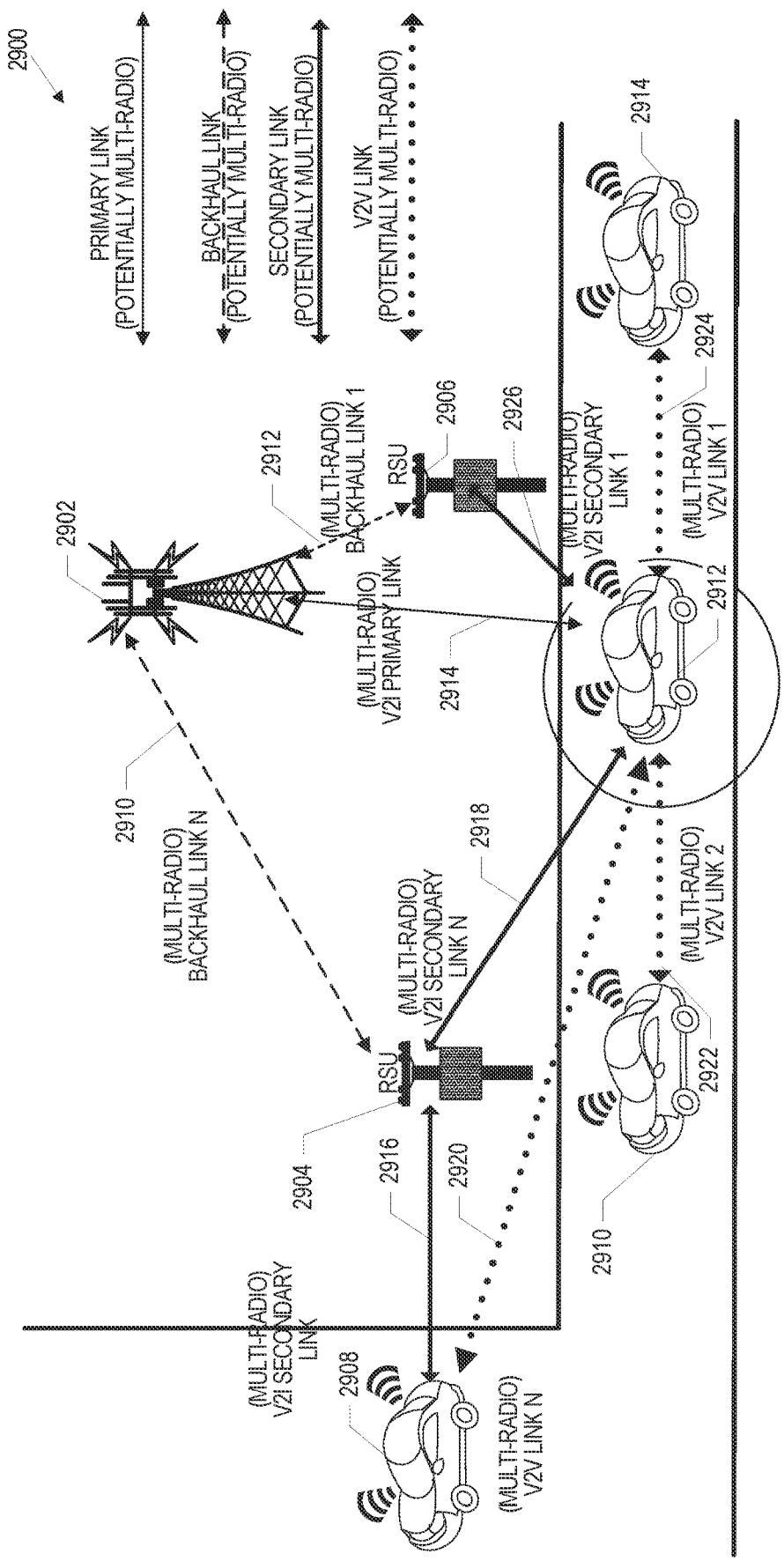
FIG. 29 illustrates an exemplary V2X communication environment with multi-link connectivity based on V2N/V2I assisted V2V communications according to some aspects described herein.

FIG. 29 illustrates an exemplary V2X communication environment with multi-link connectivity based on V2N/V2I assisted V2V communications according to some aspects described herein. Referring to FIG. 29, the V2X communication environment 2900 includes a primary node 2902 (e.g., base station or another base station), RSU 2904, RSU 2906, and vehicles 2908-2914. The vehicle 2912 may be connected with the primary node 2902 via a primary communication link 2914. The RSUs 2904 and 2906 may be connected with the primary node 2902 via communication links 2910 and 2912, respectively. In some aspects, the communication links 2910 and 2912 may be used as backhaul communication links. In some aspects, one or more of the vehicles 2908-2914 and one or more of the RSUs 2904 and 2906 may be communicatively coupled via secondary communication links. For example, RSU 2904 is communicatively coupled with vehicles 2908 and 2912 via secondary communication links 2916 and 2918 respectively. RSU 2906 is communicatively coupled to the vehicle 2912 via a secondary communication link 2926. V2V connections may also exist between one or more of the vehicles 2908-2914. For example, vehicles 2908 and 2912 are coupled via a V2V link 2920, vehicle 2910 and 2912 are coupled via a V2V link 2922, and the vehicle 2912 is coupled to the vehicle 2914 via a V2V link 2924.

In some aspects, any of the communication links 2910-2924 may be multi-link connections (e.g., using multiple communication links via a single transceiver chain) or multi-radio links (e.g., using communication links via multiple transceiver chains where each transceiver chain may operate in accordance with one or more RATs of multi-RAT).

In some aspects, standards covering network assisted device-to-device (D2D) communications, such LTE-Direct/Prose, may be applicable to managed V2V connections within the V2X communication environment 2900. Additionally, there may be numerous extensions of such standards, for example those that extend existing frameworks to use different RATs on the V2I and the V2V links. For example, the V2I links (e.g., 2916, 2918, 2914, and 2926) may be based on LTE, NR, WLAN RATs, while the V2V connectivity (e.g, communication links 2920-2924) may be based on WiFi-Direct, Wi-Fi Aware, LTE-Direct, or "NR-Things" connectivity framework. Furthermore, a V2V link may be combined with one or more V2I links that are established via carrier aggregation (CA) or direct connect (DC) frameworks (e.g., LTE CA or LTE DC frameworks).

In some aspects within the V2X communication environment 2900, the role of the V2I links may be to provide a control plane to manage the V2V connectivity, such as V2V discovery, V2V resource allocation, V2V synchronization, and so forth. In such frameworks, a centralized mechanism may be used to add and manage a V2V link as an additional carrier, similar to LTE-based frameworks. In some aspects, such frameworks may be extended to accommodate other V2V radios (DSRC, Bluetooth, and so forth). In some aspects, LTE or cellular radio may not be the "primary" control anchor (e.g., 2902) for managing V2V connections, wherein WLAN/DSRC extensions may be utilized as control anchor to manage the V2V links. In an aspect, the notion of a common convergence function (e.g., as described in reference to FIG. 40-FIG. 53) may be used to enable this coordination.

In setting up V2V cooperation, the infrastructure node (e.g., 2602) may be configured to provide assistance for, e.g., "neighbor discovery," coordination of radio resources for V2V connection setup, through advertising of communication-enabling information (e.g, bandwidth availability and pricing) to encourage different vehicles to cooperate with each other, suggestion for enabling connections with vehicles that may provide safety critical information or advanced warning (for example connect vehicles not directly in line of sight, via relay nodes such as RSUs), and so forth. Alternately, the infrastructure nodes may manage the V2V cooperation more tightly, and may be configured to dynamically schedule the V2V connectivity and cooperation, for example via an algorithmic and radio resource management (RRM) framework described later (e.g., in reference to FIG. 39).

In some aspects, devices within the V2X communication environment 2900 may also combine V2V connectivity with V2I connectivity to improve link diversity and reliability. Such devices may be configured to combine V2V and V2I links to obtain higher data rates, or may be configured to use different links for different types of traffic for improved QoS. In some aspects, two vehicles may be configured to connect with each other via one or more direct V2V links as well as via an additional hop through an RSU to increase link diversity. Such vehicles may be configured to transmit data redundantly, on both links (e.g., as discussed in reference to FIG. 17-FIG. 25), to imp rove reliability should any one link be blocked (the V2X and V2I links may not necessarily use the same radios).

Alternately, the infrastructure links may be maintained in "stand-by" mode and used opportunistically, should the V2V link deteriorate. The V2V link may deteriorate due to vehicles moving out of range, or due to interference and congestion (for example, congestion on unlicensed bands), while the V2I routed link may still be available. In some aspects, V2V connectivity management may be handled by a general algorithmic framework and through network/infrastructure assistance, so that V2I and V2V links may be selected (often in combination) to improve link or system performance according to different metrics.

In some aspects, network assisted, predictive set up of multi-link connectivity within the V2X communication environment 2900 may include V2I or V2V links based on channel quality, vehicle trajectory, vehicle location information, and so forth to increase V2X communication efficiency within the environment 2900. For example, V2V link between vehicles 2912 and 2908 may be established through V2I assistance based on device neighborhood map information. Additionally, redundant links may be used to improve reliability of connections to a non-line of sight communication link.

Figure 30:
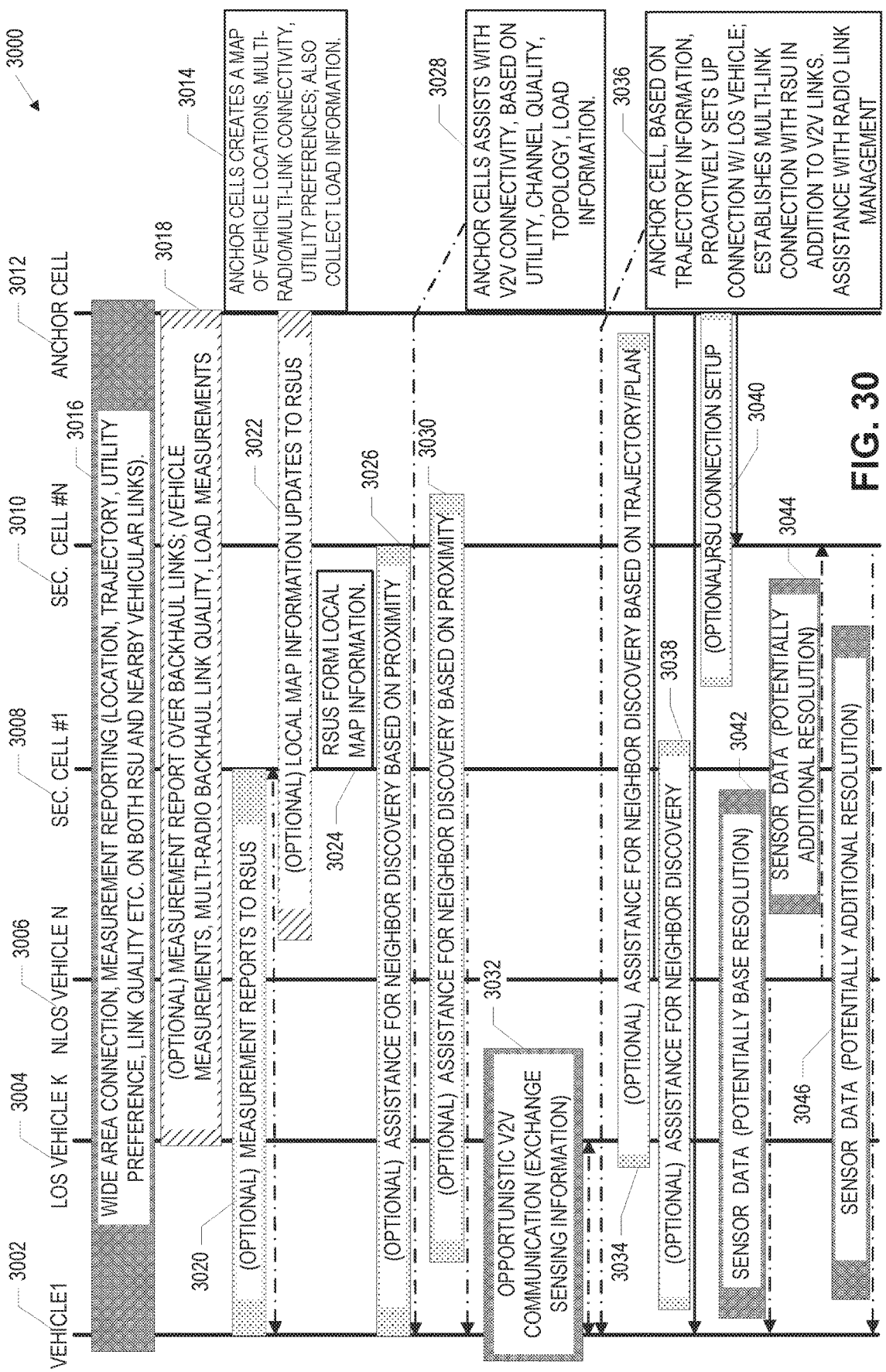
FIG. 30 illustrates an exemplary communication flow within the V2X communication environment of FIG. 29 according to some aspects described herein.

FIG. 30 illustrates an exemplary communication flow within the V2X communication environment of FIG. 29 according to some aspects described herein. Referring to FIG. 30, the example communication flow 3000 may occur between a first vehicle 3002, a line of sight (LOS) vehicle 3004, a non-line of sight (NLOS) vehicle 3006, a secondary cell 3008, a secondary cell 3010, and an anchor cell 3012. The vehicles 3002-3006 may be any of the vehicles 2908-2914 in FIG. 29. The secondary cells 3008 and 3010 may be any of RSUs 2904 and 2906, and the anchor cell 3012 may be the primary node 2902.

At 3016, wide-area communication links may be established between the vehicles 3002-3006, the secondary cells 3008-3010, and the anchor cell 3012. Additionally, at 3016, measurement reporting may take place between the V2X enabled devices 3002-3012. For example, measurement reporting may include location information, trajectory information, link utility preferences, communication link quality measurements, and so forth associated with communication links between one or more of the V2X enabled devices 3002-3012. At 3018, the measurement reporting may optionally occur over one or more of the backhaul communication links 2910 and 2912. For example, measurement reporting that may be provided via the backhaul communication links may include one or more measurements associated with any of the vehicles 2908-2914 multi-radio backhaul link quality, communication load measurements, and so forth. At 3020, one or more measurement reports may be optionally communicated from the vehicle 3002 or the vehicles 3004 and 3006 to the secondary cell 3008 (e.g, RSU 2904 or 2906).

At 3014, the anchor cell 3012 may create a map of vehicle locations based on the received measurement rep ort information as well as collect multi-radio, multi-link connectivity information such as utility preferences, communication load information, and so forth associated with one or more of the V2X enabled devices 3002-3010 within the V2X communication environments 2900. At 3022, the anchor cell 3012 may optionally provide local map information updates to one or more of the secondary cells 3008 and 3010. At 3024, secondary cell 3008 or 3010 may form local map information based on the map information updates received from the anchor cell 3012. At 3026, anchor cell 3012 may provide assistance to one or more of the V2X enabled devices 3002-3010 for neighbor device discovery based on proximity. At 3028, the anchor cell 3012 may assist one or more of the V2X enabled devices 3002-3006 with the V2V connectivity based on utility, channel quality, networked apology, communication link load information, and so forth. At 3030, secondary cell 3008 or 3010 may optionally provide assistance to the vehicle 3002 four neighbor device discovery based on proximity information. M ore specifically, the secondary cell may inform the vehicle 3002 of nearby V2X enabled devices based on a current location of the vehicle 3002. At 3032, opportunistic V2V communication may take place between the vehicle 3002 and the vehicle 3004 or 3006. The V2V communication exchange may include sensing information obtained from one or more of the sensors within the vehicle 3002.

At 3036, the anchor cell 3012 may proactively set up connection with the LOS vehicle 3004 based on trajectory information of the vehicle 3002. The anchor cell 3012 may also establish connection with one or more of the secondary cells 3008-3010 and may also provide radio link management assistance to one or more of the V2X enabled devices 3002-3010. At 3034, the anchor cell 3012 may provide assistance to the vehicle 3002 four neighbor device discovery based on moving trajectory of the vehicle 3002 or V2X communication plan associated with vehicle 3002. At 3038, one or more of the secondary cells 3008-3010 or vehicles 3004-3006 may provide neighbor device discovery information to the vehicle 3002. At 3040, the anchor cell 3012 may optionally provide connection setup information to secondary cell 3010 for purposes of establishing connection with any of the V2X enabled devices 3002-3008. At 3042, NLOS vehicle 3006 may communicate sensor data to the vehicle 3002 via communication link with the LOS vehicle 3004 and or a communication link to one or more of the secondary cells 3008-3010 that are in communication with the vehicle 3002. At 3044, vehicle 3006 may communicate the sensor data to one or more of the secondary cells 3008-3010 as well as the anchor cell 3012. At 3046, the secondary cell 3010 which has received the sensor data from the vehicle 3006, may communicate the sensor data to the vehicle 3002 via a separate communication link.

Figure 31:
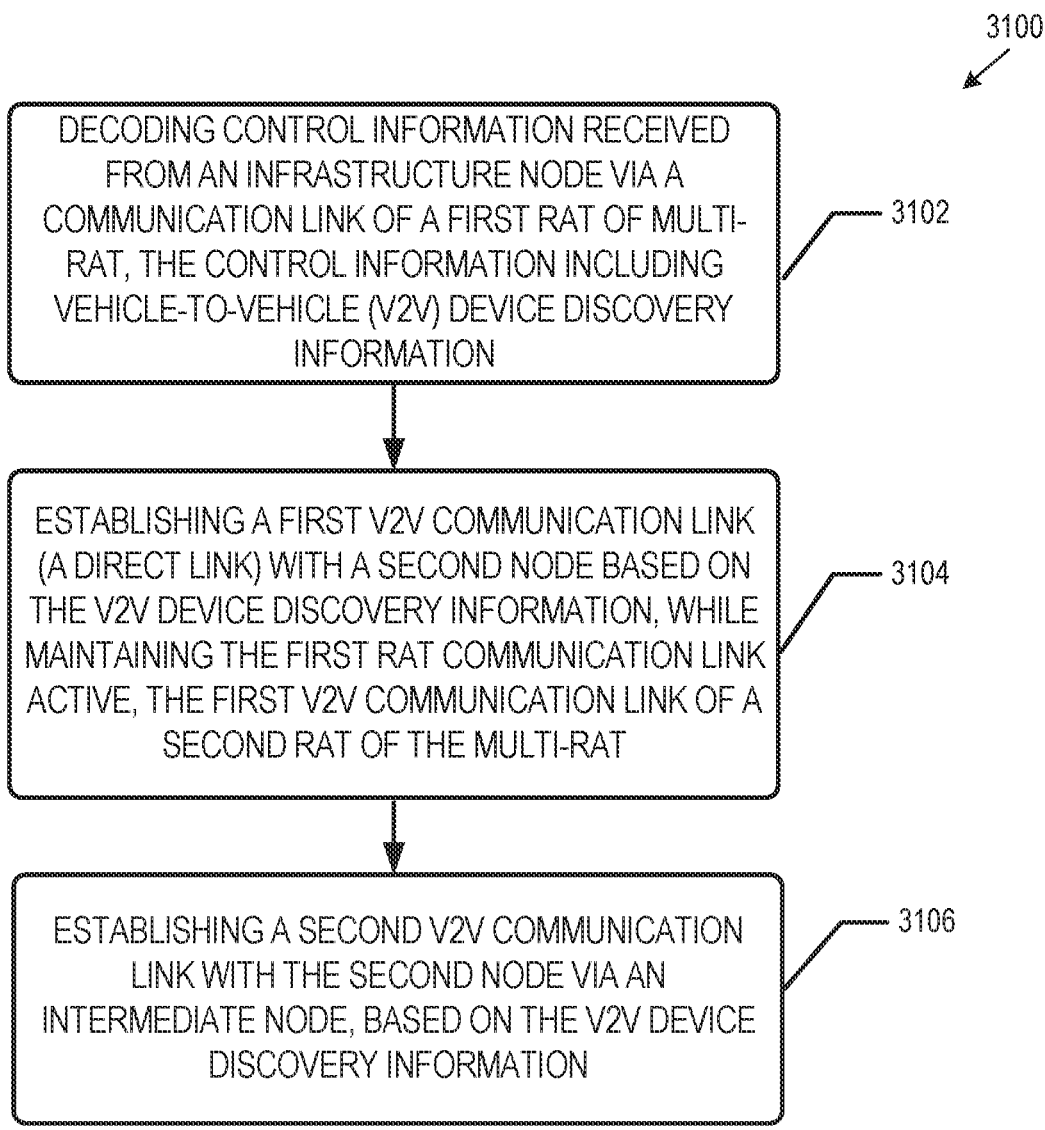
FIG. 31 illustrates an exemplary method for communication within the V2X environment of FIG. 29 according to some aspects described herein.

FIG. 31 illustrates an exemplary method 3100 for communication within the V2X environment of FIG. 29 according to some aspects described herein. In the context of the present disclosure, method 3100 may be performed by a hardware processor. However, method 3100 may be performed by other hardware or software components such as processing circuitry, microprocessors, central processing units (CPUs), etc.

Referring to FIG. 31, the example method 3100 may start at 3102, when control information received from an infrastructure node via a communication link of a first RAT of multi-RAT is decoded. The control information may include V2V device discovery information. For example, vehicle 2912 may receive device discovery information from the primary anchor node 2902 via the V2I primary communication link 2914. The device discovery information may include, for example, information associated with a second vehicle 2908. At 3104, a first V2V communication link may be established with a second node based on the V2V device discovery information. The first V2V communication link may be established while maintaining the first RAT communication link active, and the first V2V communication link may use a second RAT of the multi-RAT. For example, the first V2V communication link may be a direct V2V communication link 2920 between vehicles 2908 and 2912. At 3106, a second V2V communication link may be established with the second node via an intermediate node based on the V2V device discovery information. For example, the vehicle 2912 may also establish a second V2V communication link with vehicle 2908 via RSU 2904 (e.g., via communication links 2916 and 2918).

Figure 32:
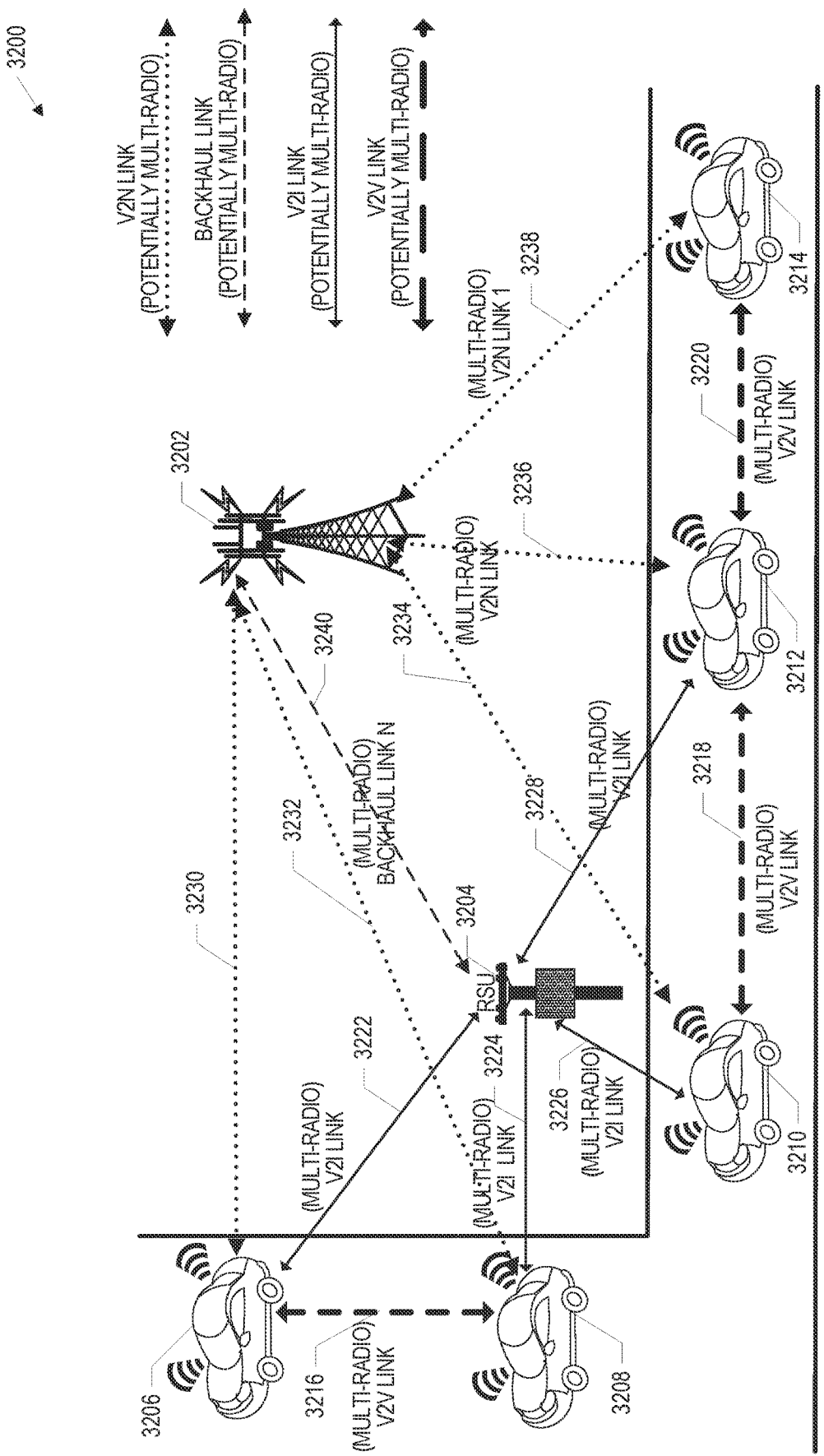
FIG. 32 illustrates an exemplar V2X communication environment with multi-link connectivity based on V2V assisted V2I/V2N link according to some aspects described herein.

FIG. 32 illustrates an exemplary V2X communication environment with multi-link connectivity based on V2V assisted V2I/V2N link according to some aspects described herein. Referring to FIG. 32, the V2X communication environment 3200 includes a primary node 3202 (e.g., a base station or another base station), RSU 3204, and vehicles 3206-3214. The vehicles 3206-3214 may be connected with the primary node 3202 via V2N links 3230, 3232, 3234, 3236, and 3238 respectively. The RSU 3204 may be coupled with the primary node 3202 via a backhaul link 3240. Additionally, the RSU 3204 may be coupled to vehicles 3206, 3208, 3210, and 3212 via V2I links 3222, 3224, 3226, and 3228 respectively. Vehicles 3206 and 3208 may be coupled via a V2V link 3216. Vehicles 3210 and 3212 may be coupled via a V2V link 3218, and vehicles 3212 and 3214 may be coupled via a V2V link 3220.

In some aspects, any of the communication links 3206-3240 may be multi-link connections (e.g., using multiple communication links via a single transceiver chain) or multi-radio links (e.g., using communication links via multiple transceiver chains where each transceiver chain may operate in accordance with one or more RATs of multi-RAT).

In some aspects, the V2X communication environment 3200 may include a V2X enabled devices that may be configured for cooperative communications, to improve the quality of the V2I links through V2V coordination (potentially over multiple links). In some aspects, the vehicles involved in V2V cooperation may be configured to share TX/RX data intended for the V2I links, on the V2V link, as well. This sharing of information allows for improved link diversity, reduced interference through interference cancellation, and so forth. In some aspects, the infrastructure nodes (e.g., 3202 and 3204) may be configured to broadcast (or unicast) map information to vehicles within the coverage area based on locality of the map information. The vehicles may then further share the map information with other vehicles not in direct coverage of the infrastructure node. Alternately, V2I transmissions may interfere with each other when the transmitting RSUs are in close proximity. In instances when proximal nodes listening to different RSUs share the received data with their interfered neighboring device, the cooperative nodes may use this data to cancel the interference from the desired signal.

In some aspects, a macrocell associated with the primary node 3202 may split map data between two or more vehicles, such as 3212 and 3214. Subsequently, the vehicles may cooperate to complete overall map information (e.g., map aggregation using V2V links).

In some aspects, an RSU 3204 may broadcast map data to a plurality of vehicles such as 3208-3212. The vehicles may then cooperate between each other via V2V links to share the map data to create redundancy and improve reliability of V2I links.

In some aspects, the vehicle 3206 may report sensing information to RSU 3204 via the V2I link 3222, and then may also cooperate with the nearby vehicle 3208 that is closer to the RSU 3204, to send the same information redundantly via V2V link 3216 combined with V2I link 3224.

Figure 33:
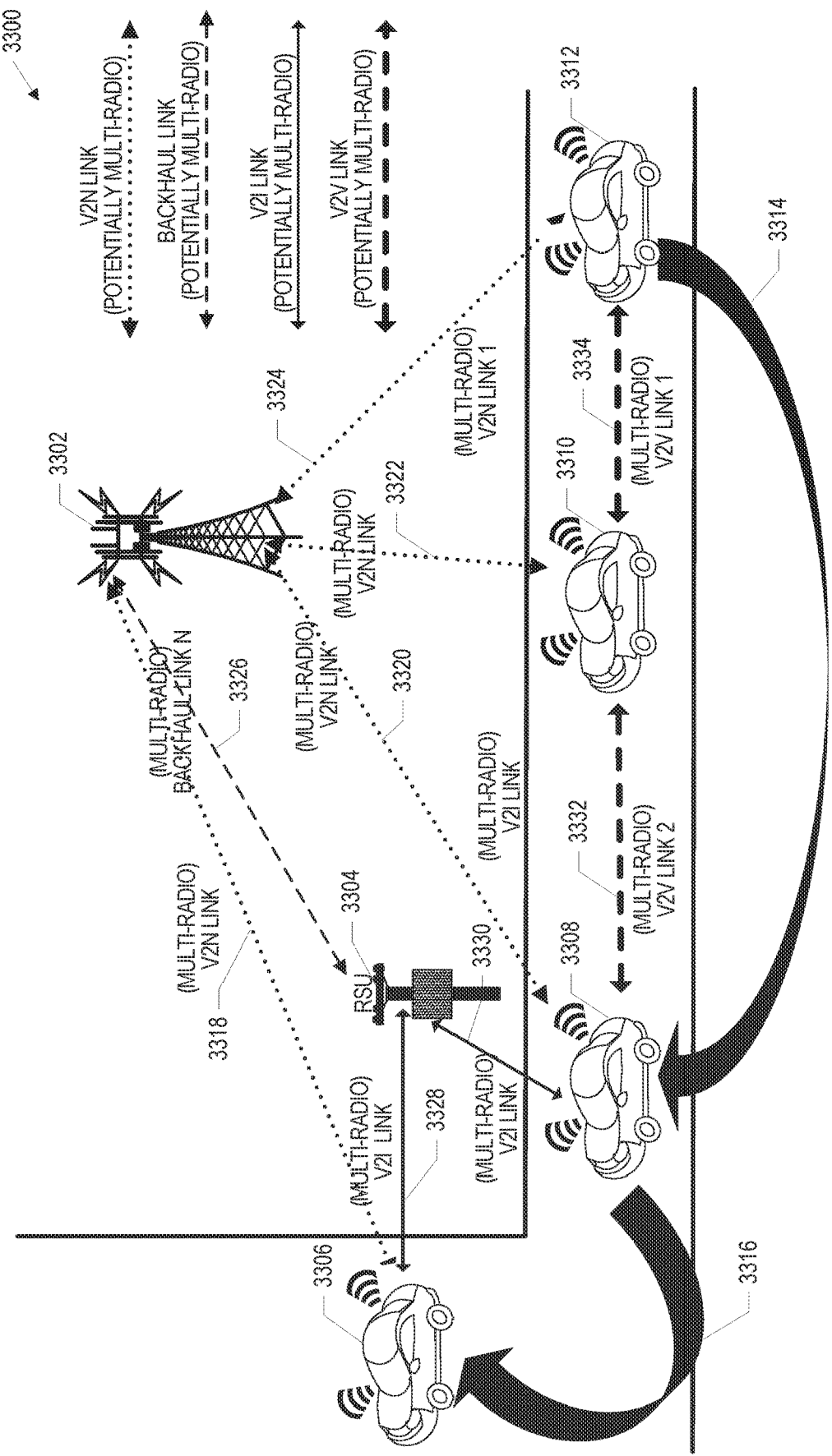
FIG. 33 illustrates an exemplary V2X communication environment with multi-radio, multi-hop V2X links using V2I/V2N and V2V communication links according to some aspects described herein.

FIG. 33 illustrates an exemplary V2X communication environment with multi-radio, multi-hop V2X links using V2I/V2N and V2V communication links according to some aspects described herein. Referring to FIG. 33, the V2X communication environment 3300 includes a primary node 3302 (e.g, an evolved Node-B or another type of base station), RSU 3304, and vehicles 3306-3312. The vehicles 3306-3312 may be connected with the primary node 3302 via V2N links 3318, 3320, 3322, and 3324 respectively. The RSU 3304 may be coupled with the primary node 3302 via a backhaul link 3326. Additionally, the RSU 3304 may be coupled to vehicles 3306 and 3308 via V2I links 3328 and 3330 respectively. Vehicles 3308 and 3310 may be coupled via a V2V link 3332, and vehicles 3310 and 3312 may be coupled via a V2V link 3334.

In some aspects, any of the communication links 3318-3334 may be multi-link connections (e.g., using multiple communication links via a single transceiver chain) or multi-radio links (e.g., using communication links via multiple transceiver chains where each transceiver chain may operate in accordance with one or more RATs of multi-RAT).

In some aspects, the V2I and V2V links within the V2X communication environment 3300 may operate over different bands or radios, and may be combined together to establish a multi-hop link between infrastructure nodes (base station 3302 and RSU 3304) and endpoint vehicles (e.g., 3306-3312) for improved coverage of a given link. In some aspects, a device with multi-radio, multi-link capabilities within the V2X communication environment 3300 may be configured to use several multi-hop links to improve link diversity, as well data rates. In some aspects, two vehicles aiming to establish a direct V2V link at the application layer to exchange non-proximal information (such as a "look-ahead" of road conditions in a different local area or around a corner) may connect via an infrastructure link to reach each other vehicles or nodes, or may use intermediate vehicles as relays (e.g., possibly over different types of radio links to connect with each other). Similarly, vehicles may reach neighboring vehicles through intermediate nodes and use more than one radio link to improve diversity.

In some aspects, a communication link 3314 may be established between vehicle 3312 and vehicle 3308 through cooperation with the vehicle 3310. In this regard, the V2V link 3314 between vehicles 3312 and 3308 may include multi-hop V2V links 3332 and 3334. The cooperation between the vehicles 3308-3312 may be carried out through network assistance.

In an example, vehicles 3306 and 3308 may be non-line of sight vehicles to each other. A communication link 3316 may be established between vehicle 3308 and vehicle 3306 so that vehicle 3308 may receive information that is accessible to vehicle 3306 but not accessible to vehicle 3308. A V2V communication link 3316 may be established by using the RSU 3304 as an intermediary node and using V2I communication links 3330 and 3328.

In an example, V2V connectivity and scheduling within the V2X communication environment 3300 may be completed under network control as described in, e.g., FIG. 29-FIG. 31.

Figure 34:
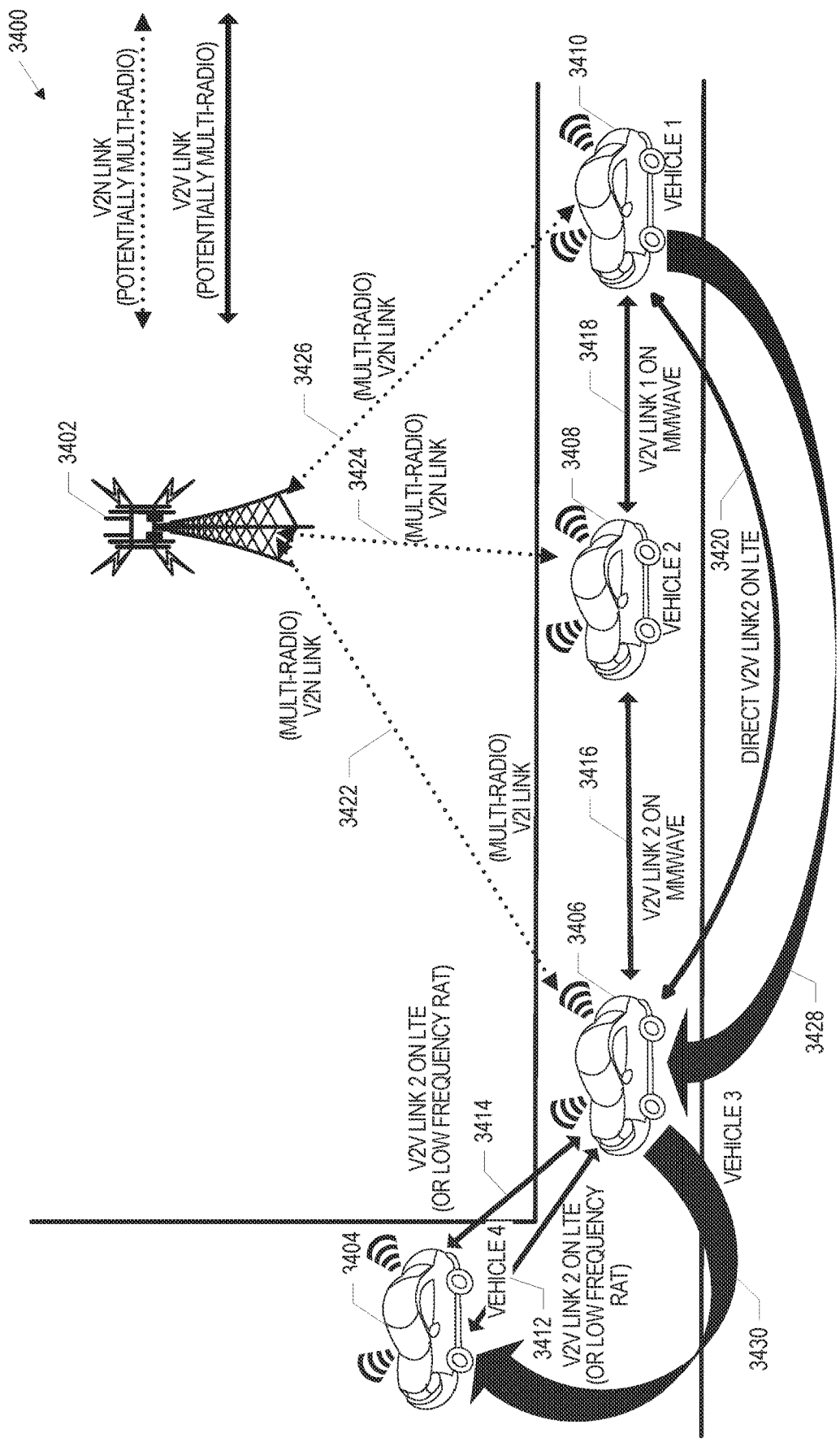
FIG. 34 illustrates an exemplary V2X communication environment with multi-radio, multi-link V2V communications according to some aspects described herein.

FIG. 34 illustrates an exemplary V2X communication environment with multi-radio, multi-link V2V communications according to some aspects described herein. Referring to FIG. 34, the V2X communication environment 3400 includes a primary node 3402 (e.g., a evolved Node-B or another type of base station) and vehicles 3404-3410. The vehicles 3406-3410 may be connected with the primary node 3402 via V2I communication links 3422, 3424, and 3426 respectively. Vehicles 3404 and 3406 may be coupled via V2V links 3412 and 3414. Vehicles 3406 and 3408 may be coupled via a V2V link 3416, and vehicles 3408 and 3410 may be coupled via a V2V link 3418. Vehicles 3406 and 3410 may also be coupled via a direct V2V communication link 3420.

In some aspects, any of the communication links 3412-3426 may be multi-link connections (e.g., using multiple communication links via a single transceiver chain) or multi-radio links (e.g., using communication links via multiple transceiver chains where each transceiver chain may operate in accordance with one or more RATs of multi-RAT).

In some aspects one or more multi-radio, multi-band capable devices (e.g, vehicles 3404-3410) may be configured to form a V2V connections over several links to improve reliability, data rates, latency, and so forth.

In some aspects, vehicle 3410 and vehicle 3406 may share sensing information through V2V connection 3428. V2V connection 3428 may be based on a direct V2V communication link 3420, which may be and LTE-based communication link or a low frequency NR communication link. V2V communication link 3428 may also be based on a multi-hop link through cooperation with the vehicle 3408 and V2V communication links 3416 and 3418. In some instances, base level sensed information may be communicated via the LTE direct V2V link 3420, an additional resolution data may be shared between vehicles 3406 and 3410 via V2V links 3416 and 3418.

In some aspects, vehicle 3406 may establish a connection 3430 with vehicle 3404 in order to access information that is available to vehicle 3404 but not available to vehicle 3406. Since there is no RSU available in the vicinity of vehicles 3404 and 3406 (e.g., V2I communication links are not available), vehicles 3404 and 3406 may connect using LTE-based or low-frequency based RAT links 3412 and 3414. In some instances, low resolution data may be shared on an LTE link and high-resolution data may be shared on a millimeter wave high-bandwidth link.

In an example, V2V connectivity and scheduling within the V2X communication environment 3400 may be completed under network control as described in, e.g., FIG. 29-FIG. 31.

Figure 35:
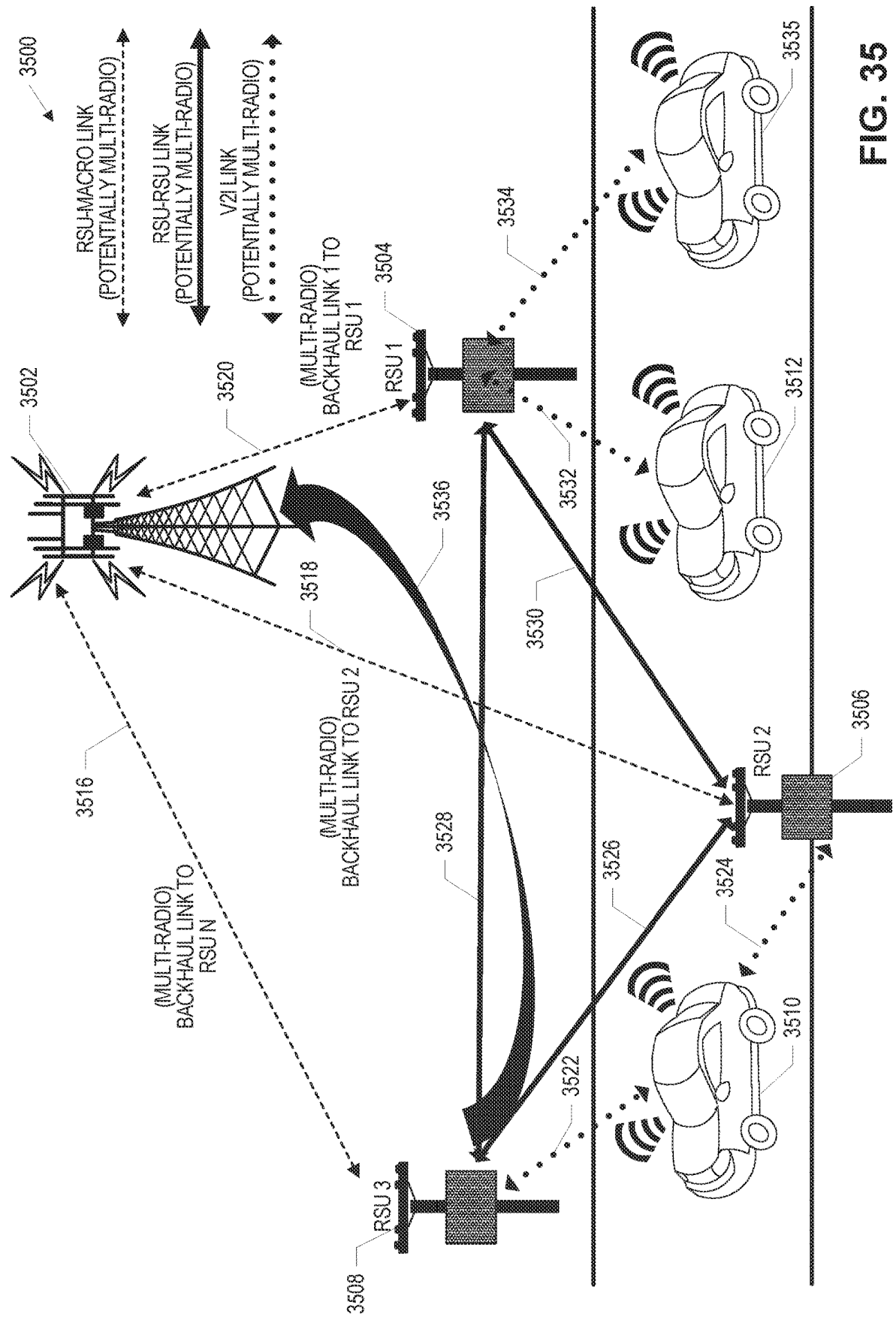
FIG. 35 illustrates an exemplary V2X communication environment with multi-radio, multi-link mesh backhaul according to some aspects described herein.

FIG. 35 illustrates an exemplary V2X communication environment with multi-radio, multi-link mesh backhaul according to some aspects described herein. Referring to FIG. 35, the V2X communication environment 3500 includes a primary node 3502 (e.g, an evolved NodeB or another type of base station), RSUs 3504-3508, and vehicles 3510-3514. The RSUs 3504-3508 may be connected with the primary node 3502 via backhaul communication links 3520, 3518, and 3516 respectively. RSUs 3504-3508 may be coupled to each other via RSU to RSU communication links 3526, 3528, and 3530. Vehicle 3510 may be connected with RSUs 3508 and 3506 using V2I communication links 3522 and 3524 respectively. Vehicles 3512 and 3514 may be coupled to RSU 3504 via V2I communication links 3532 and 3534 respectively.

In some aspects, any of the communication links 3516-3534 may be multi-link connections (e.g., using multiple communication links via a single transceiver chain) or multi-radio links (e.g., using communication links via multiple transceiver chains where each transceiver chain may operate in accordance with one or more RAT s of multi-RAT).

In some aspects one or more multi-radio, multi-band capable devices (e.g., vehicles 3510-3514 and RSUs 3504-3508) may be configured to form connections over several links to improve reliability, data rates, latency, and so forth. In this regard, multi-link connectivity concepts discussed herein may also be extended and apply to backhaul/fronthaul connecting RSUs, anchor cell to RSUs communications as well as vehicle to RSU or anchor cell communications.

In some aspects, RSU 3508 may report sensing information received from vehicle 3510 to the primary node 3502 via backhaul communication link 3516. To improve communication reliability within the V2X environment 3500, RSU 3508 may also send the same sensing information redundantly to node 3502 via communication path 3536, using RSU-to-RSU medication link 3528 and backhaul communication link 3520.

In some aspects, sensing information received by any of the RSUs 3504-3508 from any of the vehicles 3510-3514 may be shared between the RSUs using one or more of the communication links 3526-3530.

In some aspects, the primary node 3502 may communicate map information to RSUs 3504 and 3506 via communication links 3520 and 3518 respectively. RSUs 3504 and 3506 may redundantly send the received information to each other via a communication link 3530 to improve data communication reliability. In some instances, potentially different resolution of map data may be transmitted to different RSUs or different map data altogether may be communicated to the different RSUs. The RSUs may then send information to each other to cooperate and collect complete map information or enhance existing map data.

Figure 36:
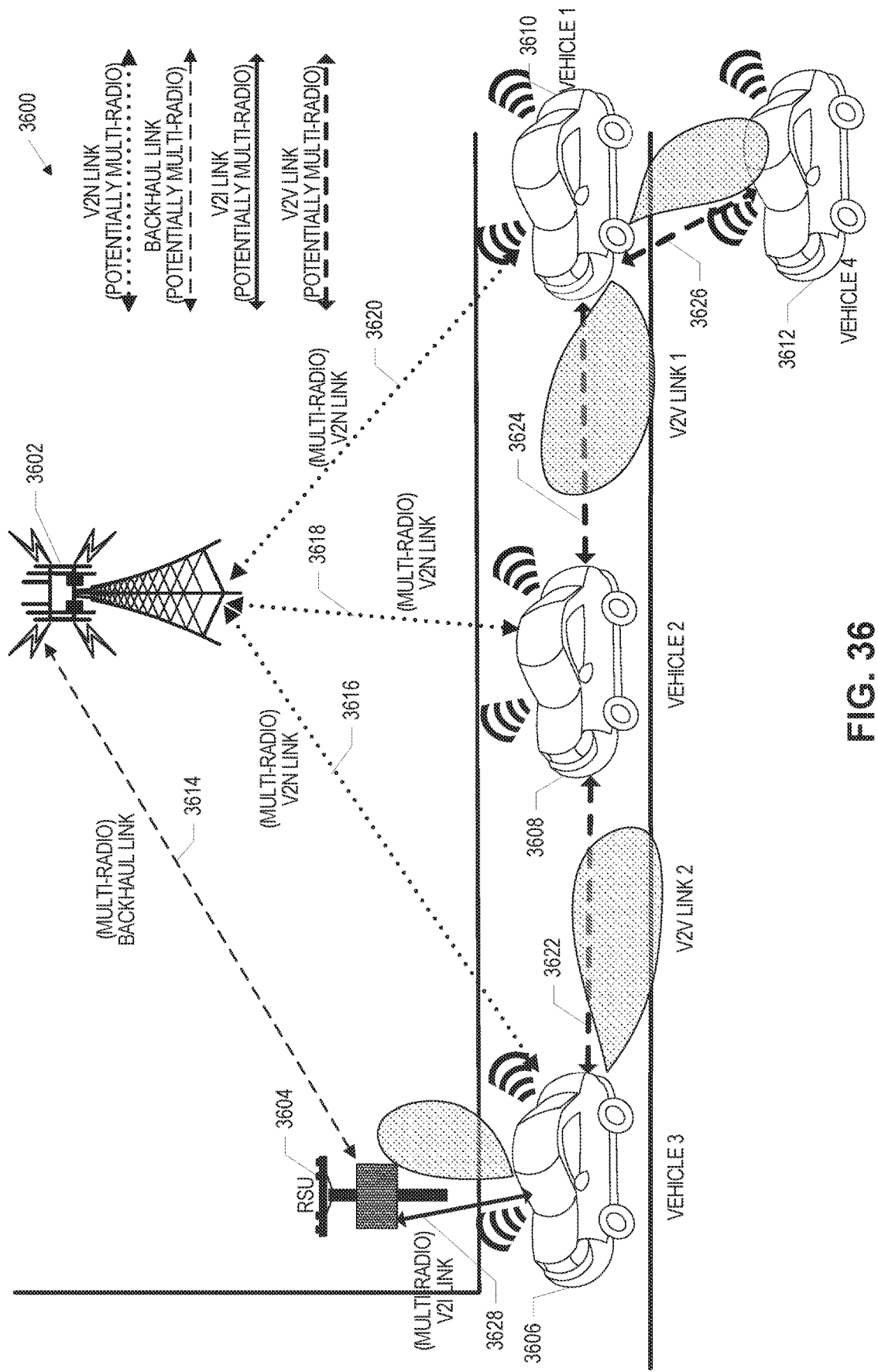
FIG. 36 illustrates an exemplary V2X communication environment with multi-link connectivity based on multiple-input-multiple-output (MIMO) medications according to some aspects described herein.

FIG. 36 illustrates an exemplary V2X communication environment with multi-link connectivity based on multiple-input-multiple-output (MIMO) medications according to some aspects described herein. Referring to FIG. 36, the V2X communication environment 3600 includes a primary node 3602 (e.g, an evolved Node-B or another type of base station), an RSU 3604, and vehicles 3606-3612. The RSU 3604 may be connected with the primary node 3602 via a backhaul communication link 3614. The RSU 3604 may be coupled to vehicle 3606 via a V2I communication link 3628. Vehicles 3606, 3608, and 3610 may be communicatively coupled with the primary node 3602 using V2N communication links 3616, 3618, and 3620 respectively. Additionally, vehicles 3606-3612 may be coupled to each other using V2V communication links 3622, 3624, and 3626, as illustrated in FIG. 36.

In some aspects, any of the communication links 3614-3628 may include multi-link connections (e.g., using multiple communication links via a single transceiver chain) or multi-radio links (e.g., using communication links via multiple transceiver chains where each transceiver chain may operate in accordance with one or more RATs of multi-RAT).

In some aspects, one or more of the communication device is within the V2X environment 3600 may include multiple antennas, which may be configured for MIMO communications. In instances when vehicles (e.g., 3606-3612) and infrastructure nodes (e.g., 3602-3604) within the V2X communication environment 3600 are equipped with multiple antennas, different antenna subsets may be used to establish multiple V2I and V2X connections, establishing multiple V2I/V2N and V2V communication links using different MIMO degrees of freedom. For example, vehicles 3606 and 3610 may use MIMO transmissions using multiple sets of antennas to establish separate communication links to multiple other vehicles (e.g, vehicle 3610 is communicatively coupled to vehicles 3608 and 3612 via two separate V2V links) or to a vehicle and one or more other communication nodes (e.g, vehicle 3606 is communicatively coupled to RSU 3604 and vehicle 3608 via separate communication links 3628 and 3622 respectively).

Furthermore, such system may be used to form multiple beams, each pointing to a different node in a system. Such connectivity may be useful in densely populated streets or intersections, where additional spatial degrees of freedom and the flexibility in assigning them to the V2I or V2V links may be useful (e.g., in dense communication scenarios, it may not be feasible to spatially isolate the different beams across the V2X networks sufficiently, and there may exist cross-beam interference). As mentioned, opportunistically utilizing V2V, V2I, or RSU-RSU cooperation (e.g., possibly over un-licensed bands) may help mitigate the crossbeam interference.

In some aspects, vehicle 3610 may transmit sensed information redundantly using M IMO configuration of its antenna array s, using separate communication links 3624 and 3626 using multiple beams formed through multi-antenna processing. Similarly, vehicle 3606 may transmit simultaneously to vehicle 3608 and RSU 3604 using multiple beams formed through multi-antenna processing.

Figure 37:
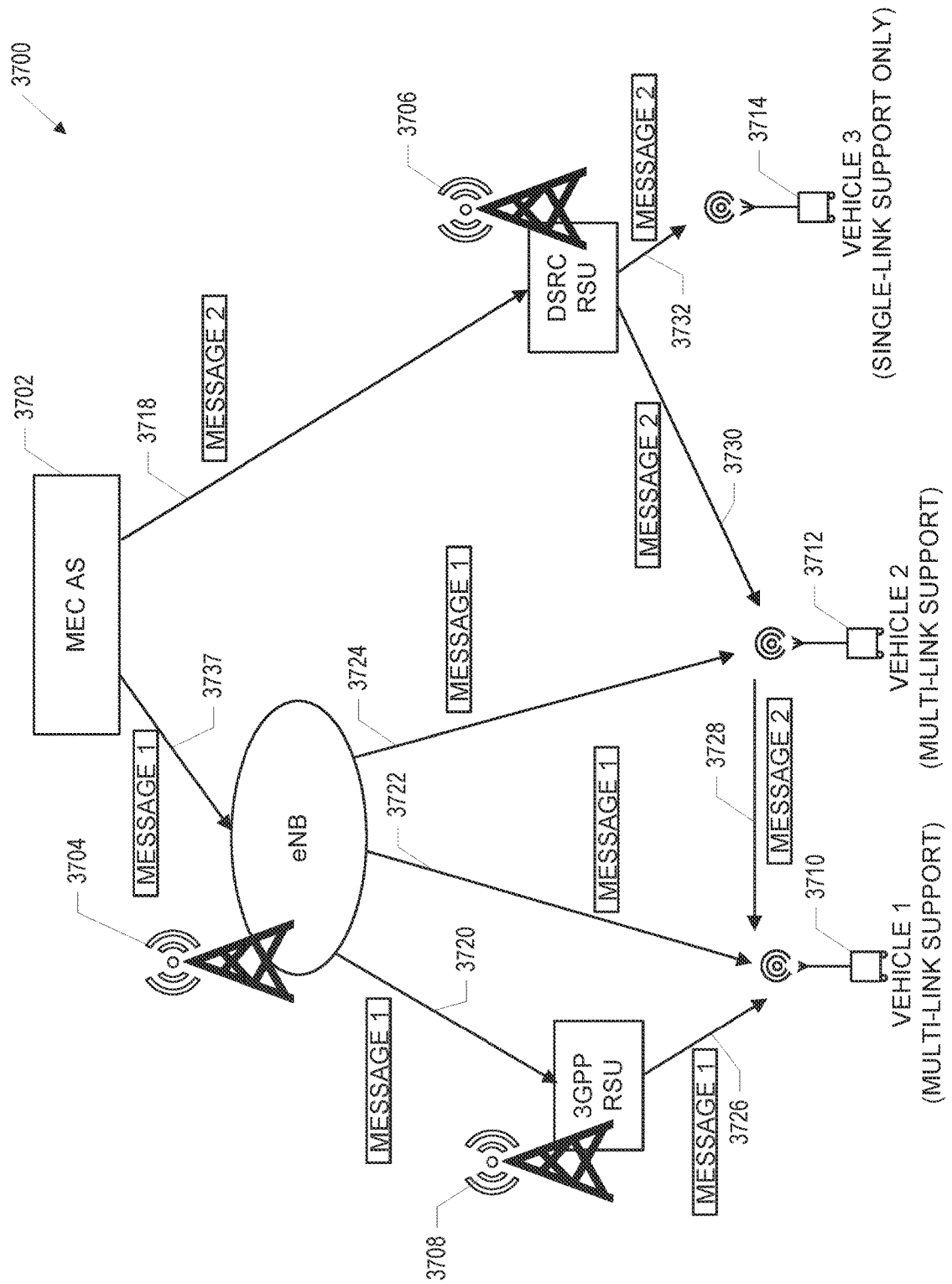
FIG. 37 illustrates an exemplary V2X communication environment with multi-link connectivity enabled via mobile edge compute (MEC) according to some aspects described herein.

FIG. 37 illustrates an exemplary V2X communication environment with multi-link connectivity enabled via mobile edge compute (MEC) according to some aspects described herein. Referring to FIG. 37, the V2X communication environment 3700 may include a MEC application server 3702, a primary node (e.g., base station) 3704, RSUs 3706 and 3708, and vehicles 3710-3714. In some aspects. RSUs 3708 may be a 3GPP enabled RSU, and RSU 3706 may be a DSRC enabled RSU. The MEC server 3702 may be communicatively coupled to the base station 3704 and the RSV 3706 via communication links 3716 and 3718 respectively. The base station 3704 may be communicatively coupled to the RSU 3708, vehicle 3710, and vehicle 3712 via communication links 3720, 3722, and 3724 respectively. The RSU 3708 may be communicatively coupled to vehicle 3710 via communication links 3726. The RSU 3706 may be communicatively coupled to vehicles 3712 and 3714 via communication links 3730 and 3732 respectively. Vehicle 3710 and 3712 may be communicatively coupled via a communication link 3728.

In some aspects, any of the communication links 3716-3732 may include multi-link connections (e.g., using multiple communication links via a single transceiver chain) or multi-radio links (e.g., using communication links via multiple transceiver chains where each transceiver chain may operate in accordance with one or more RATs of multi-RAT).

In some aspects, the use of an MEC server 3702 near the user (i.e., near the base station 3704 and the RSUs 3706-3708), may facilitate multi-link communications. The MEC 3702 may be configured to run as the application server for the V2X communication environment 3700, and may be configured to select one or more links to send communication messages on. For example, certain messages may be sent in all links, for redundancy purposes. Other messages may be dedicated for specific technologies due to their QoS requirements or the type of information in the message may be technology specific. One or more devices within the V2X communication environment 3700 may be configured to support multiple links, and such devices would receive the messages in any RAT of a multi-RAT used by the MEC 3702, while single link support devices would not be able to provide such support.

For instance, and in reference to FIG. 37, the MEC application server (AS) 3702 has two messages to transmit, message 1 and message 2. The MEC AS may determine to send message 1 via LTE communication technology to the base station 3704, and send message 2 via DSRC communication technology to the RSU 3706. Vehicle 3710 may receive message 1 via the 3GPP RSU 3708 (as it is nearby that RSU), and may also receive a copy of the same message 1 via the macro cell base station 3704 via communication links 3722. Vehicle 3712 is out of coverage of the 3GPP RSU 3708 but is in coverage of the DSRC RSU 3706. Therefore, vehicle 3712 may receive message 1 via the base station connection 3722, and message 2 via the DSRC RSU via communication link 3730 (vehicle 3712 may re-broadcasts message 2 via the D2D channel (sidelink channel) 3728 so that vehicle 3710 may receive message 2 via the sidelink channel). In this example, vehicle 3714 does not support multiple links and, consequently, vehicle 3714 may only receive message 2 via connection 3732 to the DSRC RSU 3706.

As discussed herein, multi-RAT, multi-link connectivity use cases may provide benefits when applied in V2X communication environments. The following are some of the benefits according to some aspects:

Reliability Enhancements. In some aspects, multi-link connections may improve link reliability through introducing time, frequency as well spatial diversity. For example, signals across multiple links, across the same or different nodes, using same or different frequency bands, may be combined at the PHY/MAC (or higher layers) to improve link SINR (e.g., through combining gain, as well as reduction of interference through using cooperation). The signals may also be used to re-transmit a packet on an alternative link should the primary link fail (e.g., cross-link retransmission/HARQ). In some case, several links may be kept in hot-standby so that they may activated or used for fall back should the primary link go down. Furthermore, multi-link coding techniques at the PHY/MAC or network layer me be applied to improve the overall link reliability. Additionally, a multi-link scheduler may be configured to perform multi-link scheduling over multiple active links, to use the most reliable link at a given scheduling instant. The above-mentioned techniques may be used to reduce outage in a V2X system and increase system reliability.

Data Rate Enhancements. In some aspects, multiple connections may be used to simultaneously transmit data on multiple V2I/V2N, V2V links as well as on a combination of links that span V2V and V2I connections. Multi-link aggregation may also provide benefits towards improve overall peak rates of the link and potentially reduce latency.

Coverage Enhancements. In some aspects, multi-link, multi-hop relaying may improve coverage for V2X communication. For example, a vehicle far from an RSU may make use of a nearby vehicle with a better connection to the RSU. Cooperation over V2V links or between infrastructure nodes (e.g., via backhaul links) may allow for interference reduction, cancellation, and SINR improvements through cooperation.

QoS Enhancements. In some aspects, choice and selection of links that are matched to the traffic requirements of a given V2X connection may be helpful in improving QoS. For example, for latency sensitive traffic, the link with the lowest latency may be used, whereas a higher data rate link (e.g. mmWave) may be used to transfer bulk sensing information. For example, the control link to establish V2X, V2I connectivity may always be carried over a reliable licensed band link, whereas the download of map information may be carried out over higher bandwidth links (such as mmWave for lowering latency).

Control Channel Enhancements. In some aspects, similar to dual connectivity links, having a more reliable link, potentially with wider coverage, may provide for a more reliable and stable control channel connection. The reliable control channel may be used for orchestrating different types of multi-link connectivity, radio resource allocation, interference control, mobility management, and so forth. In some aspects, it may also be possible to assign multiple links to a transport control channel for improved diversity and reliability.

Handover Enhancements. In some aspects, multi-link connectivity may assist with "make before break" connections allowing for lower handover latency and interruption time. When multi-link connectivity is established over links that may have wide area coverage, the number of handovers needed is also reduced.

Sensing Enhancements. In some aspects, multiple links may also be used to develop more reliable sensing mechanisms, such as improved position estimation through using multiple links (multiple sources for radar).

In some aspects, multi-link discovery protocols may be used to establish multi-link communications. Multi-link discovery may be based on different methods and may depend on the type of link being discovered (e.g. V2I, V2X, WLAN, LTE, etc.). The following techniques may, for example, be used for multi-link discovery:

Centralized/Network Assisted. In some aspects, a central network controller (e.g, associated with a base station) may be configured to provide assistance for link discovery and may schedule or recommend multiple links for communication in a centralized manner. This assistance may be provided for, e.g., V2I links wherein the discovery of V2V links will be left for UE implementation and may use discovery methods provided by local V2V protocols. In some aspects, both V2I and V2V links may be scheduled by the central controller. Broadcast mechanisms may also be used to discover RSUs or other vehicles.

Distributed/UE Assisted. In some aspects, the discovery process may be partially distributed in that a multi-RAT vehicle may be configured to monitor several RATs for connection and to establish connections independent of the central controller. In some aspects, V2V instead of V2I assistance may be used in discovery of upcoming on nearby RSUs.

Learning Based. In some aspects, for vehicles following a consistent trajectory, bases stations and RSUs nearby a traveled route may be learned and used to minimize the time for a discovery process. Learning may occur using a variety of techniques, such as via trained artificial neural networks (ANNs), statistical models, or simply plotting detected base stations or RSUs on a map, or the like. To take the map example, a previous trip (e.g., a commute) may have detected a number of base stations at fixed locations along the route. In a future reoccurrence of the commute, foreknowledge of the base station locations may be used to, for example, avoid rediscovery of the base station, but rather use a compacted form of connection (e.g., using pre-negotiated link setup parameters) to reconnect to the base station.

Control Protocols. In some aspects, multi-link connection establishment, multi-link radio resource management, interference control, and so forth may be centralized or partially distributed. Similar to the discovery protocols, the control of establishing multi-link connectivity may be centralized (network controlled or assisted) or may be distributed UE/device based.

In some aspects, the following radio resource management techniques may be used for multi-link connectivity:

Network Utility Optimization. In some aspects, to assist with establishing multi-connectivity, a general "utility" based framework may be used, which seeks to balance maximization of the overall utility of establishing multiple links with the cost of operating with them. The utility framework may allow a per user/device utility to be defined as a combination of utilities across different traffic types. The network may then collectively optimize a system-wide utility accounting for per user/device utilities.

Additionally, the cost of using multiple links may be accounted for within the optimization framework. One example metric that may be used to assign cost to multi-link cooperation (either multi-hop, or cooperative links), is the fraction of time a link spends in "assisting" or relaying for another "primary" link. Other cost functions, for example assigning a penalty based on power consumption etc. may also be used.

As an example, for a centralized decision-making function focusing on maximizing the aggregate (fairly allocated) throughput, the per link optimization metrics may take on the following form:

$$U_i(R_{eff}\beta_i) = u_i(f(R_1, \ldots, R_k)) + C_i(1-\beta_i)$$

Here, $R_{eff}$, is the overall throughput obtained for the ith user/device after accounting for cooperation, and $\beta_i$ is the fraction of time it spends on assisting other devices or links. For example, the ith vehicle, may serve as a relay to forward data from an RSU to another vehicle, while also receiving data for itself. In allocating resources, the central controller will make a decision on when to send data to vehicle i, while also deciding on when to use the device as a relay. Here, the central controller may factor in the cost of relaying in its decision making function.

Flow Control. In some aspects, multi-link management may be associated with ensuring stability of the queues in the network. This may be accomplished via controlling the scheduling and routing decisions, such as the packet arrival rate at each queue on network nodes is maintained, to ensure queue stability at each node. For example, queues may have a known capacity and processing latency (e.g., the time to process and remove a packet from the queue), and thus a known (or estimable) rate at which they may reliably accept traffic. To avoid oversaturation of a queue, when a threshold traffic rate for that queue is approached, the traffic may be routed to a different queue (e.g., in a different node). In an example, the traffic may be throttled by modifying the scheduling of a packet source (e.g., a requestor), or the like. Thus, queue stability may be maintained through these traffic management techniques.

Once the overall utility for each device is defined, the central scheduler may be configured to maximize the aggregate utility across all devices. Each device may be configured to make a "greedy" decision, for example, on combining links or selecting a link. For example, it may greedily maximize its utility without regard to cost, or alternately penalize itself based on the fraction of time it uses multiple links (presumably it wants to keep links free for cooperation, if it seeks to accept help from others). Alternate variations and formulations may also be considered.

While the utility formulation in the above example equation is defined in terms of effective throughput, the utility may be defined with regard to other metrics such as SNR/SINR for reliability, latency for delay sensitive traffic, and so forth. In this framework, the numeric utility value may be used to unify the different metrics as part of one framework. Similarly, the cost function may also be defined as a function of different metrics (for example, the extra power consumed during relaying or additional charge for using an addition link, etc.).

In some aspects, utility functions may be defined subjectively to measure the perceived importance of a given metric to a user, but generally a concave function (such as logarithm of a given metric) may be sufficient to steer towards a fair allocation of resources across users). In some aspects, an "effective throughput" (or equivalent effective metric, such as combined SINR) may be used to account for multi-link transmissions. In alternate formulations, the utility may be directly expressed as a function of per link metric and then subsequently combined.

In some aspects, the notion of utility may be different for different devices in the network. For example, an end user device may measure utility as a function of user or QoS satisfaction (such as a vehicle may weight a link used for exchanging safety critical information with highest utility), where a network may operate to address system wide utilities (such as aggregate utility across users, overall network utilization across the network). Combining utilities from different perspectives as well as exchanging such utilities across the network may also be incorporated in the overall framework.

Figure 38:
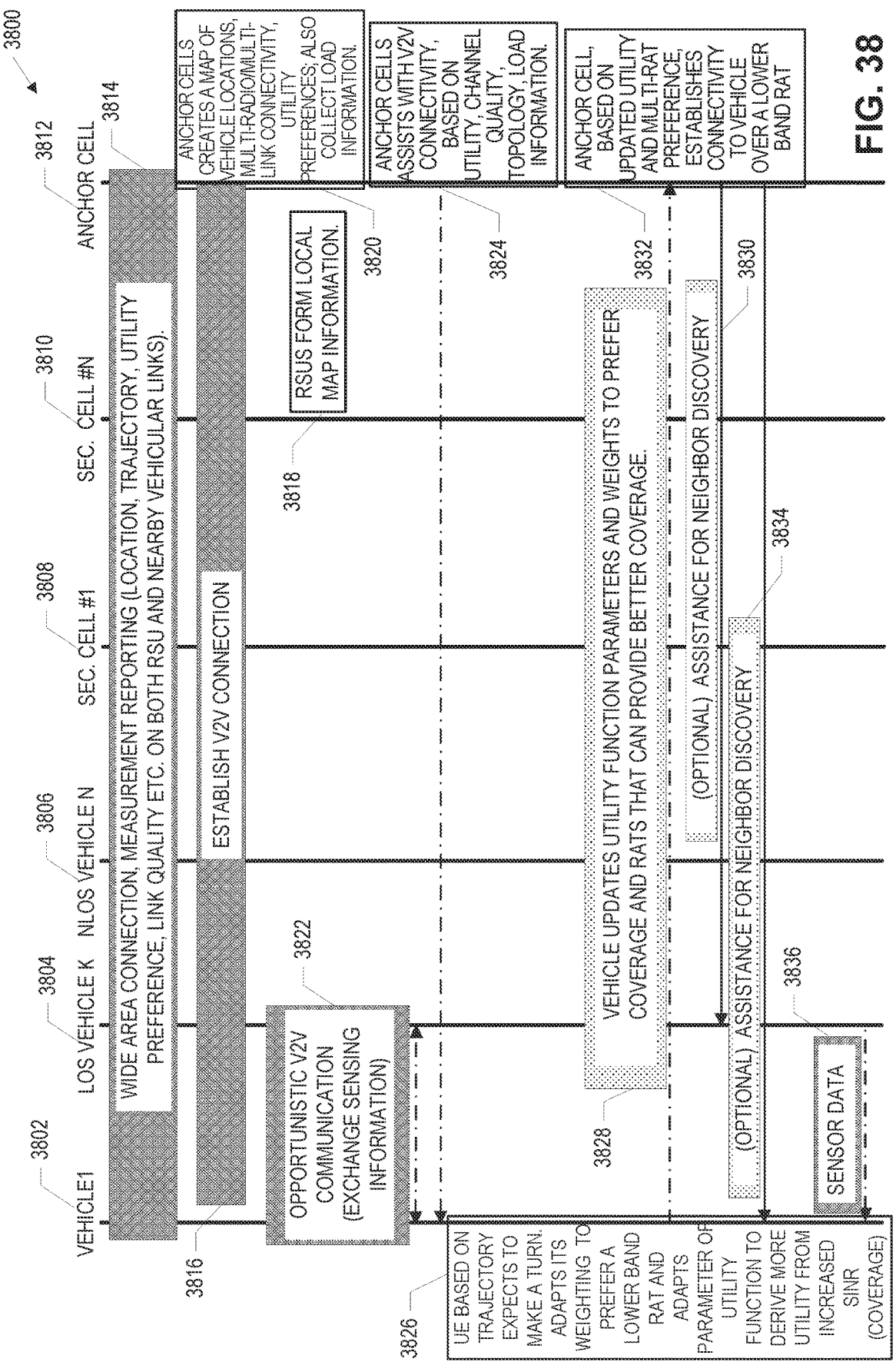
FIG. 38 illustrates an exemplary communication flow of communications associated with radio resource management for multi-link connectivity within a V2X communication environment according to some aspects described herein.

FIG. 38 illustrates an exemplary communication flow of communications associated with radio resource management for multi-link connectivity within a V2X communication environment according to some aspects described herein. Referring to FIG. 29 and FIG. 38, the example communication flow 3800 may occur between a first vehicle 3802, a line of sight (LOS) vehicle 3804, a non-line of sight (NLOS) vehicle 3806, a secondary cell 3808, a secondary cell 3810, and an anchor cell 3812. The vehicles 3802-3806 may be any of the vehicles 2908-2914 in FIG. 29. The secondary cells 3808 and 3810 may be any of RSUs 2904 and 2906, and the anchor cell 3812 may be the primary node 2902.

At 3814, wide-area communication links may be established between the vehicles 3802-3806, the secondary cells 3808-3810, and the anchor cell 3812. Additionally, at 3814, measurement reporting may take place between the V2X enabled devices 3802-3812. For example, measurement reporting may include location information, trajectory information associated with a moving vehicle, link utility preferences, communication link quality measurements, and so forth associated with communication links between one or more of the V2X enabled devices 3802-3812. At 3816, V2V communication links may be established between two or more of the vehicles 3802-3806. At 3818, secondary cells 3808 and 3810 (which may be RSUs) may form a local map information which may include device map information associated with the V2X communication environment of devices 3802-3812.

At 3820, the anchor cell 3812 may create a map of vehicle locations based on the information obtained during measurement reporting at 3814 as well as the information collected at 3818 by the secondary cell 3808-3810. The anchor cell 3812 may further assemble information on multi-radio, multi-link connectivity preferences, utility preferences and communication link load information.

At 3822, opportunistic V2V communication may take place between two or more of the vehicle 3802-3806. In some aspects, sensing information may be exchanged during the opportunistic V2V communication. At 3824 the anchor cell 3812 may assist one or more of the vehicles 3802-3806 with V2V connectivity, based on utility, channel quality, network topology, and communication link load information. In some aspects, at 3826, user equipment (e.g., a vehicular terminal device within the vehicle 3802) may adapt one or more weighting preferences based on the vehicle 3802 expected trajectory information, to indicate a preference for lower band RAT communications. Consequently, the vehicular terminal device may adapt one or more parameters of a utility function to derive more utility from an increased SINR associated with a communication link. At 3828, the vehicle 3802 may up date utility function parameters and weights with the anchor cell 3812, to indicate one or more preferences for coverage and RATs that may provide better coverage and communication links with better signal quality. At 3832, the anchor cell 3812, based on the updated utility and multi-RAT preferences indicated by the vehicle 3802, may establish connectivity to the vehicle 3802 over a lower band RAT.

At 3830, the anchor cell 3812 may optionally provide assistance to vehicle 3804 for neighboring device discovery. At 3834, the actor cell 3812 may also provide assistance to the vehicle 3802 for neighboring device discovery. At 3836, after a V2V communication link has been established between vehicles 3802 and 3804, sensor data may be communicated from vehicle 3804 to vehicle 3802.

Figure 39:
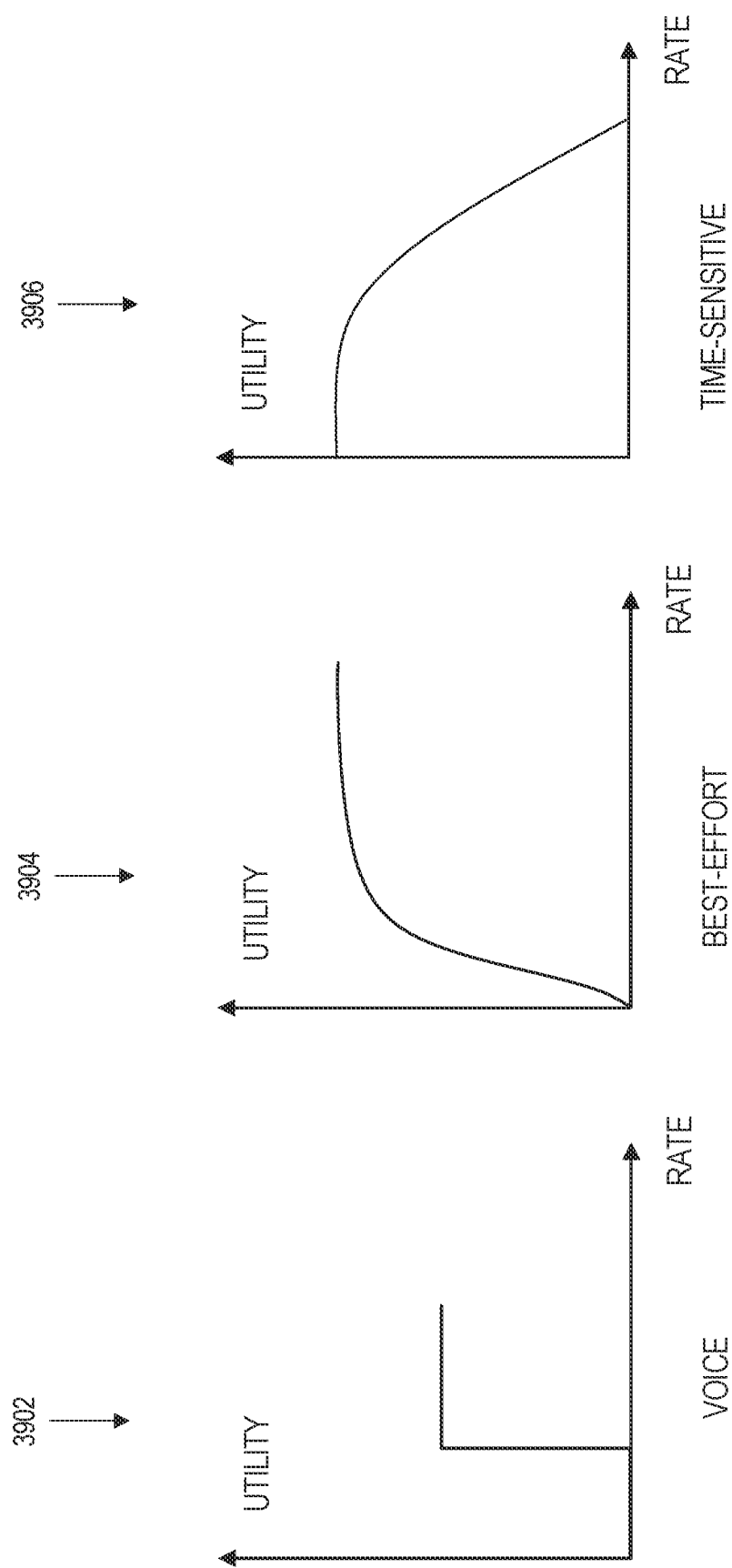
FIG. 39 illustrates exemplary graphs of a utility function for network traffic with different quality of service requirements within a V2X communication environment according to some aspects described herein.

In some aspects described herein, different utility functions may be defined and combined across metrics and links towards a net utility metric. FIG. 39 illustrates exemplary graphs 3902, 3904, and 3906 of a utility function for network traffic with different quality of service requirements within a V2X communication environment according to some aspects described herein. FIG. 39 illustrates how a utility function may be defined for traffic with different quality of service requirements. For example, the utility function 3902 defined for voice traffic seeks to maintain the minimum rate for a voice call. The user derives no additional utility, once that minimum data rate is achieved. Similarly, for time sensitive traffic (graph 3906), the user derives no utility for data that is delivered past the delay deadline. In some aspects, the delay deadline may also be cast as a minimum throughput that needs to be maintained beyond which the utility approaches zero. Once the utility is defined for the different traffic types sup ported by a user/device, the disparate utility functions may be combined consistently.

In some aspects, an extended utility formulation may be used in a V2X communication environment. For example, per device utility for each communication link may be assumed to be derived based on utility across several attributes, and the weighting of such attributes may be based on operator, user or network considerations. In some aspects, user/device utility may be defined in terms of attributes such as cost, throughput, power efficiency, delay, etc. Specifically, the utility for the ith user across jth attribute may be given as:

$$U_{i,j}(R_{\mathit{eff}}, \beta_i) = w_j u_i(f(x_{i,j,1}, \ldots, x_{i,j,k})),$$

which may be further broken into components that are based on operator and user preferences (for example, a product of weighted utility based on operator or user/device preferences may be computed). The utility function may be used to characterize the usefulness of an attribute to a user/device, whereas the utility weights may be used to characterize the relative preference for the attribute.

In some aspects, utility functions may be parameterized to obtain a different utility function, given a specific value of the attribute of interest. In this regard, utility definition may be application dependent and may be set differently for each attribute and user. As noted, for best effort data, a linear function of throughput may be applicable, where increasing throughput yields increasing user utility. In case of voice application, a step function where the utility is zero below a minimum threshold rate, and is fixed above may apply. The utility function may be parameterized by a set of discrete parameters, which may completely characterize the utility function. Adjusting the parameters may change the slope as well as the mean location of the utility function. Hence, adapting the utility as preference, or network/channel conditions change may be accomplished. Further, such changes may be communicated across the network by simply communicating the parameters of the utility function.

In some aspects, several methods for combining utilities across different attributes may be used. Potentially, each device may combine these utilities or the central entity may combine and weight device utilities across metrics. For example, attributes such as user throughput are dependent on the load and how resources are allocated across communication links, and it may be preferred that the network combine the utilities across different attributes. To combine the utilities, the utilities may be summed up with equal weights, or a product of the utilities may be computed. Other options may also be used, such as weighting of each attribute may be determined by computing its relative entropy across a given set of attribute values.

In some aspects in the context of V2X communication networks, the centralized radio resource management (RRM) may be carried out at an RSU or via a macro cell depending on the specific use case. In some instances, RRM may also be carried out by the designated vehicle, for example the designated platoon leader within the platoon or a convoy of vehicles. In some aspects, each individual vehicle may optimize a local utility to perform link selection/aggregation, etc. In an aspect, the measurements, exchange of utility information, link preferences etc. and resource assignment may be carried out over a common control link (e.g., a cellular link), which may ensure reliability of such communication. In other aspects, especially where distributed RRM is enabled, the vehicles may opportunistically exchange measurement information using local V2V links, or such coordination is exchanged via V2I assistance from the RSU, which may serve as a repository of a "Radio Environment Map" as well as have knowledge of vehicle trajectories, vehicle distribution, and available resources (in terms of nearby RSUs, services available for V2X usages, such as directory servers to download maps, connectivity information, etc.).

In some aspects, optimizing multi-link communication across the various communication scenarios discussed herein may include a significant exchange of information within the network in both distributed and (partially) centralized modes of operation. Techniques discussed herein may use a multi-link based control channel for exchange of measurement, feedback and control information. In some aspects, coded transmission may be employed to improve reliability of the control channel. In other aspects, control information may be coded into blocks and sent redundantly over multiple links such that receiving a sub-set of the information is sufficient to decode the control information. For example, both DSRC and LTE bands may be used simultaneously to send out control signaling information.

In some aspects, potentially multi-link aggregation may occur at different depths in the protocol stack (e.g, multiple links may be combined at the PHY layer as is the case of channel bonding in WLAN systems, or at the MAC or PDCP layer as is the case of LTE CA and DC modes). In some aspects, IP layer interworking may be suitable for multi-RAT standards that are not fully integrated into 3GPP systems.

In some aspects, a convergence function for multi-radios may be used for vehicular communication as well as other V2X communication scenarios. The V2X multi-radio convergence may be used in alternative architectures and mechanisms to address the challenges related to multi-radio communications (in a V2X context), given the mobility and the need for fast transition among radios and utilizing the availability of multiple connections for each location. The V2X multi-radio convergence may also be used to improve the performance and user experience by sharing context, management, and other information among radios for various V2X use cases, as discussed in greater detail herein below.

In some aspects, a V2X convergence function may be configured to perform one or more of the following functionalities, for example: (a) utilizing localization/ranging measurement s/information available from all radios for enhanced accuracy; (b) utilizing location information, interference, coverage, throughput, and other information provided by each radio as well as the context to select which radio to use for each application and smoothly transition among radios, if needed; (c) enabling interference mitigation among radios within a V2X device; (d) enable interference reduction among multiple devices by radio management; (e) utilizing shared credentials, information about available networks, and context of use to enable fast connection establishment, and smooth and fast transition among networks or cells; (f) enhance power efficiency by optimizing the utilization of radio for different type of traffic/data; and (g) provide a unified interface to the user/application hides all aspects for radio management from the user as well as applications.

Figure 40:
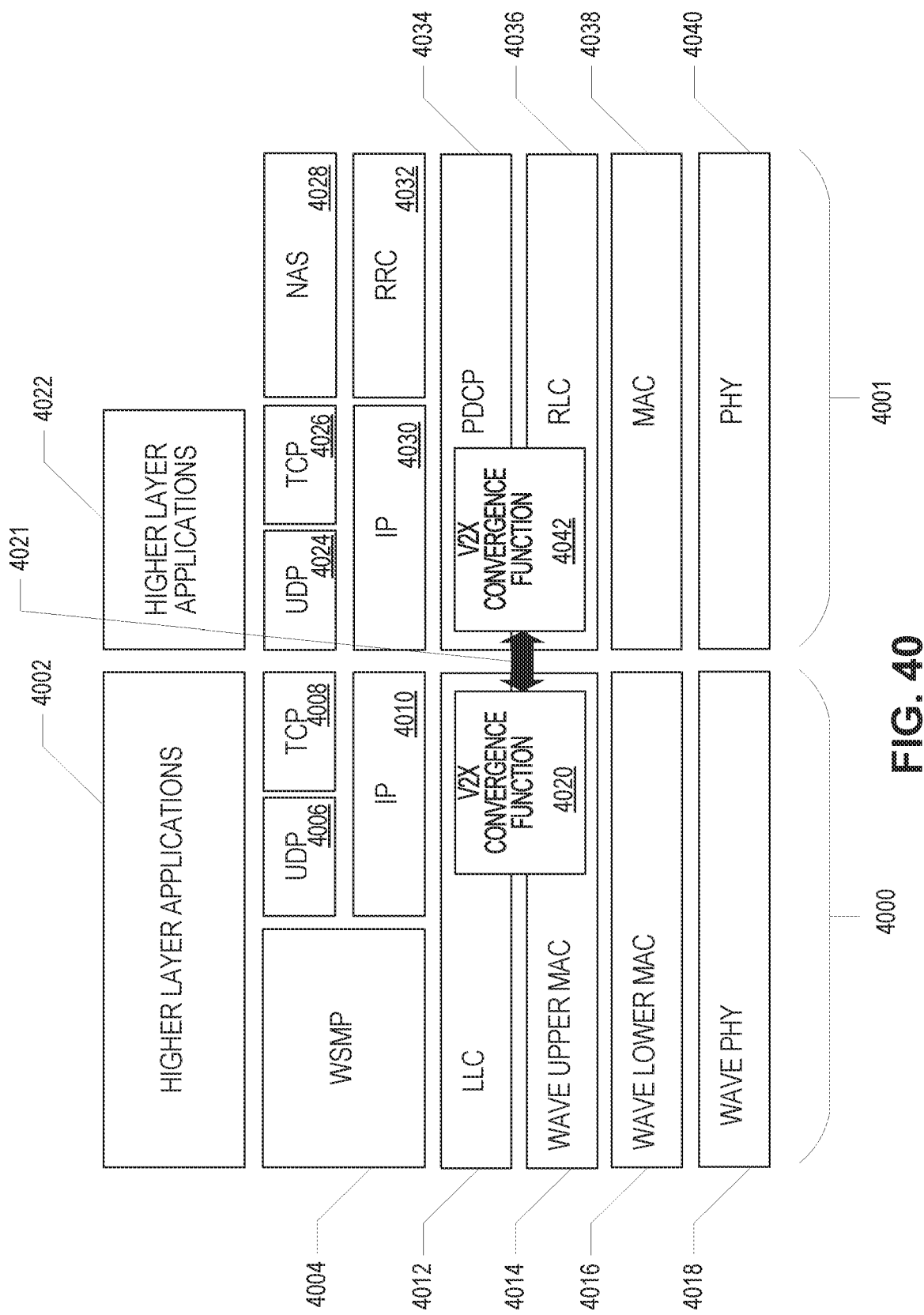
FIG. 40 illustrates exemplary WAVE and LTE protocol stacks in a V2X device using separate V2X convergence functions according to some aspects described herein.

FIG. 40 illustrates exemplary WAVE and LTE protocol stacks in a V2X device using separate V2X convergence functions according to some aspects described herein. Referring to FIG. 40, there is illustrated a WAVE protocol stack 4000 and an LTE protocol stack 4001 using separate convergence functions in the upper Layer 2 of a V2X enabled device (e.g, a car, an RSU, etc.). Even though protocol stacks for only two radios are illustrated in FIG. 40, the disclosure is not limited in this regard and protocol stacks for radios operating in other communication technologies may also use the V2X convergence functionality. In this regard, WAVE and LTE protocol stacks of independently operating WAVE and LTE radios are illustrated as examples in FIG. 40 and FIG. 41.

The WAVE protocol stack 4000 includes a physical (PHY) layer 4018, a lower media access control (MAC) layer 4016, an upper MAC layer 4014, a logical link control (LLC) Sublayer 4012, a WAVE Short Message Protocol (WSMP) network/transport layer 4004, an Internet protocol (IP) transport layer 4010, user datagram protocol (UDP) session layer 4006, and transmission control protocol (TCP) session layer 4008. The protocol stack 4000 may communicate with higher layer applications 4002 associated with the WAVE radio.

Similarly, the LTE protocol stack 4001 includes a PHY layer 4040, a MAC layer 4038, a radio link control (RLC) layer 4036, a packet data convergence protocol (PDCP) layer 4034, a radio resource control (RRC) layer 4032, an Internet protocol (IP) transport layer 4030, user datagram protocol (UDP) session layer 4024, transmission control protocol (TCP) session layer 4026, and non-access stratum (NAS) layer 4028. The protocol stack 4001 may communicate with higher layer applications 4022 associated with the LTE radio.

In some aspects, a V2X convergence function (e.g., 4020 and 4042) may be added to upper Layer 2 in each protocol stack (e.g., 4000 and 4001), with the V2X convergence functions being communicatively coupled to each other via interfaces. As seen in FIG. 40, the V2X convergence function 4020 within the WAVE protocol stack 4000 is communicatively coupled to the V2X convergence function 4042 within the LTE protocol stack 4001 via the interface 4021.

In some aspects, each of the V2X convergence functions may be configured to provide a common multi-radio data traffic interface or multi-radio management interface transparent to the applications (e.g., 4002 and 4022), common services among multiple co-located radios, interfaces or mechanisms arranged to perform for multi-radio information exchange, common load balancing functionalities, resource allocation and channel access coordination while limiting intra-device interference and coexistence challenges. In this regard, the V2X convergence functions may be used to improve over-the-air and environment-to-environment (E2E) security, device power efficiency, as well as to enhance cooperative discovery and connection setup.

In some aspects, the IEEE 1905.1 standard may be used for specifying convergence functionalities between radios. The IEEE 1905.1 standard, however, is associated with network convergence in digital homes, specifying a convergence layer as Layer 2.5 communicating with a peer convergence layer over either one or a multiple of media access technologies (access technologies used in IEEE 1905.1 include multimedia-over-coax-alliance (MoCA), Ethernet, Wi-Fi, and power line communications (PLC)) without requiring any changes to their lower layers.

The V2X convergence functionalities in accordance with some aspects discussed herein may be distinguished from the IEEE 1905.1 standard in multiple way s. For example, IEEE 1905.1 targets home networks, while V2X convergence solutions according to some aspects discussed herein targets V2X networks where mobility and dynamic nature of the environment introduce new and specific challenges (e.g., availability of radios and bandwidth availability of different radios dynamically changes). In this regard, the V2X convergence techniques according to some aspects discussed herein extend the framework to radios used in V2X communications, including cellular, WAVE, Bluetooth, and other types of radios. The communication framework may be extended so that it is not limited to a separate layer operating independently from the medium access technology underneath, but rather it may be part of the upper MAC of the radios, enabling unified operation of the device radios for increased efficiency and improved performance. Consequently, the V2X convergence techniques discussed herein further optimize and improve the user experience among any two devices that have a common set of radios, as tunneling of traffic of one radio over the other, as well as management of operation of one radio (e.g., Wi-Fi) via another radio (e.g., via Cellular), may be achieved. Furthermore, discovery, onboarding and authentication, and association of devices may be done in a common way via communication between V2X convergence layers/functions of multiple devices, making services provided by one radio available for the other.

In some aspects, the V2X convergence function (e.g., 4020 and 4042) may provide a communication interface between multiple device radios within the device as well as to multiple radios at one or more other devices via their corresponding convergence functions. In some aspects, the V2X convergence function (e.g., 4020 and 4042) may be achieved through enhancing existing control functions on the 3GPP RATs. For example, the functionalities discussed herein may according to some aspects be associated with a generic convergence function and its key properties, including interfacing with the control functionalities of existing standards using signaling and interactions in specific V2X scenarios (e.g., as outlined in connection with one or more of FIG. 29-FIG. 37).

Figure 41:
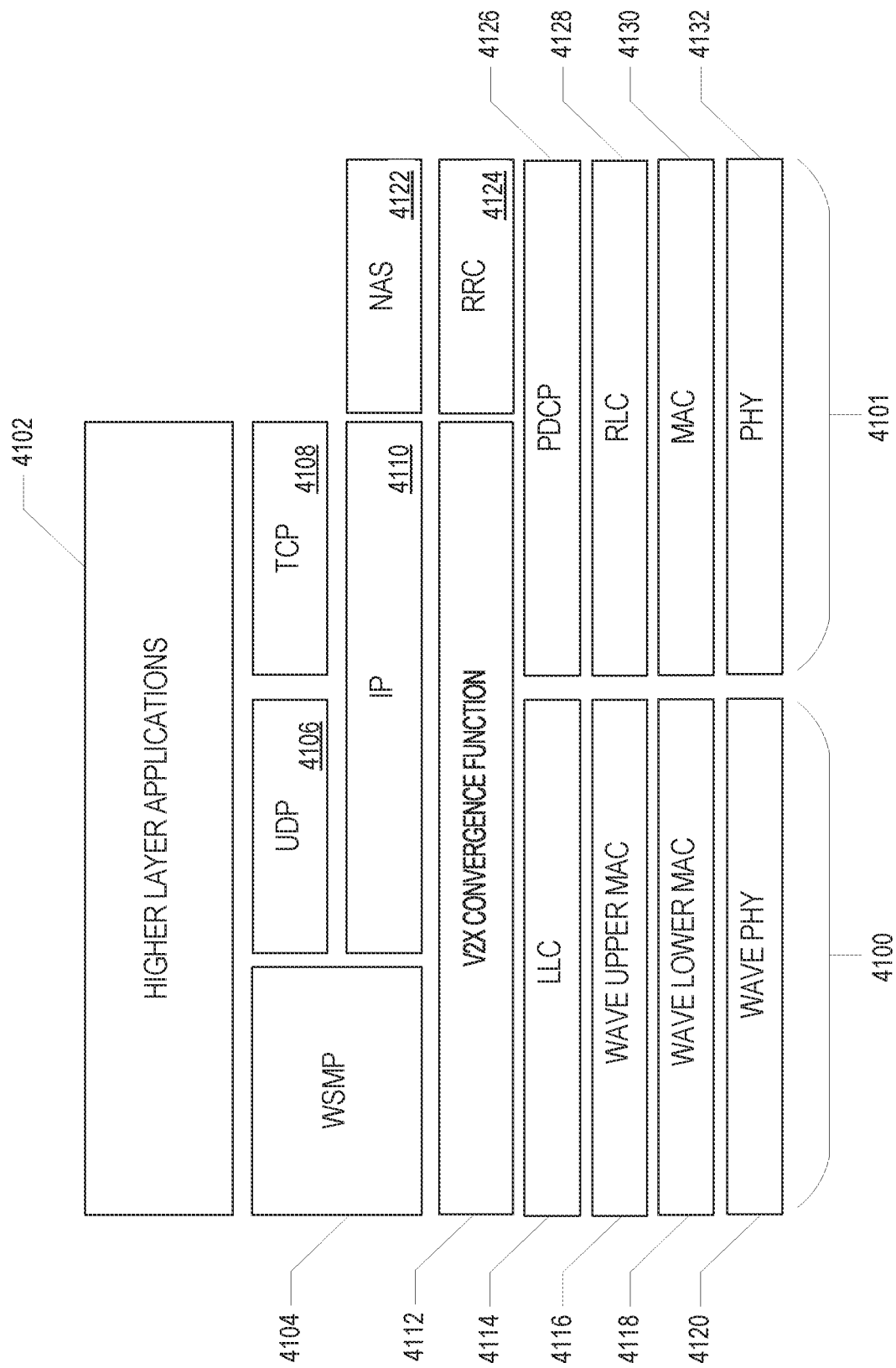
FIG. 41 illustrates exemplary WAVE and LTE protocol stacks in a V2X device using a common V2X convergence layer according to some aspects described herein.

FIG. 41 illustrates exemplary WAVE and LTE protocol stacks in a V2X device using a common V2X convergence layer according to some aspects described herein. Referring to FIG. 41, there is illustrated a WAVE protocol stack 4100 and an LTE protocol stack 4101 using a common V2X convergence layer in the upper Layer 2 of a V2X enabled device (e.g., a car, an RSU, etc.).

The WAVE and LTE protocol stacks in FIG. 41 are similar to the WAVE and LTE protocol stacks illustrated in FIG. 40. More specifically, the WAVE protocol stack 4100 includes a PHY layer 4120, a lower WAVE MAC layer 4118, a WAVE upper MAC layer 4116, an LLC sublayer 4114, a WSMP network/transport layer 4104, an IP transport layer 4110, a UDP session layer 4106, and a TCP session layer 4108.

Similarly, the LTE protocol stack 4101 includes a PHY layer 4132, a MAC layer 4130, an RLC layer 4128, a PDCP layer 4126, an RRC layer 4124, an IP transport layer 4110, an NAS layer 4122, and a TCP layer 4108. The protocol stacks 4100 and 4101 may communicate with higher layer applications 4102 associated with the WAVE and LTE radios.

In some aspects, a common V2X convergence function may be added as a common layer 4112 within the protocol stacks 4100 and 4101. The V2X convergence layer 4112 may include logic, which may be aware of available, call located radios on the device, and may coordinate the operation of the radios at different layers while exposing a common communication interface to the higher layers.

In some aspects, the V2X convergence functionality provided by the V2X convergence function (4020 and 4042) or the V2X convergence function layer 4112 may provide multiple alternative connections for applications, and may enable aggregation of the traffic over multiple radios. By using the V2X convergence functionality described herein, the control plane traffic may be carried over a different radio, and the control plane functions may be shared between radios. In this regard, the services of one radio may become available to another radio via the V2X convergence function.

In some aspects, the V2X convergence layer 4112 may provide a common interface for one or more radios to the upper layers and applications. This interface may include both data and control plane interfaces. The data plane interface may include multiple traffic prioritizations related to, for example, safety, time sensitivity, best effort, and so forth, depending on the differentiation capabilities of the radios underneath. The control plane interface may provide an aggregate of the control functions available by the radios.

In some aspects, the interface of the individual V2X convergence functions (e.g., 4020 and 4042) to higher layers may remain specific to each radio.

In some aspects, the decision regarding placement of the V2X convergence layer may be based on one or more of the following factors. Performance-driven applications may request the V2X convergence function/layer to be placed lower in the protocol stack, therefore avoiding propagating the messages from the V2X function/layer higher in the stack. In some aspects, applications performing billing based on transmitted V2X convergence function messages may require more or less data granularity, therefore influencing the placement of the V2X convergence layer. In some aspects, dynamic placement of the V2X convergence function/layer may be used, in order to support incompatibility issues in the lower layers of the protocol stack.

In some aspects, placement of the V2X convergence function/layer may be based on security considerations. For example, depending on the specific context requirements, it may be necessary to establish secure sessions, which are protected by cryptographic mechanisms. Difficulty/ease of key management of the adopted strategies could also impact on the placement of the V2X convergence layer.

Figure 42:
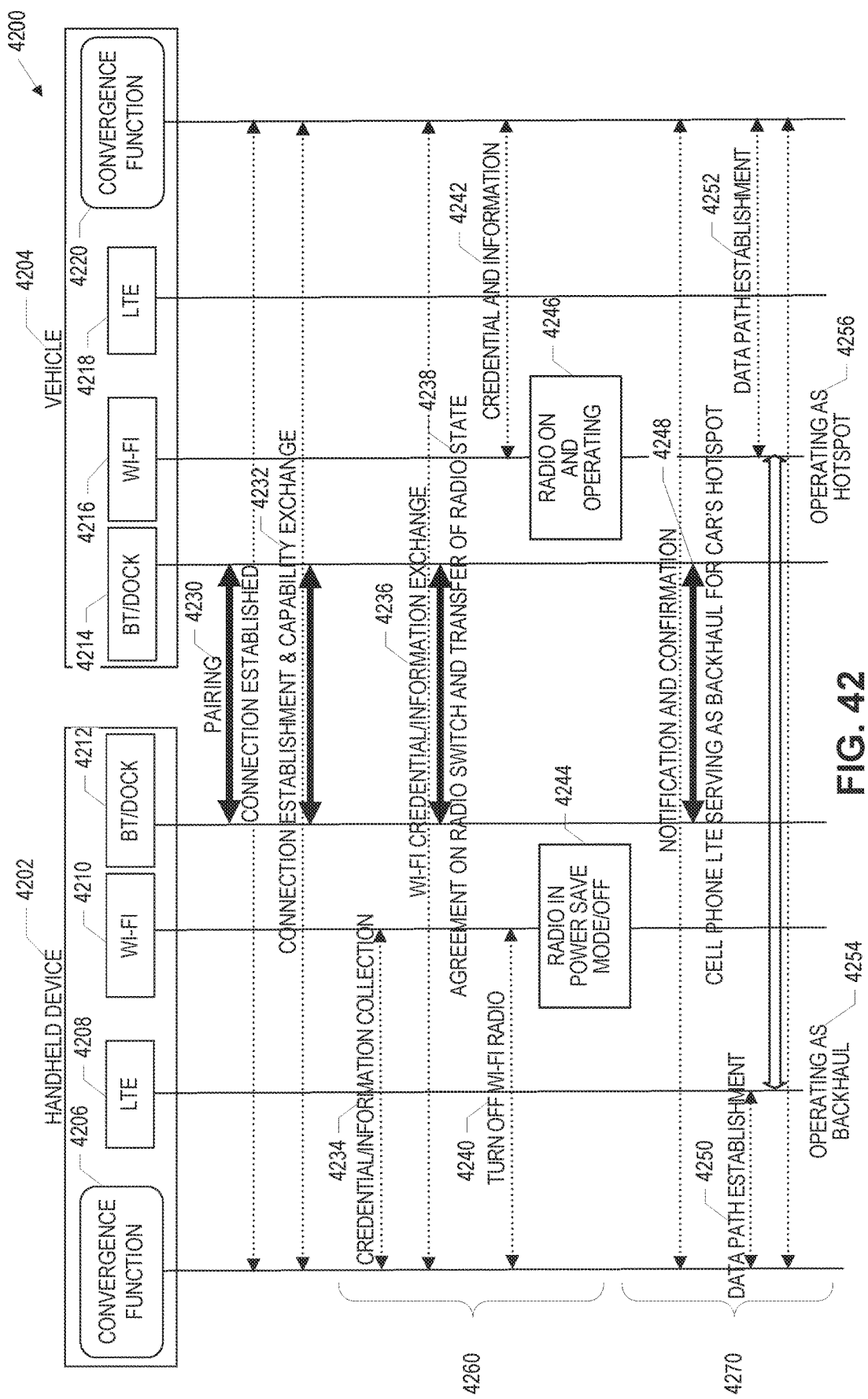
FIG. 42 illustrates exemplary convergence of communication radios of a handheld device and a vehicular terminal device according to some aspects described herein.

FIG. 42 illustrates exemplary convergence of communication radios of a handheld device and a vehicular terminal device according to some aspects described herein. Referring to FIG. 42, the V2X communication environment 4200 may include a handheld device 4202 and a vehicle 4204. The handheld device 4202 may include multiple transceiver radios, which may be configured to operate in a plurality of radio communication technologies. For example, the handheld device 4202 may include an LTE radio 4208, a Wi-Fi radio 4210, and a Bluetooth radio (or dock) 4212. The transceiver radios 4208, 4210, and 4212 may be interfaced to each other via a V2X convergence function 4206.

The vehicle 4204 may also include multiple transceiver radios, which may be configured to operate in a plurality of radio communication technologies. For example, the vehicle 4204 may include an LTE radio 4218, a Wi-Fi radio 4216, and a Bluetooth radio (or dock) 4214. The transceiver radios 4218, 4216, and 4214 may be interfaced to each other via a V2X convergence function 4220. In some aspects, the convergence functions 4206 and 4220 may be similar to the V2X convergence functions 4020 and 4042 in FIG. 40 or the V2X convergence function layer 4112 in FIG. 41.

In some aspects as illustrated in FIG. 42, the handheld device 4202 may be connected with the vehicle 4204 so that both the device 4202 and the vehicle 4204 have access to the collective set of radios (and communication services offered by such radios) via the corresponding V2X convergence functions 4206 and 4220. The connection of the handheld device 4202 to the vehicle 4204 may be achieved, for example, either through a dock (e.g., 4212 and 4214) or by establishing a Bluetooth link between the device 4202 and the vehicle 4204 via the Bluetooth radios 4212 and 4214 (in instances when no dock is available).

In operation, the handheld device 4202 may be paired (at 4230) with vehicle 4204 using, for example, a dock or a Bluetooth connection. After pairing 4230 has concluded, the V2X convergence function 4206 in the handheld device 4202 and the V2X convergence function 4220 in vehicle 4204 may establish a connection and perform a capability exchange 4232. The convergence function 4206 in the handheld device 4202 and the convergence function 4220 in vehicle 4204 are informed of the availability of the other device following the pairing 4230. The handheld device 4202 and vehicle 4204 will learn whether convergence functionality is available on the other device. In some aspects, the vehicle 4204 may take the role of a master device and may inquire the handheld device 4202 over the established Bluetooth connection, and a receipt at the vehicle 4204 of a response from the handheld device 4202 may indicate the presence of a convergence function 4206 at the handheld device 4202.

During the capability exchange 4232, an inter-convergence function interface may be established between the V2X convergence functions 4206 and 4220, which allows the two convergence functions to learn about the radios and services (e.g, data, emergency services, radio bands, location, device interface, etc.) available at the device 4202 and the vehicle 4204. The interface from the convergence function (e.g, 4220) of the master device (e.g., 4204) to the user device (e.g., 4202) may be used for selection of collective services available to the user. In some aspects, a primary radio (e.g., in the vehicle 4204) may be designated to be the master interface for initiating connection establishment and convergence function discovery, or this process may be initiated via a common control channel which facilitates discovery of radios and other service information across radios operating in a given area. In some aspects, service discovery or prioritizing a given RAT as an anchor RAT may also be used for connection establishment and capability exchange between the convergence functions.

Following the p airing of the user's handheld device 4202 with the vehicle 4204, the handheld device 4202 may be configured to save power by shutting down the Wi-Fi radio 4210 and using the vehicle's Wi-Fi radio 4216 (which may be performed when the device 4202 is not docked and only a Bluetooth connection to the vehicle 4204 is available). As seen during the communication exchange 4260, the convergence function 4206 of the handheld device 4202 may collect and share the relevant credentials and information with the vehicle's convergence function 4220. At 4234, the convergence function 4206 may collect credential information from the Wi-Fi radio 4210 and communicate the collected credential information with the convergence function 4220 at the vehicle 4204 during the information exchange 4236, and make the collected Wi-Fi credentials of the handheld device 4202 available to the Wi-Fi radio 4216 on the vehicle 4204 (e.g., during communication 4242 from the convergence function 4220 to the Wi-Fi radio 4216). The two convergence functions 4206 and 4220 may perform a handshake on the readiness of the system and achieve an agreement on radio switching and transfer of radio state (e.g. at 4238) before the Wi-Fi radio 4210 on the handheld is turned off (e.g., at 4240) or put to power save mode.

At 4244, the Wi-Fi radio 4210 may be put in a power save mode or turned off. At 4246, the Wi-Fi radio 4216 in the vehicle 4204 may be turned on and may operate using the credential information received from the Wi-Fi radio 4210 via the convergence functions 4206 and 4220. Additionally, assuming user's access to an operator managed Wi-Fi network, the communication and exchange of credential information between the convergence functions 4206 and 4220 may extend that capability to the vehicle 4204, enabling a connection to the operator managed Wi-Fi network for the vehicle 4204 while being on the road and for the benefit of the vehicle passengers.

In some aspects, a similar communication exchange as the exchange 4260 may take place with regard to the LTE radios 4208 and 4218 using a connection establishment and capability exchange via the V2X convergence functions 4206 and 4220. In this case, the LTE radio 4218 of the vehicle 4204 may take over the LTE operation for the LTE radio 4208 in the handheld device 4202, and services may become available to the user through the car infotainment system using the common interface of the V2X convergence function 4220 to all available radios within the vehicle 4204.

As seen during the communication exchange 4270, a notification and confirmation exchange 4248 may take place between the Bluetooth radios 4212 and 4214, to confirm that the handheld device LTE radio 4208 may serve as a backhaul for the hotspot established by the vehicle Wi-Fi radio 4216. At 4250, a data path may be established between the LTE radio 4208 and the V2X convergence function 4206 within the handheld device 4202. Similarly, at 4252, a data path may be established between the Wi-Fi radio 4216 and the V2X convergence function 4220 of the vehicle 4204. In this regard, the LTE radio 4208 may operate as a backhaul (at 4254), while the Wi-Fi radio 4216 of the vehicle 4204 is operating as a hotspot (at 4256). The operation of the LTE radio 4208 as a backhaul connection for the Wi-Fi radio 4216 may enable a unified charging for the user through the handheld device 4202, and extend the services available to the user to any vehicle that the user rides. For example, a rental vehicle with a V2X convergence function between the cell phone and the vehicle, may become capable of providing backhaul Internet connection and Wi-Fi hotspot services in the vehicle for the vehicle passengers.

Figure 43:
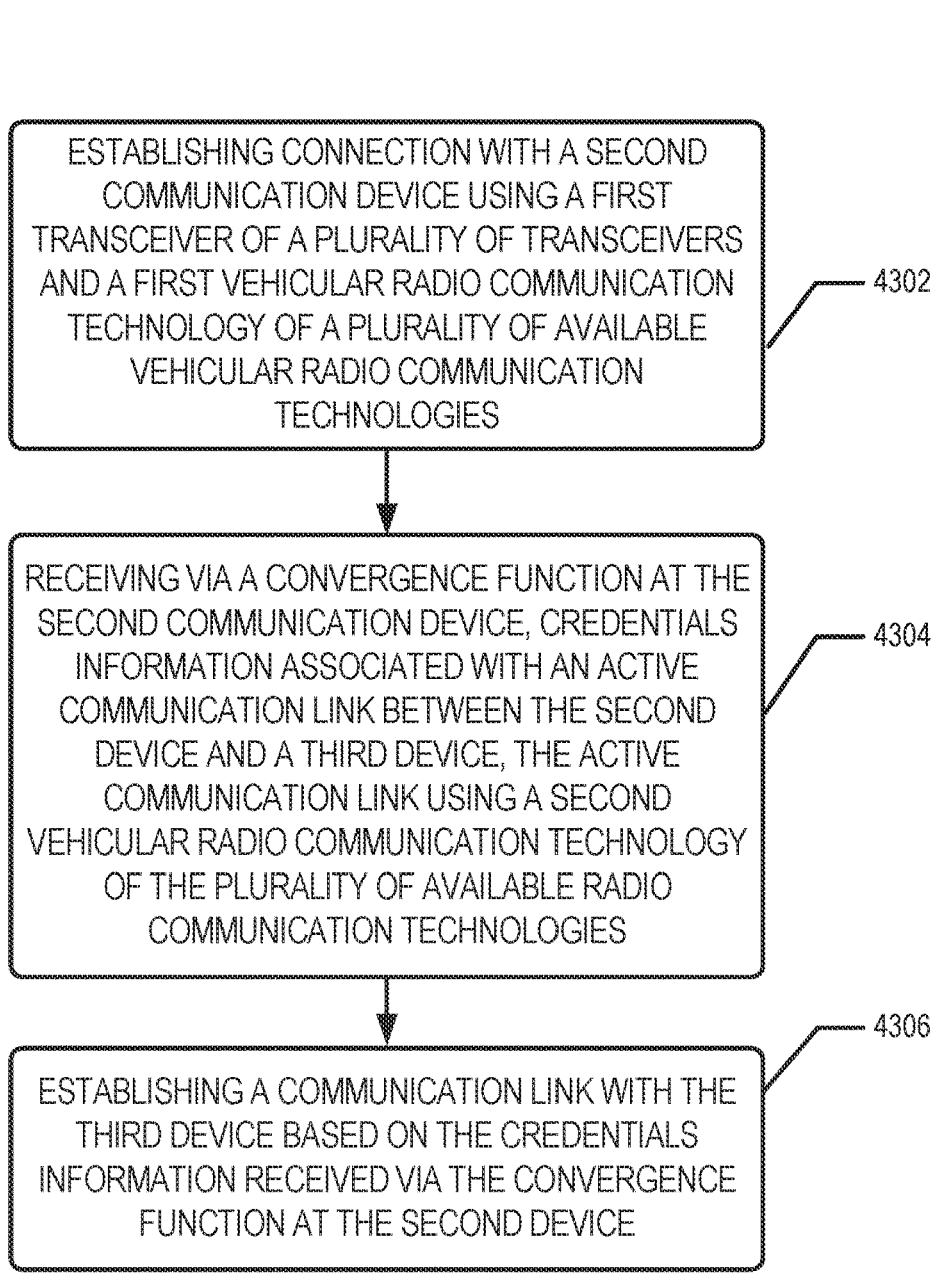
FIG. 43 illustrates a flow diagram of example operations for convergence of communication radios of a handheld device and a vehicular terminal device according to some aspects described herein.

FIG. 43 illustrates an exemplary flow diagram of example operations for convergence of communication radios of a handheld device and a vehicular terminal device according to some aspects described herein. Referring to FIG. 43, an example method 4300 for performing vehicular radio communications may start at 4302, when a connection with a second communication device may be established using a first transceiver of a plurality of transceivers and a first vehicular radio communication technology of a plurality of available vehicular radio communication technologies. For example, the Bluetooth radio 4212 within the handheld device 4202 may establish a connection with the Bluetooth radio 4214 within the vehicle 4204. At 4304, credentials information associated with an active communication link between the second communication device and a third communication device, may be received via a convergence function at the second communication device. For example, the Wi-Fi radio 4216 at the vehicle 4204 may receive credential information from the Wi-Fi radio 4210 at the handheld device 4202 via the V2X convergence functions 4206 and 4220. The active communication link may include a Wi-Fi communication link between the handheld device 4202 and another wireless device such as an access point or a base station. At 4306, a communication link with the third communication device may be established based on the credentials information received via the convergence function at the second communication device. For example, the Wi-Fi radio 4216 within the vehicle 4204 may establish communication with the wireless access point or base station using the credential information received from the Wi-Fi radio 4210 at the handheld device 4202 via the connection between the convergence functions 4206 and 4220.

Figure 44:
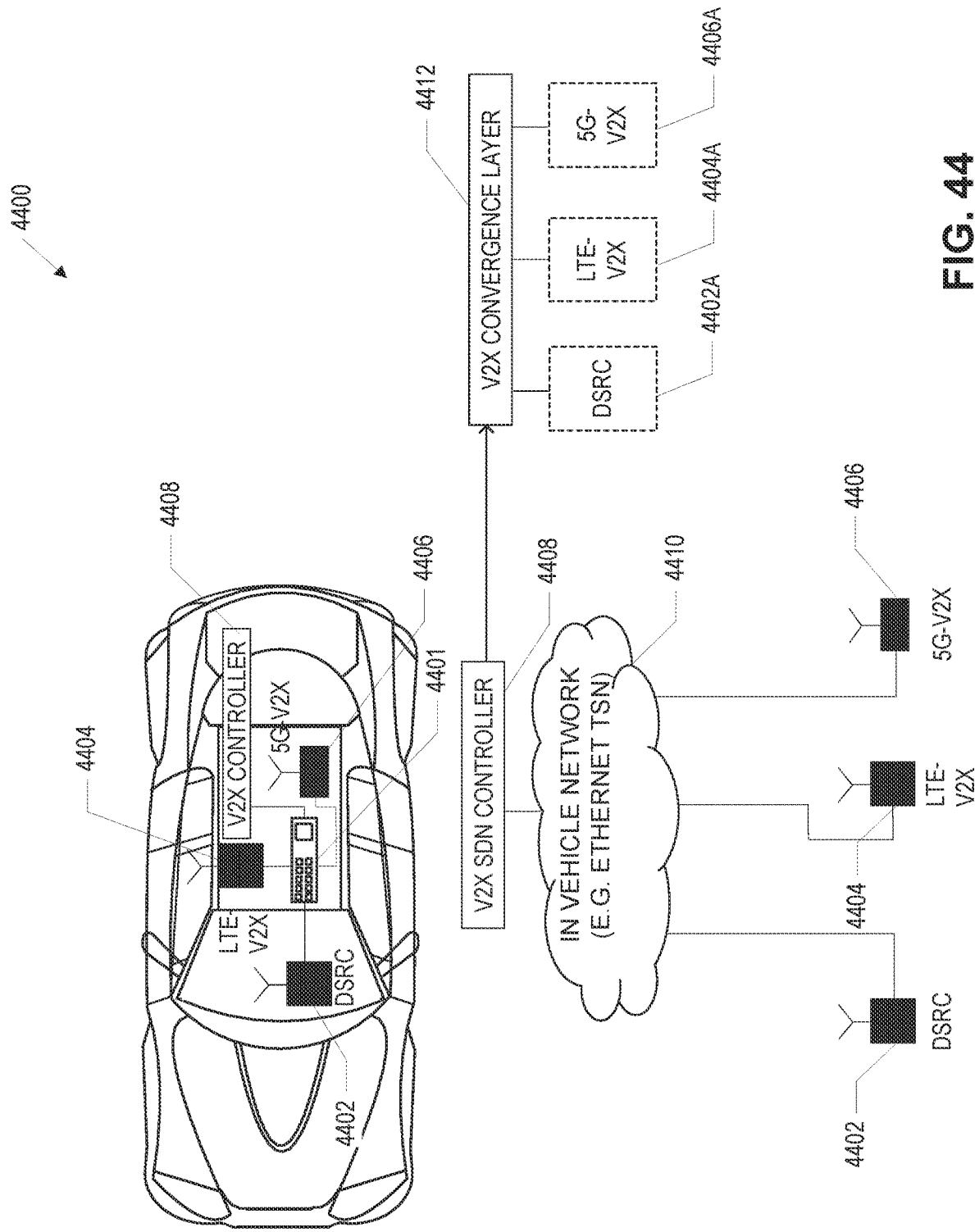
FIG. 44 illustrates an exemplary software-defined networking (SDN) V2X controller using a V2X convergence layer in a vehicular terminal device according to some aspects described herein.

FIG. 44 illustrates an exemplary software defined networking (SDN) V2X controller using a V2X convergence layer in a vehicular terminal device according to some aspects described herein. Referring to FIG. 44, the vehicular terminal device 4400 may include an RF transceiver 4401 and a V2X controller 4408. The RF transceiver 4401 and the V2X controller 4408 may have similar functionalities to the RF transceiver 4202 and the controller 4206 illustrated in FIG. 16. In some aspects, the RF transceiver 4401 may include a plurality of transceivers (e.g., 4402-4406), each transceiver associated with a different vehicular communication technology. In some aspects, the RF transceivers 4402, 4404, and 4406 may be, for example, a DSRC transceiver, and LTE-V2X transceiver, and a 5G-V2X transceiver, respectively.

In some aspects, the V2X controller 4408 may be an SDN V2X controller, implementing a V2X convergence layer 4412 (which may be similar to 112B). In some aspects, the V2X SDN controller 4408 may be communicatively coupled to the RF transceivers 4402-4406 using an in-vehicle network 4410, which may include an Ethernet time sensitive network (TSN). In some aspects, the V2X SDN controller 4408 may implement the V2X convergence layer 4412 as well as one or more different radio protocol stacks. Example protocol stacks that may be implemented by the V2X SDN controller 4408 include a DSRC protocol stack 4402A, and LTE-V2X protocol stack 4404A, and a 5G-V2X protocol stack 4406A.

Figure 45:
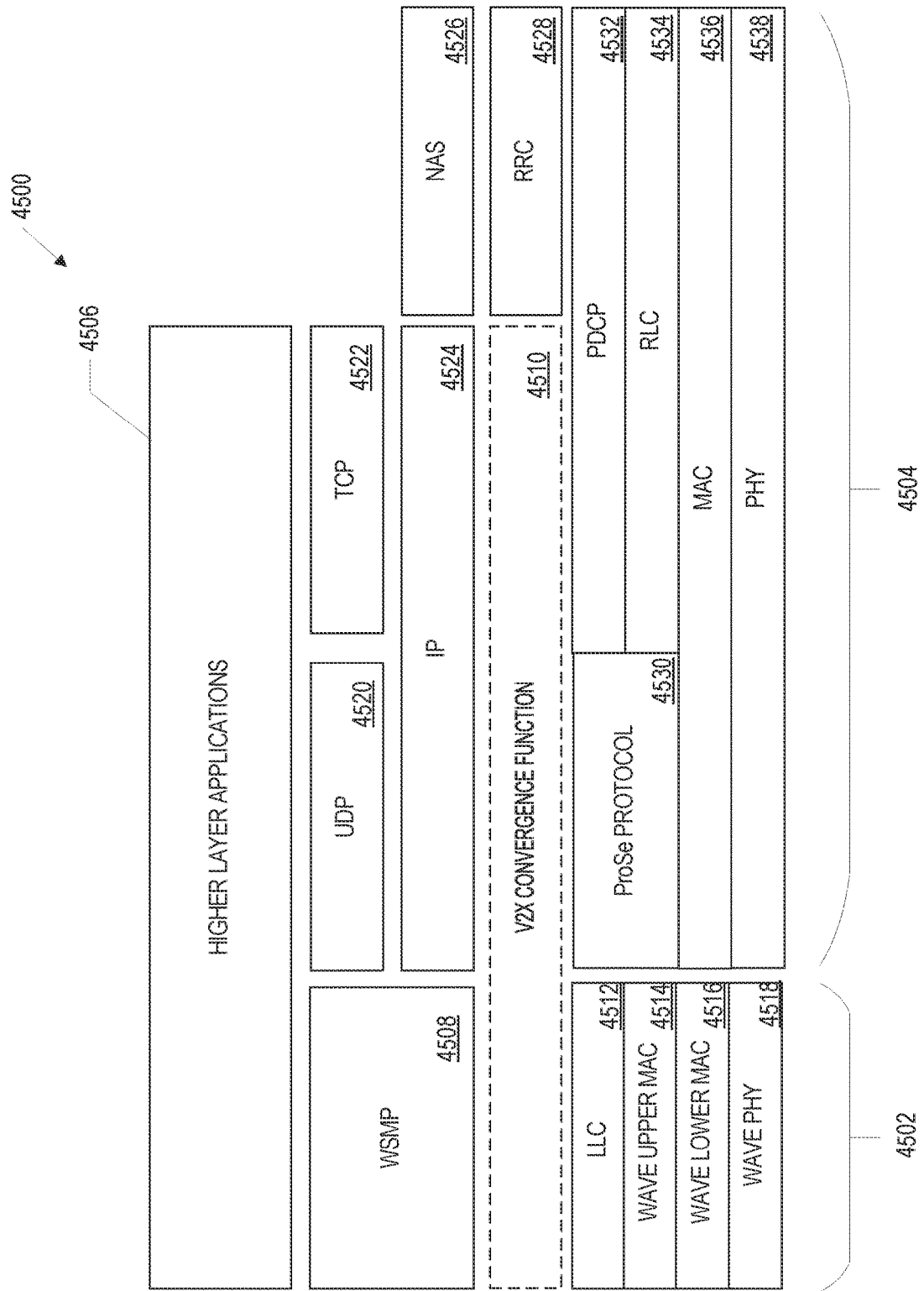
FIG. 45 illustrates exemplary WAVE and LTE protocol stacks in a V2X device using a common V2X convergence function and proximity-based services (ProSe) in the LTE protocol stack according to some aspects described herein.

FIG. 45 illustrates exemplary WAVE and LTE protocol stacks in a V2X device 4500 using a common V2X convergence function 4510 and proximity-based services (ProSe) protocol layer 4530 in the LTE protocol stack 4504 according to some aspects described herein. Referring to FIG. 45, there is illustrated a WAVE protocol stack 4502 and an LTE protocol stack 4504 using a common V2X convergence layer in the upper Layer 2 of a V2X enabled device as well as a ProSe protocol layer 4530 in the LTE protocol stack 4504.

The WAVE and LTE protocol stacks in FIG. 45 are similar to the WAVE and LTE protocol stacks illustrated in FIG. 41. More specifically, the WAVE protocol stack 4502 may include a PHY layer 4518, a lower WAVE MAC layer 4516, a WAVE upper MAC layer 4514, an LLC sublayer 4512, a WSMP network/transport layer 4508, an IP transport layer 4524, a UDP session layer 4520, and a TCP session layer 4522.

Similarly, the LTE protocol stack 4504 may include a PHY layer 4538, a MAC layer 4536, an RLC layer 4534, a PDCP layer 4532, a ProSe protocol layer 4530, an RRC layer 4528, an IP transport layer 4524, an NAS layer 4526, and a TCP layer 4522. The protocol stacks 4502 and 4504 may communicate with higher layer applications 4506 associated with the WAVE and LTE radios.

In some aspects, a common V2X convergence function may be added as a common layer 4510 within the protocol stacks 4502 and 4504. The V2X convergence layer 4112 may include logic, which may be aware of available, call located radios on the device, and may coordinate the operation of the radios at different layers while exposing a common communication interface to the higher layers.

In an example, the V2X device 4500 may include a ProSe/PC5 interface between the V2X device 4500 (e.g., a network relay UE) and another V2X device (e.g., a user equipment or UE), based on functionalities provided by the ProSe protocol layer 4530. In this case, an Evolved UE-to-Network Relay (e.g., 4500), defined by 3GPP Rel-14+, may function as a relay for an Evolved ProSe Remote UE. During the relay selection procedure, the 3GPP system may take into consideration the fact that there is a convergence function (e.g., 4510) available at the relay when deciding the best relay to connect. This information may be advertised by the relay UE to the remote UE when the remote UE is selecting the relay. Optionally, the 3GPP network may know the relay capabilities and may assist the remote UE during relay selection (a similar process may take place for relay reselection). The V2X convergence layer 4510 may be configured to further interwork with RRC control functions of the LTE interface or its enhancements specified for multi-radio device-to-device (D2D) operations.

Figure 46:
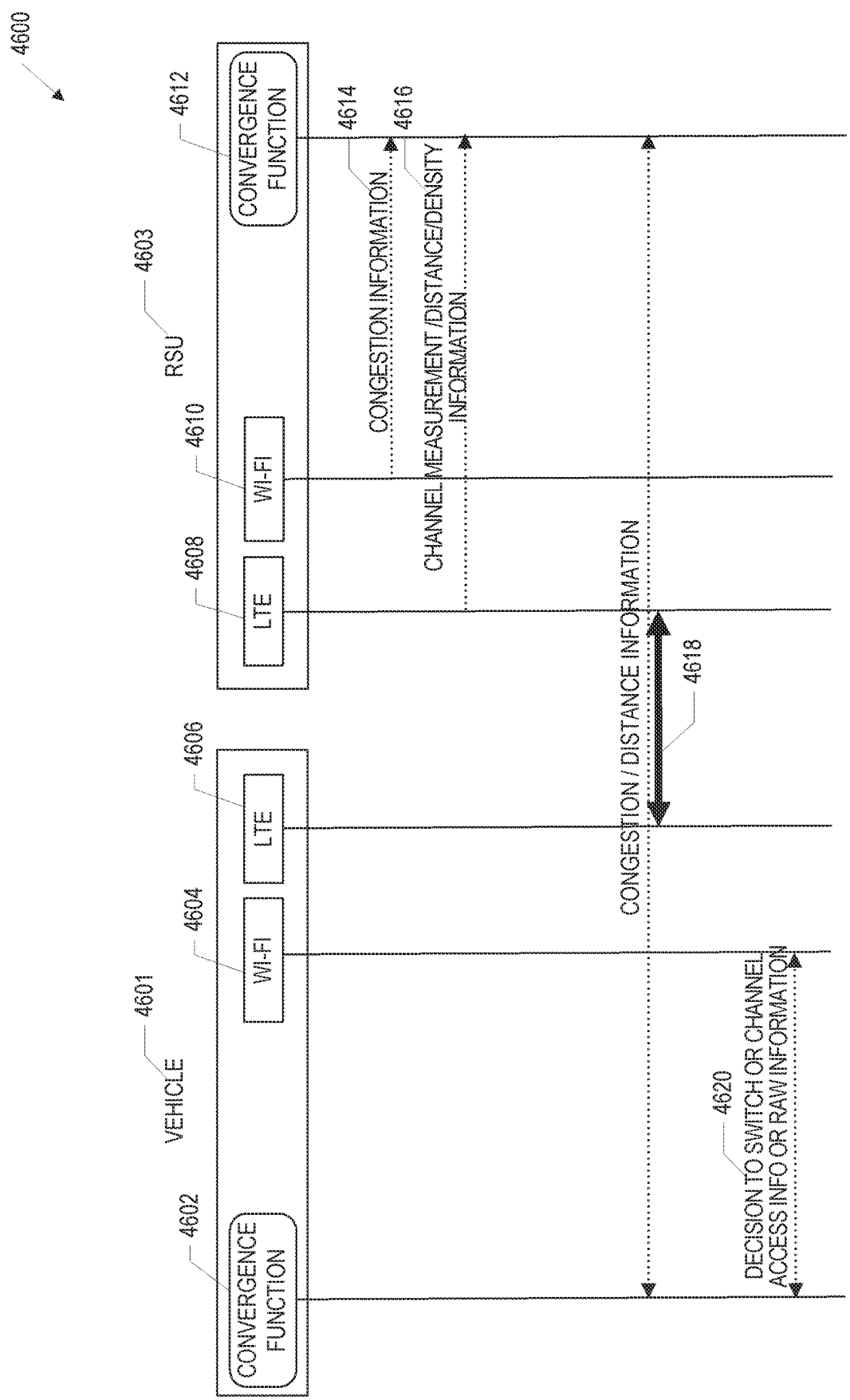
FIG. 46 illustrates exemplary convergence of communication radios of a vehicular terminal device and a roadside unit (RSU) to exchange network and measurement information according to some aspects described herein.

FIG. 46 illustrates exemplary convergence of communication radios of a vehicular terminal device and a roadside unit (RSU) to exchange network and measurement information according to some aspects described herein. Referring to FIG. 46, the V2X communication network 4600 may include a V2X enabled vehicle 4601 and an RSU 4603. The vehicle 4601 may include multiple transceiver radios, which may be configured to operate in a plurality of radio communication technologies. For example, the vehicle 4601 may include an LTE radio 4606 and a Wi-Fi radio 4604. The transceiver radios 4606 and 4604 may be interfaced to each other via a V2X convergence function 4602.

The RSU 4603 may also include multiple transceiver radios, which may be configured to operate in a plurality of radio communication technologies. For example, the RSU 4603 may include an LTE radio 4608 and a Wi-Fi radio 4610. The transceiver radios 4608 and 4610 may be interfaced to each other via a V2X convergence function 4612. In some aspects, the convergence functions 4602 and 4612 may be similar to the V2X convergence functions 4020 and 4042 in FIG. 40 or the V2X convergence function layer 4112 in FIG. 41.

In some aspects, a communication link may be established at 4618 between the LTE radio 4606 within the vehicle 4601 and the LTE radio 4608 within the RSU 4603. In this regard, a communication link is also established between the convergence functions 4602 and 4612 using the connection between the LTE radios.

In some aspects, a first radio within the vehicle 4601 may share information directly via the convergence function 4602 with a second radio within the RSU 4603 via the convergence function 4612, rather than through applications and higher layers. The shared information may be context dependent to the first radio (e.g., context aware data) and not readily available to the other radios within the vehicle 4601 or the RSU 4603. In some aspects, the shared information may include measurements available to one radio, which may be used to improve or enhance the performance or operation of the other (receiving) radio. For example, the shared information may include link quality measurement, measured local interference, and so forth. This information may be used by the receiving radio to improve its performance by, e.g., adjusting the channel access parameters or the transmit power based on the congestion information and the link measurement information.

In some aspects, as seen in FIG. 46, congestion information 4614 may be communicated from the Wi-Fi radio 4610 to the convergence function 4612 within the RSU 4603. Additionally, channel measurement information, distance information (e.g., distance of vehicle 4601 to the RSU 4603), or vehicle density information 4616 may be communicated from the LTE radio 4608 to the convergence function 4612 within the RSU 4603. The information 4614 and 4616 received at the convergence function 4612 may then be shared with the vehicle 4601 via the convergence function 4602 (e.g., via the communication exchange 4618). The received information 4614 and 4616 at the convergence function 4602 may be shared to one or more radios within the vehicle 4601. For example, during information exchange 4620, the congestion information 4614 and the information 4616 may be shared with the Wi-Fi radio 4604. In response, the Wi-Fi radio 4604 may communicate back to the convergence function 4602 a decision to switch communications using the Wi-Fi radios 4604 and 4610 as well as channel access information or other raw information for purposes of improving or changing the connection between the vehicle 4601 and the RSU 4603.

In some aspects, the repeat rate of safety and other messages for WAVE communications may depend on the density of the vehicles within the surrounding area. In some aspects, one or more algorithms and techniques that reduce the broadcasting rate and the number of broadcasting nodes to a near optimal case may be used to reduce the congestion and performance degradation and safety issues raised due to congestion in dense environments. However, implementation of such techniques may be associated with the use of a dedicated channel or otherwise a coordination mechanism in the background, and a cellular connection between the vehicle 4601 and the RSU 4603 via the LTE radios 4606 and 4610 may serve such a purpose.

In some aspects, in instances when the vehicle 4601 and the RSU 4603 include WAVE radios, the channel access parameters (e.g., transmit power, AIF parameters, and so forth) as well as repeat rate of V2X messages may be set by higher layers dependent on density of the network or other parameters. Such information may be locally computed and may be available at RSUs with greater accuracy. However, retrieving such information from the RSU 4603 by the vehicle 4601 over a WAVE radio may not be efficient. Given that the cellular connection has a loner range, the information about density available to the RSU 4603, which may be equipped with both cellular and WAVE radios, may be made available to the vehicle WAVE radio for the area ahead via the cellular connection using the LTE radios 4606 and 4608.

In some aspects, the cellular connection between the vehicle 4601 and the RSU 4603 may be used to facilitate the transition between Wi-Fi access points (APs). In instances when the RSU 4603 is equipped with both cellular and Wi-Fi radios, the longer range of the cellular radio may allow the convergence functions 4612 and 4602 (of the RSU 4603 and the vehicle 4601) to exchange information about the distance to the RSU (which may be used to estimate the signal strength to the Wi-Fi AP) and collect information about the available bandwidth in the AP in advance, to make a decision on whether or not to switch to the AP and at what time to do so.

Figure 47:
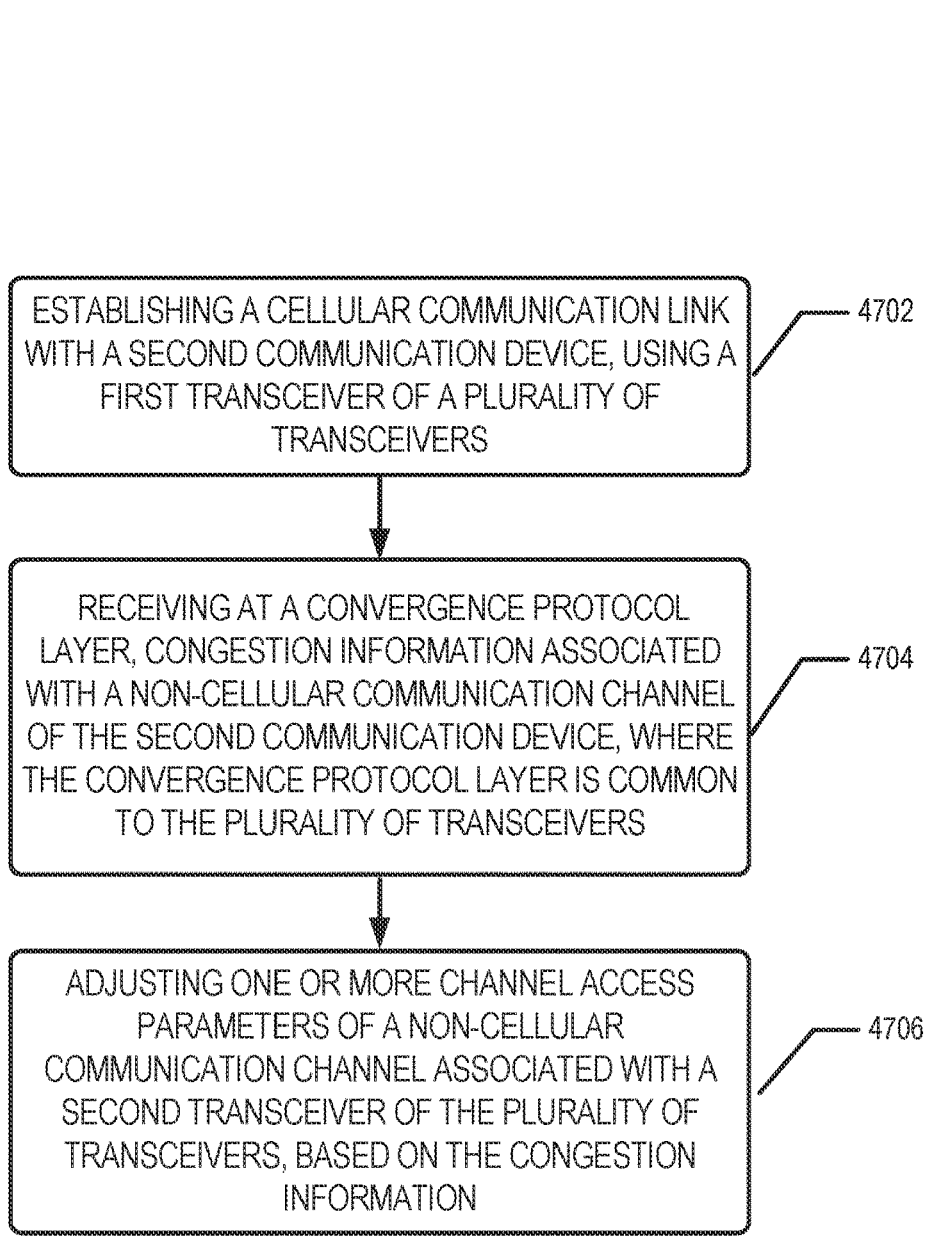
FIG. 47 illustrates a flow diagram of example operations for adjusting channel access parameters based on convergence of communication radios of a vehicular terminal device and an RSU according to some aspects described herein.

FIG. 47 illustrates an exemplary flow diagram of example operations for adjusting channel access parameters based on convergence of communication radios of a vehicular terminal device and an RSU according to some aspects described herein. Referring to FIG. 47, an example method 4700 for vehicular radio communications may start at 4702, when a cellular communication link may be established with a second communication device, using a first transceiver of a plurality of transceivers. For example, the LTE radio 4606 at the vehicle 4601 may establish a cellular communication link with the LTE radio 4608 at the RSU 4603.

At 4704, congestion information associated with a non-cellular communication channel of the second communication device may be received at a convergence protocol layer, where the convergence protocol layer is common to the plurality of transceivers. For example, congestion information associated with the Wi-Fi radio 4610 may be communicated to the convergence function 4612 within the RSU 4603. The congestion information 4614 is then forwarded to the vehicle 4601 via a communication link between the convergence functions 4612 and 4602. At the vehicle 4601, the received congestion information may be forwarded by the convergence function 4602 to the Wi-Fi radio 4604 for further processing and making a decision on adjusting one or more channel access parameters or switching communication links.

At 4706, one or more channel access parameters of a non-cellular communication channel associated with a second transceiver of the plurality of transceivers is adjusted, based on the congestion information. For example, the Wi-Fi radio 4604 may adjust one or more channel access parameters (e.g., switch to a communication channel that is non-congested) based on the congestion information received from the Wi-Fi radio 4610 at the RSU 4603.

Figure 48:
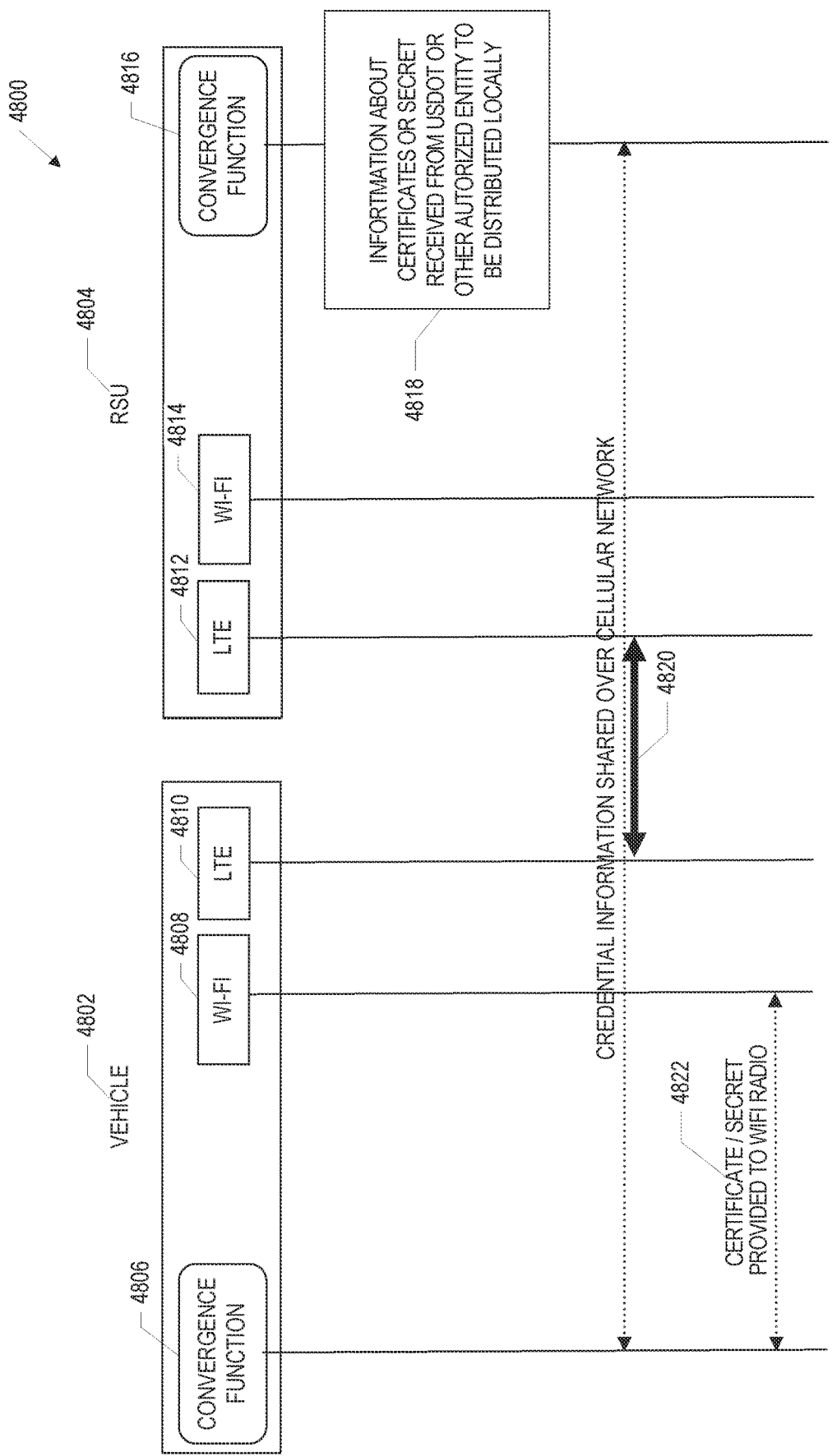
FIG. 48 illustrates exemplary convergence of communication radios of a vehicular terminal device and an RSU to exchange credentials information according to some aspects described herein.

FIG. 48 illustrates exemplary convergence of communication radios of a vehicular terminal device and an RSU to exchange credentials information according to some aspects described herein. Referring to FIG. 48, the V2X communication network 4800 may include a V2X enabled vehicle 4802 and an RSU 4804. The vehicle 4802 may include multiple transceiver radios, which may be configured to operate in a plurality of radio communication technologies. For example, the vehicle 4802 may include an LTE radio 4810 and a Wi-Fi radio 4808. The transceiver radios 4810 and 4808 may be interfaced to each other via a V2X convergence function 4806.

The RSU 4804 may also include multiple transceiver radios, which may be configured to operate in a plurality of radio communication technologies. For example, the RSU 4804 may include an LTE radio 4812 and a Wi-Fi radio 4814. The transceiver radios 4812 and 4814 may be interfaced to each other via a V2X convergence function 4816. In some aspects, the convergence functions 4806 and 4816 may be similar to the V2X convergence functions 4020 and 4042 in FIG. 40 or the V2X convergence function layer 4112 in FIG. 41.

In some aspects, a communication link may be established at 4820 between the LTE radio 4810 within the vehicle 4802 and the LTE radio 4812 within the RSU 4804. In this regard, a communication link is also established between the convergence functions 4806 and 4816 using the connection between the LTE radios 4810 and 4812.

In the V2X communication network 4800 where the vehicle 4802 is mobile, the communicating devices and the choice of connection and radio changes as the vehicle 4802 moves. For example, the RSU 4804 may be connected to one or more Wi-Fi access points, which the vehicle 4802 may use while in the range of the RSU 4804. However, a different RSU with a different set of Wi-Fi access points may become within range as the vehicle 4802 moves. Sharing of information about the networks (e.g., congestion, available bandwidth, and so forth) as well as authentication credentials may allow for smooth transition and fast switching among the networks, APs, base stations and so forth.

In some aspects, Wi-Fi connections may be made for a moving vehicle 4802 with applications demanding continued service by use of the convergence function 4806 via a cellular connection using the LTE radio 4810 in advance, enabling a make-before-break/interrupt free experience for the user. For example, after a communication link is established between the LTE radios 4810 and 4812, so that the Wi-Fi radio 4814 at the RSU 4804 may establish a communication link with a Wi-Fi station in range of the RSU using the Wi-Fi credentials received from the vehicle 4802 via the convergence functions 4806 and 4816.

In some aspects, to provide anonymity when using WAVE radios, one or more secure certificates may be provided to each vehicle by the vehicle manufacturer and other sources. These certificates, however, may be generated based on a unique secret, such as a key or algorithm. Mechanisms to revoke, recover, and distribute the secret, as well as distribution of intermediate certificates may be based on V2X communications within a V2X infrastructure. Cellular connection may be used for such purpose, as depicted in FIG. 48.

More specifically, at 4818, the convergence function 4816 may receive information about secure certificates or keys (e.g., secrets) from one or more authorized entities (e.g., US DOT, the vehicle manufacturer, and so forth) for local distribution. The receive certificates may then be communicated to the convergence function 4806 at the vehicle 4802 via the established cellular link between the LTE transceivers 4810 and 4812. At 4822, the convergence function 4806 may provide the received certificates or key s and a communication to an access point associated with the RSU 4804 may be established as soon as the vehicle 4802 is within range of such access point.

In some aspects, the V2X communication traffic may be switched among radios and transmitted over different radios based not only on an optimized path from an available throughput or latency perspective, but also based on the V2X communication traffic type and context. For example, in instances when there is a WAVE safety message with broad geographical impact, the message may be communicated via the cellular radios for emergency broadcast to a larger region or sent over a cellular link to multiple radios for increased reliability.

In some aspects, techniques disclosed herein may be used for regional navigation maps downloading. In this case, the regional maps download may be initiated via a cellular transmission from the network to the vehicles, and then the map s up date/download may be switched to a vehicle-to-vehicle (V2V) mode, e.g., updates/downloaded information may be communicated from one vehicle to another (or between a vehicle and a base station using a Wi-Fi communication link).

In some aspects, the convergence function (e.g., 4806 and 4816) may be used for managing the time certain actions are performed. As an example, in instances when a user equipment (UE) needs to up date a high precision map, which would require significant bandwidth from the network and perhaps impact other services that the UE is running the convergence function may delay the request for a map update until a certain time of the day when the V2X network is less loaded, such as in the middle of the night, when other over-the-air (OTA) up dates are performed. In this regard, time management of information download functions using the convergence function may result in improved network efficiency and capacity. In some instances, the network operator may provide incentives to V2X system users to download such map s when the network is lightly loaded, avoiding possible congestion and impact on other services from other UEs in the area.

In some aspects, the convergence layer/function may be used as a single interface available to the user and to applications, hiding aspects of connection management as well as optimizing the mapping of applications to the connections from the user. An example of enhanced user experience provided by this approach is the possibility of managing negotiations associated with transient Wi-Fi networks available to the user on the go via the cellular communication link in the background. Sharing of authentication credentials (or a part of the authentication credentials for faster re-authentication) and removing of user interaction may enable fast establishment of connections.

Figure 49:
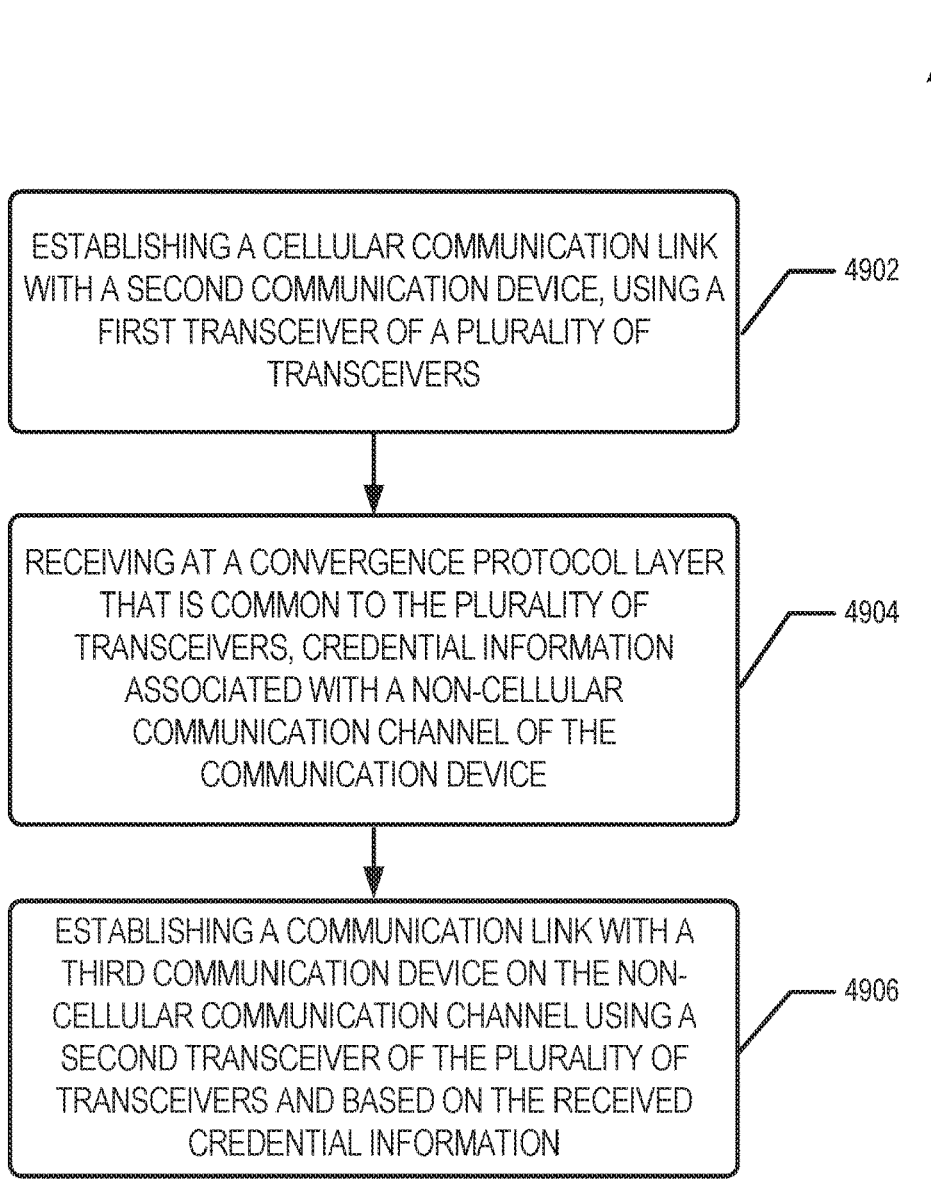
FIG. 49 illustrates a flow diagram of example operations for device authentication based on convergence of communication radios of a vehicular terminal device and an RSU according to some aspects described herein.

FIG. 49 illustrates an exemplary flow diagram of example operations for device authentication based on convergence of communication radios of a vehicular terminal device and an RSU according to some aspects described herein. Referring to FIG. 48 and FIG. 49, an example method 4900 for vehicular radio communications may start at 4902, when a cellular communication link is established with a second communication device, using a first transceiver of a plurality of transceivers. For example, the LTE radio 4810 within the vehicle 4802 may establish a cellular communication link with the LTE radio 4812 within the RSU 4804. At 4904, credential information associated with a non-cellular communication channel of the communication device is received at a convergence protocol layer that is common to the plurality of transceivers. For example, at 4818, information about certificates or secure key s originating from a vehicle manufacturer or another authorized entity may be communicated from the convergence function 4816 at the RSU 4804 to the convergence function 4806 at the vehicle 4802 via the established cellular communication link.

In some aspects, the information received at the convergence function 4816 may include credential information for accessing a non-cellular device (e.g. a Wi-Fi access point). At 4906, a communication link with a third (non-cellular) communication device may be established on the non-cellular communication channel using a second transceiver of the plurality of transceivers and based on the received credential information. For example, the convergence function 4806 within the vehicle 4802 may communicate the received credential information to the Wi-Fi radio 4808, which may use such information to establish a connection with the non-cellular communication device (e.g., an access point), which is in communication range of the RSU 4804.

Figure 50:
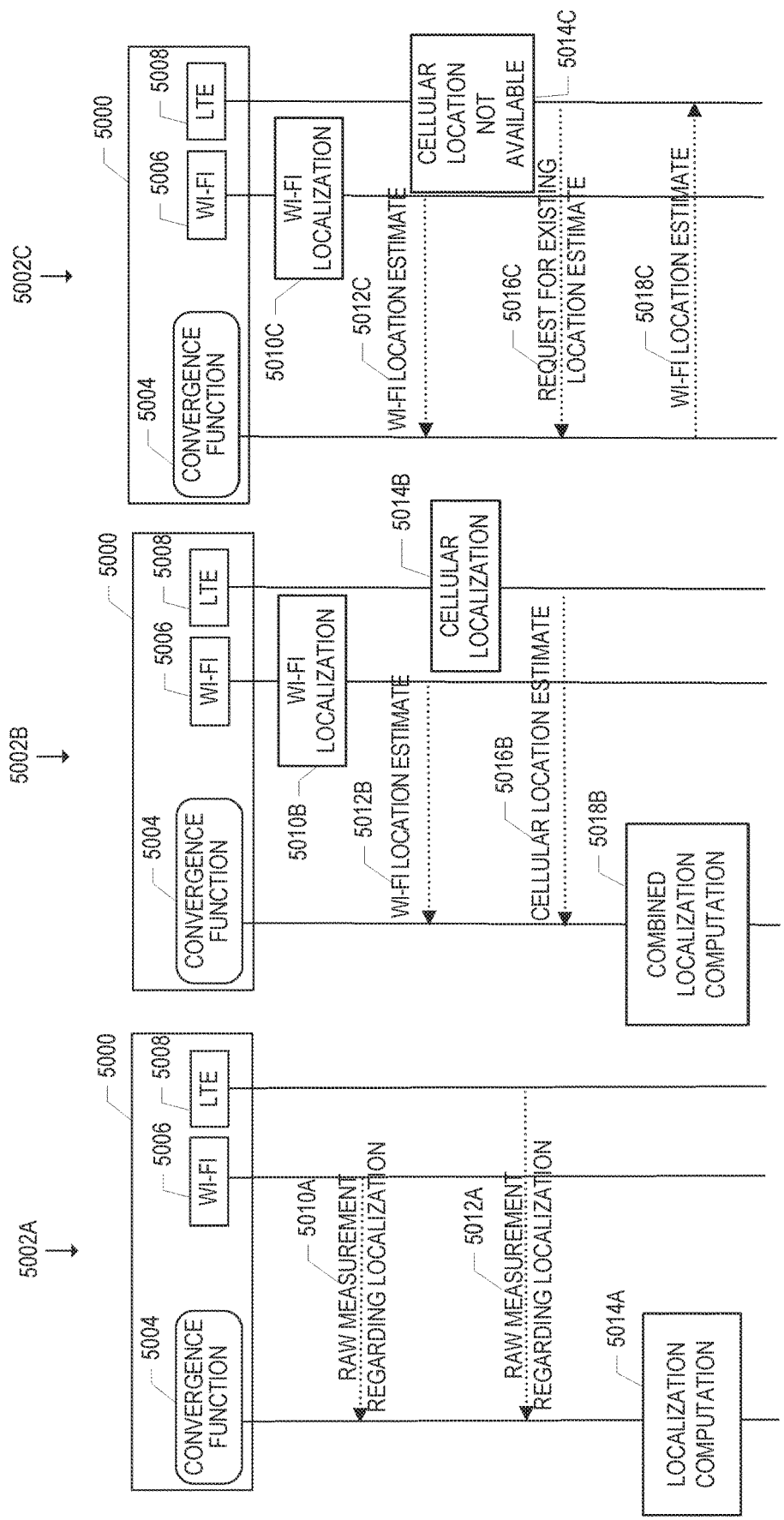
FIG. 50 illustrates exemplary convergence of communication radios within a single device to enable localization enhancements according to some aspects described herein.

FIG. 50 illustrates exemplary convergence of communication radios within a single device to implement localization enhancements according to some aspects described herein. Referring to FIG. 50, there are illustrated localization enhancement scenarios 5002A, 5002B, and 5002C associated with a V2X device 5000. As seen in FIG. 50, the V2X device 5000 may include a plurality of radios, such as a Wi-Fi radio 5006 and an LTE radio 5008. The plurality of radios may be interfaced via a common convergence function 5004.

In some aspects, location accuracy may become relevant for the mobile devices within a V2X communication network for accessing localized services as well as for autonomous driving. While radio technologies disclosed herein (e.g., Wi-Fi and cellular) have their own localization mechanisms, combining multiple localization techniques from multiple radio communication technologies may enhance the accuracy and the speed of localization.

In some aspects, the combination of multiple localization techniques associated with multiple radios may take place by sharing of measurements, for example by adding additional data points for triangulation, or by a feedback loop shared by the radios such that the combined result is provided to the higher layers. In some aspects, the location provided by one radio may be used by other radios for ranging or as the original estimate for calculation, and so forth.

In instances when a V2X device (such as a V2X enabled vehicle) is in rural areas where the vehicle may not be in a communication range of multiple base stations or access points, the combination of the above techniques (e.g., measurement sharing and using a feedback loop) may increase the chance of localization. For example, in instances when a V2X node is in range of two base stations and one access point, the time of flight (e.g., the time it takes for a signal to travel from a transmitter to a receiver) information from the three may be used for localization purposes. In reference to localization enhancement scenario 5002A, the Wi-Fi radio 5006 may communicate a localization raw measurement 5010A to the convergence function 5004. Similarly, the LTE radio 5008 may communicate a localization raw measurement 5012A to the convergence function 5004. The convergence function 5004 may then perform localization computation 5014A using the localization raw measurements 5010A and 5012A received from the radios 5006 and 5008 respectively.

In some aspects, both cellular and Wi-Fi localization may be available at the V2X device, and the location information from one may be used to add accuracy to the other. Depending on the known accuracy of each location information, central tendency summary statistic, such as a weighted average, may be used to compute a more accurate estimate of the location. In reference to localization enhancement scenario 5002B, Wi-Fi localization 5010B may be performed by the Wi-Fi radio 5006. A Wi-Fi location estimate 5012B, generated based on the Wi-Fi localization 5010B, may be communicated to the convergence function 5004. Similarly, cellular localization 5014B may be performed by the LTE radio 5008. A cellular location estimate 5016B, generated based on the cellular localization 5014B, may be communicated to the convergence function 5004. The convergence function 5004 may then use the location estimates 5012B and 5016B to generate a combined and generally more accurate localization computation 5018B.

In some aspects, in instances when an active application within the V2X device 5000 switches from one radio to another, the convergence function 5004 may be configured to provide the latest location estimation from one radio to the other to be used as the initial instance for the localization, which would provide faster and more accurate positioning. In reference to localization enhancement scenario 5002C, Wi-Fi localization 5010C may be performed by the Wi-Fi radio 5006. A Wi-Fi location estimate 5012C, generated based on the Wi-Fi localization 5010C, may be communicated to the convergence function 5004. At 5014C, the LTE radio 5008 may be activated with a cellular location not yet available. At 5016C, the LTE radio 5008 may request an existing location estimate from the convergence function 5004. At 5018C, the convergence function 5004 may communicate the Wi-Fi location estimate 5012C to the LTE radio 5008 as the initial localization estimate for LTE positioning.

Figure 51:
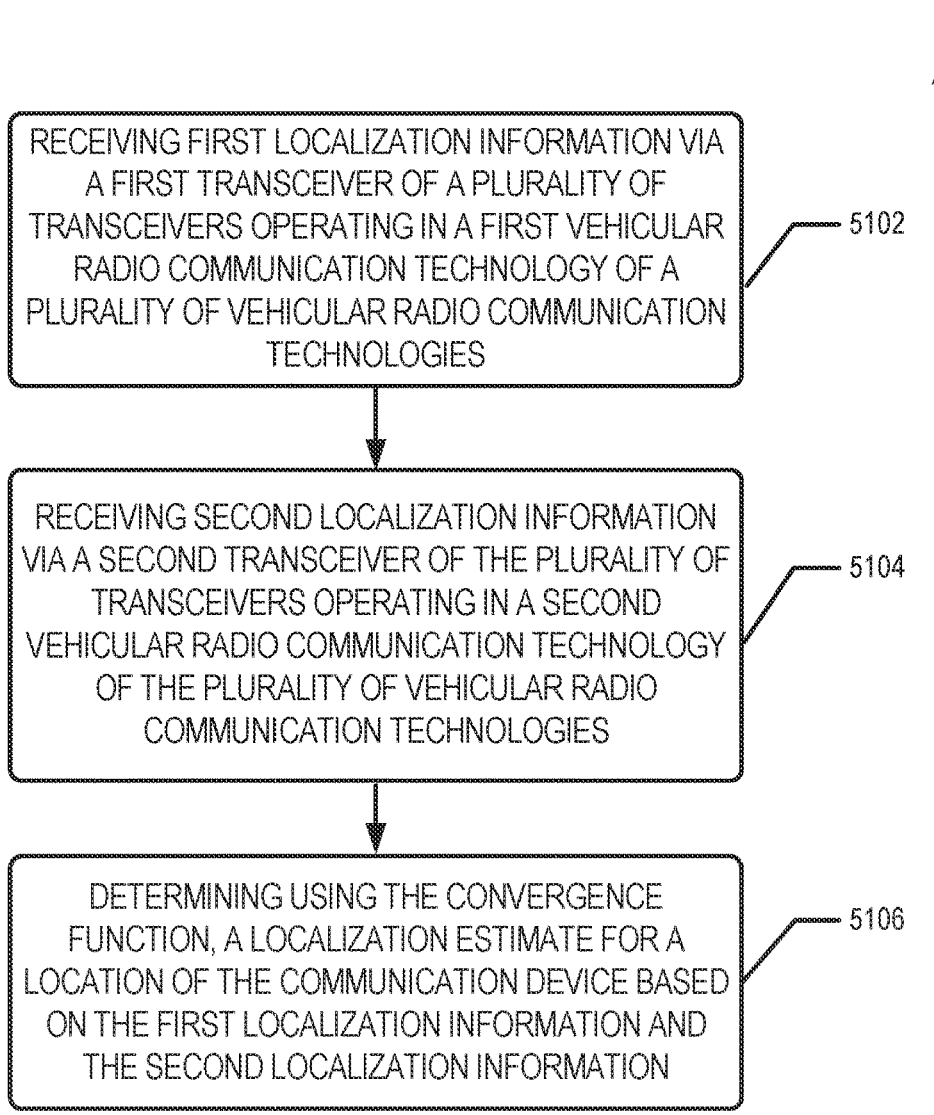
FIG. 51 illustrates a flow diagram of example operations for performing localization enhancements based on convergence of communication radios of a single device according to some aspects described herein.

FIG. 51 illustrates an exemplary flow diagram of example operations for performing localization enhancements based on convergence of communication radios of a single device according to some aspects described herein. Referring to FIG. 50 and FIG. 51, the example method 5100 for vehicular radio communications may start at operation 5102, when a first localization information may be received via a first transceiver of a plurality of transceivers operating in a first vehicular radio communication technology of a plurality of vehicular radio communication technologies. For example, a first raw localization measurement 5010A is received by the convergence function 5004 from the Wi-Fi radio 5006.

At operation 5104, second localization information is received via a second transceiver of the plurality of transceivers operating in a second vehicular radio communication technology of the plurality of vehicular radio communication technologies. For example, a second raw localization measurement 5012A is received by the convergence function 5004 from the LTE radio 5008. At operation 5106, a localization estimate for a location of the communication device is determined using the convergence function and based on the first localization information and the second localization information. For example, the convergence function 5004 may use the first localization measurement 5010A and the second localization measurement 5012A to perform a localization computation 5014A based on both raw measurements.

In some aspects, interference mitigation (e.g., among multiple radios within a V2X device or among V2X devices) may be another useful functionality enabled by using a V2X convergence function. For example, information about a duty cycle of each radio may be used to schedule/adjust the transmission time by other radios, to minimize interference among them, and so forth. Similarly, information about the interference and the use of channel in an area may be used to select the radio that will experience less interference and contribute to reducing network congestion.

Figure 52:
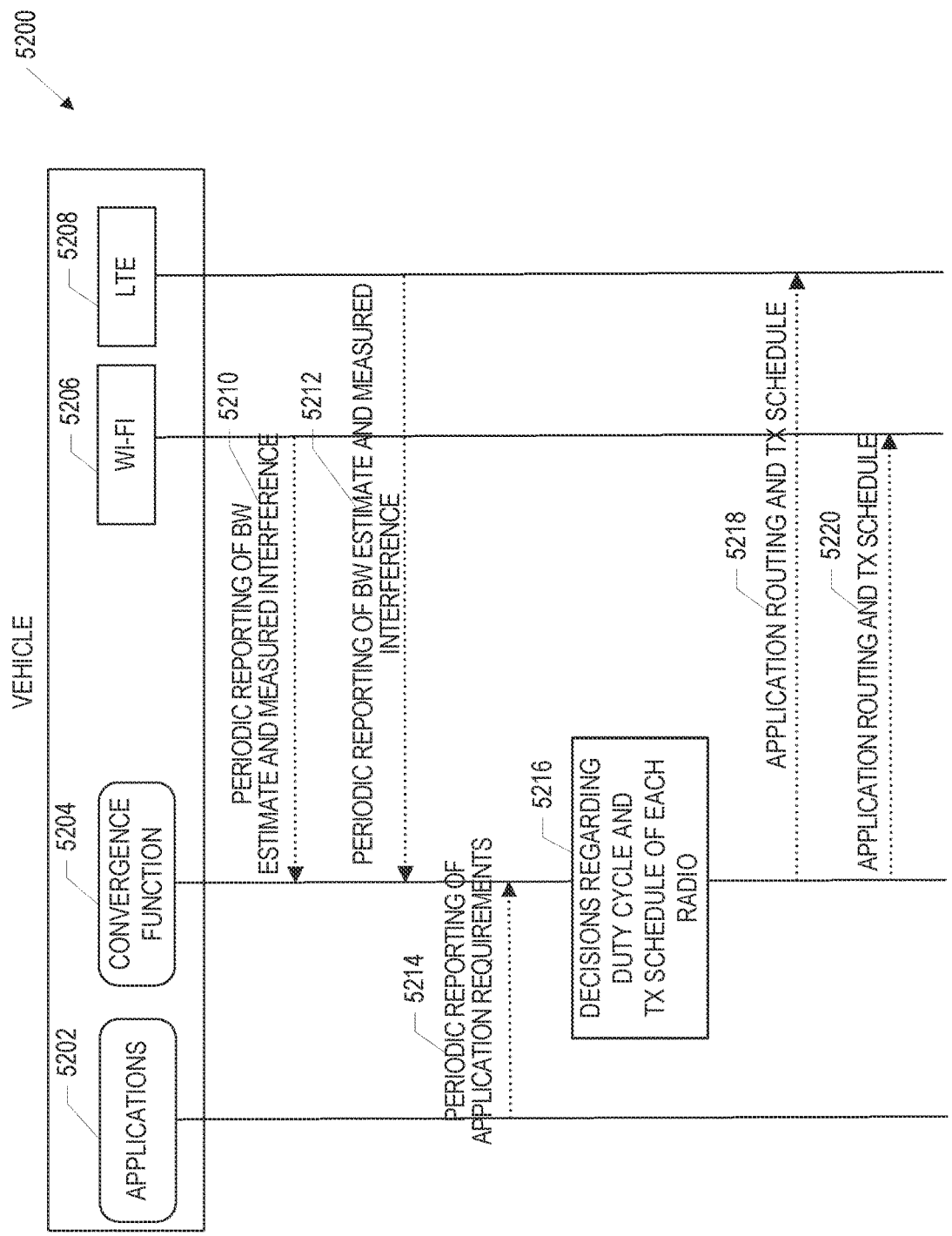
FIG. 52 illustrates exemplary convergence of communication radios within a single device to enable transmission scheduling according to some aspects described herein.

In some aspects, a WAVE WSMP stack (e.g., 104A or 104B) may be configured to set the duty cycle for V2X messages. The information regarding network status for radios may be gathered by each radio (or collected from an RSU), and made available to the convergence function on the device periodically (e.g, as illustrated in FIG. 52). The application requirements, such as WSMP messaging requirements, may also be shared with the convergence function, which may determine what application uses which radio and the transmission schedule for the radios to reduce the inter-device interference, while minimizing the negative impact on the network.

FIG. 52 illustrates exemplary convergence of communication radios within a single device to implement transmission scheduling according to some aspects described herein. Referring to FIG. 52, the vehicle 5200 may include multiple radios, such as a Wi-Fi radio 5206 and an LTE radio 5208. The vehicle 5200 may further include one or more processors or controllers running applications 5202. The multiple radios within the vehicle 5200 may be interfaced via a common V2X convergence function 5204.

In some aspects, power efficiency of a V2X device (e.g., vehicle 5200) may be improved by using one radio for traffic management of some or all of the other radios and to wake up a certain radio when there is a need for it. For example, a lower power radio may receive the trigger for waking up other radios if/when needed, which could be based on the traffic needs. For example, a Bluetooth radio may be used for music streaming within the vehicle 5200 for purposes of power saving however, in instances when data transmission to other vehicle or to the V2X infrastructure is needed, then the Wi-Fi or cellular radios may be brought up based on availability and context.

In some aspects, the convergence function 5202 may also optimize the overall power by routing the traffic depending on the amount of data to be transmitted to the radio, which provides power efficiency. For example, a low power radio may be used for performing management tasks that do not require significant tasks and control data, and the high bandwidth radio may be activated and used for large data transfers.

Referring to FIG. 52, the Wi-Fi radio 5206 within the vehicle 5200 may perform periodic reporting 5210 to the convergence function 5204 of bandwidth estimate and measured interference. Similarly, the LTE radio 5208 may perform periodic reporting 5212 to the convergence function 5204 of bandwidth estimate and measured interference. Additionally, the applications 5202 running on one or more processors or controllers within the vehicle 5200 may perform periodic reporting 5214 to the convergence function 5204 of various application requirements (e.g., requirements for bandwidth or usage of certain radio or radios for data communication). At 5216, the convergence function 5204 may make one or more determinations or decisions regarding duty cycle and transmit scheduling associated with each radio available within the vehicle 5200. Corresponding application routing and transmit scheduling information 5218 and 5220 may be communicated to the LTE radio 5208 and the Wi-Fi radio 5206 respectively.

Figure 53:
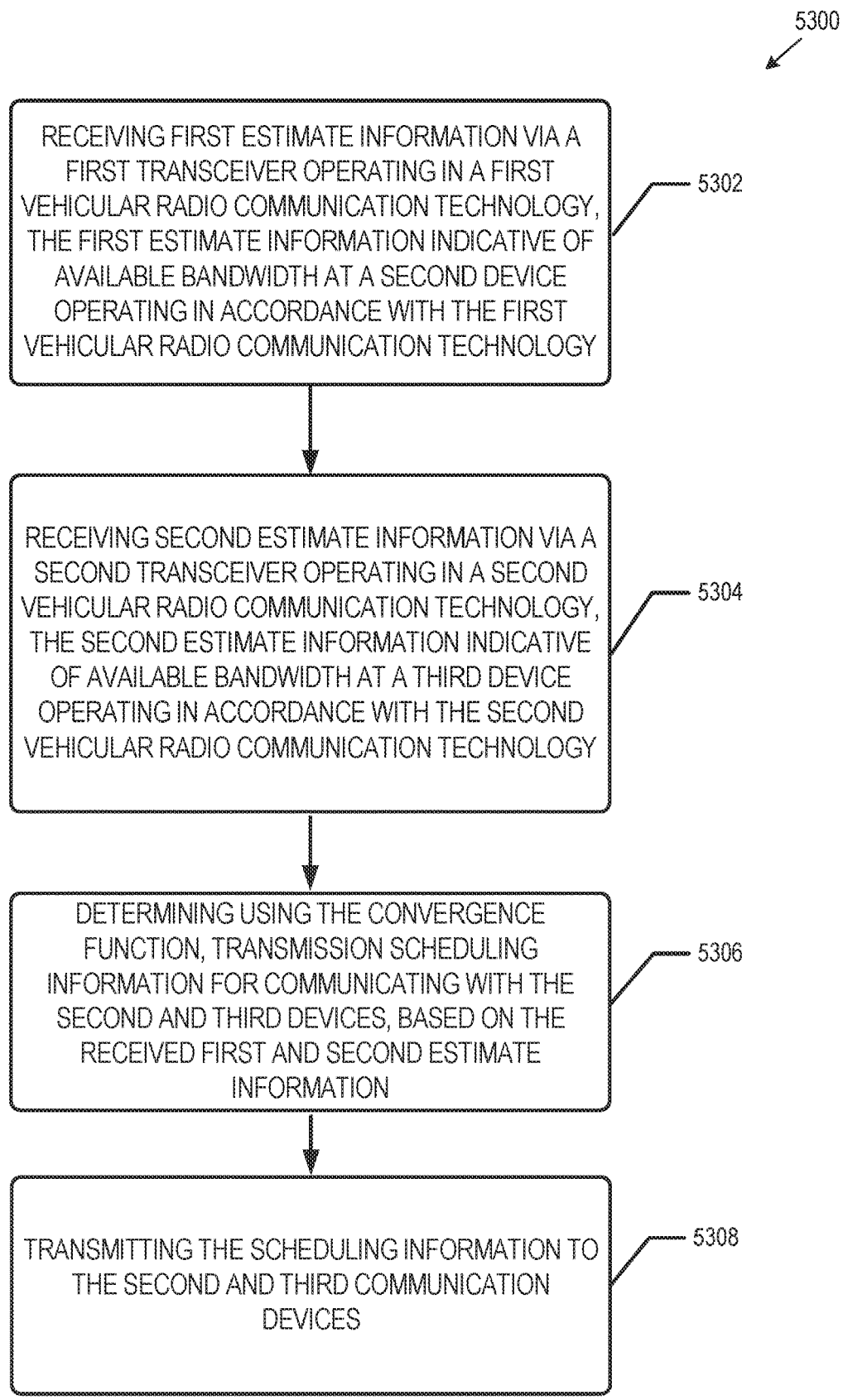
FIG. 53 illustrates a flow diagram of example operations for performing transmission scheduling based on convergence of communication radios of a single device according to some aspects described herein.

FIG. 53 illustrates an exemplary flow diagram of example operations for performing transmission scheduling based on convergence of communication radios of a single device according to some aspects described herein. Referring to FIG. 52 and FIG. 53, the example method 5300 for vehicular radio communications may start at operation 5302, when first estimate information is received via a first transceiver of a plurality of available transceivers operating in a first vehicular radio communication technology of a plurality of vehicular radio communication technologies. The first estimate information may be indicative of available bandwidth at a second communication device operating in accordance with the first vehicular radio communication technology. For example, the Wi-Fi radio 5206 may communicate bandwidth estimate information via the periodic reporting 5210 to the convergence function 5204. The bandwidth estimate may be indicative of Wi-Fi bandwidth that is available at an access point, which the Wi-Fi radio 5206 may be communicating with, or Wi-Fi bandwidth available at the vehicle 5200 as determined by the Wi-Fi radio 5206.

At operation 5304, second estimate information is received via a second transceiver of the plurality of transceivers operating in a second vehicular radio communication technology of the plurality of vehicular radio communication technologies. The second estimate information may be indicative of available bandwidth at a third communication device operating in accordance with the second vehicular radio communication technology. For example, the LTE radio 5208 may communicate bandwidth estimate information via the periodic reporting 5212 to the convergence function 5204. The bandwidth estimate may be indicative of cellular bandwidth that is available at a base station or base station, which the LTE radio 5208 is communicating with, or cellular bandwidth available at the vehicle 5200 as determined by the LTE radio 5208.

At operation 5306, transmission scheduling information for communicating with the second and third communication devices is determined using the convergence function, based on the received first and second estimate information. For example, the convergence function 5204 may determine (at 5216) duty cycle and transmit scheduling for each radio.

At operation 5308, the scheduling information may be transmitted to the second and third communication devices. For example, the convergence function 5204 may communicate the scheduling information to the respective radios (e.g. 5218 and 5220). Optionally, the convergence function 5204 may also communicate the transmit scheduling information to the base station and the access point that the LTE radio 5208 and the Wi-Fi radio 5206 are in communication with (e.g., via communication links between the convergence function 5204 at the vehicle 5200 and convergence functions available at the base station and the access point).

Figure 54:
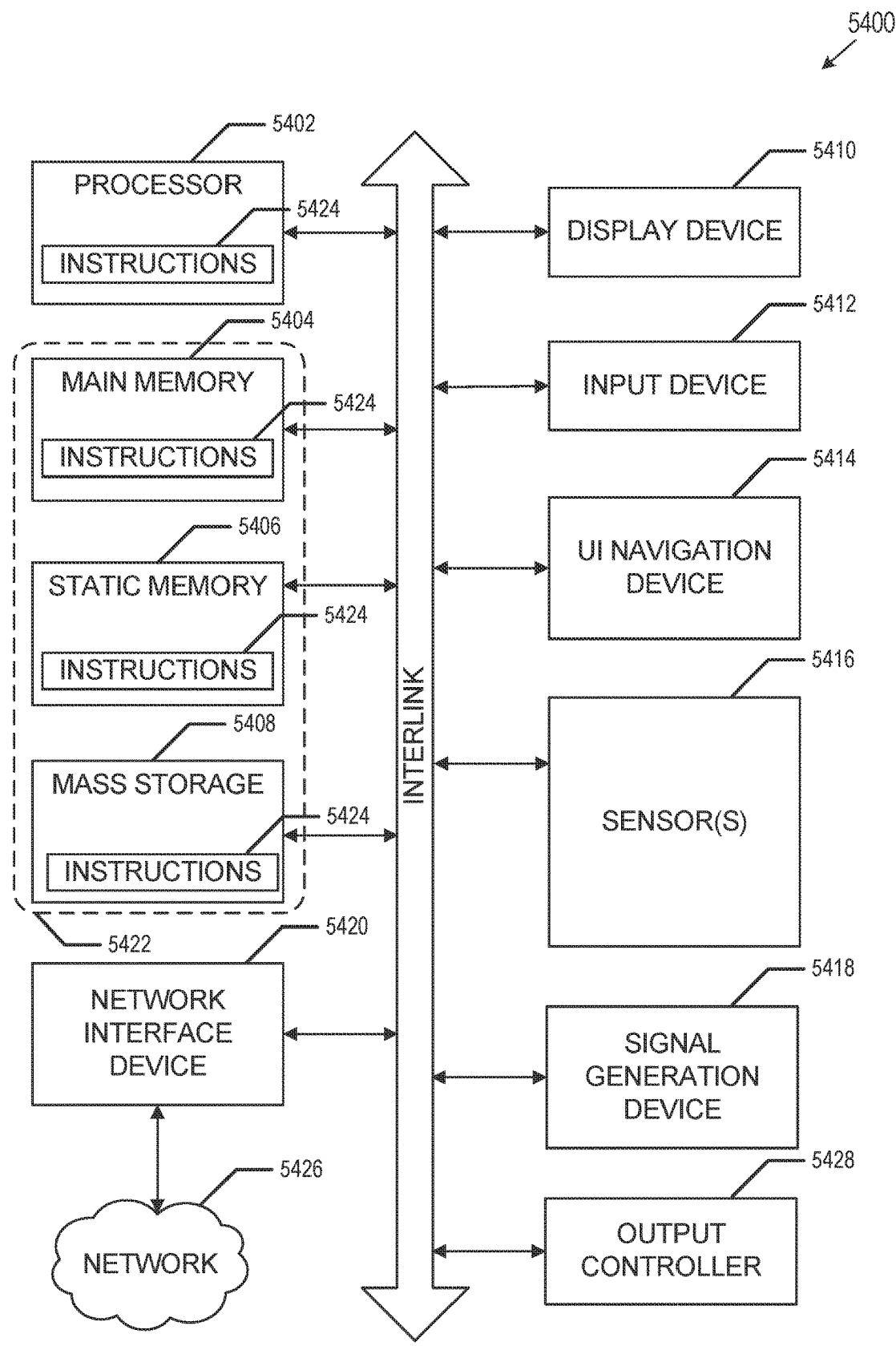
FIG. 54 is an exemplary block diagram illustrating an example of a machine, up on which one or more aspects may be implemented according to some aspects described herein.

FIG. 54 illustrates an exemplary block diagram of an example machine 5400 upon which any one or more of the techniques (e.g., methodologies) discussed herein may be performed. Examples, as described herein, may include, or may operate by, logic or a number of components, or mechanisms in the machine 5400. Circuitry (e.g., processing circuitry) is a collection of circuits implemented in tangible entities of the machine 5400 that include hardware (e.g., simple circuits, gates, logic, etc.). Circuitry membership may be flexible over time. Circuitries include members that may, alone or in combination, perform specified operations when operating.

In an aspect, hardware of the circuitry may be immutably designed to carry out a specific operation (e.g., hardwired). In an aspect, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 5400 follow.

In alternative aspects, the machine 5400 may operate as a standalone device or may be connected (e.g., networked) to other machines. In a networked deployment, the machine 5400 may operate in the capacity of a server machine, a client machine, or both in server-client network environments. In an example, the machine 5400 may act as a peer machine in peer-to-peer (P2P) (or other distributed) network environment. The machine 5400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing software as a service (SaaS), other computer cluster configurations.

The machine (e.g., computer system) 5400 may include a hardware processor 5402 (e.g, a central processing unit (CPU), a graphics processing unit (GPU), a hardware processor core, or any combination thereof), a main memory 5404, a static memory (e.g., memory or storage for firmware, microcode, a basic-input-output (BIOS), unified extensible firmware interface (UEFI), etc.) 5406, and mass storage 5408 (e.g., hard drive, tape drive, flash storage, or other block devices) some or all of which may communicate with each other via an interlink (e.g., bus) 5430. The machine 5400 may further include a display unit 5410, an alphanumeric input device 5412 (e.g., a keyboard), and a user interface (UI) navigation device 5414 (e.g, a mouse). In an example, the display unit 5410, input device 5412 and UI navigation device 5414 may be a touch screen display. The machine 5400 may additionally include a storage device (e.g., drive unit) 5408, a signal generation device 5418 (e.g., a speaker), a network interface device 5420, and one or more sensors 5416, such as a global positioning system (GP S) sensor, compass, accelerometer, or other sensor. The machine 5400 may include an output controller 5428, such as a serial (e.g., universal serial bus (USB), parallel, or other wired or wireless (e.g., infrared (IR), near field communication (NFC), etc.) connection to communicate or control one or more peripheral devices (e.g, a printer, card reader, etc.).

Registers of the processor 5402, the main memory 5404, the static memory 5406, or the mass storage 5408 may be, or include, a machine-readable medium 5422 on which is stored one or more sets of data structures or instructions 5424 (e.g., software) embodying or utilized by any one or more of the techniques or functions described herein. The instructions 5424 may also reside, completely or at least partially, within any of registers of the processor 5402, the main memory 5404, the static memory 5406, or the mass storage 5408 during execution thereof by the machine 5400. In an aspect, one or any combination of the hardware processor 5402, the main memory 5404, the static memory 5406, or the mass storage 5408 may constitute the machine-readable media 5422. While the machine-readable medium 5422 is illustrated as a single medium, the term "machine-readable medium" may include a single medium or multiple media (e.g., a centralized or distributed database, or associated caches and servers) configured to store the one or more instructions 5424.

The term "machine-readable medium" may include any medium that is capable of storing encoding or carrying instructions for execution by the machine 5400 and that cause the machine 5400 to perform any one or more of the techniques of the present disclosure, or that is capable of storing encoding or carrying data structures used by or associated with such instructions. Non-limiting machine-readable medium examples may include solid-state memories, optical media, magnetic media, and signals (e.g., radio frequency signals, other photon based signals, sound signals, etc.). In an aspect, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 5424 may be further transmitted or received over a communications network 5426 using a transmission medium via the network interface device 5420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi, IEEFE 802.16 family of standards known as WiMax®), IEEE 802.15.4 family of standards, peer-to-peer (P2P) networks, among others. In an example, the network interface device 5420 may include one or more physical jacks (e.g., Ethernet, coaxial, or phone jacks) or one or more antennas to connect to the communications network 5426.

In some aspects, the network interface device 5420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing encoding or carrying instructions for execution by the machine 5400, and includes digital or analog communications signals or other intangible medium to facilitate communication of such software. A transmission medium is a machine-readable medium.

Additional Notes and Aspects:

Example 1 is a multi-radio access technology (RAT) device, the device comprising: a transceiver interface including multiple connections to communicate with multiple transceiver chains, the multiple transceiver chains supporting multiple RATs; and a hardware processor configured to: receive a communication associated with one or more of the multiple RATs; and control the multiple transceiver chains via the multiple connections of the transceiver interface to coordinate the multiple RATs to complete the communication.

In Example 2, the subject matter of Example 1 includes, wherein the transceiver interface further comprises a multi-link coder configured to: receive via a first transceiver chain of the multiple transceiver chains, a data stream from a first communication node via a communication link associated with a first RAT of the multiple RATs; apply a code to the data stream to generate an encoded data stream; and replicate the encoded data stream to generate a plurality of encoded data streams, the plurality of encoded data streams for transmission to at least a second communication node via one or more other communication links of the first transceiver chain.

In Example 3, the subject matter of Example 2 includes, wherein the plurality of encoded data streams includes a first encoded data stream, and the hardware processor is configured to control transmission of the first encoded data stream to the first communication node via the first RAT communication link of the first transceiver chain.

In Example 4, the subject matter of Example 3 includes, wherein the plurality of encoded data streams includes at least a second encoded data stream, and the hardware processor is configured to control transmission of the at least second encoded data stream to at least the second communication node via the one or more other communication links of the first transceiver chain.

In Example 5, the subject matter of Example 4 includes, wherein the one or more other communication links are associated with the first RAT of the multiple RATs.

In Example 6, the subject matter of Examples 2-5 includes, wherein the hardware processor is configured to control transmission of the plurality of encoded data streams to the at least second communication node via one or more communication links of a second transceiver chain of the multiple transceiver chains.

In Example 7, the subject matter of Example 6 includes, wherein the one or more communication links of the second transceiver chain are associated with one or more RATs of the multiple RATs that are different from the first RAT.

In Example 8, the subject matter of Examples 2-7 includes, wherein the code includes one or more of: a repetition code; a systematic code; a raptor code; or a fountain code.

In Example 9, the subject matter of Examples 1-8 includes, wherein the transceiver interface further comprises a multi-link coder configured to: receive via a first transceiver chain of the multiple transceiver chains, a data stream from a first communication node via a communication link associated with a first RAT of the multiple RATs; apply a systematic code to the data stream to generate an encoded data stream; and replicate the encoded data stream to generate a first encoded data stream with information bits associated with the data stream, and at least a second encoded data stream with parity bits, the parity bits for decoding the information bits.

In Example 10, the subject matter of Example 9 includes, wherein the hardware processor is configured to control transmission of the first encoded data stream to the first communication node via the first RAT communication link of the first transceiver chain.

In Example 11, the subject matter of Examples 9-10 includes, wherein the hardware processor is configured to control transmission of the at least second encoded data stream to at least a second communication node via one or more other communication links of the first transceiver chain.

In Example 12, the subject matter of Example 11 includes, wherein the one or more other communication links are associated with the first RAT of the multiple RATs.

In Example 13, the subject matter of Examples 9-12 includes, wherein the hardware processor is configured to control transmission of the at least second encoded data stream to at least a second communication node via one or more communication links of a second transceiver chain of the multiple transceiver chains.

In Example 14, the subject matter of Example 13 includes, wherein the one or more communication links of the second transceiver chain are associated with one or more RATs of the multiple RATs that are different from the first RAT.

In Example 15, the subject matter of Examples 9-14 includes, wherein the transceiver interface further comprises an interleaver configured to interleave the encoded data stream.

In Example 16, the subject matter of Examples 9-15 includes, wherein the multi-link coder is within a protocol layer of a plurality of protocol layers for at least one protocol stack of the device.

In Example 17, the subject matter of Example 16 includes, wherein the multi-link coder is configured to interface with the multiple transceiver chains via a common convergence layer within the at least one protocol stack of the device.

In Example 18, the subject matter of Examples 16-17 includes, wherein the plurality of protocol layers comprise: a physical (PHY) layer; a media access control (MAC) layer; a radio link control (RLC) layer; and a packet data convergence protocol (PDCP) layer.

In Example 19, the subject matter of Examples 16-18 includes, wherein the multi-link coder is configured to: receive the data stream from a first protocol layer of the plurality of protocol layers; and output the first encoded data stream and the at least second encoded data stream to at least a second protocol layer of the plurality of protocol layers.

In Example 20, the subject matter of Examples 9-19 includes, wherein the multi-link coder is configured to: receive one or more of a packet reception acknowledgement, a quality of service (QoS) indicator, and channel quality feedback information; and adjust one or more of coding redundancy level, a number of output communication links for transmission of the first encoded data stream and the at least second encoded data stream, and a number of retransmissions of the first encoded data stream and the at least second encoded data stream based on the packet reception acknowledgement, the QoS, or the channel quality feedback information.

Example 21 is a multi-radio access technology (RAT) device, the device comprising: means for communicating with multiple transceiver chains, the multiple transceiver chains supporting multiple RATs; means for receiving a communication associated with one or more of the multiple RATs; and means for controlling the multiple transceiver chains to coordinate the multiple RATs to complete the communication.

In Example 22, the subject matter of Example 21 includes, means for receiving via a first transceiver chain of the multiple transceiver chains, a data stream from a first communication node via a communication link associated with a first RAT of the multiple RATs; means for applying a code to the data stream to generate an encoded data stream; and means for replicating the encoded data stream to generate a plurality of encoded data streams, the plurality of encoded data streams for transmission to at least a second communication node via one or more other communication links of the first transceiver chain.

In Example 23, the subject matter of Example 22 includes, means for controlling transmission of the plurality of encoded data streams to the at least second communication node via one or more communication links of a second transceiver chain of the multiple transceiver chains.

In Example 24, the subject matter of Examples 21-23 includes, means for receiving via a first transceiver chain of the multiple transceiver chains, a data stream from a first communication node via a communication link associated with a first RAT of the multiple RATs; means for applying a systematic code to the data stream to generate an encoded data stream; and means for replicating the encoded data stream to generate a first encoded data stream with information bits associated with the data stream, and at least a second encoded data stream with parity bits, the parity bits for decoding the information bits.

In Example 25, the subject matter of Example 24 includes, means for controlling transmission of the first encoded data stream to the first communication node via the first RAT communication link of the first transceiver chain.

In Example 26, the subject matter of Examples 24-25 includes, means for controlling transmission of the at least second encoded data stream to at least a second communication node via one or more other communication links of the first transceiver chain.

In Example 27, the subject matter of Examples 24-26 includes, means for controlling transmission of the at least second encoded data stream to at least a second communication node via one or more communication links of a second transceiver chain of the multiple transceiver chains.

In Example 28, the subject matter of Examples 24-27 includes, means for interleaving the encoded data stream.

In Example 29, the subject matter of Examples 24-28 includes, means for interfacing with the multiple transceiver chains via a common convergence layer within at least one protocol stack of the device.

In Example 30, the subject matter of Examples 24-29 includes, means for receiving the data stream from a first protocol layer of a plurality of protocol layers for at least one protocol stack of the device; and means for outputting the first encoded data stream and the at least second encoded data stream to at least a second protocol layer of the plurality of protocol layers.

In Example 31, the subject matter of Examples 24-30 includes, means for receiving one or more of a packet reception acknowledgement, a quality of service (QoS) indicator, and channel quality feedback information; and means for adjusting one or more of coding redundancy level, a number of output communication links for transmission of the first encoded data stream and the at least second encoded data stream, and a number of retransmissions of the first encoded data stream and the at least second encoded data stream based on the packet reception acknowledgement, the QoS, or the channel quality feedback information.

In Example 32, the subject matter of Examples 1-31 includes, wherein the multiple RATs include a plurality of available RATs, and wherein the hardware processor, to complete the communication, is configured to: receive measurement information from a vehicular terminal device via a first multi-radio communication link associated with at least a first RAT of the plurality of available RATs; configure via a second multi-radio communication link, a secondary communication node for communication with the vehicular terminal device; and encode, for transmission to the vehicular terminal device, configuration information associated with the secondary communication node, the configuration information for establishing a third multi-radio communication link between the secondary communication node and the vehicular terminal device.

In Example 33, the subject matter of Example 32 includes, wherein each of the first, second, and third multi-radio communication links are configured to use one or more of the plurality of available RATs.

In Example 34, the subject matter of Examples 32-33 includes, wherein the first multi-radio communication link is 3GPP carrier aggregated communication link, and the hardware processor is an evolved Node-B (eNB) Radio Resource Controller (RRC).

In Example 35, the subject matter of Examples 32-34 includes, wherein the measurement information includes vehicle location information associated with a vehicular terminal device.

In Example 36, the subject matter of Example 35 includes, wherein the hardware processor is further configured to: estimate a future vehicle location associated with the vehicular terminal device based on the vehicle location information; and select the secondary communication node from a plurality of nodes based on the estimated future vehicle location.

In Example 37, the subject matter of Examples 32-36 includes, wherein the measurement information includes channel quality information for one or more available channels at the vehicular terminal device, the one or more available channels associated with at least one of the plurality of RATs.

In Example 38, the subject matter of Example 37 includes, wherein to configure the secondary communication node, the hardware processor is configured to: select the secondary communication node from a plurality of nodes based the channel quality information for the one or more available channels at the vehicular terminal device.

In Example 39, the subject matter of Example 38 includes, wherein to configure the secondary communication node, the hardware processor is configured to: encode for transmission to the secondary communication node, an indication of a RAT of the plurality of available RATs selected for use with the third multi-radio communication link between the secondary communication node and the vehicular terminal device, based on the channel quality information for the one or more available channels at the vehicular terminal device.

In Example 40, the subject matter of Example 39 includes, wherein the configuration information associated with the secondary communication node includes an indication of the selected RAT for use with the third multi-radio communication link between the secondary communication node and the vehicular terminal device.

In Example 41, the subject matter of Examples 32-40 includes, wherein the primary communication node is an evolved Node-B (eNB) and the secondary communication node is a roadside unit (RSU).

In Example 42, the subject matter of Examples 32-41 includes, wherein the device is configured for dual connectivity with the primary communication node and the secondary communication node.

In Example 43, the subject matter of Example 42 includes, wherein, during the dual connectivity, the first multi-radio communication link and the third multi-radio communication link are simultaneously active.

In Example 44, the subject matter of Example 43 includes, wherein, during the dual connectivity, the first multi-radio communication link is used for data communication and the third multi-radio communication link is used for communication of control information.

In Example 45, the subject matter of Examples 43-44 includes, wherein the second multi-radio communication link is a backhaul data connection for the first multi-radio communication link between the vehicular terminal device and the primary communication node.

In Example 46, the subject matter of Examples 32-45 includes, wherein the multiple RATs include at least two of: a dedicated short-range communication (DSRC) radio access technology; wireless access vehicular environment (WAVE) radio access technology; Bluetooth radio access technology; an IEEE 802.11 radio access technology; an LTE radio access technology; or a 5G radio access technology.

In Example 47, the subject matter of Examples 32-46 includes, wherein the measurement information from the vehicular terminal device includes measurement information for a plurality of nodes accessible by the device.

In Example 48, the subject matter of Example 47 includes, wherein the hardware processor is further configured to: select the secondary communication node from the plurality of nodes, for communication with the vehicular terminal device based on the measurement information.

In Example 49, the subject matter of Examples 32-48 includes, wherein the multiple transceiver chains are interconnected via a convergence function.

In Example 50, the subject matter of Examples 21-49 includes, means for receiving measurement information from a vehicular terminal device via a first multi-radio communication link associated with at least a first RAT of a plurality of available RATs; means for configuring via a second multi-radio communication link, a secondary communication node for communication with the vehicular terminal device; and means for encoding for transmission to the vehicular terminal device, configuration information associated with the secondary communication node, the configuration information for establishing a third multi-radio communication link between the secondary communication node and the vehicular terminal device.

In Example 51, the subject matter of Examples 32-50 includes, wherein each of the first, second, and third multi-radio communication links are configured to use one or more of the plurality of available RATs.

In Example 52, the subject matter of Examples 50-51 includes, means for estimating a future vehicle location associated with a vehicular terminal device based on a vehicle location information associated with the vehicular terminal device; and means for selecting the secondary communication node from a plurality of nodes based on the estimated future vehicle location.

In Example 53, the subject matter of Examples 50-52 includes, wherein the measurement information includes channel quality information for one or more available channels at the vehicular terminal device, the one or more available channels associated with at least one of the plurality of RATs, the device further comprising: means for selecting the secondary communication node from a plurality of nodes based on the channel quality information for the one or more available channels at the vehicular terminal device.

In Example 54, the subject matter of Example 53 includes, means for encoding for transmission to the secondary communication node, an indication of a RAT of the plurality of available RATs selected for use with the third multi-radio communication link between the secondary communication node and the vehicular terminal device, based on the channel quality information for the one or more available channels at the vehicular terminal device.

In Example 55, the subject matter of Examples 50-54 includes, wherein the measurement information from the vehicular terminal device includes measurement information for a plurality of nodes accessible by the device, and the device further comprising: means for selecting the secondary communication node from the plurality of nodes, for communication with the vehicular terminal device based on the measurement information.

In Example 56, the subject matter of Examples 49-55 includes, wherein the hardware processor is configured to: receive a connection with a communication device using a first transceiver of the multiple transceiver chains and a first RAT of the multiple RATs; receive, at the convergence function, credentials information associated with an active communication link between the communication device and a second communication device, the active communication link using a second RAT from the multiple RATs; and provide the credentials information to the communication device to establish a communication link with the third communication device based on the credentials information.

In Example 57, the subject matter of Example 56 includes, wherein the hardware processor is configured to: establish an inter-convergence function interface between the convergence function and a convergence function at the communication device.

In Example 58, the subject matter of Example 57 includes, wherein hardware processor is configured to: receive via the established connection and the inter-convergence function interface, device capabilities information indicative of vehicular radio communication technologies available at the communication device; and receive the credentials information upon determining the second vehicular radio communications technology is available at both the communication device and the second communication device.

In Example 59, the subject matter of Examples 56-58 includes, wherein the convergence function comprises a convergence function component in each of a plurality of media access control (MAC) layers, the plurality of MAC layers corresponding to the plurality of available vehicular radio communication technologies.

In Example 60, the subject matter of Examples 56-59 includes, wherein the convergence function comprises a media access control (MAC) layer that is common to the plurality of available vehicular radio communication technologies.

In Example 61, the subject matter of Example 60 includes, wherein hardware processor is configured to: dynamically place the convergence function as the MAC layer that is common to the multiple RATs upon detecting incompatibility between at least one of the plurality of vehicular radio communication technologies available at the device and at least one of a plurality of vehicular radio communication technologies available at the communication device.

In Example 62, the subject matter of Examples 56-61 includes, wherein the plurality of vehicular radio communication technologies includes one or more of: a dedicated short-range communication (DSRC) radio communication technology; wireless access vehicular environment (WAVE) radio communication technology; Bluetooth radio communication technology; an IEEE 802.11 radio communication technology; an LTE radio communication technology; or a 5G radio communication technology.

In Example 63, the subject matter of Example 62 includes, wherein the first vehicular radio communication technology is the Bluetooth radio communication technology, and the second vehicular radio communication technology is the IEEE 802.11 radio communication technology, the LTE radio communication technology, or the 5G radio communication technology.

In Example 64, the subject matter of Examples 56-63 includes, wherein the hardware processor is configured to: receive, via an inter-convergence function interface between the convergence function and the convergence function at the communication device, a confirmation that the communication link between the communication device and the second communication device is deactivated.

In Example 65, the subject matter of Example 64 includes, wherein the hardware processor is configured to: establish the communication link with the third communication device based on the credentials information received via the convergence function at the second communication device up on receiving the confirmation.

In Example 66, the subject matter of Examples 56-65 includes, wherein the hardware processor is configured to: establish the connection with the communication device using a hardwired docking connection between the device and the communication device.

In Example 67, the subject matter of Examples 56-66 includes, wherein the credentials information is associated with activating a transceiver at the communication device for operation using the second RAT.

In Example 68, the subject matter of Example 67 includes, wherein the hardware processor is configured to: activate a second transceiver of the multiple transceiver chains to operate as a hotspot based on the credentials information.

In Example 69, the subject matter of Example 68 includes, wherein the hardware processor is configured to: establish a communication link between the convergence function and a second transceiver at the communication device via the convergence function of the communication device.

In Example 70, the subject matter of Examples 49-69 includes, means for receiving a connection with a communication device using a first transceiver of the multiple transceiver chains and a first RAT of the multiple RATs; means for receiving at the convergence function, credentials information associated with an active communication link between the communication device and a second communication device, the active communication link using a second RAT from the multiple RATs; and means for providing the credentials information to the communication device to establish a communication link with the third communication device based on the credentials information.

In Example 71, the subject matter of Example 70 includes, means for establishing an inter-convergence function interface between the convergence function and a convergence function at the communication device.

In Example 72, the subject matter of Example 71 includes, means for receiving via the established connection and the inter-convergence function interface, device capabilities information indicative of vehicular radio communication technologies available at the communication device; and means for receiving the credentials information up on determining the second vehicular radio communications technology is available at both the communication device and the second communication device.

In Example 73, the subject matter of Examples 70-72 includes, wherein the convergence function comprises a media access control (MAC) layer that is common to the plurality of available vehicular radio communication technologies, the device further comprising: means for dynamically p lacing the convergence function as the MAC layer that is common to the multiple RATs upon detecting incompatibility between at least one of the plurality of vehicular radio communication technologies available at the device and at least one of a plurality of vehicular radio communication technologies available at the communication device.

In Example 74, the subject matter of Examples 70-73 includes, means for receiving using an inter-convergence function interface between the convergence function and the convergence function at the communication device, a confirmation that the communication link between the communication device and the second communication device is deactivated.

In Example 75, the subject matter of Example 74 includes, means for establishing the communication link with the third communication device based on the credentials information received via the convergence function at the second communication device up on receiving the confirmation.

In Example 76, the subject matter of Examples 70-75 includes, means for establishing the connection with the communication device using a hardwired docking connection between the device and the communication device.

In Example 77, the subject matter of Examples 70-76 includes, wherein the credentials information is associated with activating a transceiver at the communication device for operation using the second RAT, and wherein the device further comprising: means for activating a second transceiver of the multiple transceiver chains to operate as a hotspot based on the credentials information.

In Example 78, the subject matter of Example 77 includes, means for establishing a communication link between the convergence function and a second transceiver at the communication device via the convergence function of the communication device.

In Example 79, the subject matter of Examples 69-78 includes, wherein the second transceiver at the second communication device is configured to operate as an LTE backhaul for the hotspot.

In Example 80, the subject matter of Examples 49-79 includes, a link quality estimator; wherein the vehicular terminal device is within a first vehicle; wherein the hardware processor is configured to: receive a broadcast message via a fourth multi-radio communication link associated with one of the plurality of available RATs; and determine, based on the received broadcast message, a link quality of the fourth multi-radio communication link; and wherein the link quality estimator is configured to: store, within a link quality ranking list, a link quality indicator representing the link quality of the fourth multi-radio communication link in accordance with the measurement information; and rank the link quality indicator within a link quality ranking list, the link quality ranking list including one or more additional link quality indicators representing one or more additional link qualities of one or more additional multi-radio communication links, wherein the link quality indicators are ordered in the link quality ranking list according to a predetermined ranking factor.

In Example 81, the subject matter of Example 80 includes, wherein, to determine the link quality indicator, the hardware processor decodes, from the broadcast message, measurement information indicative of a link quality of the fourth multi-radio communication link.

In Example 82, the subject matter of Examples 80-81 includes, wherein, to determine the link quality indicator, the hardware processor measures a received signal strength, the received signal strength representing a link quality of the fourth multi-radio communication link.

In Example 83, the subject matter of Examples 80-82 includes, wherein, to determine the link quality indicator, the hardware processor tracks one or more packet errors associated with the received broadcast message.

In Example 84, the subject matter of Examples 80-83 includes, wherein the device is a second vehicular terminal device and the hardware processor of the second vehicular terminal device is configured to receive the broadcast message, via the fourth multi-radio communication link, from the vehicular terminal device of the first vehicle.

In Example 85, the subject matter of Example 84 includes, wherein the hardware processor is configured to receive the broadcast message, via the convergence function, from a first convergence function of the vehicular terminal device.

In Example 86, the subject matter of Examples 80-85 includes, wherein the predetermined ranking factor includes an indication of a broadcast message type.

In Example 87, the subject matter of Examples 84-86 includes, wherein the predetermined ranking factor is a distance between the first vehicle and the second vehicle.

In Example 88, the subject matter of Examples 80-87 includes, wherein the hardware processor of the second vehicular terminal device is configured to receive the broadcast message, via the fourth multi-radio communication link, from a roadside unit (RSU).

In Example 89, the subject matter of Examples 80-88 includes, wherein the hardware processor of the second vehicular terminal device is configured to receive the broadcast message, via the fourth multi-radio communication link, from an evolved Node-B (eNB).

In Example 90, the subject matter of Examples 80-89 includes, wherein the link quality estimator is configured to rank the link quality indicator according to both the predetermined ranking factor and context information associated with the vehicular terminal device or the second vehicular terminal device.

In Example 91, the subject matter of Example 90 includes, wherein the hardware processor receives the context information from one or more applications of the vehicular terminal device or the second vehicular terminal device.

In Example 92, the subject matter of Examples 90-91 includes, wherein the context information is location information associated with the first vehicle, second vehicle, or one or more additional vehicles.

In Example 93, the subject matter of Examples 90-92 includes, wherein the context information is sensor data associated with one or more sensors of the first vehicle, second vehicle, or one or more additional vehicles.

In Example 94, the subject matter of Examples 80-93 includes, wherein the link quality estimator is configured to: discard, from the link quality ranking list, one or more link quality indicators based on the predetermined ranking factor.

In Example 95, the subject matter of Examples 90-94 includes, wherein the link quality estimator is configured to: discard, from the link quality ranking list, one or more link quality indicators based on the predetermined ranking factor and the context information.

In Example 96, the subject matter of Examples 80-95 includes, wherein the link quality estimator is configured to: identify a high priority link quality indicator within the link quality ranking list, the high priority link quality indicator representing a high priority multi-radio communication link, wherein the high priority multi-radio communication link has a link quality below a specified quality threshold.

In Example 97, the subject matter of Example 96 includes, wherein the second vehicular terminal device includes an antenna array comprising a plurality of multiple-input-multiple-output (MIMO) antennas coupled to a plurality of available transceivers and the hardware processor is configured to improve the link quality of the high priority multi-radio communication link by modifying a direction of a radiation pattern of at least a subset of the MIMO antennas according to a direction of the high priority multi-radio communication link.

In Example 98, the subject matter of Examples 96-97 includes, wherein, to imp rove the link quality of the high priority multi-radio communication, the hardware processor reduces a packet size of a packet for transmission by the second vehicular terminal device, via the high priority multi-radio communication link, by removing one or more information elements from the packet.

In Example 99, the subject matter of Examples 96-98 includes, wherein, to imp rove the link quality of the high priority multi-radio communication, the hardware processor encodes for transmission by the second vehicular terminal device, via the high priority multi-radio communication link, a packet including one or more codes indicating a high priority message.

In Example 100, the subject matter of Examples 96-99 includes, wherein, to improve the link quality of the high priority multi-radio communication, the hardware processor encodes for transmission by the second vehicular terminal device, via the high priority multi-radio communication link, a packet including an indication of sensor data associated with the first vehicle, second vehicle, or one or more additional vehicles.

In Example 101, the subject matter of Examples 96-100 includes, wherein, to improve the link quality of the high priority multi-radio communication, the hardware processor tracks a transmission window associated with a wireless medium, receives exclusive access of the wireless medium during the transmission window and transmits by the second vehicular terminal device during the transmission window, a packet including one or more information elements indicating a high priority message associated with the high priority multi-radio communication link.

In Example 102, the subject matter of Examples 96-101 includes, wherein, to improve the link quality of the high priority multi-radio communication, the hardware processor simultaneously transmits a signal associated with the high priority multi-radio communication link over two or more frequency bands.

In Example 103, the subject matter of Examples 96-102 includes, wherein, to improve the link quality of the high priority multi-radio communication, the hardware processor simultaneously transmits a signal associated with the high priority multi-radio communication link over two or more subsets of the MIMO antennas.

In Example 104, the subject matter of Examples 49-103 includes, wherein the convergence function is configured to: establish the third multi-radio communication link between the vehicular terminal device and the secondary communication node based on a current location of the vehicular terminal device.

In Example 105, the subject matter of Examples 32-104 includes, wherein the hardware processor is further configured to: receive the measurement information of the vehicular terminal device from the secondary communication node via the second multi-radio communication link.

In Example 106, the subject matter of Examples 32-105 includes, wherein each of the first, second, and third multi-radio communication links are configured to use a same one the plurality of available RATs at different communication frequencies.

In Example 107, the subject matter of Examples 1-106 includes, a first transceiver of the multiple transceiver chains, the first transceiver configured to communicate with a node using a communication link of a first RAT of the multiple RATs; a second transceiver of the multiple transceiver chains, the second transceiver configured to communicate with the node using one or more intermediate nodes and a communication link of a second RAT of the multiple RATs; and wherein the hardware processor, to complete the communication, is configured to: decode measurement information received from the node, the measurement information indicative of channel quality of the first RAT communication link; and determine to establish a new communication link with the one or more intermediate nodes, based on the decoded measurement information.

In Example 108, the subject matter of Example 107 includes, wherein the first transceiver is configured to communicate with the node using one or more other intermediate nodes and the first RAT communication link.

In Example 109, the subject matter of Examples 107-108 includes, a third transceiver of the multiple transceiver chains, the third transceiver configured to communicate with the node using the new communication link, the new communication link being one of the first RAT, the second RAT or a third RAT of the multiple RATs.

In Example 110, the subject matter of Examples 107-109 includes, wherein: the node is a user equipment (UE); and the device is a Radio Resource Controller (RRC) of an evolved Node-B (eNB).

In Example 111, the subject matter of Examples 107-110 includes, wherein the transceiver interface includes a vehicle-to-everything (V2X) convergence function providing a common interface between the multiple transceiver chains.

In Example 112, the subject matter of Example 111 includes, wherein the V2X convergence function is configured to: communicate with a V2X convergence function of the node via the first RAT communication link; and communicate with a V2X convergence function of the one or more intermediate nodes via the second RAT communication link.

In Example 113, the subject matter of Examples 107-112 includes, wherein the node is an eNB and the intermediate node is a roadside unit (RSU).

In Example 114, the subject matter of Examples 107-113 includes, wherein the device is a vehicular terminal device within a moving vehicle, and the measurement information includes a current location of the moving vehicle.

In Example 115, the subject matter of Example 114 includes, wherein the hardware processor is configured to: estimate a future location of the moving vehicle based on the current location; and select a second intermediate node of the one or more intermediate nodes based on node proximity to the future location; and establish the new communication link with the second intermediate node.

In Example 116, the subject matter of Examples 114-115 includes, wherein the multiple transceiver chains include at least one antenna array placed at a first location of a first surface of the vehicle and at least another antenna array placed on a second location of the first surface.

In Example 117, the subject matter of Example 116 includes, wherein the first surface is a roof of the vehicle.

In Example 118, the subject matter of Examples 116-117 includes, wherein the first surface is a hood of the vehicle.

In Example 119, the subject matter of Examples 114-118 includes, wherein the multiple transceiver chains include at least one antenna array etched into a front windshield of the vehicle.

In Example 120, the subject matter of Examples 116-119 includes, wherein the at least one antenna array shares a front end module with a radar communications module of the vehicle.

Example 121 is device of 116, wherein the at least one antenna array utilizes a front end module separate from a front end module utilized by a radar communications module of the vehicle.

In Example 122, the subject matter of Examples 107-121 includes, wherein the second RAT communication link includes a first communication link between the communication device and the intermediate node, and a second communication link between the intermediate node and the node.

In Example 123, the subject matter of Examples 107-122 includes, wherein the hardware processor is configured to: maintain the first RAT communication link to be active simultaneously with the second RAT communication link.

In Example 124, the subject matter of Examples 107-123 includes, wherein the multiple transceiver chains include an antenna array comprising a plurality of multiple-input-multiple-output (MIMO) antennas coupled to the plurality of available transceivers.

In Example 125, the subject matter of Example 124 includes, wherein: the first transceiver is configured to communicate with the node using the first RAT communication link and a first subset of the MIMO antennas; and the second transceiver is configured to communicate with the node using the second RAT communication link and a second subset of the MIMO antennas.

In Example 126, the subject matter of Examples 107-125 includes, wherein the second transceiver of the plurality of available transceivers is configured to communicate with the node using a communication link of a third RAT of the multiple RATs and without the use of the one or more intermediate nodes.

In Example 127, the subject matter of Example 126 includes, wherein the hardware processor is configured to: maintain both the first RAT communication link and the third RAT communication link for simultaneous connection to the node.

In Example 128, the subject matter of Example 127 includes, wherein the first RAT communication link comprises a data channel and the third RAT communication link comprises a control channel for communicating control information.

In Example 129, the subject matter of Example 128 includes, wherein the hardware processor is configured to: use at least a portion of the control information to control direct communication between a plurality of other nodes associated with the device in a communication framework, the direct communication using one or more RATs of the multiple RATs, the one or more RATs distinct from the third RAT.

In Example 130, the subject matter of Example 129 includes, wherein the communication framework is based on LTE dual connectivity framework.

In Example 131, the subject matter of Examples 107-130 includes, wherein the hardware processor is configured to: designate the first RAT as a primary RAT and the second RAT as a secondary RAT, based on one or more preferences associated with a vehicular terminal device; and modify, in response to a change in a network environment, the designation of the primary RAT and the secondary RAT, based on the one or more preferences.

In Example 132, the subject matter of Example 131 includes, wherein the change in the network environment is a change in a mobility environment of the vehicular terminal device.

In Example 133, the subject matter of Examples 131-132 includes, wherein the designation of the first RAT as the primary RAT and the second RAT as the secondary RAT is based on one or more network configurations.

In Example 134, the subject matter of Examples 131-133 includes, wherein the first RAT and the second RAT are each designated from a plurality of RATs including: a dedicated short-range communication (DSRC) radio access technology; wireless access vehicular environment (WAVE) radio access technology; Bluetooth radio access technology; an IEEE 802.11 radio access technology; an LTE radio access technology; or a 5G radio access technology.

In Example 135, the subject matter of Examples 131-134 includes, wherein the second transceiver is configured to communicate with the node without the use of one or more intermediate nodes via the communication link of the second RAT.

In Example 136, the subject matter of Examples 131-135 includes, wherein a preference includes a specification of one or more of a desired data throughput, cost factor, mobility factor associated with a vehicular terminal device, or a quality of service (QoS).

In Example 137, the subject matter of Examples 131-136 includes, wherein the change in a network environment includes a change in a network loading factor.

In Example 138, the subject matter of Examples 1-137 includes, wherein, to complete the communication, the hardware processor is configured to: establish a communication link with a first node using a first transceiver of the multiple transceiver chains and a first RAT of the multiple RATs; establish a communication link with a second node using a second transceiver of the multiple transceivers and a second RAT of the multiple RATs; receive via the first RAT communication link, first map data from the first node; receive via the second RAT communication link, second map data from the second node; and generate updated map data associated with a current location of the device based on the first map data and the second map data.

In Example 139, the subject matter of Example 138 includes, wherein: the device is a vehicular terminal device in a moving vehicle; the first node is a primary communication node; and the second node is a secondary communication node.

In Example 140, the subject matter of Example 139 includes, wherein the hardware processor is configured to: receive the first map data as a unicast message from the primary communication node.

In Example 141, the subject matter of Examples 139-140 includes, wherein the hardware processor is configured to: receive the first map data as a broadcast message from the primary communication node, wherein the first map data is broadcast to the communication device and to the secondary communication node.

In Example 142, the subject matter of Examples 138-141 includes, wherein the first map data is redundant with the second map data.

In Example 143, the subject matter of Examples 138-142 includes, wherein the first map data is non-redundant with the second map data, and wherein the hardware processor is configured to: combine the first map data and the second map data to generate the up dated map data.

In Example 144, the subject matter of Examples 1-143 includes, wherein a first transceiver chain from the multiple transceiver chains is configured to communicate with an infrastructure node using a communication link of a first RAT of the multiple RATs, and wherein, to complete the communication, the hardware processor is configured to: decode control information from the infrastructure node, the control information including vehicle-to-vehicle (V2V) device discovery information; and establish using a second transceiver chain of the multiple transceiver chains, a new communication link with a second node based on the V2V device discovery information, wherein the second transceiver chain is configured to communicate with the second node using a communication link of a second RAT of the multi-RAT.

In Example 145, the subject matter of Example 144 includes, wherein the second node is a line-of-sight (LOS) vehicle and the second RAT communication link is a V2V communication link based on one or more of a Wi-Fi Direct connectivity framework, a Wi-Fi Aware connectivity network, an LTE-Direct connectivity framework, or 5G connectivity network.

In Example 146, the subject matter of Examples 144-145 includes, wherein the first RAT communication link is an LTE or 5G communication link and is configured to provide control plane for managing V2V connectivity.

In Example 147, the subject matter of Examples 144-146 includes, wherein the control information from the infrastructure node further includes V2V resource allocation and V2V synchronization information to assist with establishment of the new communication link with the second node.

In Example 148, the subject matter of Examples 144-147 includes, wherein the hardware processor is configured to: establish the new communication link as a direct V2V link with the second node; and establish using a third transceiver chain of the multiple transceiver chains, another communication link with the second node via an intermediate node, based on the V2V device discovery information.

In Example 149, the subject matter of Example 148 includes, wherein the intermediate node is a roadside unit (RSU).

In Example 150, the subject matter of Examples 148-149 includes, wherein the hardware processor is configured to: decode sensor data received from the intermediate node, wherein the sensor data originates from a non-line-of-sight (NLOS) vehicle in communication with the intermediate node.

In Example 151, the subject matter of Examples 148-150 includes, wherein the hardware processor is configured to: encode data for redundant transmission to the second node via both the direct V2V link and via the another communication link with the second node via the intermediate node.

In Example 152, the subject matter of Examples 144-151 includes, wherein the first RAT communication link is a vehicle-to-infrastructure (V2I) link, the hardware processor is within a vehicle and is configured to receive assistance from the infrastructure node to enable direct V2V communication.

In Example 153, the subject matter of Examples 148-152 includes, wherein the second node and the intermediate node are cooperating vehicles that cooperate over V2V links to improve one or more quality characteristics of at least one V2I link associated with the communication device.

In Example 154, the subject matter of Examples 148-153 includes, wherein hardware processor is configured to: establish multiple communication links with the intermediate node, each communication link with the intermediate node using a different RAT of the multi-RAT.

In Example 155, the subject matter of Examples 1-154 includes, wherein a first transceiver chain from the multiple transceiver chains is configured to communicate with an infrastructure node using a communication link of a first RAT of the multiple RATs, and wherein, to complete the communication, the device further comprises: means for decoding control information from the infrastructure node, the control information including vehicle-to-vehicle (V2V) device discovery information; and means for establishing using a second transceiver chain of the multiple transceiver chains, a new communication link with a second node based on the V2V device discovery information, wherein the second transceiver chain is configured to communicate with the second node using a communication link of a second RAT of the multi-RAT.

In Example 156, the subject matter of Example 155 includes, wherein the second node is a line-of-sight (LOS) vehicle and the second RAT communication link is a V2V communication link based on one or more of a Wi-Fi Direct connectivity framework, a Wi-Fi Aware connectivity network, an LTE-Direct connectivity framework, or 5G connectivity network.

In Example 157, the subject matter of Examples 155-156 includes, wherein the first RAT communication link is an LTE or 5G communication link and is configured to provide control plane for managing V2V connectivity.

In Example 158, the subject matter of Examples 155-157 includes, wherein the control information from the infrastructure node further includes V2V resource allocation and V2V synchronization information to assist with establishment of the new communication link with the second node.

In Example 159, the subject matter of Examples 155-158 includes, means for establishing the new communication link as a direct V2V link with the second node; and means for establishing using a third transceiver chain of the multiple transceiver chains, another communication link with the second node via an intermediate node, based on the V2V device discovery information.

In Example 160, the subject matter of Example 159 includes, wherein the intermediate node is a roadside unit (RSU).

In Example 161, the subject matter of Examples 159-160 includes, means for decoding sensor data received from the intermediate node, wherein the sensor data originates from a non-line-of-sight (NLOS) vehicle in communication with the intermediate node.

In Example 162, the subject matter of Examples 159-161 includes, means for encoding data for redundant transmission to the second node via both the direct V2V link and via the another communication link with the second node via the intermediate node.

In Example 163, the subject matter of Examples 155-162 includes, wherein the first RAT communication link is a vehicle-to-infrastructure (V2I) link, the hardware processor is within a vehicle and is configured to receive assistance from the infrastructure node to enable direct V2V communication.

In Example 164, the subject matter of Examples 159-163 includes, wherein the second node and the intermediate node are cooperating vehicles that cooperate over V2V links to improve one or more quality characteristics of at least one V2I link associated with the communication device.

In Example 165, the subject matter of Examples 144-164 includes, wherein communications with the infrastructure node and the second node use one or more RATs of the multi-RAT and are combined over a physical (PHY) layer, a media access control (MAC) layer or a higher layer.

In Example 166, the subject matter of Examples 1-165 includes, wherein the hardware processor is configured to: access a list of available RATs that have been detected within a range of the device; and determine to establish a new communication link with a selected RAT of the available RATs based on compatibility of transmission requirements of the device with the selected RAT.

In Example 167, the subject matter of Example 166 includes, wherein the requirement includes one of a latency requirement, a reliability requirement, a throughput requirement, and a requirement of an application executing on the device.

In Example 168, the subject matter of Examples 166-167 includes, wherein the hardware processor is configured to select the selected RAT by accessing a database table, the database table indicating a relationship between the transmission requirements and at least one RAT of the list of available RATs.

In Example 169, the subject matter of Example 168 includes, wherein the database table is stored at the device.

In Example 170, the subject matter of Examples 168-169 includes, wherein the database table is stored at the node.

In Example 171, the subject matter of Examples 168-170 includes, wherein the database table is populated by measurements of a group of parameters taken by at least one device.

In Example 172, the subject matter of Example 171 includes, wherein the group of parameters to be measured are indicated by the node.

In Example 173, the subject matter of Examples 171-172 includes, wherein the group of parameters to be measured are indicated by the at least one device.

In Example 174, the subject matter of Examples 171-173 includes, wherein the group of parameters to be measured are partitioned among neighboring devices using device-to-device (D2D) communication.

In Example 175, the subject matter of Examples 166-174 includes, wherein the measurement information includes key performance indicators (KPIs) that characterize RATs of the list of available RATs.

In Example 176, the subject matter of Example 175 includes, wherein KPIs include at least two of latency, congestion level, load, voice support, data rates supported, range, power level, bands covered, signal conditions, coexistence capabilities, cryptographic cap abilities, and spectrum access method.

In Example 177, the subject matter of Example 176 includes, wherein KPIs further include an indication as to times at which a corresponding RAT is expected to be powered down.

In Example 178, the subject matter of Examples 168-177 includes, wherein the database table includes at least one validity indicator field to indicate trustworthiness of measurements.

In Example 179, the subject matter of Example 178 includes, wherein trustworthiness is based on at least one of a location where a corresponding measurement was taken, and a time of day when the corresponding measurement was taken.

In Example 180, the subject matter of Examples 166-179 includes, wherein the hardware processor is configured to: terminate usage of a RAT subsequent to detecting that operating conditions for the RAT have deteriorated below a threshold.

In Example 181, the subject matter of Examples 166-180 includes, wherein the hardware processor is configured to:

determine to establish a group of communication links with a selected group of RATs of the list of available RATs.

In Example 182, the subject matter of Example 181 includes, wherein the selected group of RATs is selected based upon a range KPI of RATs of the list of available RATs.

In Example 183, the subject matter of Examples 181-182 includes, wherein the selected group of RATs is selected based upon susceptibility of RATs of the list of available RATs to deep shadowing.

In Example 184, the subject matter of Examples 166-183 includes, wherein the list of available RATs is provided by the node.

In Example 185, the subject matter of Examples 166-184 includes, wherein the list of available RAT s is provided by a neighboring device using device-to-device (D2D) communication.

In Example 186, the subject matter of Examples 166-185 includes, wherein the hardware processor is configured to encode, for transmission to the node, a request to use a RAT of the list of available RATs.

In Example 187, the subject matter of Example 186 includes, wherein the hardware processor is configured to encode, for transmission to the node, a request to use a group of RATs of the list of available RATs.

In Example 188, the subject matter of Examples 166-187 includes, wherein the hardware processor is configured to: implement RAT hopping by selecting a first RAT for transmission of a first portion of a transmission and by selecting a second RAT for transmission of a second portion of the transmission.

In Example 189, the subject matter of Example 188 includes, wherein the hardware processor is configured to: select the first RAT for a control portion of a transmission; and select the second RAT for a data portion of the transmission.

In Example 190, the subject matter of Examples 1-189 includes, means for accessing a list of available RATs that have been detected within a range of the device; and means for determining to establish a new communication link with a selected RAT of the available RATs based on compatibility of transmission requirements of the device with the selected RAT.

In Example 191, the subject matter of Example 190 includes, wherein the requirement includes one of a latency requirement, a reliability requirement, a throughput requirement, and a requirement of an application executing on the device.

In Example 192, the subject matter of Examples 190-191 includes, means for selecting the selected RAT by accessing a database table, the database table indicating a relationship between the transmission requirements and at least one RAT of the list of available RATs.

In Example 193, the subject matter of Example 192 includes, wherein the database table is stored at the device.

In Example 194, the subject matter of Examples 192-193 includes, wherein the database table is stored at the node.

In Example 195, the subject matter of Examples 192-194 includes, wherein the database table is populated by measurements of a group of parameters taken by at least one device.

In Example 196, the subject matter of Example 195 includes, wherein the group of parameters to be measured are indicated by the node.

In Example 197, the subject matter of Examples 195-196 includes, wherein the group of parameters to be measured are indicated by the at least one device.

In Example 198, the subject matter of Examples 195-197 includes, wherein the group of parameters to be measured are partitioned among neighboring devices using device-to-device (D2D) communication.

In Example 199, the subject matter of Examples 190-198 includes, wherein the measurement information includes key performance indicators (KPIs) that characterize RATs of the list of available RATs.

In Example 200, the subject matter of Example 199 includes, wherein KPIs include at least two of latency, congestion level, load, voice support, data rates supported, range, power level, bands covered, signal conditions, coexistence capabilities, cryptographic capabilities, and spectrum access method.

In Example 201, the subject matter of Example 200 includes, wherein KPIs further include an indication as to times at which a corresponding RAT is expected to be powered down.

In Example 202, the subject matter of Examples 192-201 includes, wherein the database table includes at least one validity indicator field to indicate trustworthiness of measurements.

In Example 203, the subject matter of Example 202 includes, wherein trustworthiness is based on at least one of a location where a corresponding measurement was taken, and a time of day when the corresponding measurement was taken.

In Example 204, the subject matter of Examples 190-203 includes, means for terminating usage of a RAT subsequent to detecting that operating conditions for the RAT have deteriorated below a threshold.

In Example 205, the subject matter of Examples 190-204 includes, means for determining to establish a group of communication links with a selected group of RATs of the list of available RATs.

In Example 206, the subject matter of Example 205 includes, wherein the selected group of RATs is selected based upon a range KPI of RATs of the list of available RATs.

In Example 207, the subject matter of Examples 205-206 includes, wherein the selected group of RATs is selected based upon susceptibility of RATs of the list of available RATs to deep shadowing.

In Example 208, the subject matter of Examples 190-207 includes, wherein the list of available RATs is provided by the node.

In Example 209, the subject matter of Examples 190-208 includes, wherein the list of available RATs is provided by a neighboring device using device-to-device (D2D) communication.

In Example 210, the subject matter of Examples 190-209 includes, means for encoding for transmission to the node, a request to use a RAT of the list of available RAT s.

In Example 211, the subject matter of Example 210 includes, means for encoding for transmission to the node, a request to use a group of RATs of the list of available RATs.

In Example 212, the subject matter of Examples 190-211 includes, means for implementing RAT hopping by selecting a first RAT for transmission of a first portion of a transmission and by selecting a second RAT for transmission of a second portion of the transmission.

In Example 213, the subject matter of Example 212 includes, means for selecting the first RAT for a control portion of a transmission; and means for selecting the second RAT for a data portion of the transmission.

Example 214 is a method for multi-radio access technology (RAT) communication by a device including a transceiver interface including multiple connections to communicate with multiple transceiver chains, the multiple transceiver chains supporting multiple RAT s, the method comprising: receiving a communication associated with one or more of the multiple RATs; and controlling the multiple transceiver chains via the multiple connections of the transceiver interface to coordinate the multiple RATs to complete the communication.

In Example 215, the subject matter of Example 214 includes, receiving using a multi-link coder of the device, via a first transceiver chain of the multiple transceiver chains, a data stream from a first communication node via a communication link associated with a first RAT of the multiple RATs; applying a code to the data stream to generate an encoded data stream; and replicating the encoded data stream to generate a plurality of encoded data streams, the plurality of encoded data streams for transmission to at least a second communication node via one or more other communication links of the first transceiver chain.

In Example 216, the subject matter of Example 215 includes, controlling transmission of a first encoded data stream from the plurality of encoded data streams to the first communication node via the first RAT communication link of the first transceiver chain.

In Example 217, the subject matter of Example 216 includes, controlling transmission of the at least a second encoded data stream from the plurality of encoded data streams to at least the second communication node via the one or more other communication links of the first transceiver chain.

In Example 218, the subject matter of Example 217 includes, wherein the one or more other communication links are associated with the first RAT of the multiple RAT s.

In Example 219, the subject matter of Examples 215-218 includes, controlling transmission of the plurality of encoded data streams to the at least second communication node via one or more communication links of a second transceiver chain of the multiple transceiver chains.

In Example 220, the subject matter of Example 219 includes, wherein the one or more communication links of the second transceiver chain are associated with one or more RATs of the multiple RATs that are different from the first RAT.

In Example 221, the subject matter of Examples 215-220 includes, wherein the code includes one or more of: a repetition code; a systematic code; a raptor code; or a fountain code.

In Example 222, the subject matter of Examples 214-221 includes, receiving via a first transceiver chain of the multiple transceiver chains, a data stream from a first communication node via a communication link associated with a first RAT of the multiple RATs; applying a systematic code to the data stream to generate an encoded data stream; and replicating the encoded data stream to generate a first encoded data stream with information bits associated with the data stream, and at least a second encoded data stream with parity bits, the parity bits for decoding the information bits.

In Example 223, the subject matter of Example 222 includes, controlling transmission of the first encoded data stream to the first communication node via the first RAT communication link of the first transceiver chain.

In Example 224, the subject matter of Examples 222-223 includes, controlling transmission of the at least second encoded data stream to at least a second communication node via one or more other communication links of the first transceiver chain.

In Example 225, the subject matter of Example 224 includes, wherein the one or more other communication links are associated with the first RAT of the multiple RATs.

In Example 226, the subject matter of Examples 222-225 includes, controlling transmission of the at least second encoded data stream to at least a second communication node via one or more communication links of a second transceiver chain of the multiple transceiver chains.

In Example 227, the subject matter of Example 226 includes, wherein the one or more communication links of the second transceiver chain are associated with one or more RATs of the multiple RATs that are different from the first RAT.

In Example 228, the subject matter of Examples 222-227 includes, wherein the transceiver interface further comprises an interleaver configured to interleave the encoded data stream.

In Example 229, the subject matter of Examples 222-228 includes, wherein the multi-link coder is within a protocol layer of a plurality of protocol layers for at least one protocol stack of the device.

In Example 230, the subject matter of Example 229 includes, wherein the multi-link coder is configured to interface with the multiple transceiver chains via a common convergence layer within the at least one protocol stack of the device.

In Example 231, the subject matter of Examples 229-230 includes, wherein the plurality of protocol layers comp rise: a physical (PHY) layer; a media access control (MAC) layer; a radio link control (RLC) layer; and a packet data convergence protocol (PDCP) layer.

In Example 232, the subject matter of Examples 229-231 includes, receiving the data stream from a first protocol layer of the plurality of protocol layers; and outputting the first encoded data stream and the at least second encoded data stream to at least a second protocol layer of the plurality of protocol layers.

In Example 233, the subject matter of Examples 222-232 includes, receiving one or more of a packet reception acknowledgement, a quality of service (QoS) indicator, and channel quality feedback information; and adjusting one or more of coding redundancy level, a number of output communication links for transmission of the first encoded data stream and the at least second encoded data stream, and a number of retransmissions of the first encoded data stream and the at least second encoded data stream based on the packet reception acknowledgement, the QoS, or the channel quality feedback information.

In Example 234, the subject matter of Examples 214-233 includes, receiving measurement information from a vehicular terminal device via a first multi-radio communication link associated with at least a first RAT of the plurality of available RATs from the multiple RATs; configuring via a second multi-radio communication link, a secondary communication node for communication with the vehicular terminal device; and encoding for transmission to the vehicular terminal device, configuration information associated with the secondary communication node, the configuration information for establishing a third multi-radio communication link between the secondary communication node and the vehicular terminal device.

In Example 235, the subject matter of Example 234 includes, wherein each of the first, second, and third multi-radio communication links are configured to use one or more of the plurality of available RATs.

In Example 236, the subject matter of Examples 234-235 includes, wherein the first multi-radio communication link is 3GPP carrier aggregated communication link, and the device is an evolved Node-B (eNB) Radio Resource Controller (RRC).

In Example 237, the subject matter of Examples 234-236 includes, wherein the measurement information includes vehicle location information associated with a vehicular terminal device.

In Example 238, the subject matter of Example 237 includes, estimating a future vehicle location associated with the vehicular terminal device based on the vehicle location information; and selecting the secondary communication node from a plurality of nodes based on the estimated future vehicle location.

In Example 239, the subject matter of Examples 234-238 includes, wherein the measurement information includes channel quality information for one or more available channels at the vehicular terminal device, the one or more available channels associated with at least one of the plurality of RATs.

In Example 240, the subject matter of Example 239 includes, wherein configuring the secondary communication node includes selecting the secondary communication node from a plurality of nodes based the channel quality information for the one or more available channels at the vehicular terminal device.

In Example 241, the subject matter of Example 240 includes, wherein configuring the secondary communication node includes encoding for transmission to the secondary communication node, an indication of a RAT of the plurality of available RATs selected for use with the third multi-radio communication link between the secondary communication node and the vehicular terminal device, based on the channel quality information for the one or more available channels at the vehicular terminal device.

In Example 242, the subject matter of Example 241 includes, wherein the configuration information associated with the secondary communication node includes an indication of the selected RAT for use with the third multi-radio communication link between the secondary communication node and the vehicular terminal device.

In Example 243, the subject matter of Examples 234-242 includes, wherein the primary communication node is an evolved Node-B (eNB) and the secondary communication node is a roadside unit (RSU).

In Example 244, the subject matter of Examples 234-243 includes, wherein the device is configured for dual connectivity with the primary communication node and the secondary communication node.

In Example 245, the subject matter of Example 244 includes, wherein, during the dual connectivity, the first multi-radio communication link and the third multi-radio communication link are simultaneously active.

In Example 246, the subject matter of Example 245 includes, wherein, during the dual connectivity, the first multi-radio communication link is used for data communication and the third multi-radio communication link is used for communication of control information.

In Example 247, the subject matter of Examples 245-246 includes, wherein the second multi-radio communication link is a backhaul data connection for the first multi-radio communication link between the vehicular terminal device and the primary communication node.

In Example 248, the subject matter of Examples 234-247 includes, wherein the multiple RATs include at least two of: a dedicated short-range communication (DSRC) radio access technology; wireless access vehicular environment (WAVE) radio access technology; Bluetooth radio access technology; an IEEE 802.11 radio access technology; an LTE radio access technology; or a 5G radio access technology.

In Example 249, the subject matter of Examples 234-248 includes, wherein the measurement information from the device includes measurement information for a plurality of nodes accessible by the vehicular terminal device.

In Example 250, the subject matter of Example 249 includes, selecting the secondary communication node from the plurality of nodes, for communication with the vehicular terminal device based on the measurement information.

In Example 251, the subject matter of Examples 234-250 includes, wherein the plurality of transceivers are interconnected via a convergence function.

In Example 252, the subject matter of Example 251 includes, receiving a connection with a communication device using a first transceiver of the multiple transceiver chains and a first RAT of the multiple RATs; receiving at the convergence function, credentials information associated with an active communication link between the communication device and a second communication device, the active communication link using a second RAT from the multiple RATs; and providing the credentials information to the communication device to establish a communication link with the third communication device based on the credentials information.

In Example 253, the subject matter of Example 252 includes, establishing an inter-convergence function interface between the convergence function and a convergence function at the communication device.

In Example 254, the subject matter of Example 253 includes, receiving via the established connection and the inter-convergence function interface, device capabilities information indicative of vehicular radio communication technologies available at the communication device; and receiving the credentials information upon determining the second vehicular radio communications technology is available at both the communication device and the second communication device.

In Example 255, the subject matter of Examples 252-254 includes, wherein the convergence function comprises a convergence function component in each of a plurality of media access control (MAC) layers, the plurality of MAC layers corresponding to the plurality of available vehicular radio communication technologies.

In Example 256, the subject matter of Examples 252-255 includes, wherein the convergence function comprises a media access control (MAC) layer that is common to the plurality of available vehicular radio communication technologies.

In Example 257, the subject matter of Example 256 includes, dynamically p lacing the convergence function as the MAC layer that is common to the multiple RATs upon detecting incompatibility between at least one of the plurality of vehicular radio communication technologies available at the device and at least one of a plurality of vehicular radio communication technologies available at the communication device.

In Example 258, the subject matter of Examples 252-257 includes, wherein the plurality of vehicular radio communication technologies includes one or more of: a dedicated short-range communication (DSRC) radio communication technology; wireless access vehicular environment (WAVE) radio communication technology; Bluetooth radio communication technology; an IEEE 802.11 radio communication technology; an LTE radio communication technology; or a 5G radio communication technology.

In Example 259, the subject matter of Example 258 includes, wherein the first vehicular radio communication technology is the Bluetooth radio communication technology, and the second vehicular radio communication technology is the IEEE 802.11 radio communication technology, the LTE radio communication technology, or the 5G radio communication technology.

In Example 260, the subject matter of Examples 252-259 includes, receiving via an inter-convergence function interface between the convergence function and the convergence function at the communication device, a confirmation that the communication link between the communication device and the second communication device is deactivated.

In Example 261, the subject matter of Example 260 includes, establishing the communication link with the third communication device based on the credentials information received via the convergence function at the second communication device upon receiving the confirmation.

In Example 262, the subject matter of Examples 252-261 includes, establishing the connection with the communication device using a hardwired docking connection between the device and the communication device.

In Example 263, the subject matter of Examples 252-262 includes, wherein the credentials information is associated with activating a transceiver at the communication device for operation using the second RAT.

In Example 264, the subject matter of Example 263 includes, activating a second transceiver of the multiple transceiver chains to operate as a hotspot based on the credentials information.

In Example 265, the subject matter of Example 264 includes, establishing a communication link between the convergence function and a second transceiver at the communication device via the convergence function of the communication device.

In Example 266, the subject matter of Example 265 includes, wherein the second transceiver at the second communication device is configured to operate as an LTE backhaul for the hotspot.

In Example 267, the subject matter of Examples 251-266 includes, receiving a broadcast message via a fourth multi-radio communication link associated with one of the plurality of available RATs; determining based on the received broadcast message, a link quality of the fourth multi-radio communication link; storing within a link quality ranking list, a link quality indicator representing the link quality of the fourth multi-radio communication link in accordance with the measurement information; and ranking the link quality indicator within a link quality ranking list, the link quality ranking list including one or more additional link quality indicators representing one or more additional link qualities of one or more additional multi-radio communication links, wherein the link quality indicators are ordered in the link quality ranking list according to a predetermined ranking factor.

In Example 268, the subject matter of Example 267 includes, wherein determining the link quality indicator includes decoding from the broadcast message, measurement information indicative of a link quality of the fourth multi-radio communication link.

In Example 269, the subject matter of Examples 267-268 includes, wherein determining the link quality indicator includes measuring a received signal strength, the received signal strength representing a link quality of the fourth multi-radio communication link.

In Example 270, the subject matter of Examples 267-269 includes, wherein determining the link quality indicator includes tracking one or more packet errors associated with the received broadcast message.

In Example 271, the subject matter of Examples 267-270 includes, receiving the broadcast message, via the fourth multi-radio communication link, from the vehicular terminal device of the first vehicle, wherein the device is a second vehicular terminal device.

In Example 272, the subject matter of Example 271 includes, receiving the broadcast message, via the convergence function, from a first convergence function of the vehicular terminal device.

In Example 273, the subject matter of Examples 267-272 includes, wherein the predetermined ranking factor includes an indication of a broadcast message type.

In Example 274, the subject matter of Examples 271-273 includes, wherein the predetermined ranking factor is a distance between the first vehicle and the second vehicle.

In Example 275, the subject matter of Examples 267-274 includes, receiving by the second vehicular terminal device, the broadcast message, via the fourth multi-radio communication link, from a roadside unit (RSU).

In Example 276, the subject matter of Examples 267-275 includes, receiving by the second vehicular terminal device, the broadcast message, via the fourth multi-radio communication link, from an evolved Node-B (eNB).

In Example 277, the subject matter of Examples 267-276 includes, ranking the link quality indicator according to both the predetermined ranking factor and context information associated with the vehicular terminal device or the second vehicular terminal device.

In Example 278, the subject matter of Example 277 includes, receiving the context information from one or more applications of the vehicular terminal device or the second vehicular terminal device.

In Example 279, the subject matter of Examples 277-278 includes, wherein the context information is location information associated with the first vehicle, second vehicle, or one or more additional vehicles.

In Example 280, the subject matter of Examples 277-279 includes, wherein the context information is sensor data associated with one or more sensors of the first vehicle, second vehicle, or one or more additional vehicles.

In Example 281, the subject matter of Examples 267-280 includes, discarding from the link quality ranking list, one or more link quality indicators based on the predetermined ranking factor.

In Example 282, the subject matter of Examples 277-281 includes, discarding from the link quality ranking list, one or more link quality indicators based on the predetermined ranking factor and the context information.

In Example 283, the subject matter of Examples 267-282 includes, identifying a high priority link quality indicator within the link quality ranking list, the high priority link quality indicator representing a high priority multi-radio communication link, wherein the high priority multi-radio communication link has a link quality below a specified quality threshold.

In Example 284, the subject matter of Example 283 includes, wherein the second vehicular terminal device includes an antenna array comprising imp roving the link quality of the high priority multi-radio communication link by modifying a direction of a radiation pattern of at least a subset of a plurality of multiple-input-multiple-output (MIMO) antennas coupled to a plurality of available transceivers.

In Example 285, the subject matter of Examples 283-284 includes, wherein improving the link quality of the high priority multi-radio communication link includes reducing a packet size of a packet for transmission by the second vehicular terminal device, via the high priority multi-radio communication link, by removing one or more information elements from the packet.

In Example 286, the subject matter of Examples 283-285 includes, wherein improving the link quality of the high priority multi-radio communication link includes encoding for transmission by the second vehicular terminal device, via the high priority multi-radio communication link, a packet including one or more codes indicating a high priority message.

In Example 287, the subject matter of Examples 283-286 includes, wherein improving the link quality of the high priority multi-radio communication link includes encoding for transmission by the second vehicular terminal device, via the high priority multi-radio communication link, a packet including an indication of sensor data associated with the first vehicle, second vehicle, or one or more additional vehicles.

In Example 288, the subject matter of Examples 283-287 includes, wherein improving the link quality of the high priority multi-radio communication link includes: tracking a transmission window associated with a wireless medium: receiving exclusive access of the wireless medium during the transmission window; transmitting by the second vehicular terminal device during the transmission window, a packet including one or more information elements indicating a high priority message associated with the high priority multi-radio communication link.

In Example 289, the subject matter of Examples 283-288 includes, wherein improving the link quality of the high priority multi-radio communication link includes simultaneously transmitting a signal associated with the high priority multi-radio communication link over two or more frequency bands.

In Example 290, the subject matter of Examples 283-289 includes, wherein improving the link quality of the high priority multi-radio communication link includes simultaneously transmitting a signal associated with the high priority multi-radio communication link over two or more subsets of the MIMO antennas.

In Example 291, the subject matter of Examples 251-290 includes, wherein the convergence function establishes the third multi-radio communication link between the vehicular terminal device and the secondary communication node based on a current location of the vehicular terminal device.

In Example 292, the subject matter of Examples 234-291 includes, receiving the measurement information of the vehicular terminal device from the secondary communication node via the second multi-radio communication link.

In Example 293, the subject matter of Examples 234-292 includes, wherein each of the first, second, and third multi-radio communication links are configured to use a same one the plurality of available RATs at different communication frequencies.

In Example 294, the subject matter of Examples 214-293 includes, wherein the device includes: a first transceiver of the multiple transceiver chains, the first transceiver configured to communicate with a node using a communication link of a first RAT of the multiple RATs; a second transceiver of the multiple transceiver chains, the second transceiver configured to communicate with the node using one or more intermediate nodes and a communication link of a second RAT of the multiple RATs; and wherein completing the communication includes: decoding measurement information received from the node, the measurement information indicative of channel quality of the first RAT communication link; and determining to establish a new communication link with the one or more intermediate nodes, based on the decoded measurement information.

In Example 295, the subject matter of Example 294 includes, wherein the first transceiver is configured to communicate with the node using one or more other intermediate nodes and the first RAT communication link.

In Example 296, the subject matter of Examples 294-295 includes, wherein the device includes a third transceiver of the multiple transceiver chains, the third transceiver configured to communicate with the node using the new communication link, the new communication link being one of the first RAT, the second RAT or a third RAT of the multiple RATs.

In Example 297, the subject matter of Examples 294-296 includes, wherein: the node is a user equipment (UE); and the device is a Radio Resource Controller (RRC) of an evolved Node-B (eNB).

In Example 298, the subject matter of Examples 294-297 includes, wherein the transceiver interface includes a vehicle-to-everything (V2X) convergence function providing a common interface between the multiple transceiver chains.

In Example 299, the subject matter of Example 298 includes, wherein the V2X convergence function: communicates with a V2X convergence function of the node via the first RAT communication link; and communicates with a V2X convergence function of the one or more intermediate nodes via the second RAT communication link.

In Example 300, the subject matter of Examples 294-299 includes, wherein the node is an eNB and the intermediate node is a roadside unit (RSU).

In Example 301, the subject matter of Examples 294-300 includes, wherein the device is a vehicular terminal device within a moving vehicle, and the measurement information includes a current location of the moving vehicle.

In Example 302, the subject matter of Example 301 includes, estimating a future location of the moving vehicle based on the current location; and selecting a second intermediate node of the one or more intermediate nodes based on node proximity to the future location; and establishing the new communication link with the second intermediate node.

In Example 303, the subject matter of Examples 301-302 includes, wherein the multiple transceiver chains include at least one antenna array placed at a first location of a first surface of the vehicle and at least another antenna array placed on a second location of the first surface.

In Example 304, the subject matter of Example 303 includes, wherein the first surface is a roof of the vehicle.

In Example 305, the subject matter of Examples 303-304 includes, wherein the first surface is a hood of the vehicle.

In Example 306, the subject matter of Examples 301-305 includes, wherein the multiple transceiver chains include at least one antenna array etched into a front windshield of the vehicle.

In Example 307, the subject matter of Examples 303-306 includes, wherein the at least one antenna array shares a front end module with a radar communications module of the vehicle.

In Example 308, the subject matter of Examples 303-307 includes, wherein the at least one antenna array uses a front end module separate from a front end module used by a radar communications module of the vehicle.

In Example 309, the subject matter of Examples 294-308 includes, wherein the second RAT communication link includes a first communication link between the communication device and the intermediate node, and a second communication link between the intermediate node and the node.

In Example 310, the subject matter of Examples 294-309 includes, maintaining the first RAT communication link to be active simultaneously with the second RAT communication link.

In Example 311, the subject matter of Examples 294-310 includes, wherein the multiple transceiver chains include an antenna array comp rising a plurality of multiple-input-multiple-output put (MIMO) antennas coupled to the plurality of available transceivers.

In Example 312, the subject matter of Example 311 includes, wherein the first transceiver communicates with the node using the first RAT communication link and a first subset of the MIMO antennas; and wherein the second transceiver communicates with the node using the second RAT communication link and a second subset of the MIMO antennas.

In Example 313, the subject matter of Examples 294-312 includes, wherein the second transceiver of the plurality of available transceivers communicates with the node using a communication link of a third RAT of the multiple RATs and without the use of the one or more intermediate nodes.

In Example 314, the subject matter of Example 313 includes, maintaining both the first RAT communication link and the third RAT communication link for simultaneous connection to the node.

In Example 315, the subject matter of Example 314 includes, wherein the first RAT communication link comprises a data channel and the third RAT communication link comprises a control channel for communicating control information.

In Example 316, the subject matter of Example 315 includes, using at least a portion of the control information to control direct communication between a plurality of other nodes associated with the method in a communication framework, the direct communication using one or more RATs of the multiple RATs, the one or more RATs distinct from the third RAT.

In Example 317, the subject matter of Example 316 includes, wherein the communication framework is based on LTE dual connectivity framework.

In Example 318, the subject matter of Examples 294-317 includes, designating the first RAT as a primary RAT and the second RAT as a secondary RAT, based on one or more preferences associated with a vehicular terminal device; and modifying in response to a change in a network environment, the designation of the primary RAT and the secondary RAT, based on the one or more preferences.

In Example 319, the subject matter of Example 318 includes, wherein the change in the network environment is a change in a mobility environment of the vehicular terminal device.

In Example 320, the subject matter of Examples 318-319 includes, wherein designating the first RAT as the primary RAT and the second RAT as the secondary RAT is based on one or more network configurations.

In Example 321, the subject matter of Examples 318-320 includes, wherein the first RAT and the second RAT are each designated from a plurality of RATs including: a dedicated short-range communication (DSRC) radio access technology; wireless access vehicular environment (WAVE) radio access technology; Bluetooth radio access technology; an IEEE 802.11 radio access technology; an LTE radio access technology; or a 5G radio access technology.

In Example 322, the subject matter of Examples 318-321 includes, wherein the second transceiver communicates with the node without the use of one or more intermediate nodes via the communication link of the second RAT.

In Example 323, the subject matter of Examples 318-322 includes, wherein a preference includes a specification of one or more of a desired data throughput, cost factor, mobility factor associated with a vehicular terminal device, or a quality of service (QoS).

In Example 324, the subject matter of Examples 318-323 includes, wherein the change in a network environment includes a change in a network loading factor.

In Example 325, the subject matter of Examples 214-324 includes, wherein completing the communication includes: establishing a communication link with a first node using a first transceiver of the multiple transceiver chains and a first RAT of the multiple RATs; establishing a communication link with a second node using a second transceiver of the multiple transceivers and a second RAT of the multiple RATs; receiving via the first RAT communication link, first map data from the first node; receiving via the second RAT communication link, second map data from the second node; and generating updated map data associated with a current location of the device based on the first map data and the second map data.

In Example 326, the subject matter of Example 325 includes, wherein: the device is a vehicular terminal device in a moving vehicle; the first node is a primary communication node; and the second node is a secondary communication node.

In Example 327, the subject matter of Example 326 includes, receiving the first map data as a unicast message from the primary communication node.

In Example 328, the subject matter of Examples 326-327 includes, receiving the first map data as a broadcast message from the primary communication node, wherein the first map data is broadcast to the communication device and to the secondary communication node.

In Example 329, the subject matter of Examples 325-328 includes, wherein the first map data is redundant with the second map data.

In Example 330, the subject matter of Examples 325-329 includes, combining the first map data and the second map data to generate the updated map data, wherein the first map data is non-redundant with the second map data.

In Example 331, the subject matter of Examples 214-330 includes, wherein a first transceiver chain from the multiple transceiver chains communicates with an infrastructure node using a communication link of a first RAT of the multiple RAT s, and wherein completing the communication includes: decoding control information from the infrastructure node, the control information including vehicle-to-vehicle (V2V device discovery information; and establishing using a second transceiver chain of the multiple transceiver chains, a new communication link with a second node based on the V2V device discovery information, wherein the second transceiver chain is configured to communicate with the second node using a communication link of a second RAT of the multi-RAT.

In Example 332, the subject matter of Example 331 includes, wherein the second node is a line-of-sight (LOS) vehicle and the second RAT communication link is a V2V communication link based on one or more of a Wi-Fi Direct connectivity framework, a Wi-Fi Aware connectivity network, an LTE-Direct connectivity framework, or 5G connectivity network.

In Example 333, the subject matter of Examples 331-332 includes, wherein the first RAT communication link is an LTE or 5G communication link and is configured to provide control plane for managing V2V connectivity.

In Example 334, the subject matter of Examples 331-333 includes, wherein the control information from the infrastructure node further includes V2V resource allocation and V2V synchronization information to assist with establishment of the new communication link with the second node.

In Example 335, the subject matter of Examples 331-334 includes, establishing the new communication link as a direct V2V link with the second node; and establishing using a third transceiver chain of the multiple transceiver chains, another communication link with the second node via an intermediate node, based on the V2V device discovery information.

In Example 336, the subject matter of Example 335 includes, wherein the intermediate node is a roadside unit (RSU).

In Example 337, the subject matter of Examples 335-336 includes, decoding sensor data received from the intermediate node, wherein the sensor data originates from a non-line-of-sight (NLOS) vehicle in communication with the intermediate node.

In Example 338, the subject matter of Examples 335-337 includes, encoding data for redundant transmission to the second node via both the direct V2V link and via the another communication link with the second node via the intermediate node.

In Example 339, the subject matter of Examples 331-338 includes, wherein the first RAT communication link is a vehicle-to-infrastructure (V2I) link, the device is within a vehicle and is configured to receive assistance from the infrastructure node to enable direct V2V communication.

In Example 340, the subject matter of Examples 335-339 includes, wherein the second node and the intermediate node are cooperating vehicles that cooperate over V2V links to improve one or more quality characteristics of at least one V2I link associated with the communication device.

In Example 341, the subject matter of Examples 335-340 includes, establishing multiple communication links with the intermediate node, each communication link with the intermediate node using a different RAT of the multi-RAT.

In Example 342, the subject matter of Examples 331-341 includes, wherein communications with the infrastructure node and the second node use one or more RATs of the multi-RAT and are combined over a physical (PHY) layer, a media access control (MAC) layer or a higher layer.

In Example 343, the subject matter of Examples 214-342 includes, accessing a list of available RATs that have been detected within a range of the device; and determining to establish a new communication link with a selected RAT of the available RATs based on compatibility of transmission requirements of the device with the selected RAT.

In Example 344, the subject matter of Example 343 includes, wherein the requirement includes one of a latency requirement, a reliability requirement, a throughput requirement, and a requirement of an application executing on the device.

In Example 345, the subject matter of Examples 343-344 includes, selecting the selected RAT by accessing a database table, the database table indicating a relationship between the transmission requirements and at least one RAT of the list of available RATs.

In Example 346, the subject matter of Example 345 includes, wherein the database table is stored at the device.

In Example 347, the subject matter of Examples 345-346 includes, wherein the database table is stored at the node.

In Example 348, the subject matter of Examples 345-347 includes, wherein the database table is populated by measurements of a group of parameters taken by at least one RAT.

In Example 349, the subject matter of Example 348 includes, wherein the group of parameters to be measured are indicated by the node.

In Example 350, the subject matter of Examples 348-349 includes, wherein the group of parameters to be measured are indicated by the at least one device.

In Example 351, the subject matter of Examples 348-350 includes, wherein the group of parameters to be measured are partitioned among neighboring devices using device-to-device (D2D) communication.

In Example 352, the subject matter of Examples 343-351 includes, wherein the measurement information includes key performance indicators (KPIs) that characterize RATs of the list of available RATs.

In Example 353, the subject matter of Example 352 includes, wherein KPIs include at least two of latency, congestion level, load, voice support, data rates supported, range, power level, bands covered, signal conditions, coexistence capabilities, cryptographic capabilities, and spectrum access method.

In Example 354, the subject matter of Example 353 includes, wherein KPIs further include an indication as to times at which a corresponding RAT is expected to be powered down.

In Example 355, the subject matter of Examples 345-354 includes, wherein the database table includes at least one validity indicator field to indicate trustworthiness of measurements.

In Example 356, the subject matter of Example 355 includes, wherein trustworthiness is based on at least one of a location where a corresponding measurement was taken, and a time of day when the corresponding measurement was taken.

In Example 357, the subject matter of Examples 343-356 includes, terminating usage of a RAT subsequent to detecting that operating conditions for the RAT have deteriorated below a threshold.

In Example 358, the subject matter of Examples 343-357 includes, determining to establish a group of communication links with a selected group of RATs of the list of available RATs.

In Example 359, the subject matter of Example 358 includes, wherein the selected group of RATs is selected based upon a range KPI of RATs of the list of available RATs.

In Example 360, the subject matter of Examples 358-359 includes, wherein the selected group of RATs is selected based upon susceptibility of RATs of the list of available RATs to deep shadowing.

In Example 361, the subject matter of Examples 343-360 includes, wherein the list of available RATs is provided by the node.

In Example 362, the subject matter of Examples 343-361 includes, wherein the list of available RATs is provided by a neighboring device using device-to-device (D2D) communication.

In Example 363, the subject matter of Examples 343-362 includes, encoding for transmission to the node, a request to use a RAT of the list of available RATs.

In Example 364, the subject matter of Example 363 includes, encoding for transmission to the node, a request to use a group of RATs of the list of available RATs.

In Example 365, the subject matter of Examples 343-364 includes, implementing RAT hopping by selecting a first RAT for transmission of a first portion of a transmission and by selecting a second RAT for transmission of a second portion of the transmission.

In Example 366, the subject matter of Example 365 includes, selecting the first RAT for a control portion of a transmission; and selecting the second RAT for a data portion of the transmission.

Example 367 is at least one machine readable medium including instructions that, when executed by processing circuitry, cause the processing circuitry to perform any method of Examples 214-366.

Example 368 is a system comprising means to perform any method of Examples 214-366.

Example 369 is a device for multi-radio access technology (RAT) communication, the device comprising a transceiver interface including multiple connections to communicate with multiple transceiver chains, the multiple transceiver chains supporting multiple RATs, the device further comprising: means for receiving a communication associated with one or more of the multiple RATs; and means for controlling the multiple transceiver chains via the multiple connections of the transceiver interface to coordinate the multiple RATs to complete the communication.

In Example 370, the subject matter of Example 369 includes, means for receiving using a multi-link coder of the device, via a first transceiver chain of the multiple transceiver chains, a data stream from a first communication node via a communication link associated with a first RAT of the multiple RATs; means for applying a code to the data stream to generate an encoded data stream; and means for replicating the encoded data stream to generate a plurality of encoded data streams, the plurality of encoded data streams for transmission to at least a second communication node via one or more other communication links of the first transceiver chain.

In Example 371, the subject matter of Example 370 includes, means for controlling transmission of a first encoded data stream from the plurality of encoded data streams to the first communication node via the first RAT communication link of the first transceiver chain.

In Example 372, the subject matter of Example 371 includes, means for controlling transmission of the at least a second encoded data stream from the plurality of encoded data streams to at least the second communication node via the one or more other communication links of the first transceiver chain.

In Example 373, the subject matter of Example 372 includes, wherein the one or more other communication links are associated with the first RAT of the multiple RATs.

In Example 374, the subject matter of Examples 370-373 includes, means for controlling transmission of the plurality of encoded data streams to the at least second communication node via one or more communication links of a second transceiver chain of the multiple transceiver chains.

In Example 375, the subject matter of Example 374 includes, wherein the one or more communication links of the second transceiver chain are associated with one or more RATs of the multiple RATs that are different from the first RAT.

In Example 376, the subject matter of Examples 370-375 includes, wherein the code includes one or more of: a repetition code; a systematic code; a raptor code; or a fountain code.

In Example 377, the subject matter of Examples 369-376 includes, means for receiving via a first transceiver chain of the multiple transceiver chains, a data stream from a first communication node via a communication link associated with a first RAT of the multiple RATs; means for applying a systematic code to the data stream to generate an encoded data stream; and means for replicating the encoded data stream to generate a first encoded data stream with information bits associated with the data stream, and at least a second encoded data stream with parity bits, the parity bits for decoding the information bits.

In Example 378, the subject matter of Example 377 includes, means for controlling transmission of the first encoded data stream to the first communication node via the first RAT communication link of the first transceiver chain.

In Example 379, the subject matter of Examples 377-378 includes, means for controlling transmission of the at least second encoded data stream to at least a second communication node via one or more other communication links of the first transceiver chain.

In Example 380, the subject matter of Example 379 includes, wherein the one or more other communication links are associated with the first RAT of the multiple RATs.

In Example 381, the subject matter of Examples 377-380 includes, means for controlling transmission of the at least second encoded data stream to at least a second communication node via one or more communication links of a second transceiver chain of the multiple transceiver chains.

In Example 382, the subject matter of Example 381 includes, wherein the one or more communication links of the second transceiver chain are associated with one or more RATs of the multiple RATs that are different from the first RAT.

In Example 383, the subject matter of Examples 377-382 includes, wherein the transceiver interface further comprises an interleaver configured to interleave the encoded data stream.

In Example 384, the subject matter of Examples 377-383 includes, wherein the multi-link coder is within a protocol layer of a plurality of protocol layers for at least one protocol stack of the device.

In Example 385, the subject matter of Example 384 includes, wherein the multi-link coder is configured to interface with the multiple transceiver chains via a common convergence layer within the at least one protocol stack of the device.

In Example 386, the subject matter of Examples 384-385 includes, wherein the plurality of protocol layers comprise: a physical (PHY) layer; a media access control (MAC) layer; a radio link control (RLC) layer; and a packet data convergence protocol (PDCP) layer.

In Example 387, the subject matter of Examples 384-386 includes, means for receiving the data stream from a first protocol layer of the plurality of protocol layers; and means for outputting the first encoded data stream and the at least second encoded data stream to at least a second protocol layer of the plurality of protocol layers.

In Example 388, the subject matter of Examples 377-387 includes, means for receiving one or more of a packet reception acknowledgement, a quality of service (QoS) indicator, and channel quality feedback information; and means for adjusting one or more of coding redundancy level, a number of output communication links for transmission of the first encoded data stream and the at least second encoded data stream, and a number of retransmissions of the first encoded data stream and the at least second encoded data stream based on the packet reception acknowledgement, the QoS, or the channel quality feedback information.

In Example 389, the subject matter of Examples 369-388 includes, means for receiving measurement information from a vehicular terminal device via a first multi-radio communication link associated with at least a first RAT of the plurality of available RATs from the multiple RATs; means for configuring via a second multi-radio communication link, a secondary communication node for communication with the vehicular terminal device; and means for encoding for transmission to the vehicular terminal device, configuration information associated with the secondary communication node, the configuration information for establishing a third multi-radio communication link between the secondary communication node and the vehicular terminal device.

In Example 390, the subject matter of Example 389 includes, wherein each of the first, second, and third multi-radio communication links are configured to use one or more of the plurality of available RATs.

In Example 391, the subject matter of Examples 389-390 includes, wherein the first multi-radio communication link is 3GPP carrier aggregated communication link, and the device is an evolved Node-B (eNB) Radio Resource Controller (RRC).

In Example 392, the subject matter of Examples 389-391 includes, wherein the measurement information includes vehicle location information associated with a vehicular terminal device.

In Example 393, the subject matter of Example 392 includes, means for estimating a future vehicle location associated with the vehicular terminal device based on the vehicle location information; and means for selecting the secondary communication node from a plurality of nodes based on the estimated future vehicle location.

In Example 394, the subject matter of Examples 389-393 includes, wherein the measurement information includes channel quality information for one or more available channels at the vehicular terminal device, the one or more available channels associated with at least one of the plurality of RATs.

In Example 395, the subject matter of Example 394 includes, wherein configuring the secondary communication node includes selecting the secondary communication node from a plurality of nodes based the channel quality information for the one or more available channels at the vehicular terminal device.

In Example 396, the subject matter of Example 395 includes, wherein configuring the secondary communication node includes encoding for transmission to the secondary communication node, an indication of a RAT of the plurality of available RATs selected for use with the third multi-radio communication link between the secondary communication node and the vehicular terminal device, based on the channel quality information for the one or more available channels at the vehicular terminal device.

In Example 397, the subject matter of Example 396 includes, wherein the configuration information associated with the secondary communication node includes an indication of the selected RAT for use with the third multi-radio communication link between the secondary communication node and the vehicular terminal device.

In Example 398, the subject matter of Examples 389-397 includes, wherein the primary communication node is an evolved Node-B (eNB) and the secondary communication node is a roadside unit (RSU).

In Example 399, the subject matter of Examples 389-398 includes, wherein the device is configured for dual connectivity with the primary communication node and the secondary communication node.

In Example 400, the subject matter of Example 399 includes, wherein, during the dual connectivity, the first multi-radio communication link and the third multi-radio communication link are simultaneously active.

In Example 401, the subject matter of Example 400 includes, wherein, during the dual connectivity, the first multi-radio communication link is used for data communication and the third multi-radio communication link is used for communication of control information.

In Example 402, the subject matter of Examples 400-401 includes, wherein the second multi-radio communication link is a backhaul data connection for the first multi-radio communication link between the vehicular terminal device and the primary communication node.

In Example 403, the subject matter of Examples 389-402 includes, wherein the multiple RATs include at least two of: a dedicated short-range communication (DSRC) radio access technology; wireless access vehicular environment (WAVE) radio access technology; Bluetooth radio access technology; an IEEE 802.11 radio access technology; an LTE radio access technology; or a 5G radio access technology.

In Example 404, the subject matter of Examples 389-403 includes, wherein the measurement information from the device includes measurement information for a plurality of nodes accessible by the vehicular terminal device.

In Example 405, the subject matter of Example 404 includes, means for selecting the secondary communication node from the plurality of nodes, for communication with the vehicular terminal device based on the measurement information.

In Example 406, the subject matter of Examples 389-405 includes, wherein the plurality of transceivers are interconnected via a convergence function.

In Example 407, the subject matter of Example 406 includes, means for receiving a connection with a communication device using a first transceiver of the multiple transceiver chains and a first RAT of the multiple RATs; means for receiving at the convergence function, credentials information associated with an active communication link between the communication device and a second communication device, the active communication link using a second RAT from the multiple RATs; and means for providing the credentials information to the communication device to establish a communication link with the third communication device based on the credentials information.

In Example 408, the subject matter of Example 407 includes, means for establishing an inter-convergence function interface between the convergence function and a convergence function at the communication device.

In Example 409, the subject matter of Example 408 includes, means for receiving via the established connection and the inter-convergence function interface, device capabilities information indicative of vehicular radio communication technologies available at the communication device; and means for receiving the credentials information upon determining the second vehicular radio communications technology is available at both the communication device and the second communication device.

In Example 410, the subject matter of Examples 407-409 includes, wherein the convergence function comprises a convergence function component in each of a plurality of media access control (MAC) layers, the plurality of MAC layers corresponding to the plurality of available vehicular radio communication technologies.

In Example 411, the subject matter of Examples 407-410 includes, wherein the convergence function comprises a media access control (MAC) layer that is common to the plurality of available vehicular radio communication technologies.

In Example 412, the subject matter of Example 411 includes, means for dynamically placing the convergence function as the MAC layer that is common to the multiple RATs up on detecting incompatibility between at least one of the plurality of vehicular radio communication technologies available at the device and at least one of a plurality of vehicular radio communication technologies available at the communication device.

In Example 413, the subject matter of Examples 407-412 includes, wherein the plurality of vehicular radio communication technologies includes one or more of: a dedicated short-range communication (DSRC) radio communication technology; wireless access vehicular environment (WAVE) radio communication technology; Bluetooth radio communication technology; an IEEE 802.11 radio communication technology; an LTE radio communication technology; or a 5G radio communication technology.

In Example 414, the subject matter of Example 413 includes, wherein the first vehicular radio communication technology is the Bluetooth radio communication technology, and the second vehicular radio communication technology is the IEEE 802.11 radio communication technology, the LTE radio communication technology, or the 5G radio communication technology.

In Example 415, the subject matter of Examples 407-414 includes, means for receiving via an inter-convergence function interface between the convergence function and the convergence function at the communication device, a confirmation that the communication link between the communication device and the second communication device is deactivated.

In Example 416, the subject matter of Example 415 includes, means for establishing the communication link with the third communication device based on the credentials information received via the convergence function at the second communication device upon receiving the confirmation.

In Example 417, the subject matter of Examples 407-416 includes, means for establishing the connection with the communication device using a hardwired docking connection between the device and the communication device.

In Example 418, the subject matter of Examples 407-417 includes, wherein the credentials information is associated with activating a transceiver at the communication device for operation using the second RAT.

In Example 419, the subject matter of Example 418 includes, means for activating a second transceiver of the multiple transceiver chains to operate as a hotspot based on the credentials information.

In Example 420, the subject matter of Example 419 includes, means for establishing a communication link between the convergence function and a second transceiver at the communication device via the convergence function of the communication device.

In Example 421, the subject matter of Example 420 includes, wherein the second transceiver at the second communication device is configured to operate as an LTE backhaul for the hotspot.

In Example 422, the subject matter of Examples 406-421 includes, means for receiving a broadcast message via a fourth multi-radio communication link associated with one of the plurality of available RATs; means for determining based on the received broadcast message, a link quality of the fourth multi-radio communication link; means for storing within a link quality ranking list, a link quality indicator representing the link quality of the fourth multi-radio communication link in accordance with the measurement information; and means for ranking the link quality indicator within a link quality ranking list, the link quality ranking list including one or more additional link quality indicators representing one or more additional link qualities of one or more additional multi-radio communication links, wherein the link quality indicators are ordered in the link quality ranking list according to a predetermined ranking factor.

In Example 423, the subject matter of Example 422 includes, means for decoding from the broadcast message, measurement information indicative of a link quality of the fourth multi-radio communication link.

In Example 424, the subject matter of Examples 422-423 includes, means for measuring a received signal strength, the received signal strength representing a link quality of the fourth multi-radio communication link.

In Example 425, the subject matter of Examples 422-424 includes, means for tracking one or more packet errors associated with the received broadcast message.

In Example 426, the subject matter of Examples 422-425 includes, means for receiving the broadcast message, via the fourth multi-radio communication link, from the vehicular terminal device of the first vehicle, wherein the device is a second vehicular terminal device.

In Example 427, the subject matter of Example 426 includes, means for receiving the broadcast message, via the convergence function, from a first convergence function of the vehicular terminal device.

In Example 428, the subject matter of Examples 422-427 includes, wherein the predetermined ranking factor includes an indication of a broadcast message type.

In Example 429, the subject matter of Examples 426-428 includes, wherein the predetermined ranking factor is a distance between the first vehicle and the second vehicle.

In Example 430, the subject matter of Examples 422-429 includes, means for receiving by the second vehicular terminal device, the broadcast message, via the fourth multi-radio communication link, from a roadside unit (RSU).

In Example 431, the subject matter of Examples 422-430 includes, means for receiving by the second vehicular terminal device, the broadcast message, via the fourth multi-radio communication link, from an evolved Node-B (eNB).

In Example 432, the subject matter of Examples 422-431 includes, means for ranking the link quality indicator according to both the predetermined ranking factor and context information associated with the vehicular terminal device or the second vehicular terminal device.

In Example 433, the subject matter of Example 432 includes, means for receiving the context information from one or more applications of the vehicular terminal device or the second vehicular terminal device.

In Example 434, the subject matter of Examples 432-433 includes, wherein the context information is location information associated with the first vehicle, second vehicle, or one or more additional vehicles.

In Example 435, the subject matter of Examples 432-434 includes, wherein the context information is sensor data associated with one or more sensors of the first vehicle, second vehicle, or one or more additional vehicles.

In Example 436, the subject matter of Examples 422-435 includes, means for discarding from the link quality ranking list, one or more link quality indicators based on the predetermined ranking factor.

In Example 437, the subject matter of Examples 432-436 includes, means for discarding from the link quality ranking list, one or more link quality indicators based on the predetermined ranking factor and the context information.

In Example 438, the subject matter of Examples 422-437 includes, means for identifying a high priority link quality indicator within the link quality ranking list, the high priority link quality indicator representing a high priority multi-radio communication link, wherein the high priority multi-radio communication link has a link quality below a specified quality threshold.

In Example 439, the subject matter of Example 438 includes, wherein the second vehicular terminal device includes an antenna array comprising improving the link quality of the high priority multi-radio communication link by modifying a direction of a radiation pattern of at least a subset of a plurality of multiple-input-multiple-output (MIMO) antennas coupled to a plurality of available transceivers.

In Example 440, the subject matter of Examples 438-439 includes, means for reducing a packet size of a packet for transmission by the second vehicular terminal device, via the high priority multi-radio communication link, by removing one or more information elements from the packet.

In Example 441, the subject matter of Examples 438-440 includes, means for encoding for transmission by the second vehicular terminal device, via the high priority multi-radio communication link, a packet including one or more codes indicating a high priority message.

In Example 442, the subject matter of Examples 438-441 includes, means for encoding for transmission by the second vehicular terminal device, via the high priority multi-radio communication link, a packet including an indication of sensor data associated with the first vehicle, second vehicle, or one or more additional vehicles.

In Example 443, the subject matter of Examples 438-442 includes, means for tracking a transmission window associated with a wireless medium; means for receiving exclusive access of the wireless medium during the transmission window; and means for transmitting by the second vehicular terminal device during the transmission window, a packet including one or more information elements indicating a high priority message associated with the high priority multi-radio communication link.

In Example 444, the subject matter of Examples 438-443 includes, means for simultaneously transmitting a signal associated with the high priority multi-radio communication link over two or more frequency bands.

In Example 445, the subject matter of Examples 438-444 includes, means for simultaneously transmitting a signal associated with the high priority multi-radio communication link over two or more subsets of the MIMO antennas.

In Example 446, the subject matter of Examples 406-445 includes, wherein the convergence function establishes the third multi-radio communication link between the vehicular terminal device and the secondary communication node based on a current location of the vehicular terminal device.

In Example 447, the subject matter of Examples 389-446 includes, means for receiving the measurement information of the vehicular terminal device from the secondary communication node via the second multi-radio communication link.

In Example 448, the subject matter of Examples 389-447 includes, wherein each of the first, second, and third multi-radio communication links are configured to use a same one the plurality of available RATs at different communication frequencies.

In Example 449, the subject matter of Examples 369-448 includes, wherein the device includes: a first transceiver of the multiple transceiver chains, the first transceiver configured to communicate with a node using a communication link of a first RAT of the multiple RATs; a second transceiver of the multiple transceiver chains, the second transceiver configured to communicate with the node using one or more intermediate nodes and a communication link of a second RAT of the multiple RATs; and wherein to complete the communication, the device further includes: means for decoding measurement information received from the node, the measurement information indicative of channel quality of the first RAT communication link; and means for determining to establish a new communication link with the one or more intermediate nodes, based on the decoded measurement information.

In Example 450, the subject matter of Example 449 includes, wherein the first transceiver is configured to communicate with the node using one or more other intermediate nodes and the first RAT communication link.

In Example 451, the subject matter of Examples 449-450 includes, wherein the device includes a third transceiver of the multiple transceiver chains, the third transceiver configured to communicate with the node using the new communication link, the new communication link being one of the first RAT, the second RAT or a third RAT of the multiple RATs.

In Example 452, the subject matter of Examples 449-451 includes, wherein: the node is a user equipment (UE); and the device is a Radio Resource Controller (RRC) of an evolved Node-B (eNB).

In Example 453, the subject matter of Examples 449-452 includes, wherein the transceiver interface includes a vehicle-to-everything (V2X) convergence function providing a common interface between the multiple transceiver chains.

In Example 454, the subject matter of Example 453 includes, wherein the V2X convergence function includes: means for communicating with a V2X convergence function of the node via the first RAT communication link; and means for communicating with a V2X convergence function of the one or more intermediate nodes via the second RAT communication link.

In Example 455, the subject matter of Examples 449-454 includes, wherein the node is an eNB and the intermediate node is a roadside unit (RSU).

In Example 456, the subject matter of Examples 449-455 includes, wherein the device is a vehicular terminal device within a moving vehicle, and the measurement information includes a current location of the moving vehicle.

In Example 457, the subject matter of Example 456 includes, means for estimating a future location of the moving vehicle based on the current location; means for selecting a second intermediate node of the one or more intermediate nodes based on node proximity to the future location; and means for establishing the new communication link with the second intermediate node.

In Example 458, the subject matter of Examples 456-457 includes, wherein the multiple transceiver chains include at least one antenna array p laced at a first location of a first surface of the vehicle and at least another antenna array placed on a second location of the first surface.

In Example 459, the subject matter of Example 458 includes, wherein the first surface is a roof of the vehicle.

In Example 460, the subject matter of Examples 458-459 includes, wherein the first surface is a hood of the vehicle.

In Example 461, the subject matter of Examples 456-460 includes, wherein the multiple transceiver chains include at least one antenna array etched into a front windshield of the vehicle.

In Example 462, the subject matter of Examples 458-461 includes, wherein the at least one antenna array shares a front-end module with a radar communications module of the vehicle.

In Example 463, the subject matter of Examples 458-462 includes, wherein the at least one antenna array uses a front-end module separate from a front end module used by a radar communications module of the vehicle.

In Example 464, the subject matter of Examples 449-463 includes, wherein the second RAT communication link includes a first communication link between the communication device and the intermediate node, and a second communication link between the intermediate node and the node.

In Example 465, the subject matter of Examples 449-464 includes, means for maintaining the first RAT communication link to be active simultaneously with the second RAT communication link.

In Example 466, the subject matter of Examples 449-465 includes, wherein the multiple transceiver chains include an antenna array comp rising a plurality of multiple-input-multiple-output (MIMO) antennas coupled to the plurality of available transceivers.

In Example 467, the subject matter of Example 466 includes, wherein the first transceiver communicates with the node using the first RAT communication link and a first subset of the MIMO antennas; and wherein the second transceiver communicates with the node using the second RAT communication link and a second subset of the MIMO antennas.

In Example 468, the subject matter of Examples 449-467 includes, wherein the second transceiver of the plurality of available transceivers communicates with the node using a communication link of a third RAT of the multiple RATs and without the use of the one or more intermediate nodes.

In Example 469, the subject matter of Example 468 includes, means for maintaining both the first RAT communication link and the third RAT communication link for simultaneous connection to the node.

In Example 470, the subject matter of Example 469 includes, wherein the first RAT communication link comprises a data channel and the third RAT communication link comprises a control channel for communicating control information.

In Example 471, the subject matter of Example 470 includes, means for using at least a portion of the control information to control direct communication between a plurality of other nodes associated with the device in a communication framework, the direct communication using one or more RATs of the multiple RATs, the one or more RATs distinct from the third RAT.

In Example 472, the subject matter of Example 471 includes, wherein the communication framework is based on LTE dual connectivity framework.

In Example 473, the subject matter of Examples 449-472 includes, means for designating the first RAT as a primary RAT and the second RAT as a secondary RAT, based on one or more preferences associated with a vehicular terminal device; and means for modifying in response to a change in a network environment, the designation of the primary RAT and the secondary RAT, based on the one or more preferences.

In Example 474, the subject matter of Example 473 includes, wherein the change in the network environment is a change in a mobility environment of the vehicular terminal device.

In Example 475, the subject matter of Examples 473-474 includes, wherein designating the first RAT as the primary RAT and the second RAT as the secondary RAT is based on one or more network configurations.

In Example 476, the subject matter of Examples 473-475 includes, wherein the first RAT and the second RAT are each designated from a plurality of RATs including: a dedicated short-range communication (DSRC) radio access technology; wireless access vehicular environment (WAVE) radio access technology; Bluetooth radio access technology; an IEEE 802.11 radio access technology; an LTE radio access technology; or a 5G radio access technology.

In Example 477, the subject matter of Examples 473-476 includes, wherein the second transceiver communicates with the node without the use of one or more intermediate nodes via the communication link of the second RAT.

In Example 478, the subject matter of Examples 473-477 includes, wherein a preference includes a specification of one or more of a desired data throughput, cost factor, mobility factor associated with a vehicular terminal device, or a quality of service (QoS).

In Example 479, the subject matter of Examples 473-478 includes, wherein the change in a network environment includes a change in a network loading factor.

In Example 480, the subject matter of Examples 369-479 includes, means for establishing a communication link with a first node using a first transceiver of the multiple transceiver chains and a first RAT of the multiple RATs; means for establishing a communication link with a second node using a second transceiver of the multiple transceivers and a second RAT of the multiple RATs; means for receiving via the first RAT communication link, first map data from the first node; means for receiving via the second RAT communication link, second map data from the second node; and means for generating updated map data associated with a current location of the device based on the first map data and the second map data.

In Example 481, the subject matter of Example 480 includes, wherein: the device is a vehicular terminal device in a moving vehicle; the first node is a primary communication node; and the second node is a secondary communication node.

In Example 482, the subject matter of Example 481 includes, means for receiving the first map data as a unicast message from the primary communication node.

In Example 483, the subject matter of Examples 481-482 includes, means for receiving the first map data as a broadcast message from the primary communication node, wherein the first map data is broadcast to the communication device and to the secondary communication node.

In Example 484, the subject matter of Examples 480-483 includes, wherein the first map data is redundant with the second map data.

In Example 485, the subject matter of Examples 480-484 includes, means for combining the first map data and the second map data to generate the up dated map data, wherein the first map data is non-redundant with the second map data.

In Example 486, the subject matter of Examples 369-485 includes, wherein a first transceiver chain from the multiple transceiver chains communicates with an infrastructure node using a communication link of a first RAT of the multiple RAT s, and wherein to complete the communication the device includes: means for decoding control information from the infrastructure node, the control information including vehicle-to-vehicle (V2V) device discovery information; and means for establishing using a second transceiver chain of the multiple transceiver chains, a new communication link with a second node based on the V2V device discovery information, wherein the second transceiver chain is configured to communicate with the second node using a communication link of a second RAT of the multi-RAT.

In Example 487, the subject matter of Example 486 includes, wherein the second node is a line-of-sight (LOS) vehicle and the second RAT communication link is a V2V communication link based on one or more of a Wi-Fi Direct connectivity framework, a Wi-Fi Aware connectivity network, an LTE-Direct connectivity framework, or 5G connectivity network.

In Example 488, the subject matter of Examples 486-487 includes, wherein the first RAT communication link is an LTE or 5G communication link and is configured to provide control plane for managing V2V connectivity.

In Example 489, the subject matter of Examples 486-488 includes, wherein the control information from the infrastructure node further includes V2V resource allocation and V2V synchronization information to assist with establishment of the new communication link with the second node.

In Example 490, the subject matter of Examples 486-489 includes, means for establishing the new communication link as a direct V2V link with the second node; and means for establishing using a third transceiver chain of the multiple transceiver chains, another communication link with the second node via an intermediate node, based on the V2V device discovery information.

In Example 491, the subject matter of Example 490 includes, wherein the intermediate node is a roadside unit (RSU).

In Example 492, the subject matter of Examples 490-491 includes, means for decoding sensor data received from the intermediate node, wherein the sensor data originates from a non-line-of-sight (NLOS) vehicle in communication with the intermediate node.

In Example 493, the subject matter of Examples 490-492 includes, means for encoding data for redundant transmission to the second node via both the direct V2V link and via the another communication link with the second node via the intermediate node.

In Example 494, the subject matter of Examples 486-493 includes, wherein the first RAT communication link is a vehicle-to-infrastructure (V2I) link, the device is within a vehicle and is configured to receive assistance from the infrastructure node to enable direct V2V communication.

In Example 495, the subject matter of Examples 490-494 includes, wherein the second node and the intermediate node are cooperating vehicles that cooperate over V2V links to improve one or more quality characteristics of at least one V2I link associated with the communication device.

In Example 496, the subject matter of Examples 490-495 includes, means for establishing multiple communication links with the intermediate node, each communication link with the intermediate node using a different RAT of the multi-RAT.

In Example 497, the subject matter of Examples 486-496 includes, wherein communications with the infrastructure node and the second node use one or more RATs of the multi-RAT and are combined over a physical (PHY) layer, a media access control (MAC) layer or a higher layer.

In Example 498, the subject matter of Examples 369-497 includes, means for accessing a list of available RATs that have been detected within a range of the device; and means for determining to establish a new communication link with a selected RAT of the available RATs based on compatibility of transmission requirements of the device with the selected RAT.

In Example 499, the subject matter of Example 498 includes, wherein the requirement includes one of a latency requirement, a reliability requirement, a throughput requirement, and a requirement of an application executing on the device.

In Example 500, the subject matter of Examples 498-499 includes, means for selecting the selected RAT by accessing a database table, the database table indicating a relationship between the transmission requirements and at least one RAT of the list of available RATs.

In Example 501, the subject matter of Example 500 includes, wherein the database table is stored at the device.

In Example 502, the subject matter of Examples 500-501 includes, wherein the database table is stored at the node.

In Example 503, the subject matter of Examples 500-502 includes, wherein the database table is populated by measurements of a group of parameters taken by at least one RAT.

In Example 504, the subject matter of Example 503 includes, wherein the group of parameters to be measured are indicated by the node.

In Example 505, the subject matter of Examples 503-504 includes, wherein the group of parameters to be measured are indicated by the at least one device.

In Example 506, the subject matter of Examples 503-505 includes, wherein the group of parameters to be measured are partitioned among neighboring devices using device-to-device (D2D) communication.

In Example 507, the subject matter of Examples 498-506 includes, wherein the measurement information includes key performance indicators (KPIs) that characterize RATs of the list of available RATs.

In Example 508, the subject matter of Example 507 includes, wherein KPIs include at least two of latency, congestion level, load, voice support, data rates supported, range, power level, bands covered, signal conditions, coexistence cap abilities, cryptographic cap abilities, and spectrum access method.

In Example 509, the subject matter of Example 508 includes, wherein KPIs further include an indication as to times at which a corresponding RAT is expected to be powered down.

In Example 510, the subject matter of Examples 500-509 includes, wherein the database table includes at least one validity indicator field to indicate trustworthiness of measurements.

In Example 511, the subject matter of Example 510 includes, wherein trustworthiness is based on at least one of a location where a corresponding measurement was taken, and a time of day when the corresponding measurement was taken.

In Example 512, the subject matter of Examples 498-511 includes, means for terminating usage of a RAT subsequent to detecting that operating conditions for the RAT have deteriorated below a threshold.

In Example 513, the subject matter of Examples 498-512 includes, means for determining to establish a group of communication links with a selected group of RATs of the list of available RATs.

In Example 514, the subject matter of Example 513 includes, wherein the selected group of RATs is selected based upon a range KPI of RATs of the list of available RATs.

In Example 515, the subject matter of Examples 513-514 includes, wherein the selected group of RATs is selected based upon susceptibility of RATs of the list of available RATs to deep shadowing.

In Example 516, the subject matter of Examples 498-515 includes, wherein the list of available RATs is provided by the node.

In Example 517, the subject matter of Examples 498-516 includes, wherein the list of available RATs is provided by a neighboring device using device-to-device (D2D) communication.

In Example 518, the subject matter of Examples 498-517 includes, means for encoding for transmission to the node, a request to use a RAT of the list of available RATs.

In Example 519, the subject matter of Example 518 includes, means for encoding for transmission to the node, a request to use a group of RATs of the list of available RATs.

In Example 520, the subject matter of Examples 498-519 includes, means for implementing RAT hopping by selecting a first RAT for transmission of a first portion of a transmission and by selecting a second RAT for transmission of a second portion of the transmission.

In Example 521, the subject matter of Example 520 includes, means for selecting the first RAT for a control portion of a transmission; and means for selecting the second RAT for a data portion of the transmission.

Example 522 is a communication device for vehicular radio communications, the communication device comprising: a plurality of transceivers, wherein each transceiver is configured to operate in a vehicular radio communication technology of a plurality of available vehicular radio communication technologies, and wherein the plurality of transceivers are interconnected via a convergence function; and one or more processors configured to: establish connection with a second communication device using a first transceiver of the plurality of transceivers and a first vehicular radio communication technology of the plurality of available vehicular radio communication technologies; receive via a convergence function at the second communication device, credentials information associated with an active communication link between the second communication device and a third communication device, the active communication link using a second vehicular radio communication technology of the plurality of available vehicular radio communication technologies; and establish a communication link with the third communication device based on the credentials information received via the convergence function at the second communication device.

In Example 523, the subject matter of Example 522 includes, wherein the one or more processors are further configured to: establish an inter-convergence function interface between the convergence function at the communication device and the convergence function at the second communication device.

In Example 524, the subject matter of Example 523 includes, wherein the one or more processors are further configured to: receive via the established connection and the inter-convergence function interface, device cap abilities information indicative of vehicular radio communication technologies available at the second communication device; and request the credentials information upon determining the second vehicular radio communications technology is available at both the communication device and the second communication device.

In Example 525, the subject matter of Examples 522-524 includes, wherein the convergence function comprises a convergence function component in each of a plurality of media access control (MAC) layers, the plurality of MAC layers corresponding to the plurality of available vehicular radio communication technologies.

In Example 526, the subject matter of Examples 522-525 includes, wherein the convergence function comprises a media access control (MAC) layer that is common to the plurality of available vehicular radio communication technologies.

In Example 527, the subject matter of Example 526 includes, wherein the one or more processors are further configured to: dynamically place the convergence function as the MAC layer that is common to the plurality of available vehicular radio communication technologies upon detecting incompatibility between at least one of the plurality of vehicular radio communication technologies available at the communication device and at least one of a plurality of vehicular radio communication technologies available at the second communication device.

In Example 528, the subject matter of Examples 522-527 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 529, the subject matter of Example 528 includes, wherein the first vehicular radio communication technology is the Bluetooth radio communication technology, and the second vehicular radio communication technology is the IEEE 802.11 radio communication technology, the LTE radio communication technology, or the 5G radio communication technology.

In Example 530, the subject matter of Examples 522-529 includes, wherein the one or more processors are further configured to: receive via an inter-convergence function interface between the convergence function at the communication device and the convergence function at the second communication device, a confirmation that the communication link between the second communication device and the third communication device is deactivated.

In Example 531, the subject matter of Example 530 includes, wherein the one or more processors are further configured to: establish the communication link with the third communication device based on the credentials information received via the convergence function at the second communication device up on receiving the confirmation.

In Example 532, the subject matter of Examples 522-531 includes, wherein the one or more processors are further configured to: establish the connection with the second communication device using a hardwired docking connection between the communication device and the second communication device.

In Example 533, the subject matter of Examples 522-532 includes, wherein the credentials information is associated with activating a transceiver at the second communication device for operation using the second vehicular radio communication technology.

In Example 534, the subject matter of Example 533 includes, wherein the one or more processors are further configured to: activate a second transceiver of the plurality of transceivers to operate as a hotspot based on the received credentials information.

In Example 535, the subject matter of Example 534 includes, wherein the one or more processors are further configured to: establish a communication link between the convergence function at the communication device and a second transceiver at the second communication device via the convergence function of the second communication device.

In Example 536, the subject matter of Example 535 includes, wherein the second transceiver at the second communication device is configured to operate as an LTE backhaul for the hotspot.

Example 537 is a method for performing vehicular radio communications, the method comprising: by a communication device: establishing connection with a second communication device using a first transceiver of a plurality of transceivers and a first vehicular radio communication technology of a plurality of available vehicular radio communication technologies; receiving via a convergence function at the second communication device, credentials information associated with an active communication link between the second communication device and a third communication device, the active communication link using a second vehicular radio communication technology of the plurality of available vehicular radio communication technologies; and establishing a communication link with the third communication device based on the credentials information received via the convergence function at the second communication device.

In Example 538, the subject matter of Example 537 includes, establishing an inter-convergence function interface between the convergence function at the communication device and the convergence function at the second communication device.

In Example 539, the subject matter of Example 538 includes, receiving via the established connection and the inter-convergence function interface, device capabilities information indicative of vehicular radio communication technologies available at the second communication device; and requesting the credentials information upon determining the second vehicular radio communications technology is available at both the communication device and the second communication device.

In Example 540, the subject matter of Examples 537-539 includes, wherein the convergence function comprises a convergence function component in each of a plurality of media access control (MAC) layers, the plurality of MAC layers corresponding to the plurality of available vehicular radio communication technologies.

In Example 541, the subject matter of Examples 537-540 includes, wherein the convergence function comprises a media access control (MAC) layer that is common to the plurality of available vehicular radio communication technologies.

In Example 542, the subject matter of Example 541 includes, dynamically p lacing the convergence function as the MAC layer that is common to the plurality of available vehicular radio communication technologies upon detecting incompatibility between at least one of the plurality of vehicular radio communication technologies available at the communication device and at least one of a plurality of vehicular radio communication technologies available at the second communication device.

In Example 543, the subject matter of Examples 537-542 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 544, the subject matter of Example 543 includes, wherein the first vehicular radio communication technology is the Bluetooth radio communication technology, and the second vehicular radio communication technology is the IEEE 802.11 radio communication technology or a cellular radio communication technology.

In Example 545, the subject matter of Examples 537-544 includes, receiving via an inter-convergence function interface between the convergence function at the communication device and the convergence function at the second communication device, a confirmation that the communication link between the second communication device and the third communication device is deactivated.

In Example 546, the subject matter of Example 545 includes, establishing the communication link with the third communication device based on the credentials information received via the convergence function at the second communication device up on receiving the confirmation.

In Example 547, the subject matter of Examples 537-546 includes, establishing the connection with the second communication device using a hardwired docking connection between the communication device and the second communication device.

In Example 548, the subject matter of Examples 537-547 includes, wherein the credentials information is associated with activating a transceiver at the second communication device for operation using the second vehicular radio communication technology.

In Example 549, the subject matter of Example 548 includes, activating a second transceiver of the plurality of transceivers to operate as a hotspot based on the received credentials information.

In Example 550, the subject matter of Example 549 includes, establishing a communication link between the convergence function at the communication device and a second transceiver at the second communication device via the convergence function of the second communication device.

In Example 551, the subject matter of Example 550 includes, wherein the second transceiver at the second communication device is configured to operate as an LTE backhaul for the hotspot.

Example 552 is anon-transitory computer readable medium storing instructions that when executed by a processor cause the processor to perform the method of any one of Examples 537 to 551.

Example 553 is a communication device for vehicular radio communications, the communication device comprising: a plurality of transceivers, wherein each transceiver is configured to operate in a one of a plurality of vehicular radio communication technologies; a communication interface between the plurality of transceivers, the communication interface comprising a vehicle-to-everything (V2X) convergence protocol layer that is common to the plurality of transceivers; and one or more processors configured to: establish a cellular communication link with a second communication device, using a first transceiver of the plurality of transceivers; receive at the V2X convergence protocol layer, congestion information associated with a non-cellular communication channel of the second communication device; and adjust one or more channel access parameters of a non-cellular communication channel associated with a second transceiver of the plurality of transceivers, based on the congestion information.

In Example 554, the subject matter of Example 553 includes, wherein the one or more processors are configured to: adjust transmit power of the second transceiver based on the congestion information.

In Example 555, the subject matter of Examples 553-554 includes, wherein the congestion information is received via a V2X convergence protocol layer of the second communication device.

In Example 556, the subject matter of Example 555 includes, wherein the V2X convergence protocol layer of the second communication device provides a common interface between a plurality of transceivers at the second communication device.

In Example 557, the subject matter of Examples 553-556 includes, wherein: the non-cellular communication channel associated with t the second transceiver is an IEEE 802.11 communication channel between an 802.11 station (STA) and the communication device; and the second communication device is associated with a second STA providing the non-cellular communication channel of the second communication device.

In Example 558, the subject matter of Example 557 includes, wherein the one or more processors are configured to: switch the non-cellular communication channel associated with the second transceiver from the first STA to the second STA based on the congestion information.

Example 559 is a device for performing vehicular radio communications, the device comprising: means for establishing connection with a second communication device using a first transceiver of a plurality of transceivers and a first vehicular radio communication technology of a plurality of available vehicular radio communication technologies; means for receiving via a convergence function at the second communication device, credentials information associated with an active communication link between the second communication device and a third communication device, the active communication link using a second vehicular radio communication technology of the plurality of available vehicular radio communication technologies; and means for establishing a communication link with the third communication device based on the credentials information received via the convergence function at the second communication device.

In Example 560, the subject matter of Example 559 includes, means for establishing an inter-convergence function interface between the convergence function at the communication device and the convergence function at the second communication device.

In Example 561, the subject matter of Example 560 includes, means for receiving via the established connection and the inter-convergence function interface, device capabilities information indicative of vehicular radio communication technologies available at the second communication device; and means for requesting the credentials information up on determining the second vehicular radio communications technology is available at both the communication device and the second communication device.

In Example 562, the subject matter of Examples 559-561 includes, wherein the convergence function comprises a convergence function component in each of a plurality of media access control (MAC) layers, the plurality of MAC layers corresponding to the plurality of available vehicular radio communication technologies.

In Example 563, the subject matter of Examples 559-562 includes, wherein the convergence function comprises a media access control (MAC) layer that is common to the plurality of available vehicular radio communication technologies.

In Example 564, the subject matter of Example 563 includes, means for dynamically placing the convergence function as the MAC layer that is common to the plurality of available vehicular radio communication technologies upon detecting incompatibility between at least one of the plurality of vehicular radio communication technologies available at the communication device and at least one of a plurality of vehicular radio communication technologies available at the second communication device.

In Example 565, the subject matter of Examples 559-564 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 566, the subject matter of Example 565 includes, wherein the first vehicular radio communication technology is the Bluetooth radio communication technology, and the second vehicular radio communication technology is the IEEE 802.11 radio communication technology or a cellular radio communication technology.

In Example 567, the subject matter of Examples 559-566 includes, means for receiving via an inter-convergence function interface between the convergence function at the communication device and the convergence function at the second communication device, a confirmation that the communication link between the second communication device and the third communication device is deactivated.

In Example 568, the subject matter of Example 567 includes, means for establishing the communication link with the third communication device based on the credentials information received via the convergence function at the second communication device up on receiving the confirmation.

In Example 569, the subject matter of Examples 559-568 includes, means for establishing the connection with the second communication device using a hardwired docking connection between the communication device and the second communication device.

In Example 570, the subject matter of Examples 559-569 includes, wherein the credentials information is associated with activating a transceiver at the second communication device for operation using the second vehicular radio communication technology.

In Example 571, the subject matter of Example 570 includes, means for activating a second transceiver of the plurality of transceivers to operate as a hotspot based on the received credentials information.

In Example 572, the subject matter of Example 571 includes, means for establishing a communication link between the convergence function at the communication device and a second transceiver at the second communication device via the convergence function of the second communication device.

In Example 573, the subject matter of Example 572 includes, wherein the second transceiver at the second communication device is configured to operate as an LTE backhaul for the hotspot.

Example 574 is a method for vehicular radio communications, the method comprising: by a communication device: establishing a cellular communication link with a second communication device, using a first transceiver of a plurality of transceivers; receiving at a convergence protocol layer, congestion information associated with a non-cellular communication channel of the second communication device, wherein the convergence protocol layer is common to the plurality of transceivers; and adjusting one or more channel access parameters of a non-cellular communication channel associated with a second transceiver of the plurality of transceivers, based on the congestion information.

In Example 575, the subject matter of Example 574 includes, adjusting transmit power of the second transceiver based on the congestion information.

In Example 576, the subject matter of Examples 574-575 includes, receiving the congestion information via a convergence protocol layer of the second communication device.

In Example 577, the subject matter of Example 576 includes, wherein the convergence protocol layer of the second communication device provides a common interface between a plurality of transceivers at the second communication device.

In Example 578, the subject matter of Examples 574-577 includes, wherein: the non-cellular communication channel associated with the second transceiver is an IEEE 802.11 communication channel between an 802.11 station (STA) and the communication device; and the second communication device is associated with a second STA providing the non-cellular communication channel of the second communication device.

In Example 579, the subject matter of Example 578 includes, switching the non-cellular communication channel associated with the second transceiver from the first STA to the second STA based on the received congestion information.

Example 580 is a non-transitory computer readable medium storing instructions that when executed by a processor cause the processor to perform the method of any one of Examples 574 to 579.

Example 581 is a device for vehicular radio communications, the device comprising: means for establishing a cellular communication link with a second communication device, using a first transceiver of a plurality of transceivers; means for receiving at a convergence protocol layer, congestion information associated with a non-cellular communication channel of the second communication device, wherein the convergence protocol layer is common to the plurality of transceivers; and means for adjusting one or more channel access parameters of a non-cellular communication channel associated with a second transceiver of the plurality of transceivers, based on the congestion information.

In Example 582, the subject matter of Example 581 includes, means for adjusting transmit power of the second transceiver based on the congestion information.

In Example 583, the subject matter of Examples 581-582 includes, means for receiving the congestion information via a convergence protocol layer of the second communication device.

In Example 584, the subject matter of Example 583 includes, wherein the convergence protocol layer of the second communication device provides a common interface between a plurality of transceivers at the second communication device.

In Example 585, the subject matter of Examples 581-584 includes, wherein: the non-cellular communication channel associated with the second transceiver is an IEEE 802.11 communication channel between an 802.11 station (STA) and the communication device; and the second communication device is associated with a second STA providing the non-cellular communication channel of the second communication device.

In Example 586, the subject matter of Example 585 includes, means for switching the non-cellular communication channel associated with the second transceiver from the first STA to the second STA based on the received congestion information.

Example 587 is a communication device for vehicular radio communications, the communication device comprising: a plurality of transceivers, wherein each transceiver is configured to operate in a one of a plurality of vehicular radio communication technologies; a communication interface between the plurality of transceivers, the communication interface comprising a vehicle-to-every thing (V2X) convergence protocol layer that is common to the plurality of transceivers; and one or more processors configured to: establish a cellular communication link with a second communication device, using a first transceiver of the plurality of transceivers; receive at the V2X convergence protocol layer, credential information associated with a non-cellular communication channel of the communication device; and establish a communication link with a third communication device on the non-cellular communication channel using a second transceiver of the plurality of transceivers and based on the received credential information.

In Example 588, the subject matter of Example 587 includes, wherein the second communication device is a roadside unit (RSU), and the third communication device is an IEEE 802.11 station (STA).

In Example 589, the subject matter of Examples 587-588 includes, wherein the communication link with the third communication device is a continued service application link.

In Example 590, the subject matter of Examples 587-589 includes, wherein the credential information comprises a digital certificate for accessing a continued service application.

Example 591 is a method for vehicular radio communications, the method comprising: establishing a cellular communication link with a second communication device, using a first transceiver of a plurality of transceivers; receiving at a convergence protocol layer that is common to the plurality of transceivers, credential information associated with a non-cellular communication channel of the communication device; and establishing a communication link with a third communication device on the non-cellular communication channel using a second transceiver of the plurality of transceivers and based on the received credential information.

In Example 592, the subject matter of Example 591 includes, communicating via the convergence protocol layer, the received credentials information to the second transceiver.

In Example 593, the subject matter of Examples 591-592 includes, activating the second transceiver from a low-power state upon receiving the credentials information.

Example 594 is a non-transitory computer readable medium storing instructions that when executed by a processor cause the processor to perform the method of any one of Examples 591 to 593.

Example 595 is a device for vehicular radio communications, the device comprising: means for establishing a cellular communication link with a second communication device, using a first transceiver of a plurality of transceivers; means for receiving at a convergence protocol layer that is common to the plurality of transceivers, credential information associated with a non-cellular communication channel of the communication device; and means for establishing a communication link with a third communication device on the non-cellular communication channel using a second transceiver of the plurality of transceivers and based on the received credential information.

In Example 596, the subject matter of Example 595 includes, means for communicating via the convergence protocol layer, the received credentials information to the second transceiver.

In Example 597, the subject matter of Examples 595-596 includes, means for activating the second transceiver from a low-power state up on receiving the credentials information.

Example 598 is a communication device for vehicular radio communications, the communication device comprising: a plurality of transceivers, wherein each transceiver is configured to operate in a one of a plurality of vehicular radio communication technologies; a communication interface between the plurality of transceivers, the communication interface comprising a convergence function that is common to the plurality of transceivers; and one or more processors configured to: receive first localization information via a first transceiver of the plurality of transceivers operating in a first vehicular radio communication technology of the plurality of vehicular radio communication technologies; receive second localization information via a second transceiver of the plurality of transceivers operating in a second vehicular radio communication technology of the plurality of vehicular radio communication technologies; and determine using the convergence function, a localization estimate for a location of the communication device based on the first localization information and the second localization information.

In Example 599, the subject matter of Example 598 includes, wherein the convergence function comprises a convergence function component in each of a plurality of media access control (MAC) layers, the plurality of MAC layers corresponding to the plurality of available vehicular radio communication technologies.

In Example 600, the subject matter of Examples 598-599 includes, wherein the convergence function comprises a media access control (MAC) layer that is common to the plurality of available vehicular radio communication technologies.

In Example 601, the subject matter of Examples 598-600 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 602, the subject matter of Example 601 includes, wherein the first vehicular radio communication technology is the Bluetooth radio communication technology, and the second vehicular radio communication technology is the IEEE 802.11 radio communication technology, the LTE radio communication technology, or the 5G radio communication technology.

In Example 603, the subject matter of Examples 598-602 includes, wherein the first localization information is a first raw measurement information received via the first transceiver from a second communication device.

In Example 604, the subject matter of Example 603 includes, wherein the second localization information is a second raw measurement information received via the second transceiver from a third communication device.

In Example 605, the subject matter of Example 604 includes, wherein the one or more processors are configured to: determine using the convergence function, the localization estimate based on the first raw measurement information and the second raw measurement information.

In Example 606, the subject matter of Examples 598-605 includes, wherein the first localization information is a location estimate of the communication device received via the first transceiver from a second communication device.

In Example 607, the subject matter of Example 606 includes, wherein the one or more processors are configured to: decode a request from a third communication device for the location of the communication device, the request received via the second transceiver.

In Example 608, the subject matter of Example 607 includes, wherein the one or more processors are configured to: in response to the request, encode for transmission via the second transceiver, the location estimate of the communication device received via the first transceiver from the second communication device.

Example 609 is a method for vehicular radio communications, the method comprising: by a communications device comprising a plurality of transceivers coupled via a communication interface with a common convergence function: receiving first localization information via a first transceiver of the plurality of transceivers operating in a first vehicular radio communication technology of a plurality of vehicular radio communication technologies; receiving second localization information via a second transceiver of the plurality of transceivers operating in a second vehicular radio communication technology of the plurality of vehicular radio communication technologies; and determining using the convergence function, a localization estimate for a location of the communication device based on the first localization information and the second localization information.

In Example 610, the subject matter of Example 609 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 611, the subject matter of Examples 609-610 includes, wherein the first localization information is a first raw measurement information received via the first transceiver from a second communication device.

In Example 612, the subject matter of Example 611 includes, wherein the second localization information is a second raw measurement information received via the second transceiver from a third communication device.

In Example 613, the subject matter of Example 612 includes, determining using the convergence function, the localization estimate based on the first raw measurement information and the second raw measurement information.

In Example 614, the subject matter of Examples 609-613 includes, wherein the first localization information is a location estimate of the communication device received via the first transceiver from a second communication device.

In Example 615, the subject matter of Example 614 includes, decoding a request from a third communication device for the location of the communication device, the request received via the second transceiver.

In Example 616, the subject matter of Example 615 includes, in response to the request, encoding for transmission via the second transceiver, the location estimate of the communication device received via the first transceiver from the second communication device.

Example 617 is a non-transitory computer readable medium storing instructions that when executed by a processor cause the processor to perform the method of any one of Examples 609 to 616.

Example 618 is a device comprising: a plurality of transceivers coupled via a communication interface with a common convergence function; means for receiving first localization information via a first transceiver of the plurality of transceivers operating in a first vehicular radio communication technology of a plurality of vehicular radio communication technologies; means for receiving second localization information via a second transceiver of the plurality of transceivers operating in a second vehicular radio communication technology of the plurality of vehicular radio communication technologies; and means for determining using the convergence function, a localization estimate for a location of the communication device based on the first localization information and the second localization information.

In Example 619, the subject matter of Example 618 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 620, the subject matter of Examples 618-619 includes, wherein the first localization information is a first raw measurement information received via the first transceiver from a second communication device.

In Example 621, the subject matter of Example 620 includes, wherein the second localization information is a second raw measurement information received via the second transceiver from a third communication device.

In Example 622, the subject matter of Example 621 includes, means for determining using the convergence function, the localization estimate based on the first raw measurement information and the second raw measurement information.

In Example 623, the subject matter of Examples 618-622 includes, wherein the first localization information is a location estimate of the communication device received via the first transceiver from a second communication device.

In Example 624, the subject matter of Example 623 includes, means for decoding a request from a third communication device for the location of the communication device, the request received via the second transceiver.

In Example 625, the subject matter of Example 624 includes, means for encoding for transmission via the second transceiver, the location estimate of the communication device received via the first transceiver from the second communication device, in response to the request.

Example 626 is a method for vehicular radio communications, the method comprising: by a communications device comprising a plurality of transceivers coup led via a communication interface with a common convergence function: receiving first estimate information via a first transceiver of the plurality of transceivers operating in a first vehicular radio communication technology of a plurality of vehicular radio communication technologies, the first estimate information indicative of available bandwidth at a second communication device operating in accordance with the first vehicular radio communication technology; receiving second estimate information via a second transceiver of the plurality of transceivers operating in a second vehicular radio communication technology of the plurality of vehicular radio communication technologies, the second estimate information indicative of available bandwidth at a third communication device operating in accordance with the second vehicular radio communication technology; determining using the convergence function, transmission scheduling information for communicating with the second and third communication devices, based on the received first and second estimate information; and transmitting via the common convergence function, the scheduling information to the second and third communication devices.

In Example 627, the subject matter of Example 626 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 628, the subject matter of Examples 626-627 includes, wherein the first estimate information comprises interference estimate information measured at the second communication device.

In Example 629, the subject matter of Examples 626-628 includes, wherein the second estimate information comprises interference estimate information measured at the third communication device.

In Example 630, the subject matter of Examples 626-629 includes, transmitting via the common convergence function, the scheduling information to the first transceiver and the second transceiver.

Example 631 is a device for vehicular radio communications, the device comprising: a plurality of transceivers coupled via a communication interface with a common convergence function; means for receiving first estimate information via a first transceiver of the plurality of transceivers operating in a first vehicular radio communication technology of a plurality of vehicular radio communication technologies, the first estimate information indicative of available bandwidth at a second communication device operating in accordance with the first vehicular radio communication technology; means for receiving second estimate information via a second transceiver of the plurality of transceivers operating in a second vehicular radio communication technology of the plurality of vehicular radio communication technologies, the second estimate information indicative of available bandwidth at a third communication device operating in accordance with the second vehicular radio communication technology; means for determining using the convergence function, transmission scheduling information for communicating with the second and third communication devices, based on the received first and second estimate information; and means for transmitting via the common convergence function, the scheduling information to the second and third communication devices.

In Example 632, the subject matter of Example 631 includes, wherein the plurality of vehicular radio communication technologies includes: a dedicated short-range communication (DSRC) radio communication technology; wireless access vehicular environment (WAVE) radio communication technology; Bluetooth radio communication technology; an IEEE 802.11 radio communication technology; an LTE radio communication technology; and a 5G radio communication technology.

In Example 633, the subject matter of Examples 631-632 includes, wherein the first estimate information comprises interference estimate information measured at the second communication device.

In Example 634, the subject matter of Examples 631-633 includes, wherein the second estimate information comprises interference estimate information measured at the third communication device.

In Example 635, the subject matter of Examples 631-634 includes, means for transmitting via the common convergence function, the scheduling information to the first transceiver and the second transceiver.

Example 636 is a wireless vehicular communication system, comprising: a vehicular terminal device comprising a plurality of transceivers, wherein each transceiver is configured to operate in a radio access technology (RAT) of a plurality of available RATs; and a primary communication node, the primary communication node comprising a hardware processor configured to: receive measurement information from the vehicular terminal device via a first multi-radio communication link associated with at least a first RAT of the plurality of available RATs; configure via a second multi-radio communication link, a secondary communication node for communication with the vehicular terminal device; and encode for transmission to the vehicular terminal device, configuration information associated with the secondary communication node, the configuration information for establishing a third multi-radio communication link between the secondary communication node and the vehicular terminal device.

In Example 637, the subject matter of Example 636 includes, wherein each of the first, second, and third multi-radio communication links are configured to use one or more of the plurality of available RATs.

In Example 638, the subject matter of Examples 636-637 includes, wherein the first multi-radio communication link is a 3GPP carrier aggregated communication link, and the hardware processor is an evolved Node-B (eNB) Radio Resource Controller (RRC).

In Example 639, the subject matter of Examples 636-638 includes, wherein the measurement information includes vehicle location information associated with the vehicular terminal device.

In Example 640, the subject matter of Example 639 includes, wherein the hardware processor is further configured to: estimate a future vehicle location associated with the vehicular terminal device based on the vehicle location information; and select the secondary communication node from a plurality of nodes based on the estimated future vehicle location.

In Example 641, the subject matter of Examples 636-640 includes, wherein the measurement information includes channel quality information for one or more available channels at the vehicular terminal device, the one or more available channels associated with at least one of the plurality of RATs.

In Example 642, the subject matter of Example 641 includes, wherein to configure the secondary communication node, the hardware processor is further configured to: select the secondary communication node from a plurality of nodes based the channel quality information for the one or more available channels at the vehicular terminal device.

In Example 643, the subject matter of Example 642 includes, wherein to configure the secondary communication node, the hardware processor is further configured to: encode for transmission to the secondary communication node, an indication of a RAT of the plurality of available RATs selected for use with the third multi-radio communication link between the secondary communication node and the vehicular terminal device, based the channel quality information for the one or more available channels at the vehicular terminal device.

In Example 644, the subject matter of Example 643 includes, wherein the configuration information associated with the secondary communication node includes an indication of the selected RAT for use with the third multi-radio communication link between the secondary communication node and the vehicular terminal device.

In Example 645, the subject matter of Examples 636-644 includes, wherein the primary communication node is an evolved Node-B (eNB) and the secondary communication node is a roadside unit (RSU).

In Example 646, the subject matter of Examples 636-645 includes, wherein the vehicular terminal device is configured for dual connectivity with the primary communication node and the secondary communication node.

In Example 647, the subject matter of Example 646 includes, wherein during the dual connectivity, the first multi-radio communication link and the third multi-radio communication link are simultaneously active.

In Example 648, the subject matter of Example 647 includes, wherein during the dual connectivity, the first multi-radio communication link is used for data communication and the third multi-radio communication link is used for communication of control information.

In Example 649, the subject matter of Examples 647-648 includes, wherein the second multi-radio communication link is a backhaul data connection for the first multi-radio communication link between the vehicular terminal device and the primary communication node.

In Example 650, the subject matter of Examples 636-649 includes, wherein the plurality of RATs includes: a dedicated short-range communication (DSRC) RAT; wireless access vehicular environment (WAVE) RAT; Bluetooth RAT; an IEEE 802.11 RAT; an LTE RAT; and a 5G RAT.

In Example 651, the subject matter of Examples 636-650 includes, wherein the measurement information from the vehicular terminal device includes measurement information for a plurality of nodes accessible by the vehicular terminal device.

In Example 652, the subject matter of Example 651 includes, wherein the hardware processor is further configured to: select the secondary communication node from the plurality of nodes, for communication with the vehicular terminal device based on the measurement information.

In Example 653, the subject matter of Examples 636-652 includes, wherein the plurality of transceivers are interconnected via a convergence function.

In Example 654, the subject matter of Example 653 includes, wherein the convergence function is configured to: establish the third multi-radio communication link between the vehicular terminal device and the secondary communication node based on a current location of the vehicular terminal device.

In Example 655, the subject matter of Examples 636-654 includes, wherein the hardware processor is further configured to: receive the measurement information of the vehicular terminal device from the secondary communication node via the second multi-radio communication link.

In Example 656, the subject matter of Examples 636-655 includes, wherein each of the first, second, and third multi-radio communication links are configured to use a same one the plurality of available RATs at different communication frequencies.

Example 657 is a communication device for radio communications using multiple RATs (multi-RAT), the communication device comprising: a first transceiver of a plurality of available transceivers, the first transceiver configured to communicate with a node using a communication link of a first RAT of the multi-RAT; a second transceiver of the plurality of available transceivers, the second transceiver configured to communicate with the node using one or more intermediate nodes and a communication link of a second RAT of the multi-RAT; and a multi-RAT coordination processor configured to: decode measurement information received from the node, the measurement information indicative of channel quality of the first RAT communication link; and determine to establish a new communication link with the one or more intermediate nodes, based on the decoded measurement information.

In Example 658, the subject matter of Example 657 includes, wherein the first transceiver is configured to communicate with the node using one or more other intermediate nodes and the first RAT communication link.

In Example 659, the subject matter of Examples 657-658 includes, a third transceiver of the plurality of transceivers, the third transceiver configured to communicate with the node using the new communication link, the new communication link being one of the first RAT, the second RAT or a third RAT of the multi-RAT.

In Example 660, the subject matter of Examples 657-659 includes, wherein: the node is a user equipment (UE); and the multi-RAT coordination processor is a Radio Resource Controller (RRC) of an evolved Node-B (eNB).

In Example 661, the subject matter of Examples 657-660 includes, wherein the multi-RAT coordination processor comp rises: a vehicle-to-every thing (V2X) convergence function providing a common interface between the plurality of transceivers.

In Example 662, the subject matter of Example 661 includes, wherein the V2X convergence function is configured to: communicate with a V2X convergence function of the node via the first RAT communication link; and communicate with a V2X convergence function of the one or more intermediate nodes via the second RAT communication link.

In Example 663, the subject matter of Examples 657-662 includes, wherein the node is an eNB and the intermediate node is an RSU.

1 In Example 664, the subject matter of Examples 657-663 includes, wherein the communication device is a vehicular terminal device within a moving vehicle, and the measurement information includes a current location of the moving vehicle.

In Example 665, the subject matter of Example 664 includes, wherein the multi-RAT coordination processor is configured to: estimate a future location of the moving vehicle based on the current location; and select a second intermediate node of the one or more intermediate nodes based on node proximity to the future location; and establish the new communication link with the second intermediate node.

In Example 666, the subject matter of Examples 657-665 includes, wherein the second RAT communication link includes a first communication link between the communication device and the intermediate node, and a second communication link between the intermediate node and the node.

In Example 667, the subject matter of Examples 657-666 includes, wherein the multi-RAT coordination processor configured to: maintain the first RAT communication link to be active simultaneously with the second RAT communication link.

In Example 668, the subject matter of Examples 657-667 includes, an antenna array comprising a plurality of multiple-input-multiple-output (MIMO) antennas coupled to the plurality of available transceivers.

In Example 669, the subject matter of Example 668 includes, wherein: the first transceiver is configured to communicate with the node using the first RAT communication link and a first subset of the MIMO antennas; and the second transceiver is configured to communicate with the node using the second RAT communication link and a second subset of the MIMO antennas.

In Example 670, the subject matter of Examples 657-669 includes, wherein the second transceiver of the plurality of available transceivers is configured to communicate with the node using a communication link of a third RAT of the multi-RAT and without the use of the one or more intermediate nodes.

In Example 671, the subject matter of Example 670 includes, wherein the multi-RAT coordination processor is configured to: maintain both the first RAT communication link and the third RAT communication link for simultaneous connection to the node.

In Example 672, the subject matter of Example 671 includes, wherein the first RAT communication link comprises a data channel and the third RAT communication link comprises a control channel for communicating control information.

In Example 673, the subject matter of Example 672 includes, wherein the multi-RAT coordination processor is configured to: use at least a portion of the control information to control direct communication between a plurality of other nodes associated with the communication device in a communication framework, the direct communication using one or more RATs of the multi-RAT, the one or more RATs distinct from the third RAT.

In Example 674, the subject matter of Example 673 includes, wherein the communication framework is based on LTE dual connectivity framework.

Example 675 is a method for performing vehicular radio communications using multiple RATs (multi-RAT), the method comprising: by a communication device: establishing a communication link with a first node using a first transceiver of a plurality of transceivers and a first RAT of the multi-RAT; establishing a communication link with a second node using a second transceiver of a plurality of transceivers and a second RAT of the multi-RAT; receiving via the first RAT communication link, first map data from the first node; receiving via the second RAT communication link, second map data from the second node; and generating up dated map data associated with a current location of the communication device based on the first map data and the second map data.

In Example 676, the subject matter of Example 675 includes, wherein: the communication device is a vehicular terminal device in a moving vehicle; the first node is a primary communication node; and the second node is a secondary communication node.

In Example 677, the subject matter of Example 676 includes, receiving the first map data as a unicast message from the primary communication node.

In Example 678, the subject matter of Examples 676-677 includes, receiving the first map data as a broadcast message from the primary communication node, wherein the first map data is broadcast to the communication device and to the secondary communication node.

In Example 679, the subject matter of Examples 675-678 includes, wherein the first map data is redundant with the second map data.

In Example 680, the subject matter of Examples 675-679 includes, wherein the first map data is non-redundant with the second map data, and the method comprises: combining the first map data and the second map data to generate the updated map data.

Example 681 is a device for performing vehicular radio communications using multiple RATs (multi-RAT), the device comprising: means for establishing a communication link with a first node using a first transceiver of a plurality of transceivers and a first RAT of the multi-RAT; means for establishing a communication link with a second node using a second transceiver of a plurality of transceivers and a second RAT of the multi-RAT; means for receiving via the first RAT communication link, first map data from the first node; means for receiving via the second RAT communication link, second map data from the second node; and means for generating updated map data associated with a current location of the communication device based on the first map data and the second map data.

In Example 682, the subject matter of Example 681 includes, wherein: the communication device is a vehicular terminal device in a moving vehicle; the first node is a primary communication node; and the second node is a secondary communication node.

In Example 683, the subject matter of Example 682 includes, means for receiving the first map data as a unicast message from the primary communication node.

In Example 684, the subject matter of Examples 682-683 includes, means for receiving the first map data as a broadcast message from the primary communication node, wherein the first map data is broadcast to the communication device and to the secondary communication node.

In Example 685, the subject matter of Examples 681-684 includes, wherein the first map data is redundant with the second map data.

In Example 686, the subject matter of Examples 681-685 includes, wherein the first map data is non-redundant with the second map data, and the device comprises: means for combining the first map data and the second map data to generate the updated map data.

Example 687 is a communication device for radio communications using multiple RATs (multi-RAT), the communication device comprising: a first transceiver of a plurality of available transceivers, the first transceiver configured to communicate with an infrastructure node using a communication link of a first RAT of the multi-RAT; and a multi-RAT coordination processor configured to: decode control information from the infrastructure node, the control information including vehicle-to-vehicle (V2V) device discovery information; and establish using a second transceiver of the plurality of available transceivers, a new communication link with a second node based on the V2V device discovery information, wherein the second transceiver is configured to communicate with the second node using a communication link of a second RAT of the multi-RAT.

In Example 688, the subject matter of Example 687 includes, wherein the second node is a line-of-sight (LOS) vehicle and the second RAT communication link is a V2V communication link based on one or more of a Wi-Fi Direct connectivity framework, a Wi-Fi Aware connectivity network, an LTE-Direct connectivity framework, or 5G connectivity network.

In Example 689, the subject matter of Examples 687-688 includes, wherein the first RAT communication link is an LTE or 5G communication link and is configured to provide control plane for managing V2V connectivity.

In Example 690, the subject matter of Examples 687-689 includes, wherein the control information from the infrastructure node further includes V2V resource allocation and V2V synchronization information for assisting with establishing the new communication link with the second node.

In Example 691, the subject matter of Examples 687-690 includes, wherein the multi-RAT coordination processor is configured to: establish the new communication link as a direct V2V link with the second node; and establish using a third transceiver of the plurality of available transceivers, another communication link with the second node via an intermediate node, based on the V2V device discovery information.

In Example 692, the subject matter of Example 691 includes, wherein the intermediate node is a roadside unit (RSU).

In Example 693, the subject matter of Examples 691-692 includes, wherein the multi-RAT coordination processor is configured to: decode sensor data received from the intermediate node, wherein the sensor data originates from a non-line-of-sight (NLOS) vehicle in communication with the intermediate node.

In Example 694, the subject matter of Examples 691-693 includes, wherein the multi-RAT coordination processor is configured to: encode data for redundant transmission to the second node via both the direct V2V link and via the another communication link with the second node via the intermediate node.

Example 695 is at least one machine-readable medium including instructions that, when executed by processing circuitry, cause the processing circuitry to perform operations to implement of any of Examples 1-694.

Example 696 is an apparatus comprising means to implement of any of Examples 1-694.

Example 697 is a system to implement of any of Examples 1-694.

Example 698 is a method to implement of any of Examples 1-694.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other aspects may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as aspects may feature a subset of said features. Further, aspects may include fewer features than those disclosed in a particular example. Thus, the following claims are hereby incorporated into the Detailed Description, with a claim standing on its own as a separate aspect. The scope of the aspects disclosed herein is to be determined with reference to the appended claims, along with the full scope of equivalents to which such claims are entitled.

The invention claimed is:

1. A multi-radio access technology (RAT) device, the device comprising:
    a transceiver interface including multiple connections to communicate with multiple transceiver chains, each of the multiple transceiver chains supporting at least one RAT of multiple RATs; and
    one or more processors configured to:
        receive via a first transceiver chain of the multiple transceiver chains, a data stream from a first communication node via a communication link associated with a first RAT of the multiple RATs;
        apply a code to the data stream to generate an encoded data stream; and
        replicate the encoded data stream to generate a plurality of encoded data streams, the plurality of encoded data streams for transmission to at least a second communication node via one or more other communication links of the first transceiver chain.

2. The device of claim 1, wherein the one or more processors are configured to:
    cause transmission of at least one of the plurality of encoded data streams to the at least second communication node via a second transceiver chain of the multiple transceiver chains, the second transceiver chain associated with a second RAT of the multiple RATS.

3. The device of claim 1, wherein the plurality of encoded data streams includes a first encoded data stream, and the one or more processors are configured to control transmission of the first encoded data stream to the first communication node via the communication link associated with the first RAT.

4. The device of claim 3, wherein the plurality of encoded data streams includes at least a second encoded data stream, and the one or more processors are configured to control transmission of the at least second encoded data stream to at least the second communication node via the one or more other communication links of the first transceiver chain.

5. The device of claim 4, wherein the one or more other communication links are associated with the first RAT of the multiple RATs.

6. The device of claim 1, wherein the one or more processors are configured to control transmission of the plurality of encoded data streams to the at least second communication node via one or more communication links of a second transceiver chain of the multiple transceiver chains.

7. The device of claim 6, wherein the one or more communication links of the second transceiver chain are associated with one or more RATs of the multiple RATs that are different from the first RAT.

8. The device of claim 1, wherein the code includes one or more of:
    a repetition code;
    a systematic code;
    a raptor code; or
    a fountain code.

9. A method for multi-radio access technology (RAT) communication by a device including a transceiver interface including multiple connections to communicate with multiple transceiver chains, each of the multiple transceiver chains supporting at least one RAT of multiple RATs, the method comprising:
    receiving via a first transceiver chain of the multiple transceiver chains, a data stream from a first communication node via a communication link associated with a first RAT of the multiple RATs;
    applying a code to the data stream to generate an encoded data stream; and
    replicating the encoded data stream to generate a plurality of encoded data streams; and
    causing transmission of the plurality of encoded data streams to at least a second communication node via one or more other communication links of the first transceiver chain.

10. The method of claim 9, comprising:
    causing transmission of at least one of the plurality of encoded data streams to the at least second communication node via a second transceiver chain of the multiple transceiver chains, the second transceiver chain associated with a second RAT of the multiple RATs.

11. The device of claim 1, wherein the one or more processors are further configured to:
    receive via an inter-convergence function interface between a convergence function at the first communication node and a convergence function at the second communication node, a confirmation that a communication link between the second communication node and a third communication node is deactivated.

12. The device of claim 11, wherein the one or more processors are further configured to:
    establish a communication link with the third communication node based on credentials information received via the convergence function at the second communication node upon receiving the confirmation.

13. At least one non-transitory machine-readable storage medium comprising instructions, wherein the instructions, when executed by a processing circuitry of a multi-radio access technology (RAT) device including a transceiver interface, the transceiver interface including multiple connections to communicate with multiple transceiver chains, the multiple transceiver chains supporting multiple RATs, cause the processing circuitry to perform operations comprising:
    receiving via a first transceiver chain of the multiple transceiver chains, a data stream from a first communication node via a communication link associated with a first RAT of the multiple RATs;

applying a code to the data stream to generate an encoded data stream; and replicating the encoded data stream to generate a plurality of encoded data streams; and causing transmission of the plurality of encoded data streams to at least a second communication node via one or more other communication links of the first transceiver chain.

14. The at least one non-transitory machine-readable storage medium of claim 13, the operations further comprising:

causing transmission of at least one of the plurality of encoded data streams to the at least second communication node via a second transceiver chain of the multiple transceiver chains, the second transceiver chain associated with a second RAT of the multiple RATs.

* * * * *

UNITED STATES PATENT AND TRADEMARK OFFICE
CERTIFICATE OF CORRECTION

PATENT NO. : 11,304,037 B2
APPLICATION NO. : 16/623348
DATED : April 12, 2022
INVENTOR(S) : Fechtel et al.

It is certified that error appears in the above-identified patent and that said Letters Patent is hereby corrected as shown below:

In the Claims

In Column 131, Line 50, in Claim 2, delete "RATS." and insert --RATs.-- therefor Signed and Sealed this
Third Day of September, 2024

Katherine Kelly Vidal
*Director of the United States Patent and Trademark Office*